US010887277B2

(12) United States Patent
Kwon et al.

(10) Patent No.: US 10,887,277 B2
(45) **Date of Patent: *Jan. 5, 2021**

(54) APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

(71) Applicant: LG ELECTRONICS INC., Seoul (KR)

(72) Inventors: Woosuk Kwon, Seoul (KR); Minsung Kwak, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,698

(22) Filed: Sep. 13, 2019

(65) Prior Publication Data

US 2020/0014657 A1 Jan. 9, 2020

Related U.S. Application Data

(63) Continuation of application No. 16/050,395, filed on Jul. 31, 2018, now Pat. No. 10,454,885, which is a (Continued)

(51) Int. Cl.
*H04L 12/741* (2013.01)
*H04L 29/06* (2006.01)
(Continued)

(52) U.S. Cl.
CPC .......... *H04L 61/2592* (2013.01); *H04L 41/50* (2013.01); *H04L 45/745* (2013.01);
(Continued)

(58) Field of Classification Search
None
See application file for complete search history.

(56) References Cited

U.S. PATENT DOCUMENTS 8,358,670 B2 1/2013 Na et al.
10,205,556 B2 * 2/2019 Kwak .................. H04L 65/607
(Continued)

FOREIGN PATENT DOCUMENTS

EP 2645709 A2 10/2013
KR 10-2014-0043237 A 4/2014
(Continued)

OTHER PUBLICATIONS

ETSI, "Digital Video Broadcasting (DVB); Generic Stream Encapsulation (GSE); Part 1: Protocol," ETSI TS 102 606-1 V1.2.1, Jul. 2014, pp. 1-36.

*Primary Examiner* — Duc T Duong
(74) *Attorney, Agent, or Firm* — Birch, Stewart, Kolasch & Birch, LLP

(57) ABSTRACT

A method for transmitting a broadcast signal in a digital transmitter, includes generating transport packets of transport streams including service data; generating link layer packet including the transport packets; the link layer packet including a base header including configuration information indicating a configuration of a payload of the link layer packet, the link layer packet further including an additional header including information for segmentation or concatenation based on the configuration of the payload, and the additional header further including information representing that an optional header for a sub-stream identification identifier is present after the additional header, the link layer packet further including an optional header having the sub-stream identification identifier; generating signaling information including link mapping information between the sub-stream identifier and an IP address and an UDP port (Continued)

carrying a transport stream for the sub-stream identifier; generating a broadcast signal including the link layer packet and the signaling information; and transmitting the broadcast signal.

8 Claims, 125 Drawing Sheets

Related U.S. Application Data continuation of application No. 14/915,041, filed as application No. PCT/KR2015/013364 on Dec. 8, 2015, now Pat. No. 10,057,211.

(60) Provisional application No. 62/090,860, filed on Dec. 11, 2014, provisional application No. 62/090,352, filed on Dec. 10, 2014.

(51) Int. Cl.

| | |
|---|---|
| *H04L 29/12* | (2006.01) |
| *H04N 21/2343* | (2011.01) |
| *H04N 21/235* | (2011.01) |
| *H04L 12/24* | (2006.01) |
| *H04N 21/2362* | (2011.01) |
| *H04L 29/08* | (2006.01) |

(52) U.S. Cl.

CPC ........... *H04L 69/22* (2013.01); *H04N 21/235* (2013.01); *H04N 21/2343* (2013.01); *H04N 21/2362* (2013.01); *H04L 41/0803* (2013.01); *H04L 61/2007* (2013.01); *H04L 69/16* (2013.01); *H04L 69/324* (2013.01)

(56) References Cited

U.S. PATENT DOCUMENTS

| | | | | |
|---|---|---|---|---|
| 10,389,460 | B2 * | 8/2019 | Lee | H04H 20/423 |
| 2001/0048680 | A1 | 12/2001 | Yoshimura et al. | |
| 2004/0039830 | A1 | 2/2004 | Zhang et al. | |
| 2004/0088642 | A1 | 5/2004 | Imura et al. | |
| 2005/0074024 | A1 * | 4/2005 | Kim | H04L 12/18 370/432 |
| 2005/0201366 | A1 | 9/2005 | Kim et al. | |
| 2007/0211724 | A1 | 9/2007 | Johansson et al. | |
| 2007/0248075 | A1 | 10/2007 | Liu et al. | |
| 2008/0056273 | A1 | 3/2008 | Pelletier et al. | |
| 2008/0080559 | A1 * | 4/2008 | Singh | H04W 24/08 370/477 |
| 2009/0022107 | A1 * | 1/2009 | Kapoor | H04W 36/0055 370/331 |
| 2009/0296624 | A1 | 12/2009 | Ryu et al. | |
| 2010/0257570 | A1 | 10/2010 | Song et al. | |
| 2012/0113993 | A1 * | 5/2012 | Sridhar | H04L 69/04 370/474 |
| 2013/0279516 | A1 | 10/2013 | Shi | |
| 2014/0198876 | A1 | 7/2014 | Hong et al. | |
| 2014/0314103 | A1 | 10/2014 | Michael | |
| 2015/0023249 | A1 | 1/2015 | Hwang et al. | |
| 2015/0036689 | A1 | 2/2015 | Hwang et al. | |
| 2015/0237179 | A1 | 8/2015 | Sridhar et al. | |
| 2015/0341052 | A1 | 11/2015 | Jeong et al. | |
| 2016/0127522 | A1 | 5/2016 | Yang et al. | |
| 2016/0134532 | A1 | 5/2016 | Hwang et al. | |
| 2017/0155473 | A1 | 6/2017 | Jeong et al. | |

FOREIGN PATENT DOCUMENTS

| | | | |
|---|---|---|---|
| KR | 10-1435841 | B1 | 9/2014 |
| WO | WO 2016/067954 | A1 | 5/2016 |
| WO | WO 2016/072747 | A1 | 5/2016 |

* cited by examiner

FIG. 2

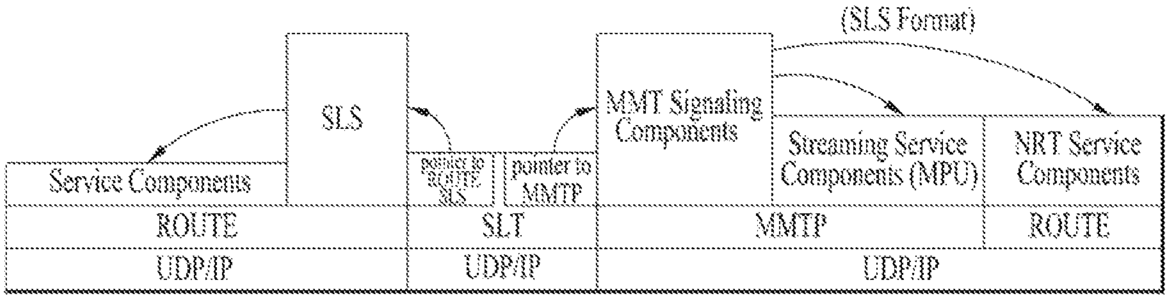

FIG. 3

| Element or Attribute Name | Use |
|---|---|
| SLT | |
| @bsid | 1 |
| @sltSectionVersion | 1 |
| @sltSectionNumber | 0..1 |
| @totalSltSectionNumbers | 0..1 |
| @language | 0..1 |
| @capabilities | 0..1 |
| InetSigLoc | 0..1 |
| Service | 1..N |
| @serviceId | 1 |
| @SLT serviceSeqNumber | 1 |
| @protected | 0..1 |
| @majorChannelNo | 1 |
| @minorChannelNo | 1 |
| @serviceCategory | 1 |
| @shortServiceName | 1 |
| @hidden | 0..1 |
| @sls ProtocolType | 1 |
| BroadcastSignaling | 0..1 |
| @slsPlpId | 0..1 |
| @slsDestinationIpAddress | 0..1 |
| @slsDestinationUdpPort | 0..1 |
| @slsSourceIpAddress | 0..1 |
| @slsMajorProtocolVersion | 0..1 |
| @SlsMinorProtocolVersion | 0..1 |
| @serviceLanguage | 0..1 |
| @broadbandAccessRequired | 0..1 |
| @capabilities | 0..1 |
| InetSigLoc | 0..1 |

FIG. 5

| Element or Attribute Name | Use |
|---|---|
| bundleDescription | |
| userServiceDescription | |
| @serviceId | M |
| @atsc: serviceId | M |
| @atsc: serviceStatus | OD |
| @atsc: fullMPDUri | M |
| @atsc: sTSIDUri | M |
| name | 0..N |
| lang | CM |
| serviceLanguage | 0..N |
| atsc: capabilityCode | 0..1 |
| deliveryMethod | 1..N |
| r12: broadcastAppService | 1..N |
| basePattern | 1..N |
| r12: unicastAppService | 0..N |
| basePattern | 1..N |

FIG. 6

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | Use |
|---|---|
| bundleDescription | |
| userServiceDescription | |
| @serviceId | M |
| @atsc: serviceId | M |
| Name | 0..N |
| Lang | CM |
| serviceLanguage | 0..N |
| atsc: capabilityCode | 0..1 |
| atsc: Channel | 1 |
| @atsc: majorChannelNo | M |
| @atsc: minorChannelNo | M |
| @atsc: serviceLang | O |
| @atsc: serviceGenre | O |
| @atsc: serviceIcon | M |
| atsc: ServiceDescription | 0..N |
| @atsc: serviceDescrText | M |
| @atsc: serviceDescrLang | O |
| atsc:mpuComponent | 0..1 |
| @atsc: mmtPackageId | M |
| @atsc: next_MmtPackageId | O |
| atsc: routeComponent | 0..1 |
| @atsc: sTSIDUri | M |
| @slsPlpId | OD |
| @slsDestinationIpAddress | OD |
| @slsDestinationUdpPort | M |
| @slsSourceIpAddress | M |
| @slsMajorProtocolVersion | OD |
| @SlsMinorProtocolVersion | OD |
| atsc: broadbandComponent | 0..1 |
| @atsc: fullMPDUri | M |
| atsc: ComponentInfo | 1..N |
| @atsc: component_Type | M |
| @atsc: component_Role | M |
| @atsc: component_ProtectedFlag | OD |
| @atsc: component_Id | M |
| @atsc: component_Name | O |

FIG. 13
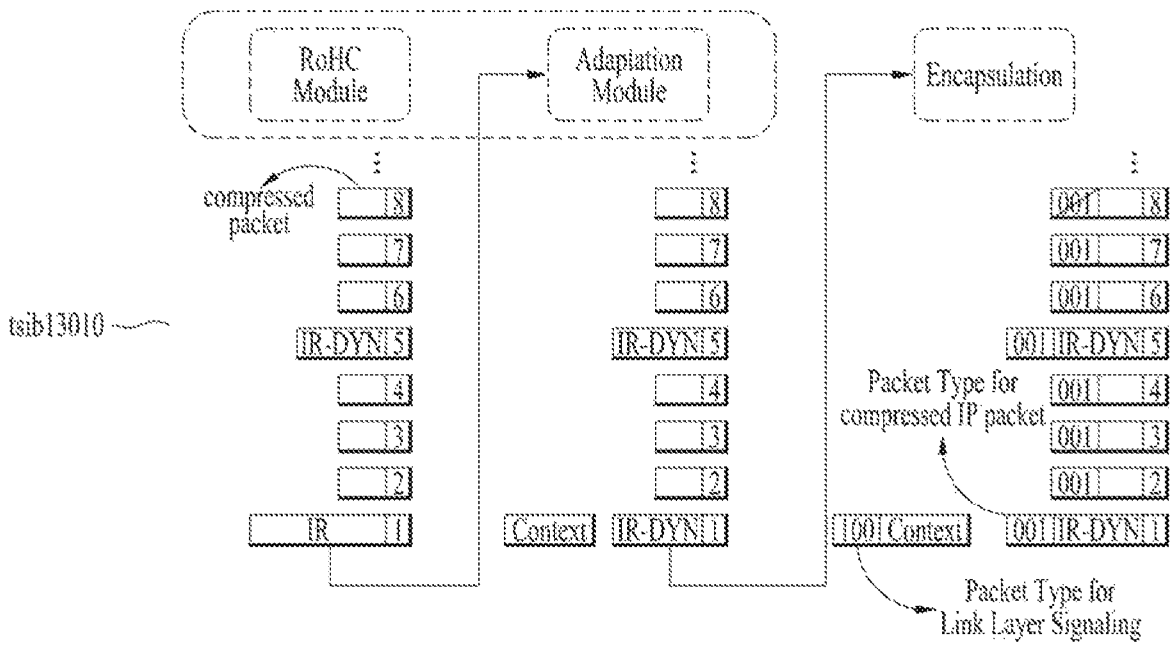
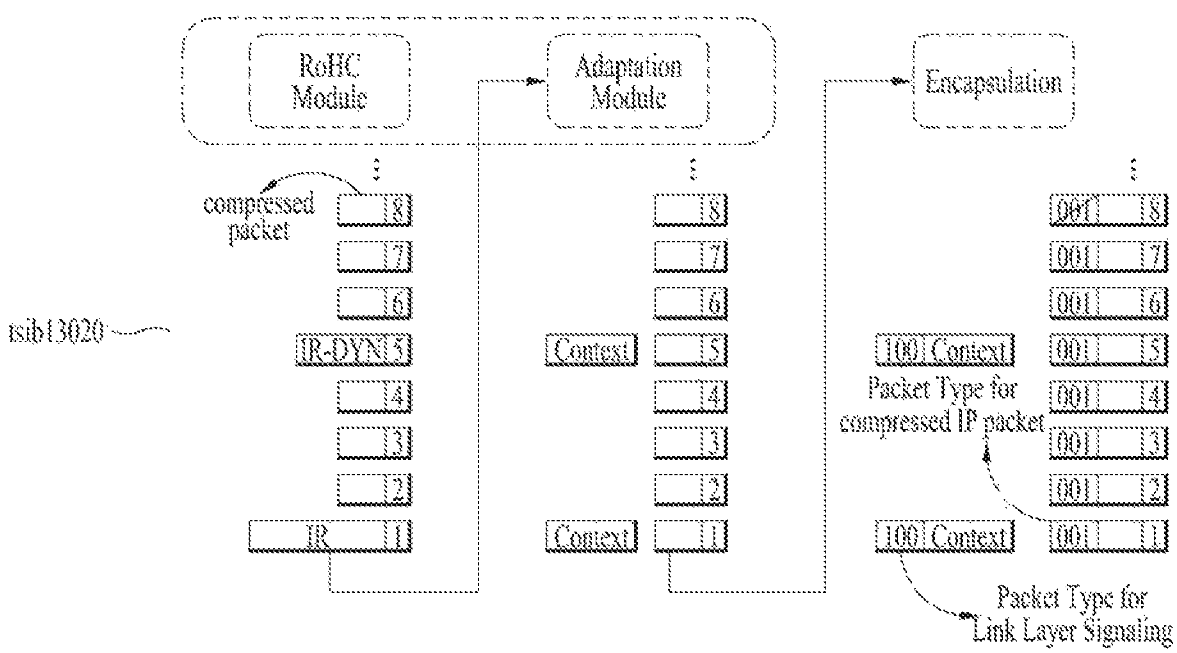

FIG. 14 tsib14010

| Syntax | Number of bits | Mnemonic |
|---|---|---|
| Link_Mapping_Table() { | | |
| signaling_type | 8 | "0x01" |
| PLP_ID | 6 | uimsbf |
| Reserved | 2 | |
| num_session | 8 | uimsbf |
| for(i = 0 ; i < num_session ; i + +) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '000000' |
| if (SID_flag = = "1") { | | |
| SID | 8 | uimsbf |
| } | | |
| if (compressed_flag = = "1") { | | |
| context_id | 8 | uimsbf |
| } | | |
| } | | |
| } | | |

tsib14020

| Syntax | Number of bits | Mnemonic |
|---|---|---|
| ROHC-U_description_table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if (context_config = 0x01) { | | |
| context_length | 8 | uimsbf |
| static_chain_byte () | var | uimsbf |
| } | | |
| else if (context_config = 0X02) { | | |
| context_length | 8 | uimsbf |
| dynamic_chain_byte () | var | uimsbf |
| } | | |
| else if (context_config = 0x03) { | | |
| context_length | 8 | uimsbf |
| static_chain_byte () | var | uimsbf |
| dynamic_chain_byte () | var | uimsbf |
| } | | |
| } | | |

FIG. 22

| Flag | | Operation | | PHY Input Format |
|---|---|---|---|---|
| HCF | EF | Header Compression | Encapsulation | |
| 1 | 1 | Enable | Enable | Link Layer Packet with Compressed IP payload |
| 1 | 0 | Enable | Disable | Not used. |
| 0 | 1 | Disable | Enable | Link Layer Packet with IP payload |
| 0 | 0 | Disable | Disable | IP Packet direct input |

FIG. 24

Table 6.1 RoHC Profiles

| Identifier | Profile | Protocol Combination | Reference | Usage for ATSC 3.0 |
|---|---|---|---|---|
| 0×0000 | RoHC uncompressed | No Compression | RFC 5795 | Optional |
| 0×0001 | RoHC RTP | RTP/UDP/IP | RFC 3095, RFC 4815 | Optional |
| 0×0002 | RoHC UDP | UDP/IP | RFC 3095, RFC 4815 | Mandatory |
| 0×0003 | RoHC ESP | ESP/IP | RFC 3095, RFC 4815 | Not Used |
| 0×0004 | RoHC IP | IP | RFC 3843, RFC 4815 | Mandatory |
| 0×0007 | RoHC RTP/UDP-Life | RTP/UDP-Life/IP | RFC 4019, RFC 4815 | Optional |
| 0×0008 | RoHC UDP-Life | UDP-Life/IP | RFC 4019, RFC 4815 | Optional |
| 0×0101 | RoHCv2 RTP | RTP/UDP/IP | RFC 5225 | Optional |
| 0×0102 | RoHCv2 UDP | UDP/IP | RFC 5225 | Mandatory |
| 0×0103 | RoHCv2 ESP | ESP/IP | RFC 5225 | Not Used |
| 0×0104 | RoHCv2 IP | IP | RFC 5225 | Mandatory |
| 0×0107 | RoHCv2 RTP/UDP-Life | RTP/UDP-Life/IP | RFC 5225 | Optional |
| 0×0108 | RoHCv2 UDP-Life | UDP-Life/IP | RFC 5225 | Optional |

FIG. 28

<table>
<tr><th>Transport Mode</th><th>Static Chain</th><th>Dynamic Chain</th><th>General Header Compressed Packet</th><th>Associated Configuration Mode</th></tr>
<tr><td>Mode 1</td><td>Signaling</td><td>Signaling</td><td rowspan="5">Normal Data Pipe</td><td rowspan="3">Mode 1, Mode 2</td></tr>
<tr><td>Mode 2</td><td>Signaling</td><td>Base Data Pipe</td></tr>
<tr><td>Mode 3</td><td>Base Data Pipe</td><td>Base Data Pipe</td></tr>
<tr><td>Mode 4</td><td>Signaling</td><td rowspan="2">Normal Data Pipe (IR-DYN packet)</td><td rowspan="2">Mode 3</td></tr>
<tr><td>Mode 5</td><td>Base Data Pipe</td></tr>
</table>

FIG. 30

| Syntax | Description |
| --- | --- |
| ATSC3.0_Link_Layer_Packet() { | |
|     Packet_Type | Table 8.1 |
|     if (Packet_Type =="000" ‖ Packet_Type =="001) { | |
|         Link_Layer_Packet_Header_for_IP () | Clause 0 |
|     } | |
|     else if (Packet_Type =="010") { | |
|         Link_Layer_Packet_Header_for_Compressed_IP () | Clause 8.2 |
|     } | |
|     else if (Packet_Type =="011") { | |
|         Link_Layer_Packet_Header_for_TS () | Clause 8.3 |
|     } | |
|     else if (Packet_Type =="110") { | |
|         Link_Layer_Packet_Header_for_Signaling () | Clause 8.4 |
|     } | |
|     else if (Packet_Type =="111") { | |
|         Link_Layer_Packet_Header_for_Framed_Packet () | Clause 8.5 |
|     } | |
|     else if { | |
|         Reserved | |
|     } | |
|     Link_Layer_Packet_Payload () | |
| } | |

FIG. 32

| Syntax | Number of bits | Mnemonic |
|---|---|---|
| ATSC3.0_Link_Layer_Packet_Header() { | | |
| Packet_Type | 3 | '000' or '001' |
| Payload_Config | 1 | bslbf |
| if (Payload_Config =="0") { | | |
| Count | 4 | bslbf |
| } | | |
| else if (Payload_Config =="1) { | | |
| Last_Segment_Indicator | 1 | bslbf |
| Segment_ID | 3 | uimsbf |
| Segment_Sequence_Number | 4 | uimsbf |
| if (Last_Segment_Indicator =="0") { | | |
| Segment_Length_ID | 4 | bslbf |
| } | | |
| else { | | |
| Last_Segment_Length | 12 | uimsbf |
| } | | |
| } | | |
| } | | |

| PC field value | Meaning | Next Field | Extended Header Size | Extended Header Field | Total Header Length |
|---|---|---|---|---|---|
| 0 | Single IP packet or multiple IP packets | Count | - | - | 1 byte |
| 1 | Segmented IP packet | LI(=="0"),Seg_ID | 1 byte | Seg_SN,Seg_Len_ID | 2 bytes |
| | | LI(=="1"),Seg_ID | 2 bytes | Seg_SN,L_Seg_Len | 3 bytes |

FIG. 33

| Count field (4bits) | Number of concatenated (connected) IP packets | Count field (4bits) | Number of concatenated (connected) IP packets |
|---|---|---|---|
| 0000 | 1 | 1000 | 9 |
| 0001 | 2 | 1001 | 10 |
| 0010 | 3 | 1010 | 11 |
| 0011 | 4 | 1011 | 12 |
| 0100 | 5 | 1100 | 13 |
| 0101 | 6 | 1101 | 14 |
| 0110 | 7 | 1110 | 15 |
| 0111 | 8 | 1111 | 16 | t61010

| Segment length ID field | Segment length (byte) | Segment length ID field | Segment length (byte) |
|---|---|---|---|
| 0000 | 512 (= min_Len) | 1000 | 2560 |
| 0001 | 768 | 1001 | 2816 |
| 0010 | 1024 | 1010 | 3072 |
| 0011 | 1280 | 1011 | 3328 |
| 0100 | 1536 | 1100 | 3584 |
| 0101 | 1792 | 1101 | 3840 |
| 0110 | 2048 | 1110 | 4096 |
| 0111 | 2304 | 1111 | 4352 | t61020

FIG. 39

| Syntax | Number of bits | Mnemonic |
|---|---|---|
| ATSC3.0_Link_Layer_Packet_Header() { | | |
|     Packet_Type | 3 | '010' |
|     Payload_Config | 1 | bslbf |
|     if (Payload_Config =="0") { | | |
|         Common_Context_ID_Indicator | 1 | bslbf |
|         Count | 3 | uimsbf |
|         for(i=0; i<Count; i++) { | | |
|             Length | 16 | uimsbf |
|         } | | |
|         if (CI =="1") { | | |
|             Common_CID | 8 or 16 | bslbf |
|         } | | |
|     } | | |
|     else { | | |
|         Last_Segment_Indicator | 1 | bslbf |
|         Segment_ID | 3 | bslbf |
|         Segment_Sequence_Number | 4 | bslbf |
|         if (Last_Segment_Indicator =="0") { | | |
|             Segment_Length_ID | 4 | bslbf |
|         } | | |
|         else { | | |
|             Last_Segment_Indicator | 12 | uimsbf |
|         } | | |
|     } | | |
| } | | |

FIG. 45

| Syntax | Number of bits | Mnemonic |
|---|---|---|
| ATSC3.0_Link_Layer_Packet_Header() { | | |
| Packet_Type | 3 | '110' |
| Payload_Config | 1 | bslbf |
| if (Payload_Config =="0") { | | |
| Count | 4 | uimsbf |
| Signaling_Class | 3 | bslbf |
| Information_Type | 3 | bslbf |
| Signaling_Format | 2 | bslbf |
| if (Signaling_Format =="1×") { | | |
| for(i=0; i<Count; i++){ | | |
| Length | 16 | uimsbf |
| } | | |
| } | | |
| } | | |
| else { | | |
| Last_Segment_Indicator | 1 | bslbf |
| Segment_ID | 3 | uimsbf |
| Segment_Sequence_Number | 4 | uimsbf |
| if (Last_Segment_Indicator =="0") { | | |
| Segment_Length_ID | 4 | bslbf |
| if (Segment_Sequence_Number =="0000") { | | |
| Signaling_Class | 3 | bslbf |
| Information_Type | 3 | bslbf |
| Signaling_Format | 2 | bslbf |
| } | | |
| } | | |
| else { | | |
| Last_Segment_Length | 12 | uimsbf |
| } | | |
| } | | |
| } | | |

FIG. 47

| Syntax | Number of bits | Mnemonic |
|---|---|---|
| ATSC3.0_Link_Layer_Packet_Header() { | | |
| Packet_Type | 3 | '110' |
| Reserved | 5 | bslbf |
| framed_packet() | | |
| } | | |

FIG. 48

| Syntax | Number of bits | Format |
|---|---|---|
| framed_packet () { | | |
| ethernet_type | 16 | uimsbf |
| length | 16 | '11' |
| packet() | Var. | bslbf |
| } | | |

FIG. 49

| Syntax | Number of bits | Mnemonic |
|---|---|---|
| Fast_Information_Chunk(){ | | |
| FIT_data_version | 8 | uimsbf |
| num_broadcast | 8 | uimsbf |
| for(i=0; i<num_broadcast; i++){ | | |
| broadcast_id | 16 | uimsbf |
| delivery_system_id | 16 | uimsbf |
| base_DP_id | 8 | uimsbf |
| base_DP_version | 5 | uimsbf |
| reserved | 3 | '111' |
| num_service | 8 | uimsbf |
| for(j=0; j<num_service; j++){ | | |
| service_id | 16 | uimsbf |
| service_category | 6 | uimsbf |
| service_hidden_flag | 1 | bslbf |
| SP_indicator | 1 | bslbf |
| num_component | 8 | uimsbf |
| for(k=0; k<num_component; k++){ | | |
| component_id | 8 | bslbf |
| DP_id | 8 | bslbf |
| RoHC_init_descriptor() | var | |
| } | | |
| } | | |
| } | | |
| } | | |

FIG. 51

| Syntax | No. Bits | Format |
| --- | --- | --- |
| Emergency_Alert_Table (){ | | |
| table_id | 8 | uimsbf |
| section_synax-indicator | 1 | '0' |
| private_indicator | 1 | '1' |
| reserved | 2 | '11' |
| secion_length | 12 | uimsbf |
| table_id_extension { | | |
| EAT_protocol_version | 8 | 0X0 |
| reserved | 8 | uimsbf |
| } | | |
| reserved | 2 | '11' |
| version_number | 5 | uimsbf |
| current_next_indicator | 1 | '1' |
| section_number | 8 | uimsbf |
| last_section_number | 8 | uimsbf |
| automatic_thing_flag | 1 | bslbf |
| num_EAS_messages | 7 | uimsbf |
| IF(automatic_tuning_flag==0X01) { | | |
| automatic_tuning_channel_number | 8 | uimsbf |
| automatic_tuning_DP_id | 8 | uimsbf |
| automatic_tuning_service_id | 16 | uimsbf |
| } | | |
| for (m=0; m<num_EAS_messages; m++) { | | |
| EAS_message_id | 32 | uimsbf |
| EAS_IP_version_flag | 1 | bslbf |
| EAS_message_transfer_type | 3 | uimsbf |
| EAS_message_encoding_type | 3 | uimsbf |
| EAS_NRT_flag | 1 | bslbf |
| if(EAS_message_transfer_type==0X02) { | | |
| reserved | 4 | '1111' |
| EAS_message_length/*N*/ | 12 | uimsbf |
| EAS_message_bytes() | 8*N | var |
| } | | |
| else if (EAS_message_transfer_type==0X003) { | | |
| IP_address | 32 or 128 | uimsbf |
| UDP_port_num | 16 | uimsbf |
| DP_id | 8 | uimsbf |
| } | | |
| if(EAS_NRT_flag==0X01){ | | |
| EAS_NRT_service_id | 16 | uimsbf |
| } | | |
| } | | |
| } | | |

FIG. 52

| Information Type for Header Compression | Description |
|---|---|
| 000 | Initialization Information |
| 001 | Configytation Parameters |
| 010 | Static Chain |
| 011 | Dynamic Chain |
| 100 | Reserved |
| 101 | Reserved |
| 110 | Reserved |
| 111 | Reserved |

FIG. 53

| Syntax | Number of bits | Mnemonic |
|---|---|---|
| Payload_for_Initialization() { | | |
| num_RoHC_channels | 8 | uimsbf |
| for(i=0; i<num_DP; i++){ | | |
| RoHC_channels_id | 8 | uimsbf |
| max_cid | 16 | uimsbf |
| large_cids | 1 | bslbf |
| reserved | 3 | '111' |
| num_profiles | 4 | uimsbf |
| for(j=0; j<num_profiles; j++){ | | |
| profiles() | var | uimsbf |
| } | | |
| num_IP_stream | 8 | uimsbf |
| for(k=0; k<num_IP_stream; k++){ | | |
| IP_address() | var | uimsbf |
| } | | |
| } | | |
| } | | |

FIG. 54

| Syntax | Number of bits | Mnemonic |
|---|---|---|
| Payload_for_ROHC_configuration() { | | |
|     RoHC_channel_id | 8 | uimsbf |
|     num_context | 8 | uimsbf |
|     for(i=0; i<num_DP; i++){ | | |
|         context_id | 8 or 16 | uimsbf |
|         context_profile | 8 | uimsbf |
|         packet_configuration_mode | 4 | uimsbf |
|         context_transmission_mode | 4 | uimsbf |
|     } | | |
| } | | |

FIG. 55

| Syntax | Number of bits | Mnemonic |
|---|---|---|
| Payload_for_static_chain() { | | |
|     context_id | 8 or 16 | uimsbf |
|     context_profile | 8 | uimsbf |
|     static_chain_length | 8 | uimsbf |
|     static_chain () | var | bslbf |
|     dynamic_chain_incl | 1 | uimsbf |
|     reserved | 7 | '111' |
|     if(dynamic_chain_incl == 0×01){ | | |
|         dynamic_chain_length | 8 | uimsbf |
|         dynamic_chain () | var | bslbf |
|     } | | |
| } | | |

FIG. 56

| Syntax | Number of bits | Mnemonic |
|---|---|---|
| Payload_for_dynamic_chain() { | | |
| context_id | 8 or 16 | |
| context_profile | 8 | uimsbf |
| dynamic_chain_length | 8 | uimsbf |
| dynamic_chain () | var | bslbf |
| } | | |

FIG. 58

| Syntax | No. of bits | Mnemonic |
|---|---|---|
| ATSC3.0_LLP_Header() { | | |
|   Packet_Type | 3 | '000' or '001' |
|   Payload_Config | 1 | bslbf |
|   if (Payload_Config=="0") { | | |
|     Header_Mode | 1 | bslbf |
|     if (Header_Mode =="0") { | | |
|       Length | 11 | uimsbf |
|     } | | |
|     else if (Header_Mode =="1") { | | |
|       Length | 16 | uimsbf |
|       Label_flag | 1 | bslbf |
|       Reserved | 2 | |
|       if (Label_flag=="1") { | | |
|         Label | 24 | uimsbf |
|       } | | |
|     } | | |
|   } | | |
|   else if (Payload_Config=="1"){ | | |
|     SC_flag | 1 | bslbf |
|     if (SC_flag=="0") { | | |
|       Segment_ID | 3 | uimsbf |
|       Segment_SN | 4 | uimsbf |
|       if (Segment_SN=="0000") { | | |
|         F_Segment_Length | 11 | uimsbf |
|         Label_flag | 1 | bslbf |
|         if (Label_flag=="1") { | | |
|           Label | 24 | uimsbf |
|         } | | |
|       } | | |
|       else { | | |
|         Last_Segment_Indicator | 1 | bslbf |
|         Segment_Length_ID | 3 | bslbf |
|       } | | |
|     } | | |
|     else { | | |
|       Count | 3 | uimsbf |
|       Length_Mode | 1 | bslbf |
|       for (i=0; i<Count; i++) { | | |
|         if (Length_Mode=="0") | | |
|           Length | 11 | uimsbf |
|         else | | |
|           Length | 16 | uimsbf |
|       } | | |
|       Padding | var | |
|     } | | |
|   } | | |
| } | | |

FIG. 61

| Segment order | Type | PC | S/C | Seg ID | Seg SN | Length | LI | Seg LenID |
|---|---|---|---|---|---|---|---|---|
| 1 | Same | 1 | 0 | Same | 0000 | Indicates payload length | - | - |
| 2 | | | | | 0001 | - | 0 | Select one value from table |
| 3 | | | | | 0010 | - | 0 | |
| 4 | | | | | 0011 | - | 0 | |
| 5 | | | | | 0100 | - | 0 | |
| 6 | | | | | 0101 | - | 0 | |
| 7 | | | | | 0110 | - | 0 | |
| 8 (Last) | | | | | 0111 | - | 1 | |

FIG. 64

| Packet configuration | 1st byte | 2nd byte | 3rd byte | Header Length | comment |
|---|---|---|---|---|---|
| Short Single Packet | xxx00xxx | xxxxxxxx | - | 2B | |
| Long Single Packet | xxx01xxx | xxxxxxxx | xxxxx0xx | 3B | |
| Segmentation (1st segment) | xxx10xxx | 0000xxxx | xxxxxxx0 | 3B | |
| Segmentation (Int. or Last segment) | xxx10xxx | 1xxxxxxx | - | 2B | |
| Segmentation (Int. or Last segment) | xxx10xxx | x1xxxxxx | - | 2B | |
| Segmentation (Int. or Last segment) | xxx10xxx | xx1xxxxx | - | 2B | |
| Segmentation (Int. or Last segment) | xxx10xxx | xxx1xxxx | - | 2B | |
| Short Packet Concatenation | xxx11nn0 | xxxxxxxx | xxxxxxxx | (11n/8 +1) B | Padding bits are required for byte align |
| Long Packet Concatenation | xxx11nn1 | xxxxxxxx | xxxxxxxx | (2n+1) B | |

t65020

| Segment order | Type | PC | S/C | Seg ID | Seg SN | Length indication | LI |
|---|---|---|---|---|---|---|---|
| 1 | Same | 1 | 0 | 0000 (same for all segments) | 0000 | Indicates payload length using F_Seg_Len | Not defined |
| 2 | | | | | 0001 | Select one value from table and indicate using Seg_Len_ID | 0 |
| 3 | | | | | 0010 | | 0 |
| 4 | | | | | 0011 | | 0 |
| 5 (Last) | | | | | 0100 | | 1 | t66010 t66020

| Segment order | Type | PC | S/C | Seg ID | Seg SN | Length indication | LI |
|---|---|---|---|---|---|---|---|
| 1 | Same | 1 | 0 | 0000 (same for all segments) | 0000 | Indicates payload length using Seg_Len | Not defined |
| 2 | | | | | 0001 | | 0 |
| 3 | | | | | 0010 | | 0 |
| 4 | | | | | 0011 | | 0 |
| 5 (Last) | | | | | 0100 | | 1 | t67010 t67020

| Segment order | Type | PC | S/C | Seg ID | Seg SN | Length indication | LI |
|---|---|---|---|---|---|---|---|
| 1 | Same | 1 | 0 | 0000 (same for all segments) | 0000 | Indicates payload length using Seg_Len | Not defined |
| 2 | | | | | 0001 | | 0 |
| 3 | | | | | 0010 | | 0 |
| 4 | | | | | 0011 | | 0 |
| 5 (Last) | | | | | 0100 | | 1 | t68010 t68020

| Segment order | Type | PC | S/C | Seg ID | Seg SN | LI | Length indication |
|---|---|---|---|---|---|---|---|
| 1 | Same | 1 | 0 | 0000 (same for all segments) | 0000 | 0 | Indicates payload length using Seg_Len |
| 2 | | | | | 0001 | 0 | |
| 3 | | | | | 0010 | 0 | |
| 4 | | | | | 0011 | 0 | |
| 5 (Last) | | | | | 0100 | 1 | | t69010 t69020

| Count (2bits) | No. of Concatenated Packets (N) | No. of Concatenated | | | Total Header Length | Header portion per one input packet |
|---|---|---|---|---|---|---|
| | | Length field (b) | Padding bit (b) | Total (B) | | |
| 00 | 2 | 22 | 2 | 3 | 4 | 2.00 |
| 01 | 3 | 33 | 7 | 5 | 6 | 2.00 |
| 10 | 4 | 44 | 4 | 6 | 7 | 1.75 |
| 11 | 5 | 55 | 1 | 7 | 8 | 1.60 | t70030

| Count (3bits) | No. of Concatenated Packets (N) | Size for Length indication | | | Total Header Length | Header portion per one input packet |
|---|---|---|---|---|---|---|
| | | Length field (b) | Padding bit (b) | Total (B) | | |
| 000 | 2 | 22 | 2 | 3 | 4 | 2.00 |
| 001 | 3 | 33 | 7 | 5 | 6 | 2.00 |
| 010 | 4 | 44 | 4 | 6 | 7 | 1.75 |
| 011 | 5 | 55 | 1 | 7 | 8 | 1.60 |
| 100 | 6 | 66 | 6 | 9 | 10 | 1.67 |
| 101 | 7 | 77 | 3 | 10 | 11 | 1.57 |
| 110 | 8 | 88 | 0 | 11 | 12 | 1.50 |
| 111 | 9 | 99 | 5 | 13 | 14 | 1.56 | t70030

| Count (3bits) | No. of Concatenated Packets (N) | Size for Length indication | | | Total Header Length | Header portion per one input packet |
|---|---|---|---|---|---|---|
| | | Length field (B) | Padding bit (b) | Total (B) | | |
| 000 | 2 | 4 | 0 | 4 | 5 | 2.50 |
| 001 | 3 | 5 | 0 | 6 | 7 | 2.33 |
| 010 | 4 | 6 | 0 | 8 | 9 | 2.25 |
| 011 | 5 | 10 | 0 | 10 | 11 | 2.20 |
| 100 | 6 | 12 | 0 | 12 | 13 | 2.17 |
| 101 | 7 | 14 | 0 | 14 | 15 | 2.14 |
| 110 | 8 | 16 | 0 | 16 | 17 | 2.13 |
| 111 | 9 | 18 | 0 | 18 | 19 | 2.11 |

FIG. 72 t72010

| Count (2bits) | No. of Concatenated Packets (N) | Size for Length indication | | | Total Header Length | Header portion per one input packet |
|---|---|---|---|---|---|---|
| | | Length field (b) | Padding bit (b) | Total (B) | | |
| 00 | 2 | 18 | 6 | 3 | 4 | 2.00 |
| 01 | 3 | 27 | 5 | 4 | 5 | 1.67 |
| 10 | 4 | 36 | 4 | 5 | 6 | 1.50 |
| 11 | 5 | 45 | 3 | 6 | 7 | 1.40 | t72020

| Count (2bits) | No. of Concatenated Packets (N) | Size for Length indication | | | Total Header Length | Header portion per one input packet |
|---|---|---|---|---|---|---|
| | | Length field (b) | Padding bit (b) | Total (B) | | |
| 00 | 2 | 28 | 4 | 4 | 5 | 2.50 |
| 01 | 3 | 42 | 6 | 6 | 6 | 2.33 |
| 10 | 4 | 56 | 0 | 0 | 7 | 2.00 |
| 11 | 5 | 70 | 2 | 2 | 10 | 2.00 |

FIG. 75

| T field | S field | Packet Type Value | Meaning |
|---|---|---|---|
| 0 | - | - | IP (v4 or v6) |
| 1 | 0 | 000 | Compressed IP Packet |
| | | 001 | MPEG-2 Transport Stream |
| | | 010 ~ 110 | Reserved |
| | | 111 | Extension |
| | 1 | 000 | Signaling for Fast channel scan and Service Acquisition |
| | | 001 | Signaling for Emergency Alert |
| | | 010 | Signaling for Header Compression |
| | | 011 ~ 110 | Reserved |
| | | 111 | Multiple signaling information |

| Packet Configuration | Length Extension | Seg_ID | Seg_SN | LI | Count | E | Optional Header Size (bits) |
|---|---|---|---|---|---|---|---|
| Single packet | 5 | - | | | | 1 | 6 |
| Segmentation | - | 3 | 5 | 1 | | 1 | 10 |
| Concatenation | 5 | - | | | 5 | 1 | 10 |

2 Byte-header is added for byte align (b)

| Packet Configuration | Length Extension | Seg_ID | Seg_SN | LI | Count | E | Optional Header Size (bits) | Note |
|---|---|---|---|---|---|---|---|---|
| Single packet | 5 | - | | | | 1 | 6 | |
| Segmentation | - | 3 | 3 | 1 | | 1 | 8 | Support max. 16k |
| Concatenation | 4 | - | | | 3 | 1 | 8 | Support max. 16k |
| Concatenation | 3 | - | | | 4 | 1 | 8 | Support max. 16k |

Supporting maximum 16kB packet to add only 1 byte-header (c)

| Packet Configuration | Length Extension | Seg_ID | Seg_SN | LI | Count | E | Optional Header Size (bits) |
|---|---|---|---|---|---|---|---|
| Single packet | 3 | - | | | | 1 | 6 |
| Segmentation | - | 3 | 3 | 1 | | 1 | 8 |
| Concatenation | 3 | - | | | 3 | 1 | 7 |

Only 1-byte header is added, even though supporting 64k packet

FIG. 79
1st segment
Intermediate segment
Last segment
0
1
2
3
4
5
6
T (1)
PC (1)
PC (0)
S/C (0)
Length (13b)
S (1b)
Type (3b)
Reserved
Seg_ID (3b)
Seg_SN (000)
Seg_SN (xxx)
LI (0)
LI (1)
E (0)
E (1)
Header Extension (1B)
Payload
4B
5B

FIG. 84

| Packet Type Value | Meaning |
|---|---|
| 000 | IPv4 |
| 001 | Compressed IP Packet |
| 010 | MPEG-2 Transport Stream |
| 011 | Reserved |
| 100 | L2 Signaling |
| 101 | Reserved |
| 110 | Reserved |
| 111 | Extension |

FIG. 86
1st segment
Intermediate segment
Last segment
0 1 2 3 4 5 6 7
Type (3b)
PC (1)
S/C (0)
Length (11b)
Seg_ID (3b)
Seg_SN (0000)
Seg_SN (xxxx)
E (0)
E (1)
LI (0)
LI (1)
Header Extension (1B)
Payload
3B

FIG. 94

| Link Layer Organization Type | Logical Data Path | | |
|---|---|---|---|
| | Normal Data Path | Base Data Pipe | Dedicated Channel |
| Organization Type 1 | O | X | X |
| Organization Type 2 | O | O | X |
| Organization Type 3 | O | X | O |
| Organization Type 4 | O | O | O |

FIG. 100

| Syntax | No. Bits | Format |
|---|---|---|
| Fast_Information_Table(){ | | |
| table_id | 8 | uimsbf |
| section_syntax_indicator | 1 | '0' |
| private_indicator | 1 | '1' |
| reserved | 2 | '11' |
| section_length | 12 | uimsbf |
| table_id_extension | 16 | uimsbf |
| reserved | 2 | '11' |
| FIT_data_version | 5 | uimsbf |
| current_next_indicator | 1 | bslbf |
| section_number | 8 | uimsbf |
| last_section_number | 8 | uimsbf |
| number_broadcast | 8 | uimsbf |
| for(i=0;i<num_brdadcast;i++){ | | |
| broadcast_id | 16 | uimsbf |
| delivery_system_id | 16 | uimsbf |
| base_DP_id | 8 | uimsbf |
| base_DP_version | 5 | uimsbf |
| reserved | 3 | '111' |
| num_service | 8 | uimsbf |
| for(j=0;j<num_service;j++){ | | |
| service_id | 16 | uimsbf |
| service_category | 6 | uimsbf |
| service_hidden_flag | 1 | bslbf |
| SP_indicator | 1 | bslbf |
| num_component | 8 | uimsbf |
| for(k=0;k<num_component;k++){ | | |
| component_id | 8 | bslbf |
| DP_id | 8 | bslbf |
| RoHC_init_descriptor(){ | | |
| context_id | 8 or 16 | |
| context_profile | 8 | uimsbf |
| max_cid | 8 | uimsbf |
| large_cid | 8 | bslbf |
| } | | |
| } | | |
| } | | |
| } | | |
| } | | |

FIG. 101

| Syntax | No. Bits | Format |
|---|---|---|
| Emergency_Alert_Table () { | | |
| table_id | 8 | uimsbf |
| section_synax-indicator | 1 | '0' |
| private_indicator | 1 | '1' |
| reserved | 2 | '11' |
| secion_length | 12 | uimsbf |
| table_id_extension { | | |
| EAT_protocol_version | 8 | 0X0 |
| reserved | 8 | uimsbf |
| } | | |
| reserved | 2 | '11' |
| version_number | 5 | uimsbf |
| current_next_indicator | 1 | '1' |
| section_number | 8 | uimsbf |
| last_section_number | 8 | uimsbf |
| automatic_thing_flag | 1 | bslbf |
| num_EAS_messages | 7 | uimsbf |
| IF(automatic_tuning_flag==0X01) { | | |
| automatic_tuning_channel_number | 8 | uimsbf |
| automatic_tuning_DP_id | 8 | uimsbf |
| automatic_tuning_service_id | 16 | uimsbf |
| } | | |
| for (m=0; m<num_EAS_messages; m++) { | | |
| EAS_message_id | 32 | uimsbf |
| EAS_IP_version_flag | 1 | bslbf |
| EAS_message_transfer_type | 3 | uimsbf |
| EAS_message_encoding_type | 3 | uimsbf |
| EAS_NRT_flag | 1 | bslbf |
| if(EAS_message_transfer_type==0X02) { | | |
| reserved | 4 | '1111' |
| EAS_message_length/*N*/ | 12 | uimsbf |
| EAS_message_bytes() | 8*N | var |
| } | | |
| else if (EAS_message_transfer_type==0X003) { | | |
| IP_address | 32 or 128 | uimsbf |
| UDP_port_num | 16 | uimsbf |
| DP_id | 8 | uimsbf |
| } | | |
| if(EAS_NRT_flag==0X01){ | | |
| EAS_NRT_service_id | 16 | uimsbf |
| } | | |
| } | | |
| } | | |

| Packet_Type Value | Meaning |
|---|---|
| 000 | IPv4 |
| 001 | IPv6 |
| 010 | Compressed IP Packet |
| 011 | MPEG-2 Transport Stream |
| 100 | Reserved |
| 101 | Reserved |
| 110 | Signaling |
| 111 | Framed_Packet_Type |

FIG. 105

| Syntax | Bits | Format |
|---|---|---|
| FIC_payload( ){ | | |
| FIC_protocol_version | 8 | |
| transport_stream_id | 16 | |
| num_partitions | 8 | |
| for (i= 0 ; i<num_partitions ; i++) { | | |
| partition_id | 8 | uimsbf |
| partition_protocol_version | 8 | uimsbf |
| num_services | 8 | uimsbf |
| for (j= 0 ; j<num_services ;j++) { | | |
| service_id | 8 | uimsbf |
| service_data_version | 8 | uimsbf |
| service_channel_number | 8 | uimsbf |
| service_category | 8 | uimsbf |
| service_status | 3 | uimsbf |
| service_distribution | 2 | uimsbf |
| sp_indicator | 1 | bslbf |
| IP_version_flag | 1 | bslbf |
| SSC_source_IP_address_flag | 1 | bslbf |
| if( SSC_source_IP_address_flag) | | |
| SSC_source_IP_address | 32 or 128 | uimsbf |
| SSC_destination_IP_address | 32 or 128 | uimsbf |
| SSC_destination_UDP_port | 16 | uimsbf |
| SSC_TSI | 16 | uimsbf |
| SSC_DP_ID | 8 | uimsbf |
| } | | |
| num_partition_level_descriptors | 8 | uimsbf |
| for (k= 0 ; k< num_partition_level_descriptors ; k++ | | |
| partition_level_descriptor( ) | var | |
| } | | |
| num_FIC_level_descriptors | 8 | uimsbf |
| for (n= 0 ; n<num_FIC_level_descriptors ; n++) | | |
| FIC_level_descriptor( ) | var | |
| } | | |

FIG. 108

| Flag | | Operation | | PHY Input Format |
|---|---|---|---|---|
| HCF | EF | Header Compression | Encapsulation | |
| 1 | 1 | Enable | Enable | Link Layer Packet with Compressed IP payload |
| 1 | 0 | Enable | Disable | Not used |
| 0 | 1 | Disable | Enable | Link Layer Packet with IP payload |
| 0 | 0 | Disable | Disable | IP Packet direct input |

FIG. 109

| Syntax | No. Bits | Format |
|---|---|---|
| Link_Layer_mode_control_descriptor() { | | |
| descriptor_tag | 8 | uimsbf |
| descriptor_length | 8 | uimsbf |
| num_DP | 8 | uimsbf |
| for(i=0;i<num_dp;i++) { | | |
| DP_id | 8 | uimsbf |
| HCF | 1 | bslbf |
| EF | 1 | bslbf |
| reserved | 6 | uimsbf |
| } | | |
| } | | |

FIG. 112

| Index | Field value | Encapsulation Mode |
|---|---|---|
| 0 | 00 | None (Bypass) |
| 1 | 01 | Encapsulation 1 (Default) |
| 2 | 10 | Encapsulation 2 |
| 3 | 11 | Encapsulation 3 |

FIG. 113

| Index | Field value | Header Compression Mode |
|---|---|---|
| 0 | 000 | None (No Compression) |
| 1 | 001 | RoHC (default) |
| 2 | 010 | Header Compression 2 |
| 3 | 011 | Header Compression 3 |
| 4 | 100 | Reserved |
| 5 | 101 | Reserved |
| 6 | 110 | Reserved |
| 7 | 111 | Reserved |

FIG. 114

| Index | Field value | Packet Reconfiguration Mode |
|---|---|---|
| 0 | 00 | None (No Reconfiguration) |
| 1 | 01 | Reconfiguration 1 (default) |
| 2 | 10 | Reconfiguration 2 |
| 3 | 11 | Reconfiguration 3 |

FIG. 115

| Index | Field value | Context Transmission Mode |
|---|---|---|
| 0 | 000 | Transmission Mode 1 |
| 1 | 001 | Transmission Mode 2 |
| 2 | 010 | Transmission Mode 3 |
| 3 | 011 | Transmission Mode 4 |
| 4 | 100 | Transmission Mode 5 |
| 5 | 101 | Reserved |
| 6 | 110 | Reserved |
| 7 | 111 | Reserved |

FIG. 116

| Syntax | No. Bits | Format |
|---|---|---|
| RoHC_Initialization_in_link( ){ | | |
| link_id | 8 | uimsbf |
| max_cid | 16 | uimbf |
| large_cids | 1 | bslbf |
| reserved | 3 | 111 |
| num_profiles | 4 | uimsbf |
| for(j= 0;j<num_profiles ; j++) { | | |
| profiles( ) | 8 | uimsbf |
| } | | |
| num_IP_stream | 8 | uimsbf |
| for(k= 0;k<num_IP_stream ; k++) | | |
| { | | |
| IP_address() | 32 | uimsbf |
| } | | |
| } | | |

FIG. 117

| Index | Field value | Signaling path | Priority |
|---|---|---|---|
| 0 | 000 | None (No signaling path) | - |
| 1 | 001 | Dedicated Data Pipe | 1 |
| 2 | 010 | Specific signaling channel (FIC) | 2 |
| 3 | 011 | Specific signaling channel (EAC) | 3 |
| 4 | 100 | Reserved | 4 |
| 5 | 101 | Reserved | 5 |
| 6 | 110 | Reserved | 6 |
| 7 | 111 | Reserved | 7 |

FIG. 118

| Bit position | Field value | Signaling path mapping |
|---|---|---|
| b0 (MSB) | 0 : disable<br>1 : enable | Dedicated Data Pipe |
| b1 | | Specific signaling channel (FIC) |
| b2 | | Specific signaling channel (EAC) |
| b3(LSB) | | Specific signaling channel (other) |

FIG. 121

| Syntax | No. Bits | Format |
|---|---|---|
| Link_Layer_Initialization_descriptor( ) { | | |
| descriptor_tag | 8 | uimsbf |
| descriptor_length | 8 | uimsbf |
| num_link | 8 | uimsbf |
| for(i= 0 ; i<num_link ; i++) { | | |
| link_id | 8 | uimsbf |
| encapsulation_mode | 2 | bslbf |
| if (encapsulation_mode==0) { | | |
| reserved | 6 | bslbf |
| } | | |
| else { | | |
| header_compression_mode | 3 | bslbf |
| if (header_compression_mode==0) { | | |
| reserved | 3 | |
| } | | |
| else { | | |
| packet_reconfiguration_mode | 2 | |
| context_transmission_mode | 3 | bslbf |
| reserved | 1 | bslbf |
| max_cid | 16 | uimbf |
| large_cids | 1 | bslbf |
| num_profiles | 4 | uimsbf |
| for(j= 0 ;j<num_profiles ; j++) { | | |
| profiles( ) | 8 | uimsbf |
| } | | |
| } | | |
| } | | |
| } | | |
| } | | |

FIG. 122

| Syntax | No. Bits | Format |
|---|---|---|
| Link_Layer_Initialization_descriptor( ) { | | |
| descriptor_tag | 8 | uimsbf |
| descriptor_length | 8 | uimsbf |
| num_link | 8 | uimsbf |
| for(i=0;i<num_link;i++){ | | |
| link_id | 8 | uimsbf |
| encapsulation_mode | 2 | bslbf |
| if (encapsulation_mode ==0) { | | |
| reserved | 6 | bslbf |
| } | | |
| else { | | |
| header_compression_mode | 3 | bslbf |
| if (header_compression_mode ==0) { | | |
| reserved | 3 | |
| } | | |
| else { | | |
| packet_reconfiguration_mode | 2 | bslbf |
| context_transmission_mode | 3 | bslbf |
| reserved | 6 | bslbf |
| } | | |
| } | | |
| } | | |
| } | | |

FIG. 123

| Syntax | No. Bits | Format |
|---|---|---|
| Link_Layer_Initialization_descriptor() { | | |
| descriptor_tag | 8 | uimsbf |
| descriptor_length | 8 | uimsbf |
| num_link | 8 | uimsbf |
| signaling_path_configuration | 4 | bslbf |
| reserved | 4 | bslbf |
| if (signaling_path_configuration >='1000') { | | |
| dedicated_DP_id | 8 | uimsbf |
| } | | |
| for(i=0;i<num_link;i++){ | | |
| link_id | 8 | uimsbf |
| encapsulation_mode | 2 | bslbf |
| if (encapsulation_mode ==0) { | | |
| reserved | 6 | bslbf |
| } | | |
| else { | | |
| header_compression_mode | 3 | bslbf |
| if (header_compression_mode ==0) { | | |
| reserved | 3 | |
| } | | |
| else { | | |
| packet_reconfiguration_mode | 2 | bslbf |
| context_transmission_mode | 3 | bslbf |
| reserved | 6 | bslbf |
| } | | |
| } | | |
| } | | |
| } | | |

APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

CROSS-REFERENCE TO RELATED APPLICATIONS

This application is a Continuation of U.S. patent application Ser. No. 16/050,395 filed on Jul. 31, 2018, which is a Continuation of U.S. patent application Ser. No. 14/915,041 filed on Feb. 26, 2016 (now U.S. Pat. No. 10,057,211 issued on Aug. 21, 2018), which is the National Phase of PCT International Application No. PCT/KR2015/013364 filed on Dec. 8, 2015, which claims the priority benefit under 35 U.S.C. § 119(e) to U.S. Provisional Application Nos. 62/090,860 filed on Dec. 11, 2014 and 62/090,352 filed on Dec. 10, 2014, all of these applications are hereby expressly incorporated by reference into the present application.

BACKGROUND OF THE INVENTION

Field of the Invention

The present invention relates to an apparatus for transmitting a broadcast signal, an apparatus for receiving a broadcast signal and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

SUMMARY OF THE INVENTION

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

In accordance with the purpose of the invention, as embodied and broadly described herein, the present invention proposes a system that is capable of effectively supporting a next generation broadcast service in an environment that supports next generation hybrid broadcasting using a terrestrial broadcast network and the Internet and a signaling scheme related thereto.

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 22 illustrates operations in the link layer and formats of a packet transferred to a physical layer depending on flag values according to an embodiment of the present invention;

FIG. 24 illustrates RoHC profiles according to an embodiment of the present invention;

FIG. 28 illustrates combinations of information which can be transmitted out of band according to an embodiment of the present invention;

FIG. 30 illustrates a syntax of a link layer packet structure according to an embodiment of the present invention;

FIG. 32 illustrates a syntax of the link layer packet header structure when IP packets are delivered to the link layer according to another embodiment of the present invention;

FIG. 33 illustrates values of fields in the link layer packet header when IP packets are transmitted to the link layer according to another embodiment of the present invention;

FIG. 39 illustrates a syntax of the link layer packet header for RoHC transmission according to an embodiment of the present invention;

FIG. 45 illustrates a syntax of the structure of the link layer packet when signaling information is transmitted to the link layer according to another embodiment of the present invention;

FIG. 47 illustrates a syntax of the structure of the link layer packet for framed packet transmission according to an embodiment of the present invention;

FIG. 48 illustrates a syntax of a framed packet according to an embodiment of the present invention;

FIG. 49 illustrates a syntax of a fast information channel (FIC) according to an embodiment of the present invention;

FIG. 51 illustrates a syntax of an emergency alert table (EAT) according to an embodiment of the present invention;

FIG. 52 illustrates a method for identifying information related to header compression, which is included in a payload of a link layer packet according to an embodiment of the present invention;

FIG. 53 illustrates initialization information according to an embodiment of the present invention;

FIG. 54 illustrates configuration parameters according to an embodiment of the present invention;

FIG. 55 illustrates static chain information according to an embodiment of the present invention;

FIG. 56 illustrates dynamic chain information according to an embodiment of the present invention;

FIG. 58 illustrates a syntax of the structure of the header of a link layer packet according to another embodiment of the present invention;

FIG. 61 is a table showing a case in which one segment of an input packet is included in a link layer payload in a link layer packet header structure according to another embodiment of the present invention;

FIG. 64 is a table showing header lengths in a link layer packet header structure according to another embodiment of the present invention;

FIG. 72 is a table showing word based length indication according to the number of input packets in a link layer packet header structure according to another embodiment of the present invention;

FIG. 75 is a view illustrating a combination that identifies the type of a packet included in a payload according to an embodiment of the present invention;

FIG. 76 is a view illustrating the size of data assigned to each element or field for signaling segmentation and/or concatenation according to an embodiment of the present invention;

FIG. 84 is a view illustrating the description of a PC element based on the value thereof according to an embodiment of the present invention;

FIG. 94 is a view illustrating the definition of a link layer based on the organization type thereof according to an embodiment of the present invention;

FIG. 100 is a view illustrating the syntax of a fast information channel (FIC) according to an embodiment of the present invention;

FIG. 101 is a view illustrating the syntax of an emergency alert table (EAT) according to an embodiment of the present invention;

FIG. 105 is a view illustrating the syntax of an FIC according to another embodiment of the present invention;

FIG. 108 is a view illustrating the operation in a link layer based on the value of a flag and the type of packet that is transmitted to a physical layer according to an embodiment of the present invention;

FIG. 109 is a view illustrating a descriptor for signaling a mode control parameter according to an embodiment of the present invention;

FIG. 112 is a view illustrating information that identifies an encapsulation mode according to an embodiment of the present invention;

FIG. 113 is a view illustrating information that identifies a header compression mode according to an embodiment of the present invention;

FIG. 114 is a view illustrating information that identifies a packet reconfiguration mode according to an embodiment of the present invention;

FIG. 115 is a view illustrating information that identifies a context transmission mode according to an embodiment of the present invention;

FIG. 116 is a view illustrating initialization information, in a case in which RoHC is applied in a header compression mode, according to an embodiment of the present invention;

FIG. 117 is a view illustrating information that identifies a link layer signaling path configuration according to an embodiment of the present invention;

FIG. 118 is a view illustrating information about signaling path configuration in a bit mapping mode according to an embodiment of the present invention;

FIG. 119 is a flowchart illustrating a link layer initialization procedure according to an embodiment of the present invention;

FIG. 120 is a flowchart illustrating a link layer initialization procedure according to another embodiment of the present invention;

FIG. 121 is a view illustrating a signaling format in a form for transmitting an initialization parameter according to an embodiment of the present invention;

FIG. 122 is a view illustrating a signaling format in a form for transmitting an initialization parameter according to another embodiment of the present invention;

FIG. 123 is a view illustrating a signaling format in a form for transmitting an initialization parameter according to a further embodiment of the present invention;

FIG. 124 is a view illustrating a receiver according to an embodiment of the present invention;

FIG. 125 is a view illustrating the structure of a header of a link layer packet according to another embodiment of the present invention;

FIG. 126 is a view illustrating a method of filtering a packet stream using an SID according to an embodiment of the present invention;

FIG. 127 is a view illustrating a method of filtering a packet stream using an SID according to another embodiment of the present invention;

FIG. 128 is a view illustrating the configuration of an optional header according to an embodiment of the present invention and fields related thereto;

FIG. 129 is a view illustrating the structure of an optional header according to another embodiment of the present invention;

FIG. 130 is a view illustrating a scheme for configuring an optional header according to another embodiment of the present invention;

Figure 131:
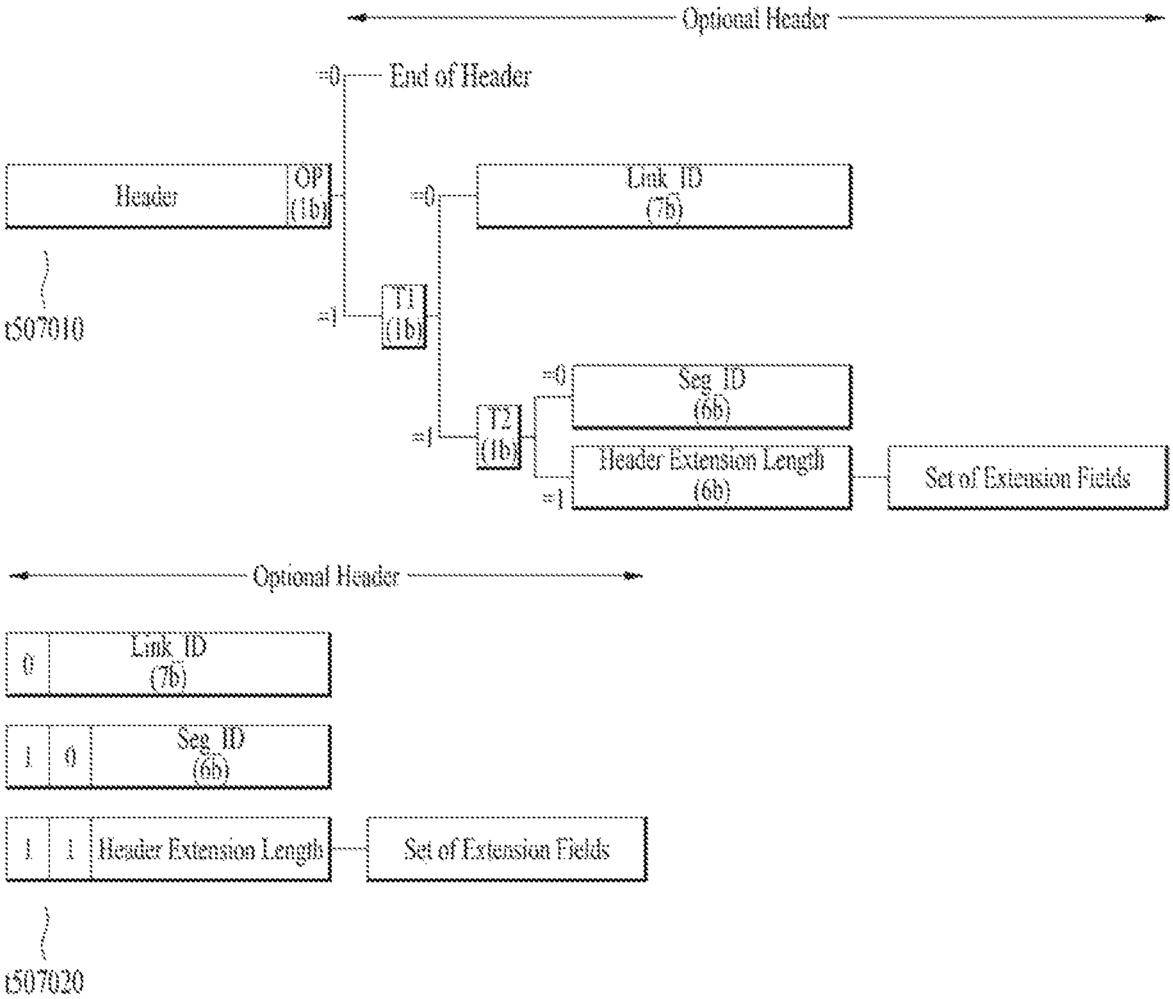
Figure 132:
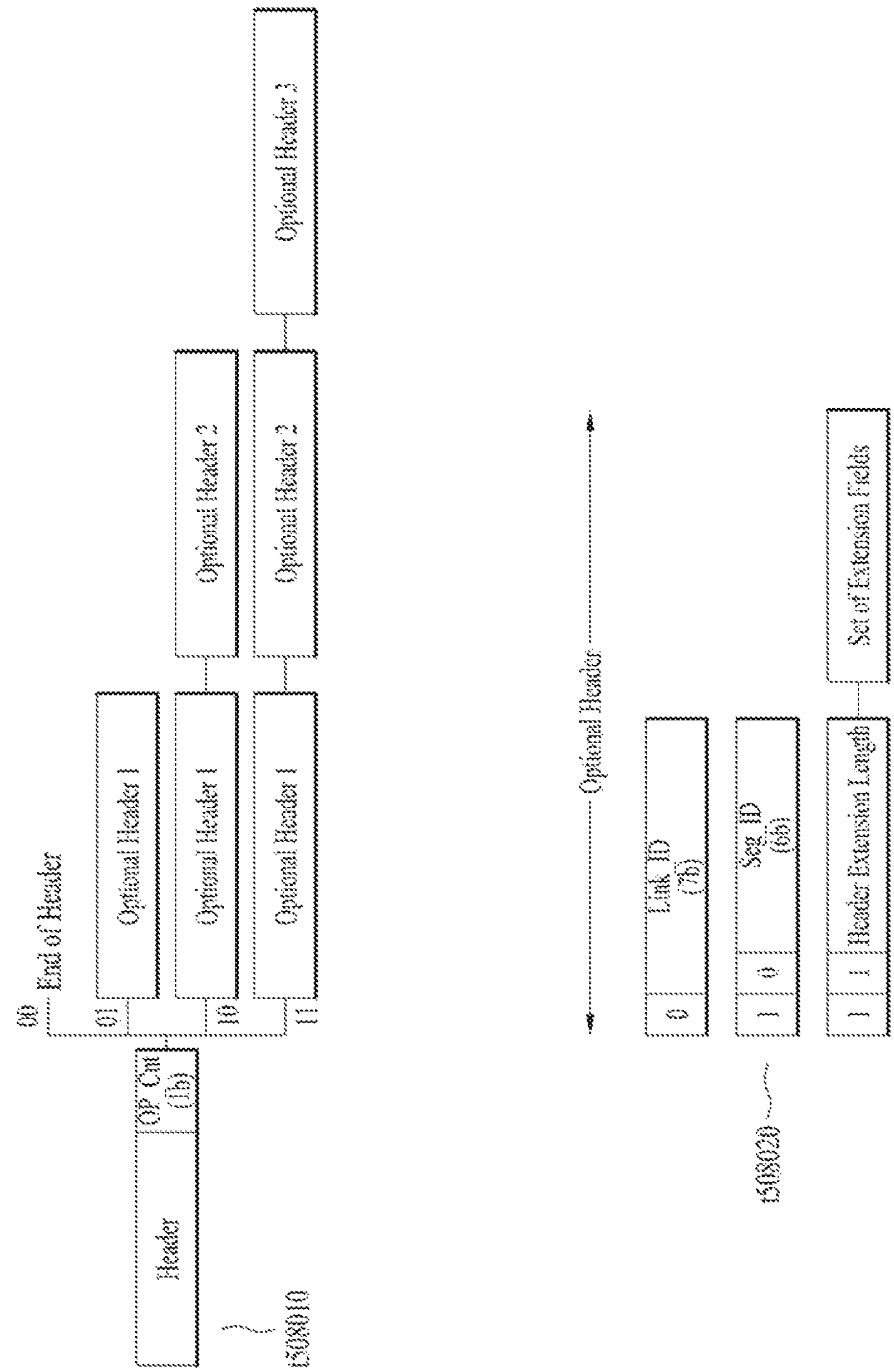
Figure 133:
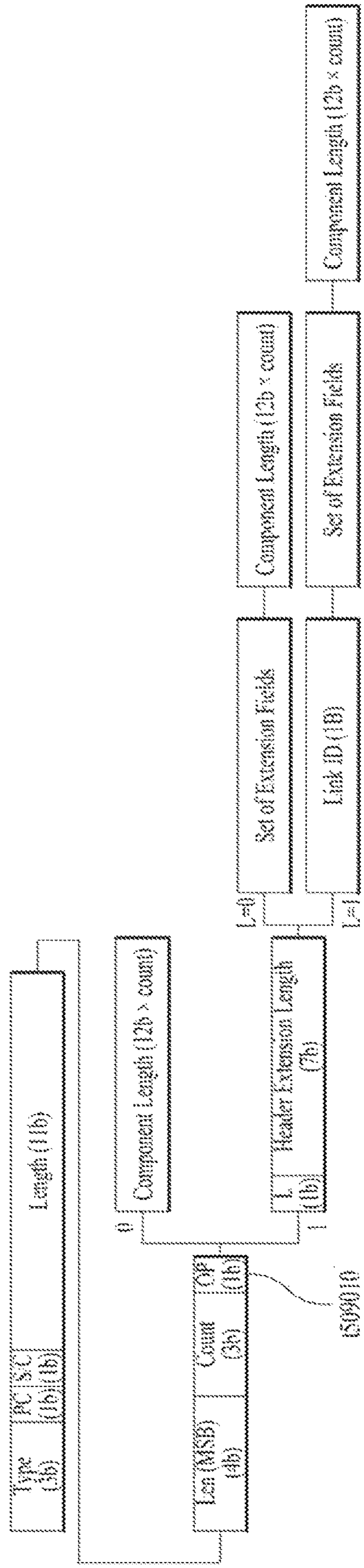
Figure 134:
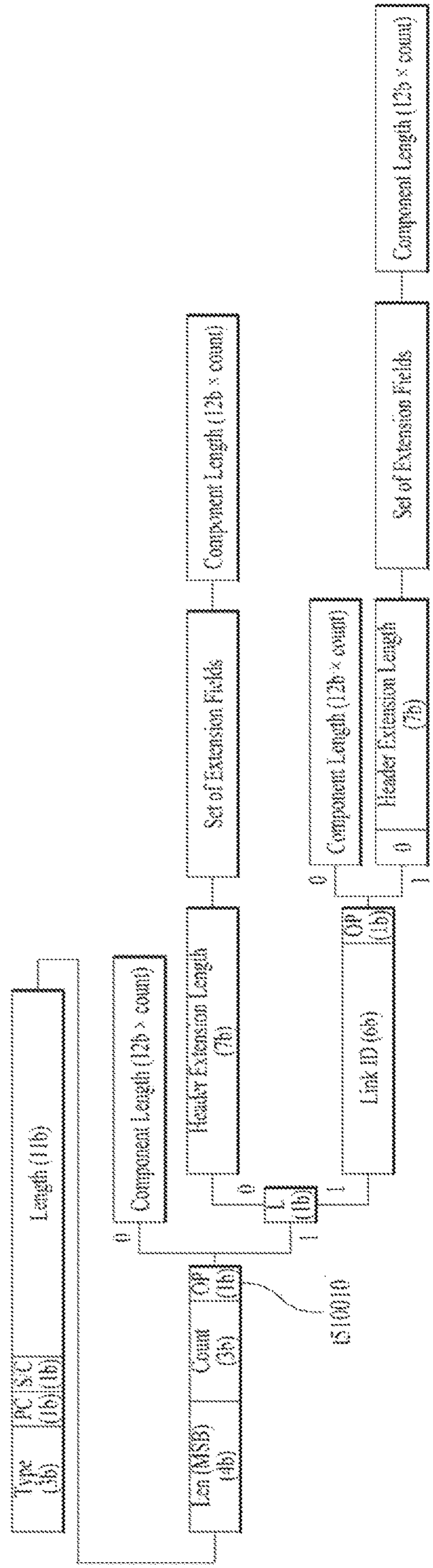
Figure 135:
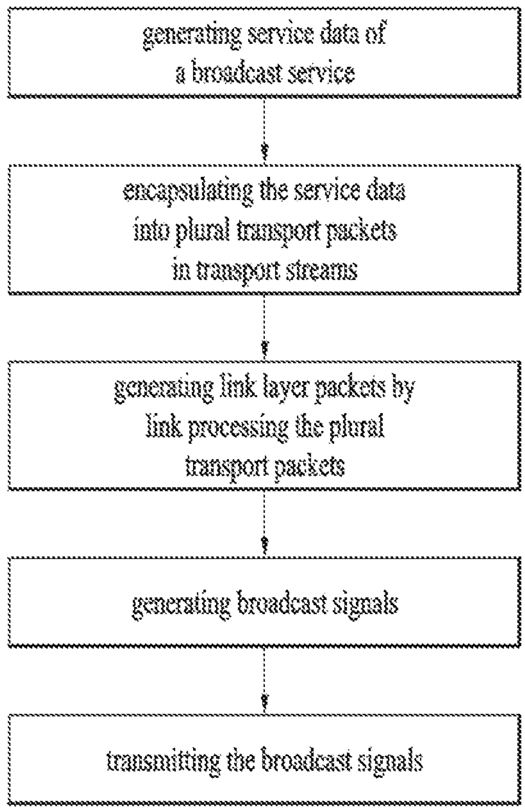
Figure 136:
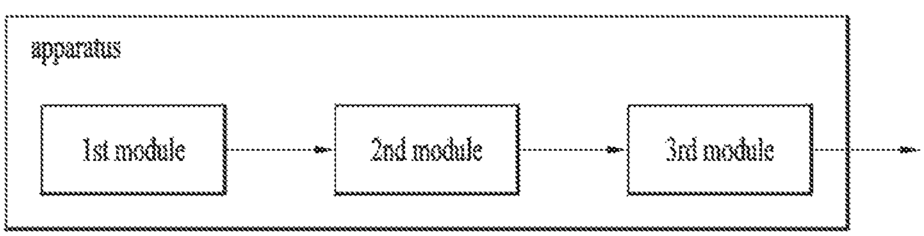

FIG. 131 is a view illustrating a scheme for configuring an optional header according to another embodiment of the present invention;

FIG. 132 is a view illustrating a scheme for configuring an optional header according to another embodiment of the present invention;

FIG. 133 is a view illustrating a scheme for configuring an optional header in a case of concatenation according to another embodiment of the present invention;

FIG. 134 is a view illustrating a scheme for configuring an optional header in a case of concatenation according to another embodiment of the present invention;

FIG. 135 is a view illustrating a broadcast signal transmission method according to an embodiment of the present invention; and FIG. 136 is a view illustrating a broadcast signal transmission apparatus according to an embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
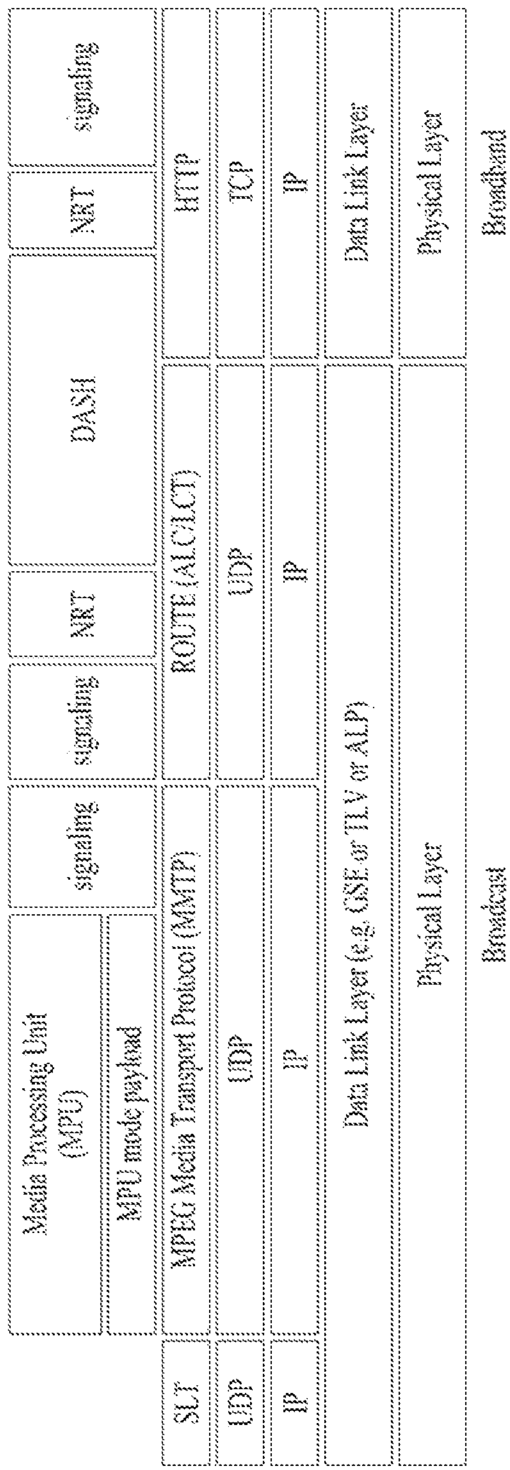
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have be a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
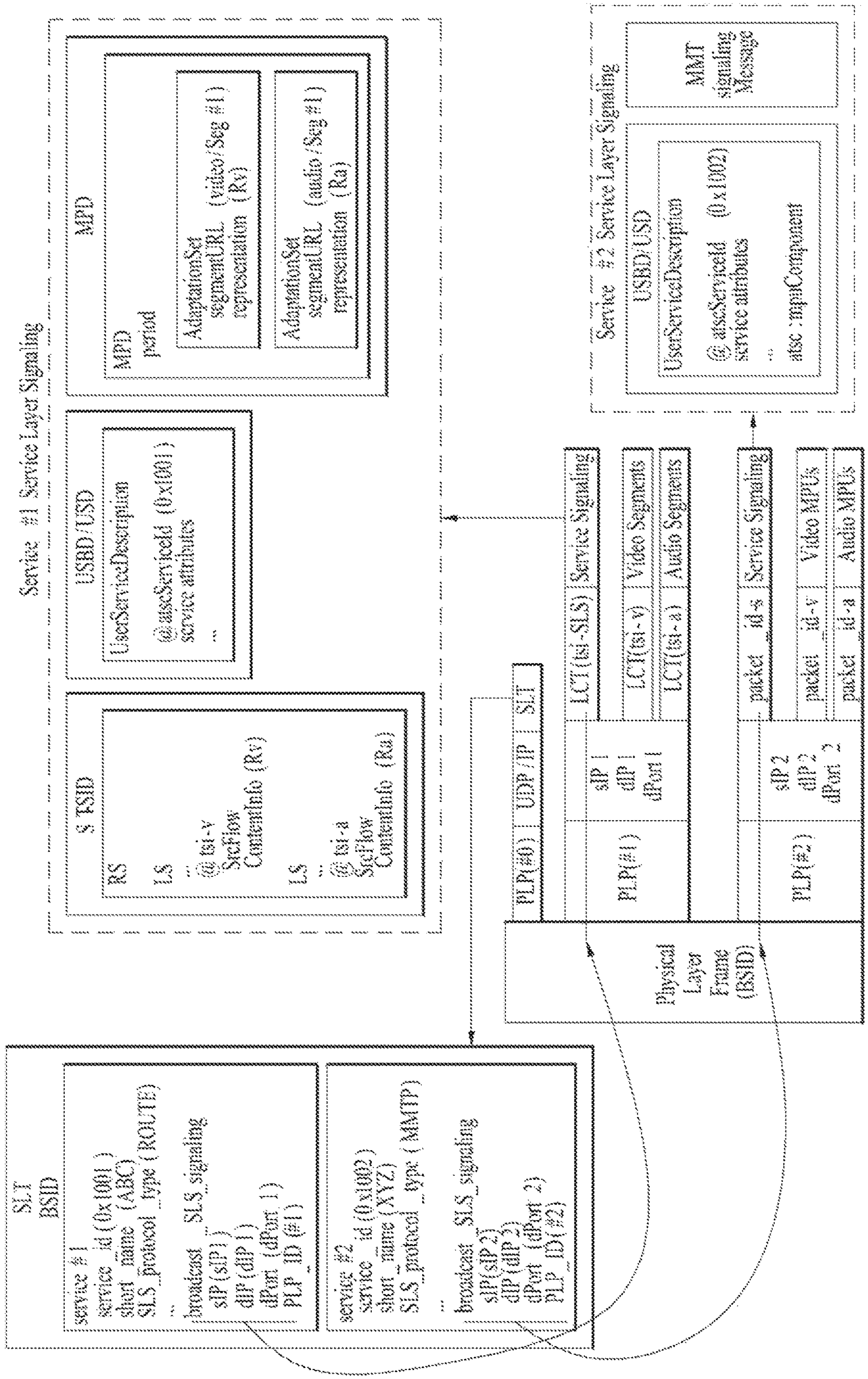
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, an network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, 0 may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast stream id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, 0 may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer Pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, 0 may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
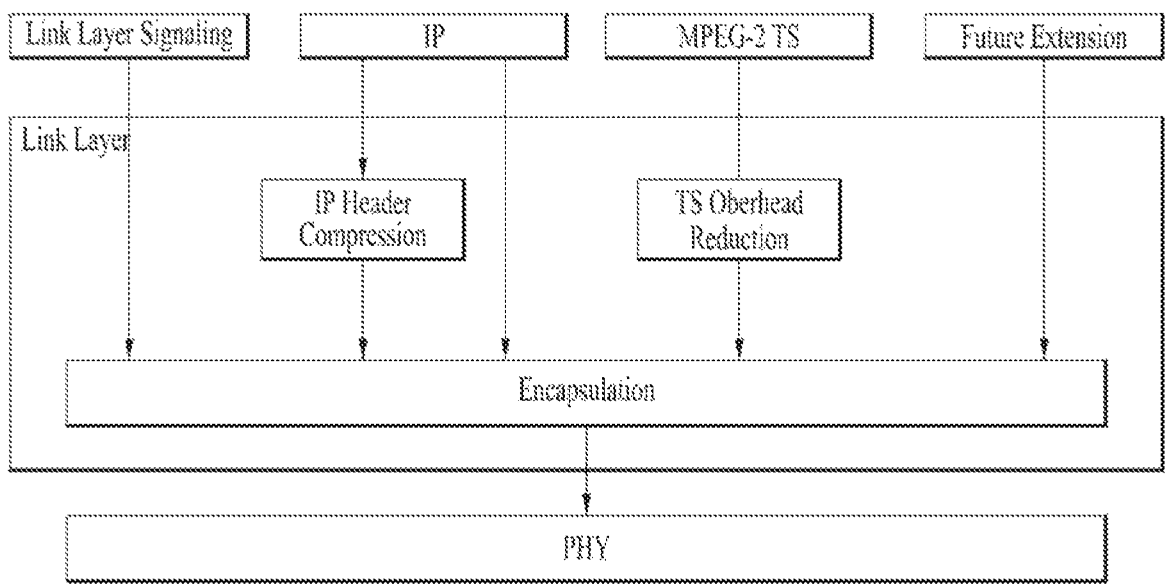
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
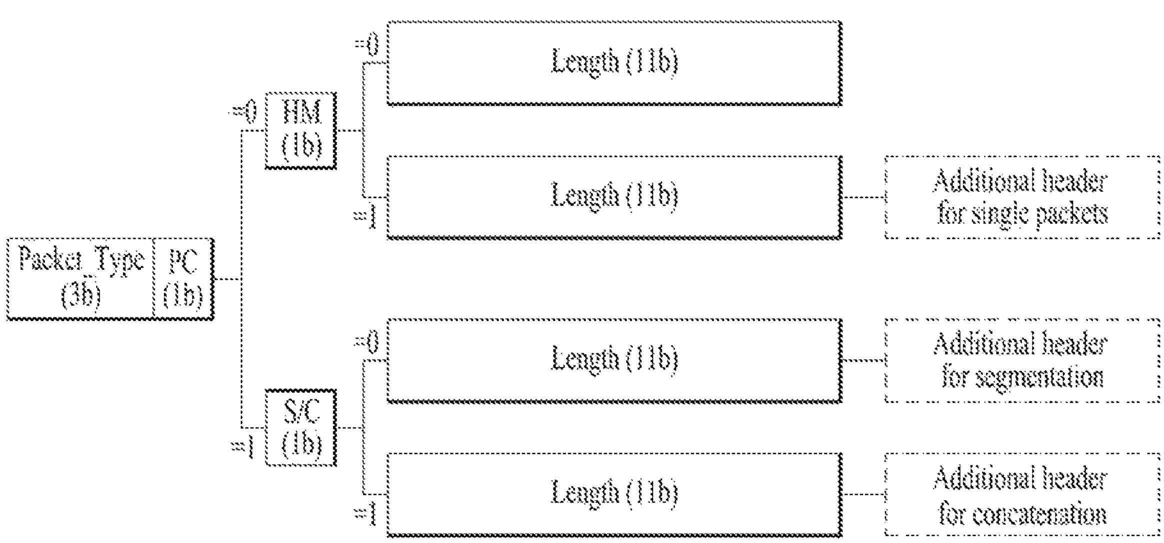
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is “000”, “001” “100” or “111”, that is the original data type of an ALP packet is one of an IPv4 packet, a compressed IP packet, link layer signaling or extension packet. When the MPEG-2 TS packet is encapsulated, the value of Packet_Type can be “010”. Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be a 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
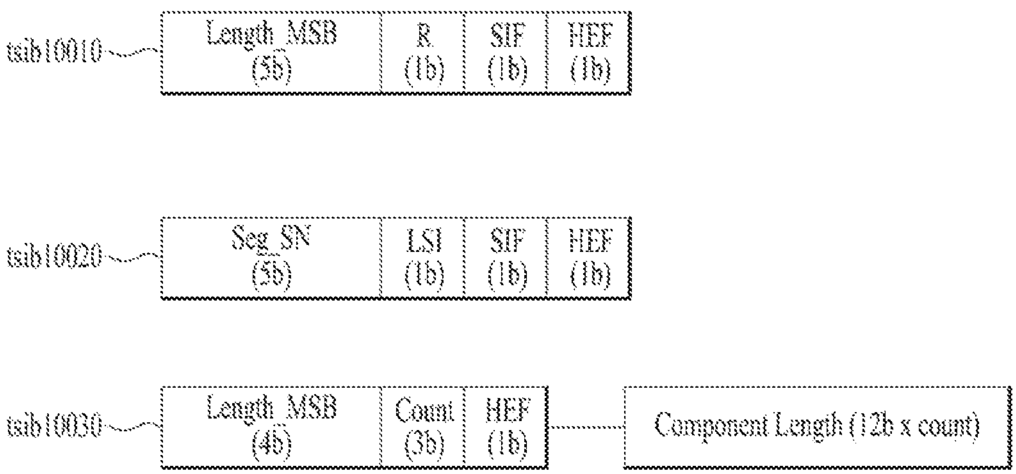
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)=“1”. The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)=“0”. Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be a 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be a 8-bit field that can indicate the length of the Header Extension ( ) in bytes counting from the next byte to the last byte of the Header_Extension ( ).

Extension_Byte can be a byte representing the value of the Header_Extension ( ).

Figure 11:
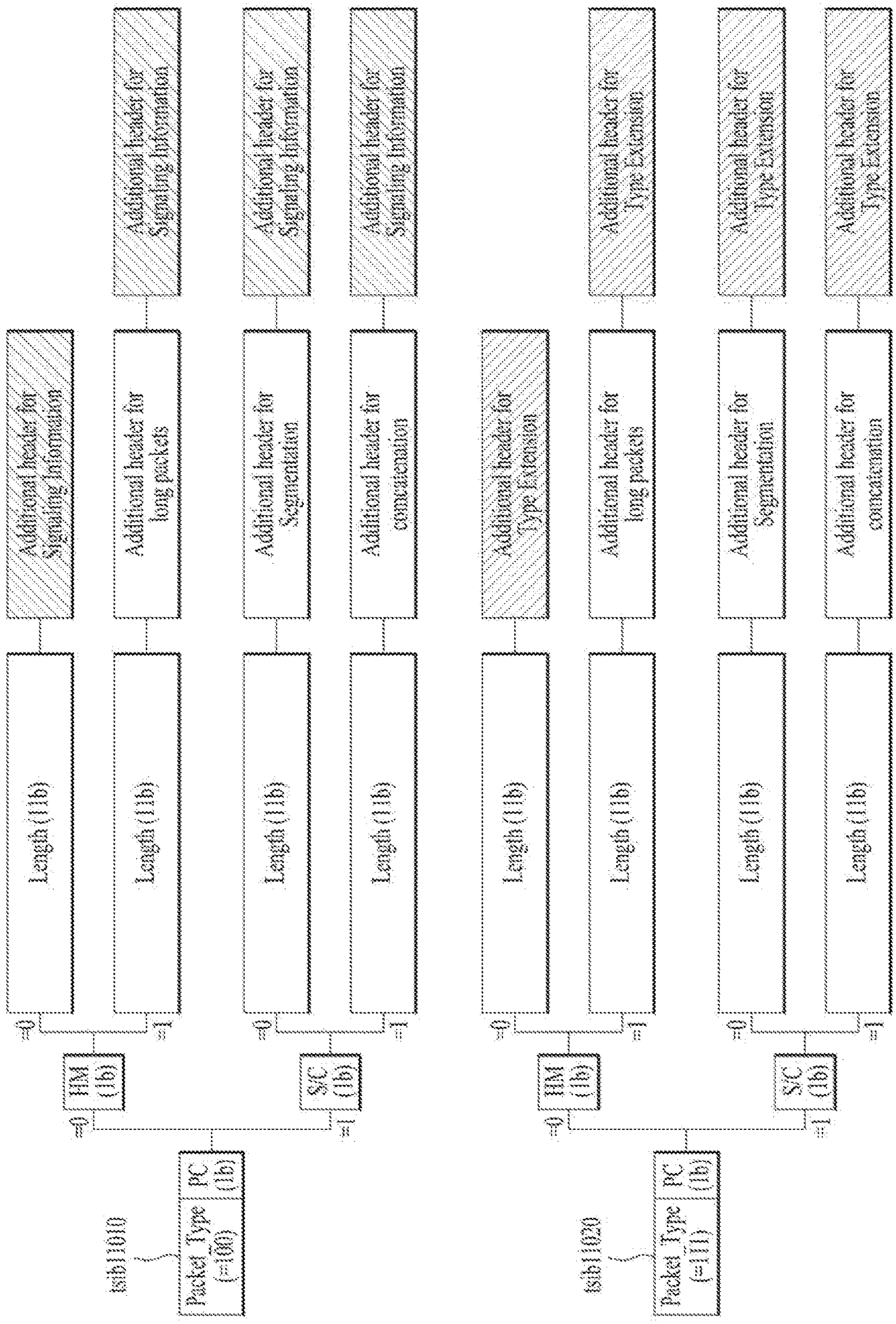
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
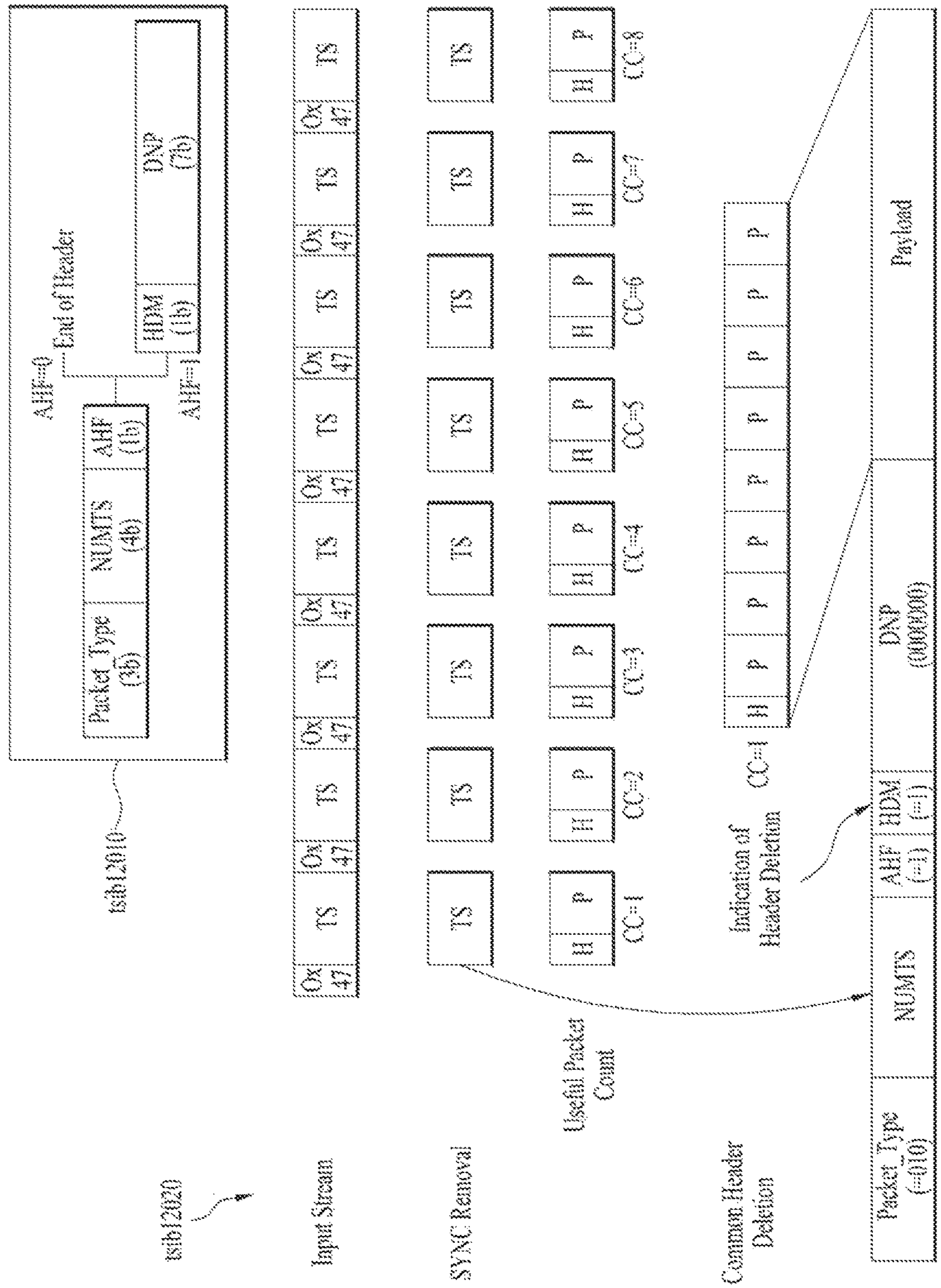
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field.

The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling.

In Adaptation Mode 2 (tsib13010), the adaptation module can detect the initialization and refresh (IR) packet from ROHC packet flow and extract the context information (static chain). After extracting the context information, each IR packet can be converted to an IR-dynamic part (IR-DYN) packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to “0x02”.

PLP_ID can be an 8-bit field that indicates the PLP corresponding to this table.

context id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to “0x0”. If the static_chain( ) or dynamic_chain( ) byte is included in this table, this field may be set to “0x01” or “0x02” respectively. If both of the static_chain( ) and dynamic_chain( ) byte are included in this table, this field may be set to “0x03”.

context_length can be an 8-bit field that indicates the length of the static_chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
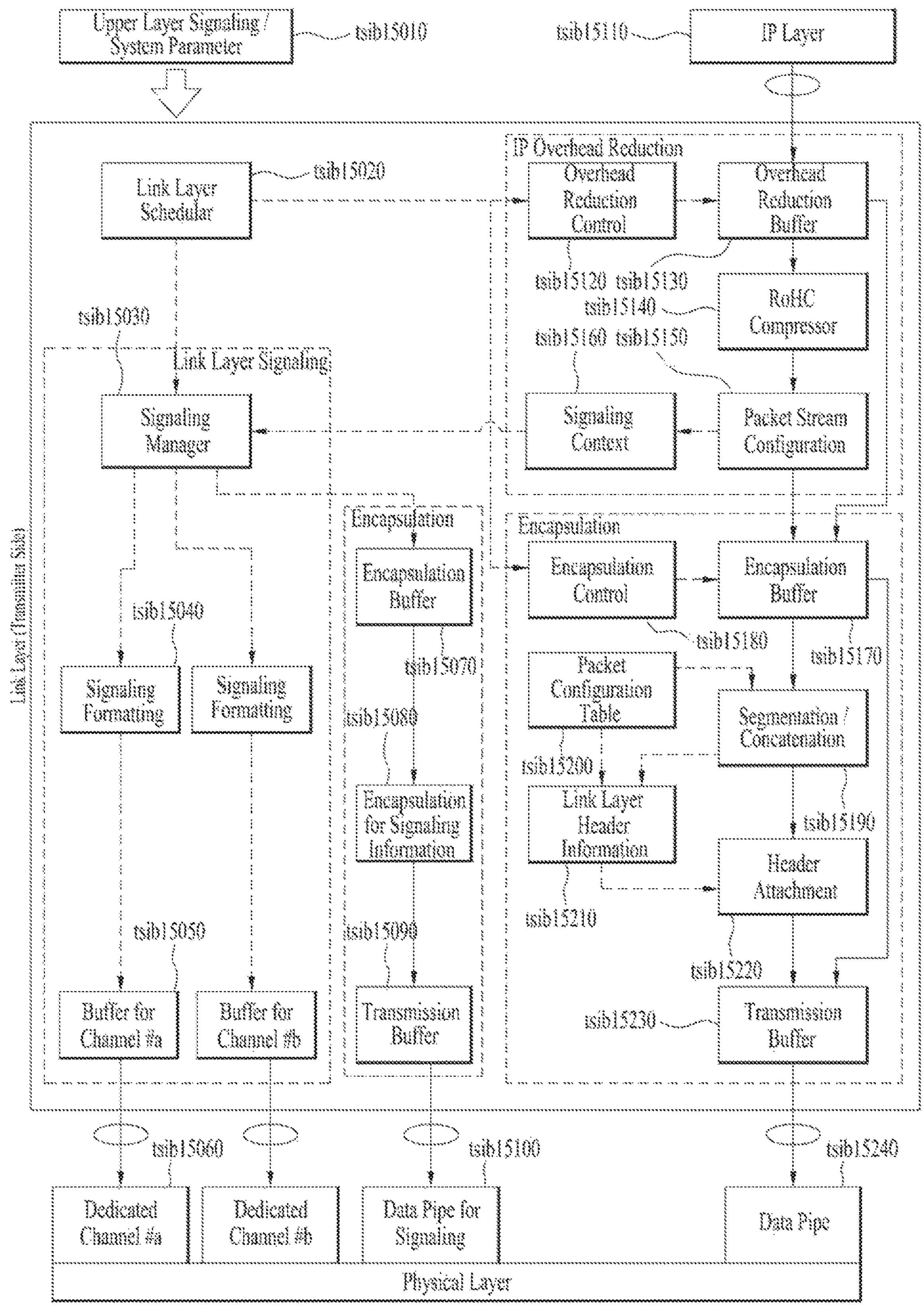
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be falterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
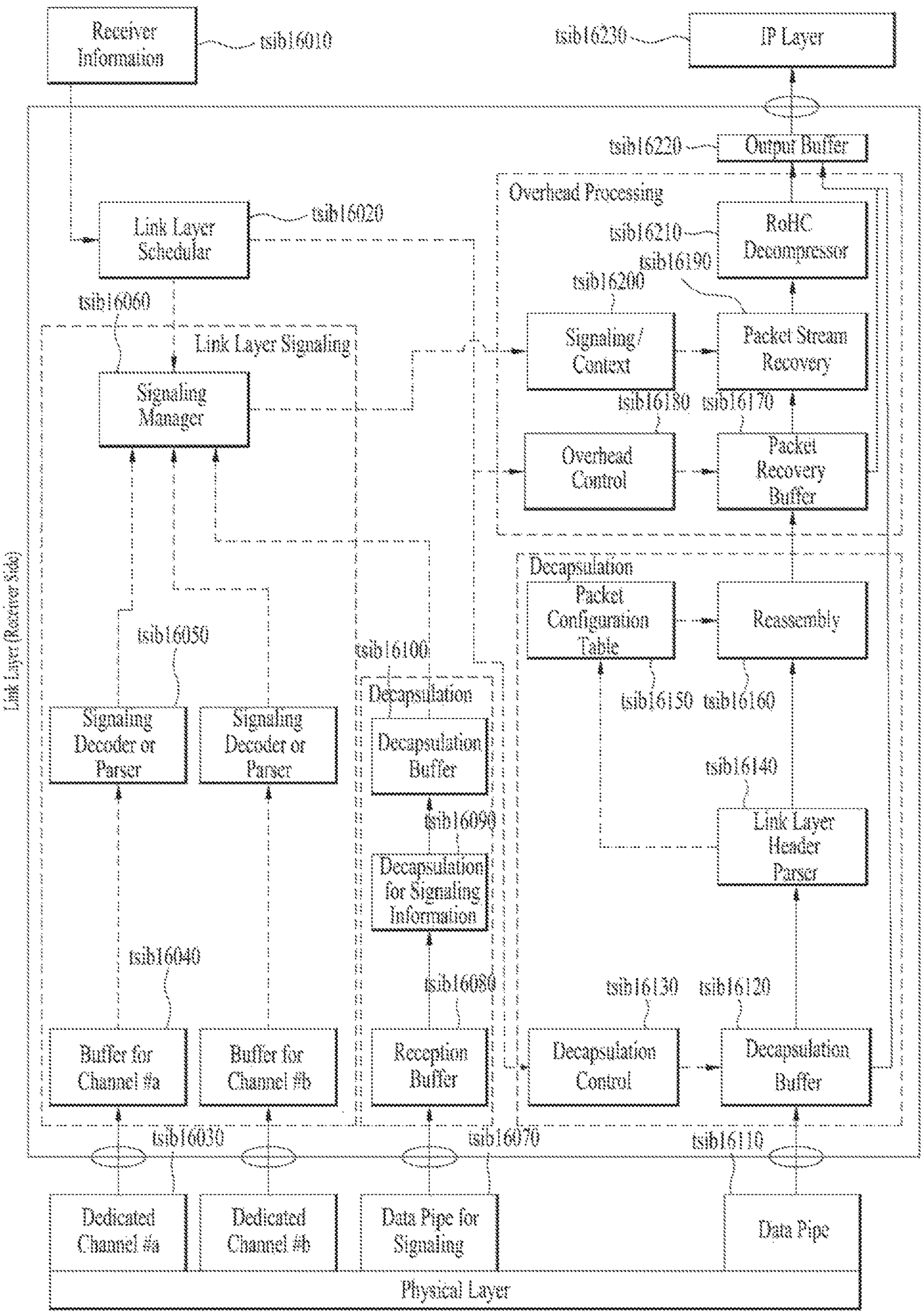
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
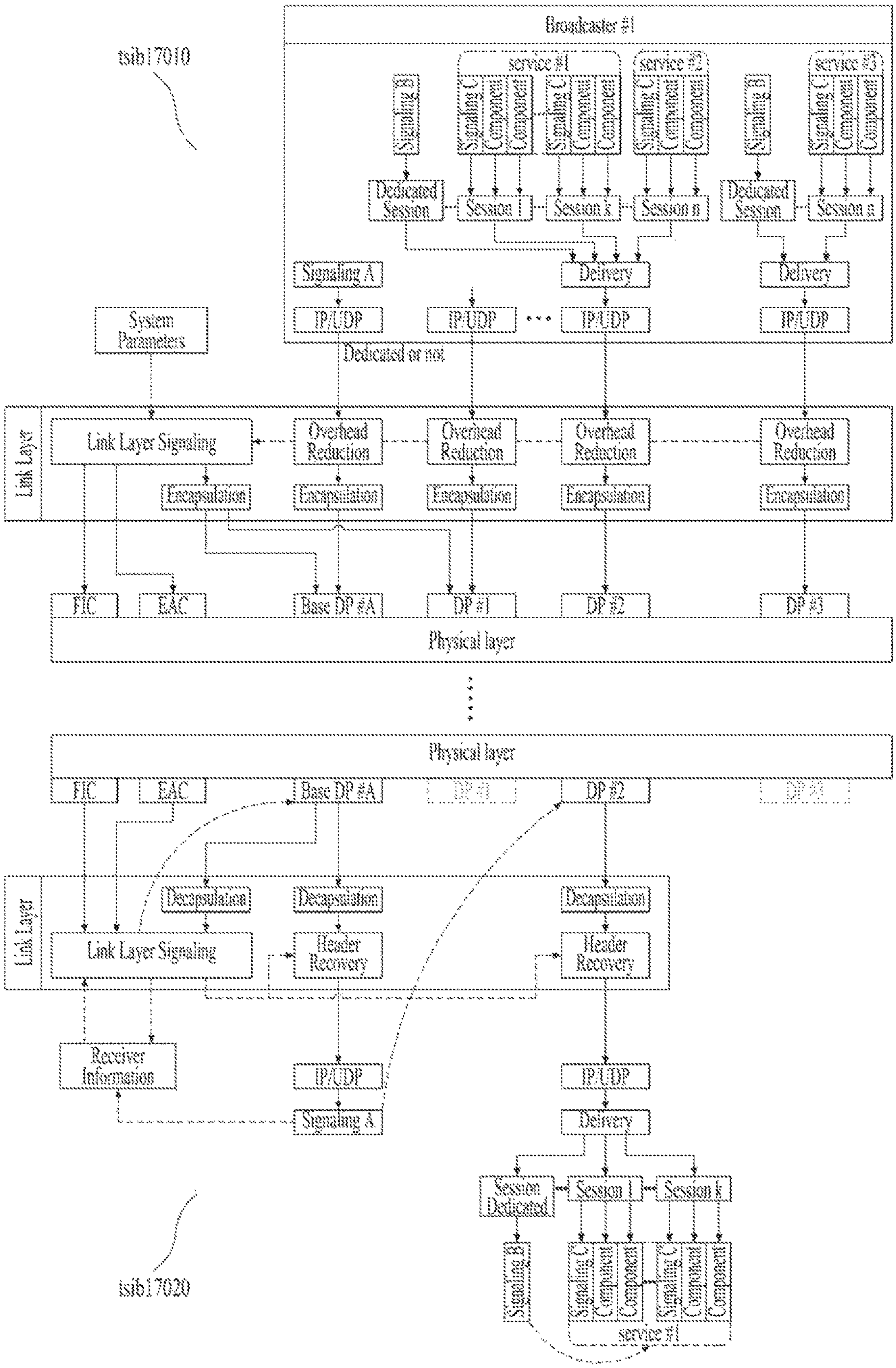
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

Figure 18:
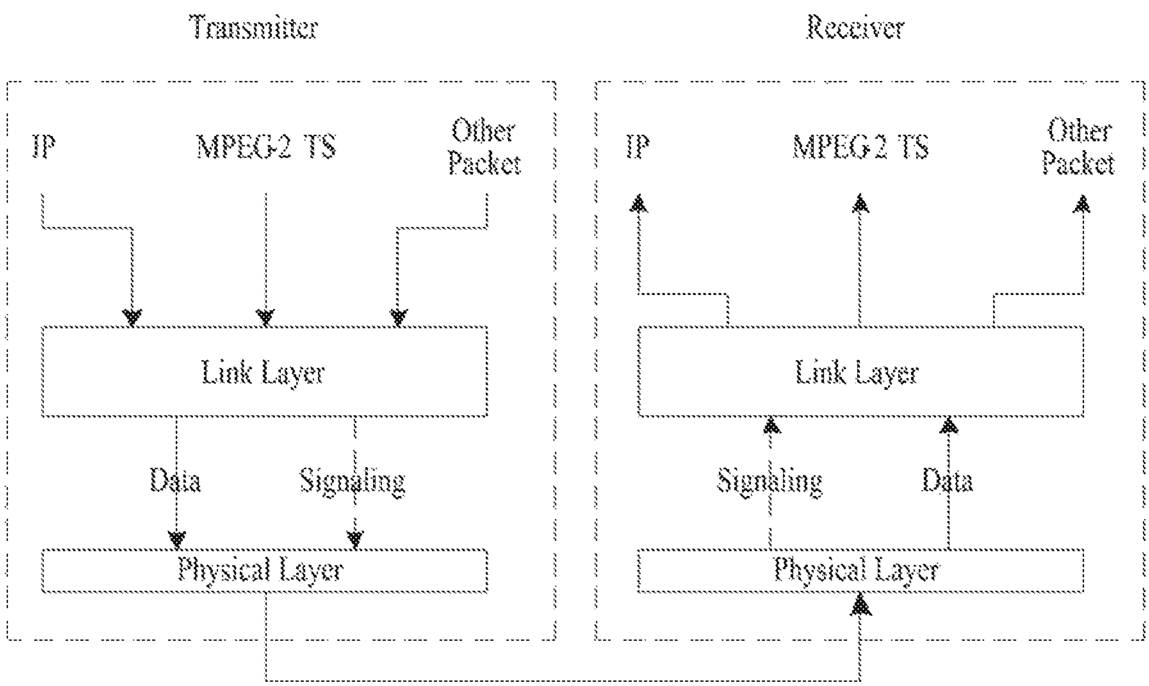
FIG. 18 illustrates an interface of a link layer according to an embodiment of the present invention.

FIG. 18 illustrates an interface of a link layer according to an embodiment of the present invention.

The figure shows a case in which a transmitter uses an IP packet and/or an MPEG2-TS packet used in digital broadcast as an input signal. The transmitter may support a packet structure in a new protocol which can be used in future broadcast systems. Encapsulated data and/or signaling information of the link layer may be transmitted to a physical layer. The transmitter may process transmitted data (which can include signaling data) according to a protocol of the physical layer, which is supported by a broadcast system, and transmit a signal including the data.

A receiver restores the data and/or the signaling information received from the physical layer to data that can be processed in an upper layer. The receiver can read packet headers and determine whether packets received from the physical layer include signaling information (or signaling data) or general data (or content data).

The signaling information (i.e., signaling data) transmitted from the transmitter may include first signaling information which is received from an upper layer and needs to be transmitted to an upper layer of the receiver, second signaling information which is generated in the link layer and provides information related to data processing in the link layer of the receiver and/or third signaling information which is generated in the upper layer or the link layer and transmitted to rapidly identify specific data (e.g. service, content and/or signaling data) in the physical layer.

According to an embodiment of the present invention, additional processing may be performed on packets, delivered from the upper layer, in the link layer.

When a packet delivered from the upper layer is an IP packet, the transmitter can perform IP header compression in the link layer. Overhead can be reduced in IP flow through IP header compression. For IP header compression, robust header compression (RoHC) may be used. Refer to RFC3095 and RFC5795 for details of RoHC.

In one embodiment of the present invention, RoHC can operate in a unidirectional mode. This will be described in detail later.

When the packet delivered from the upper layer is an MPEG-2 transport stream (ST) packet, overhead reduction may be performed on the MPEG-2 TS packet. The MPEG-2 TS packet may include a sync field, a null packet and/or a common packet identifier (PID). Since such data is repeated in each TS packet or unnecessary data, the transmitter can delete the data in the link layer, generate information used for the receiver to restore the data and transmit the information to the receiver.

The transmitter can encapsulate the packet, transmitted from the upper layer, in the link layer. For example, the transmitter can generate a link layer packet by encapsulating the IP packet, the MPEG-2 TS packet and/or a packet in a different protocol in the link layer. Packets in one format can be processed in the physical layer of the transmitter/receiver through encapsulation in the link layer irrespective of protocol type of the network layer. In this case, the MPEG-2 TS packet can be considered to be a packet of the network layer.

The network layer is an upper layer of the link layer. A packet of the network layer can be converted into a payload of a packet of the link layer. In an embodiment of the present invention, packets of the network layer can be included in packets of the link layer by being concatenated and segmented in order to efficiently use resources of the physical layer.

When the size of packets of the network layer is small such that a payload of the link layer can include a plurality of packets of the network layer, a packet header of the link layer can include a protocol field for performing concatenation. Concatenation can be defined as combination of a plurality of packets of the network layer in a payload (a packet payload of the link layer).

When the size of one packet of the network layer is too large to be processed in the physical layer, a packet of the network layer may be segmented into two or more segments. A packet header of the link layer may include necessary information in the form of a protocol field such that the transmitting side can segment the packet of the network layer and the receiving side can reassemble the segmented packets.

Processing of the link layer in the transmitter includes transmission of signaling information generated in the link layer, such as a fast information channel (FIC), an emergency alert system (EAS) message and/or information for overhead reduction.

The FIC is a signaling structure including information necessary for channel scan and fast service acquisition. That is, a main purpose of the FIC is to efficiently transfer information necessary for fast channel scan and service acquisition. Information included in the FIC may correspond to information for connecting a data pipe (DP) (or PLP) and a broadcast service.

Processing of the link layer in the transmitter includes transmission of an emergency alert message and signaling information related thereto through a specific channel. The specific channel may correspond to a channel predefined in the physical layer. The specific channel may be called an emergency alert channel (EAC).

Figure 19:
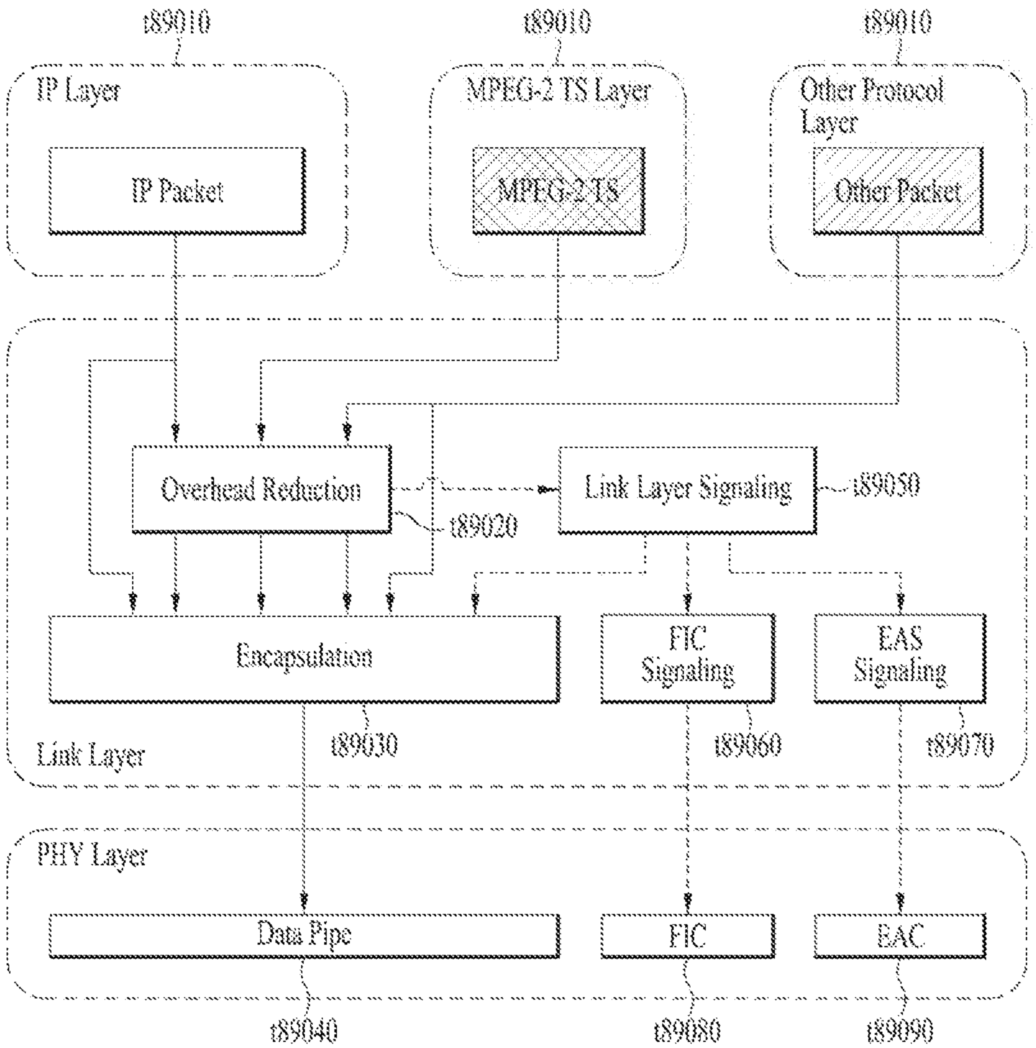
FIG. 19 illustrates operation of a normal mode from among operation modes of the link layer according to an embodiment of the present invention.

FIG. 19 illustrates operation of a normal mode from among operation modes of a link layer according to an embodiment of the present invention.

The link layer proposed by the present invention may have various operation modes for compatibility between an upper layer and a lower layer. The present invention proposes the normal mode and a transparent mode of the link layer. The two operation modes can coexist in the link layer and which mode will be used can be designated using a signaling or system parameter. According to an embodiment, only one of the two modes may be implemented. Different modes may be applied according to an IP layer and a TS layer input to the link layer. Otherwise, different modes may be applied for streams of the IP layer and streams of the TS layer.

According to an embodiment, a new operation mode may be added to the link layer. The new operation mode may be added on the basis of configurations of an upper layer and a lower layer. The new operation mode may include different interfaces on the basis of the configurations of the upper layer and the lower layer. Whether to use the new operation mode may be designated using a signaling or system parameter.

In the normal mode, data is processed according to functions supported by the link layer and then delivered to the physical layer.

First, packets may be respectively transferred from an IP layer, an MPEG-2 TS layer and a specific protocol layer t89010 to the link layer. That is, an IP packet can be delivered from the IP layer to the link layer. An MPEG-2 TS packet can be delivered from the MPEG-2 TS layer to the link layer. A specific packet can be delivered from the specific protocol layer to the link layer.

The delivered packets may or may not be overhead-reduced t89020 and then encapsulated t89030.

Specifically, the IP packet may or may not be overhead-reduced t89020 and then encapsulated t89030. Whether overhead reduction is performed may be designated by a signaling or system parameter. According to an embodiment, overhead reduction may or may not be performed per IP stream. The encapsulated IP packet can be delivered to the physical layer.

The MPEG-2 TS packet may be overhead-reduced t89020 and then encapsulated t89030. In the case of the MPEG-2 TS packet, overhead reduction may be omitted according to an embodiment. However, since a general TS packet has a sync byte (0x47) at the head thereof, it may be efficient to remove such fixed overhead. The encapsulated TS packet can be delivered to the physical layer.

A packet other than the IP or TS packet may or may not be overhead-reduced t89020 and then encapsulated t89030. Whether overhead reduction is performed may be determined according to characteristics of the packet. Whether overhead reduction is performed may be designated by the signaling or system parameter. The encapsulated packet can be delivered to the physical layer.

During overhead reduction t89020, the sizes of the input packets may be reduced through an appropriate method. During the overhead reduction process, specific information may be extracted or generated from the input packets. The specific information is information related to signaling and may be transmitted through a signaling region. The signaling information enables the receiver to restore the packets changed during overhead reduction to the original packets. The signaling information can be delivered through link layer signaling t89050.

Link layer signaling t89050 can transmit and manage the signaling information extracted/generated during overhead reduction. The physical layer may have physically/logically separated transmission paths. Link layer signaling t89050 may deliver the signaling information to the physical layer according to the separated transmission paths. The separated transmission paths may include FIC signaling t89060 and EAS signaling t89070. Signaling information which is not transmitted through the transmission paths may be delivered to the physical layer after being subjected to encapsulation t89030.

Signaling information managed through link layer signaling t89050 may include signaling information delivered from an upper layer, signaling information generated in the link layer and/or system parameters. Specifically, signaling information managed through link layer signaling t89050 may include signaling information that is delivered from the upper layer and needs to be transmitted to an upper layer of the receiver, signaling information that is generated in the link layer and needs to be used in the link layer of the receiver and signaling information that is generated in the upper layer or the link layer and used for fast detection in the physical layer of the receiver.

Data encapsulated t89030 and delivered to the physical layer may be transmitted through a data pipe (DP) 89040. Here, the DP may be a physical layer pipe (PLP). Signaling information transmitted through the aforementioned separate transmission paths may be delivered to respective transmission paths. For example, FIC signaling information can be transmitted through an FIC channel t89080 designated in a physical frame and EAS signaling information can be transmitted through an EAS channel t89090 designed in the physical frame. Information representing presence of a specific channel such as an FIC or EAC can be signaled and transmitted through a preamble region of the physical frame or signaled by scrambling a preamble using a specific scrambling sequence. According to an embodiment, FIC signaling/EAS signaling information may be transmitted through a normal DP region, a PLS region or a preamble instead of a designated specific channel.

The receiver can receive data and signaling information through the physical layer. The receiver can restore the data and signaling information to forms that can be processed in an upper layer and transfer the same to the upper layer. This process can be performed in the link layer of the receiver. The receiver can determine whether received packets are related to the signaling information or the data by reading headers of the packets, for example. When overhead reduction has been performed at the transmitting side, the receiver can restore packets having reduced overhead through overhead reduction to the original packets. In this process, the received signaling information can be used.

Figure 20:
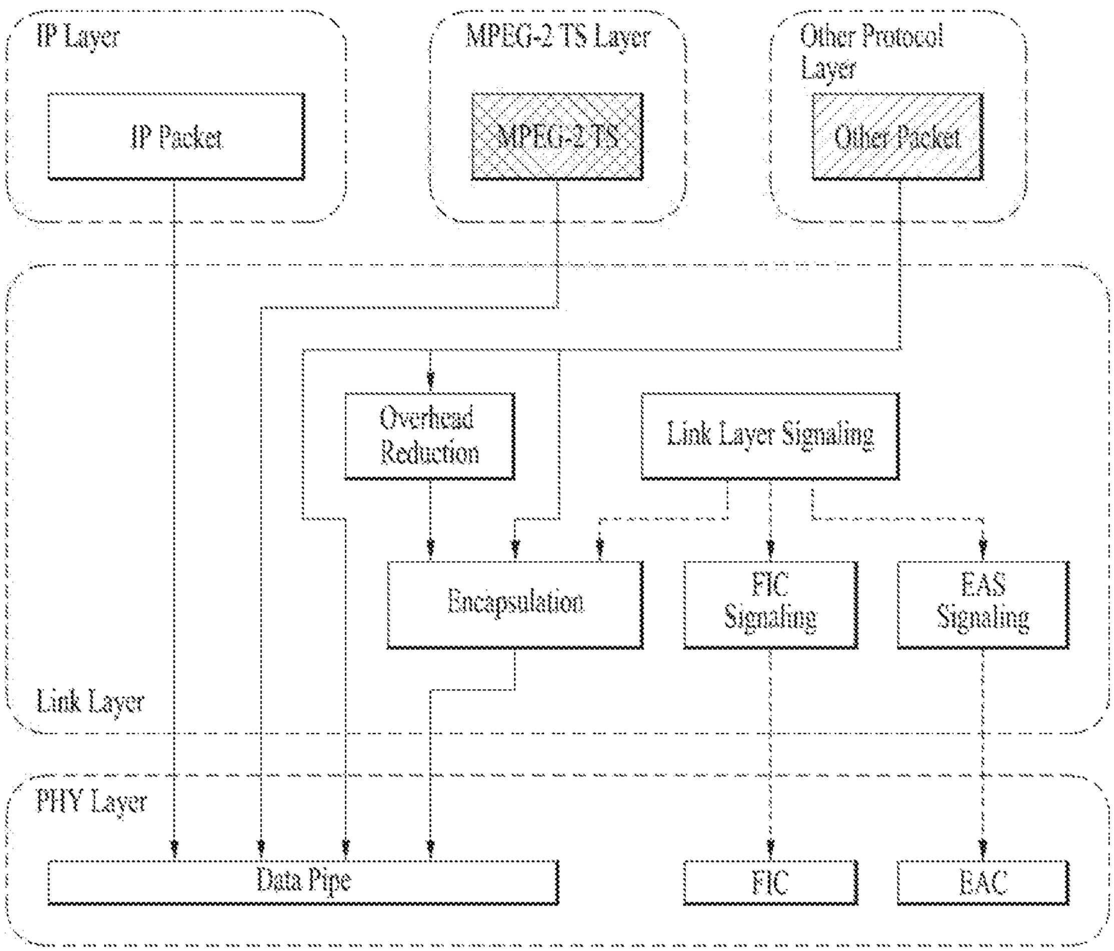
FIG. 20 illustrates operation of a transparent mode from among operation modes of the link layer according to an embodiment of the present invention.

FIG. 20 illustrates operation of the transparent mode from among the operation modes of the link layer according to an embodiment of the present invention.

In the transparent mode, data can be delivered to the physical layer without being processed according to functions supported by the link layer or processed according to only some of the functions and then delivered to the physical layer. That is, packets delivered from an upper layer can be sent to the physical layer without passing through overhead reduction and/or encapsulation in the transparent mode. Other packets may be pass through overhead reduction and/or encapsulation in the transparent mode as necessary. The transparent mode may be called a bypass mode.

According to an embodiment, some packets can be processed in the normal mode and some packets can be processed in the transparent mode on the basis of characteristics of packets and system operation.

Packets to which the transparent mode is applicable may be packets of types well known to the system. When the corresponding packets can be processed in the physical layer, the transparent mode can be used. For example, in the case of a known TS or IP packet, the packet can pass through overhead reduction and input formatting processes in the physical layer and thus the transparent mode can be used in the link layer stage. When the transparent mode is applied and the packet is process through input formatting in the physical layer, the aforementioned operation such as TS header compression can be performed in the physical layer. When a normal mode is applied, a processed link layer packet can be processed by being handled as a GS packet in the physical layer.

Even in the transparent mode, a link layer signaling module may be provided when it is necessary to support transmission of signaling information. The link layer signaling module can transmit and manage signaling information, as described above. Singling information can be encapsulated and transmitted through a DP and FIC and EAS signaling information having separated transmission paths can be respectively transmitted through an FIC channel and an EAC channel.

In the transparent mode, whether information corresponds to signaling information can be indicated through a method of using a fixed IP address and port number, for example. In this case, the signaling information may be filtered to configure a link layer packet and then the link layer packet may be transmitted through the physical layer.

Figure 21:
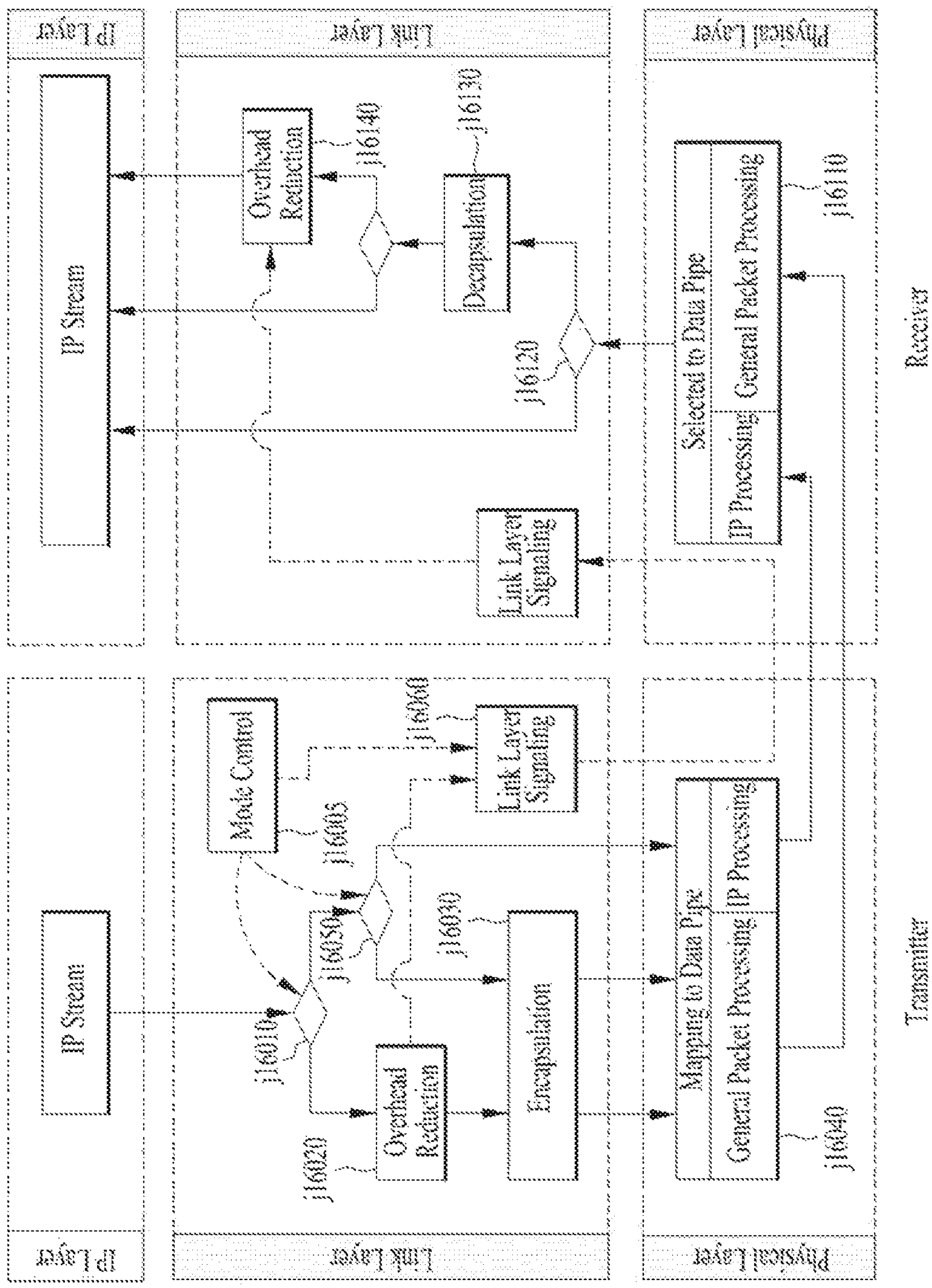
FIG. 21 illustrates a process of controlling operation modes of a transmitter and/or a receiver in the link layer according to an embodiment of the present invention.

FIG. 21 illustrates a process of controlling operation modes of the transmitter and/or the receiver in the link layer according to an embodiment of the present invention.

Determination of a link layer operation mode of the transmitter or the receiver can enable more efficient use of a broadcast system and flexible design of the broadcast system. According to the method of controlling link layer modes, proposed by the present invention, link layer modes for efficient operation of a system bandwidth and processing time can be dynamically switched. In addition, when a specific mode needs to be supported or need for a specific mode disappears due to change of the physical layer, this can be easily handled. Furthermore, when a broadcaster providing broadcast services intends to designate a method for transmitting the broadcast services, broadcast systems can easily accept requests of the broadcaster.

The method for controlling link layer operation modes may be implemented such that the method is performed only in the link layer or may be performed through data structure change in the link layer. In this case, independent operations of the network layer and/or the physical layer can be performed without additionally implementing additional functions therein. It is possible to control link layer modes proposed by the present invention with signaling or system internal parameters without modifying the system to adapt to the structure of the physical layer. A specific mode may operate only when processing of corresponding input is supported in the physical layer.

The figure shows a flow through which the transmitter/receiver processes signals and/or data in the IP layer, link layer and physical layer.

A functional block (which can be implemented as hardware and/or software) for mode control may be added to the link layer to manage parameters and/or signaling information for determining whether to process a packet. The link layer can determine whether to execute a corresponding function in a packet stream processing procedure using information stored in the mode control functional block.

Operation of the transmitted will now be described first.

When an IP stream is input to the link layer, the transmitter determines whether to perform overhead reduction j16020 using mode control parameters j16005 (j16010). The mode control parameters can be generated in the transmitter by a service provider. The mode control parameters will be described in detail later.

When overhead reduction j16020 is performed, information about overhead reduction is generated and included in link layer signaling information j16060. The link layer signaling information j16060 may include all or some mode control parameters. The link layer signaling information j16060 may be delivered in the form of a link layer signaling packet. While the link layer signaling packet can be mapped to a DP and delivered to the receiver, the link layer signaling packet may be transmitted to the receiver through a predetermined region of a broadcast signal without being mapped to a DP.

The packet stream that has passed through overhead reduction j16020 is encapsulated j16030 and applied to a DP of the physical layer (J16040). When the packet stream has not passed through overhead reduction, the transmitter determines whether to perform encapsulation j16050 on the packet stream.

The packet stream that has passed through encapsulation j16030 is applied to the DP of the physical layer (j16040). Here, operation for general packet (link layer packet) processing is performed in the physical layer. When the IP stream has not passed through overhead reduction and encapsulation, the IP stream is directly delivered to the physical layer. Then, operation for processing the IP stream is performed in the physical layer. When the IP stream is directly transmitted to the physical layer, parameters can be provided such that operation is performed only when the physical layer supports IP packet input. That is, mode control parameter values can be controlled such that operation of directly transmitting an IP packet to the physical layer is not performed when the physical layer does not support IP packet processing.

The transmitter transmits the broadcast signal that has passed through the aforementioned process to the receiver.

Operation of the receiver will now be described.

When a specific DP is selected according to channel change by a user and a packet stream is received through the DP in the receiver (j16110), the receiver can check a mode in which the corresponding packet has been generated when transmitted using the header of the packet stream and/or signaling information (S16120). When the mode is confirmed for the DP, the corresponding IP packet is transmitted to the upper layer through decapsulation j16130 and overhead reduction j16140 in the link layer. Overhead reduction j16140 may include overhead recovery.

FIG. 22 illustrates operation in the link layer and format of a packet transmitted to the physical layer on the basis of flag values according to an embodiment of the present invention.

To determine an operation mode of the link layer, the aforementioned signaling method can be used. Signaling information related to the method can be directly transmitted to the receiver. In this case, the aforementioned signaling data or link layer signaling packet may include mode control related information which will be described later.

There may be a method of indirectly signaling an operation mode of the link layer to the receiver in consideration of complexity of the receiver.

The following two flags can be considered for operation mode control.

- Header compression flag (HCF): this is a flag setting whether to apply header compression in the link layer and can be assigned values indicating "enable" and "disable".
- Encapsulation flag (EF): this is a flag setting whether to apply encapsulation in the link layer and can be assigned values indicating "enable" and "disable". However, the EF can be subordinated to the HCF when encapsulation needs to be essentially performed according to header compression scheme.

A value mapped to each flag can be provided in the range including representation of "enable" and "disable" according to system configuration and the number of bits allocated per flag can be changed. For example, the value "enable" can be mapped to 1 and the value "disable" can be mapped to 0.

The figure shows whether header compression and encapsulation are performed and a packet format transferred to the physical layer according to header compression and encapsulation on the basis of HCF and EF values. That is, according to one embodiment of the present invention, the receiver can recognize the format of a packet input to the physical layer from information about the HCF and the EF.

Figure 23:
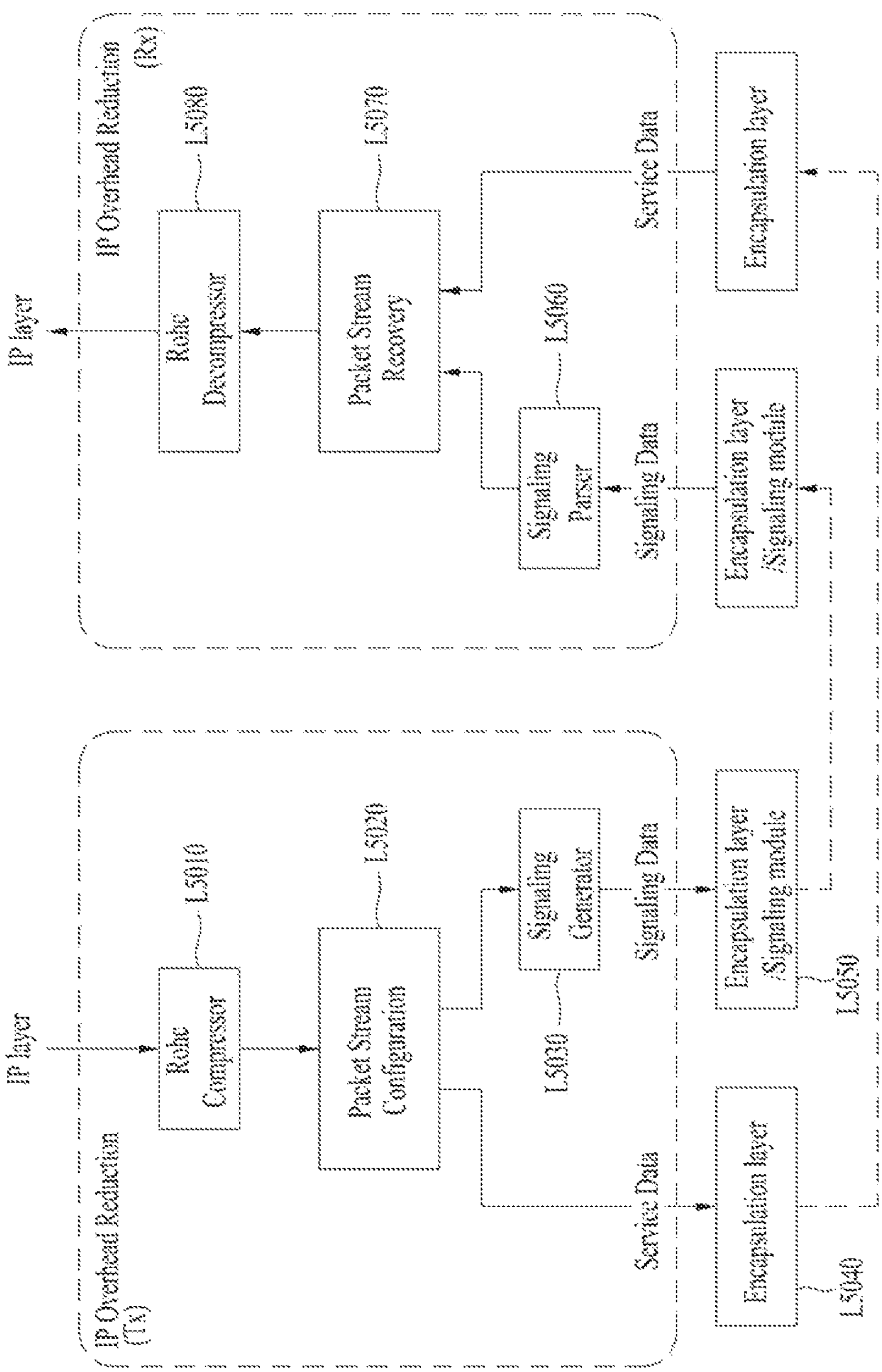
FIG. 23 illustrates an IP overhead reduction process in a transmitter/receiver according to an embodiment of the present invention.

FIG. 23 illustrates an IP overhead reduction process in the transmitter/receiver according to an embodiment of the present invention.

According to an embodiment of the present invention, when an IP stream enters the overhead reduction process, an RoHC compressor L5010 can perform header compression on the IP stream. RoHC can be used as a header compression algorithm in an embodiment of the present invention. The packet stream that has passed through RoHC can be reconfigured according to an RoHC packet format in a packet stream configuration process L5020, and the reconfigured RoHC packet stream can be delivered to an encapsulation layer L5040 and then transmitted to the receiver through the physical layer. RoHC context information and/or signaling information generated during packet stream reconfiguration can be made into data in a transmittable form through a signaling generator L5030 and the data can be delivered to an encapsulation layer or signaling module S5050 according to transmission form.

According to an embodiment of the present invention, the receiver can receive a stream with respect to service data and a signaling channel or signaling data transmitted through a separate DP. A signaling parser L5060 can receive the signaling data, parses the signaling data into RoHC context information and/or signaling information and transmit the parsed information to a packet stream recovery unit L5070. The receiver can recover the packet stream reconfigured in the transmitter in a format that can be decompressed by an RoHC decompressor L5080 using the RoHC context information and/or the signaling information included in the signaling data, through the packet stream recovery unit L5070. The RoHC decompressor L5080 can convert the recovered RoHC packet stream into an IP stream, and the IP stream can be delivered to an upper layer through the IP layer.

FIG. 24 illustrates RoHC profiles according to an embodiment of the present invention.

According to an embodiment of the present invention, RoHC can be used for header compression for an upper packet in the link layer, as described above. An RoHC framework can operate in the unidirectional mode, as described in RFC 3095, in consideration of characteristics of broadcast networks. The RoHC framework defines a plurality of header compression profiles. Each profile indicates a specific protocol combination and a profile identifier identifying each profile can be allocated by the Internet assigned numbers authority. Some of the profiles shown in FIG. 24 can be used in the broadcast system according to embodiments of the present invention.

Figure 25:
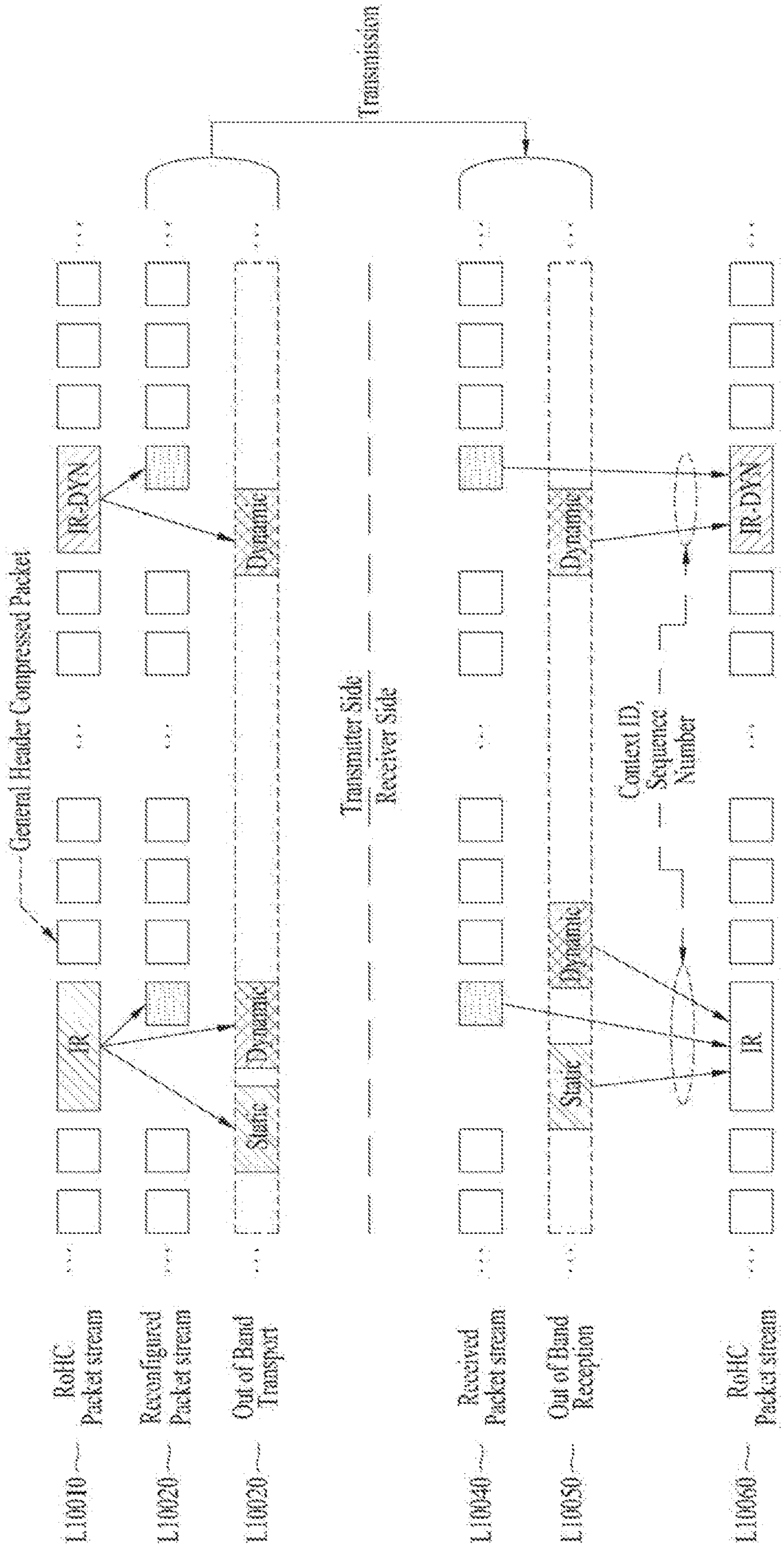
FIG. 25 illustrates processes of configuring and recovering an RoHC packet stream with respect to configuration mode #1 according to an embodiment of the present invention.

FIG. 25 illustrates processes of configuring and recovering an RoHC packet stream with respect to configuration mode #1 according to an embodiment of the present invention.

A description will be given of an RoHC packet stream configuration process in a transmitter according to an embodiment of the present invention.

The transmitter according to an embodiment can detect IR packets and IR-DYN packets from an RoHC packet stream L10010 on the basis of RoHC header information. Then the transmitter can generate general header compressed packets using sequence numbers included in the IR packets and the IR-DYN packets. The general header compressed packets can be randomly generated since the general header compressed packets include sequence number (SN) information irrespective of the type thereof. Here, the SN corresponds to information that is basically present in the RTP. In the case of the UDP, the transmitter can generate and use the SN. The transmitter can replace the IR packets or the IR-DYN packets with the generated general header compressed packets, extract a static chain and a dynamic chain from the IR packets and extract a dynamic chain from the IR-DYN packets. The extracted static chain and dynamic chain can be transported through out-of-band L10030. The transmitter can replace IR headers and IR-DYN headers with headers of general header compressed packets and extract static chains and/or dynamic chains, for all RoHC packet streams, according to the aforementioned process. A reconfigured packet stream L10020 can be transmitted through a data pipe and the extracted static chain and dynamic chain can be transported through out-of-band L10030.

A description will be given of a process of recovering an RoHC packet stream in a receiver according to an embodiment of the present invention.

The receiver according to an embodiment of the present invention can select a data pipe corresponding to a packet stream to be received using signaling information. Then, the receiver can receive the packet stream transmitted through the data pipe (S10040) and detect a static chain and a dynamic chain corresponding to the packet stream. Here, the static chain and/or the dynamic chain can be received through out-of-band (S10050). Subsequently, the receiver can detect general header compressed packets having the same SN as that of the static chain or the dynamic chain from the packet stream transmitted through the data pipe, using SNs of the detected static chain and the dynamic chain. The receiver can configure IR packets and/or IR-DYN packets by combining the detected general header compressed packets with the static chain and/or the dynamic chain. The configured IR packets and/or the IR-DYN packets can be transmitted to an RoHC decompressor. In addition, the receiver can configure an RoHC packet stream L10060 including the IR packets, the IR-DYN packets and/or the general header compressed packets. The configured RoHC packet stream can be transmitted to the RoHC decompressor. The receiver according to an embodiment of the present invention can recover the RoHC packet stream using the static chain, the dynamic chain, SNs and/or context IDs of the IR packets and the IR-DYN packets.

Figure 26:
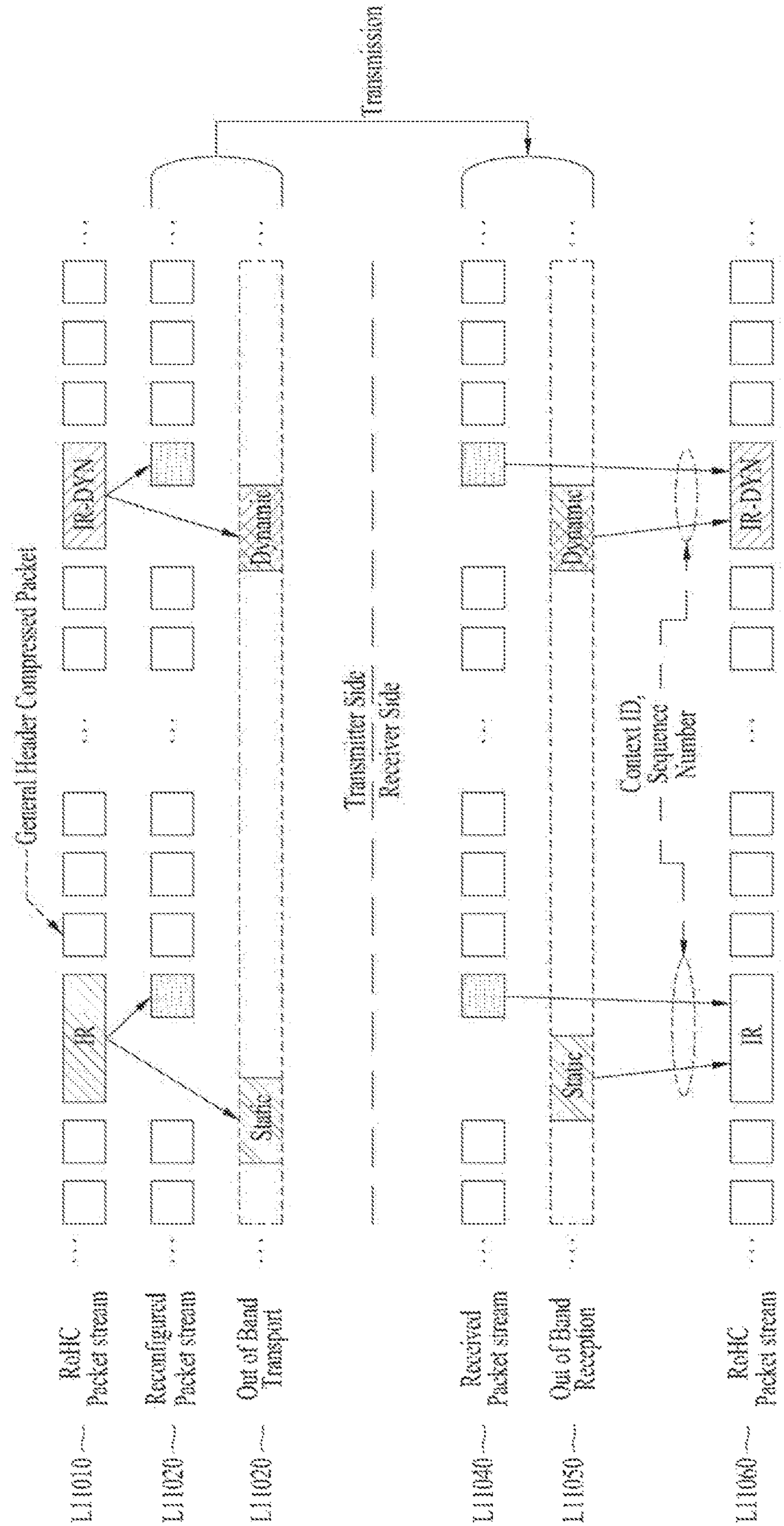
FIG. 26 illustrates processes of configuring and recovering an RoHC packet stream with respect to configuration mode #2 according to an embodiment of the present invention.

FIG. 26 illustrates processes of configuring and recovering an RoHC packet stream with respect to configuration mode #2 according to an embodiment of the present invention.

A description will be given of an RoHC packet stream configuration process in a transmitter according to an embodiment of the present invention.

The transmitter according to an embodiment can detect IR packets and IR-DYN packets from an RoHC packet stream L11010 on the basis of RoHC header information. Then the transmitter can generate general header compressed packets using sequence numbers included in the IR packets and the IR-DYN packets. The general header compressed packets can be randomly generated since the general header compressed packets include sequence number (SN) information irrespective of the type thereof. Here, the SN corresponds to information that is basically present in the RTP. In the case of the UDP, the transmitter can generate and use the SN. The transmitter can replace the IR packets or the IR-DYN packets with the generated general header compressed packets, extract a static chain from the IR packets and extract a dynamic chain from the IR-DYN packets. The extracted static chain and dynamic chain can be transported through out-of-band L11030. The transmitter can replace IR headers and IR-DYN headers with headers of general header compressed packets and extract static chains and/or dynamic chains, for all RoHC packet streams, according to the aforementioned process. A reconfigured packet stream L11020 can be transmitted through a data pipe and the extracted static chain and dynamic chain can be transported through out-of-band L11030.

A description will be given of a process of recovering an RoHC packet stream in a receiver according to an embodiment of the present invention.

The receiver according to an embodiment of the present invention can select a data pipe corresponding to a packet stream to be received using signaling information. Then, the receiver can receive the packet stream transmitted through the data pipe (S11040) and detect a static chain and a dynamic chain corresponding to the packet stream. Here, the static chain and/or the dynamic chain can be received through out-of-band (S11050). Subsequently, the receiver can detect general header compressed packets having the same SN as that of the static chain or the dynamic chain from the packet stream transmitted through the data pipe, using SNs of the detected static chain and the dynamic chain. The receiver can configure IR packets and/or IR-DYN packets by combining the detected general header compressed packets with the static chain and/or the dynamic chain. The configured IR packets and/or the IR-DYN packets can be transmitted to an RoHC decompressor. In addition, the receiver can configure an RoHC packet stream L11060 including the IR packets, the IR-DYN packets and/or the general header compressed packets. The configured RoHC packet stream can be transmitted to the RoHC decompressor. The receiver according to an embodiment of the present invention can recover the RoHC packet stream using the static chain, the dynamic chain, SNs and/or context IDs of the IR packets and the IR-DYN packets.

Figure 27:
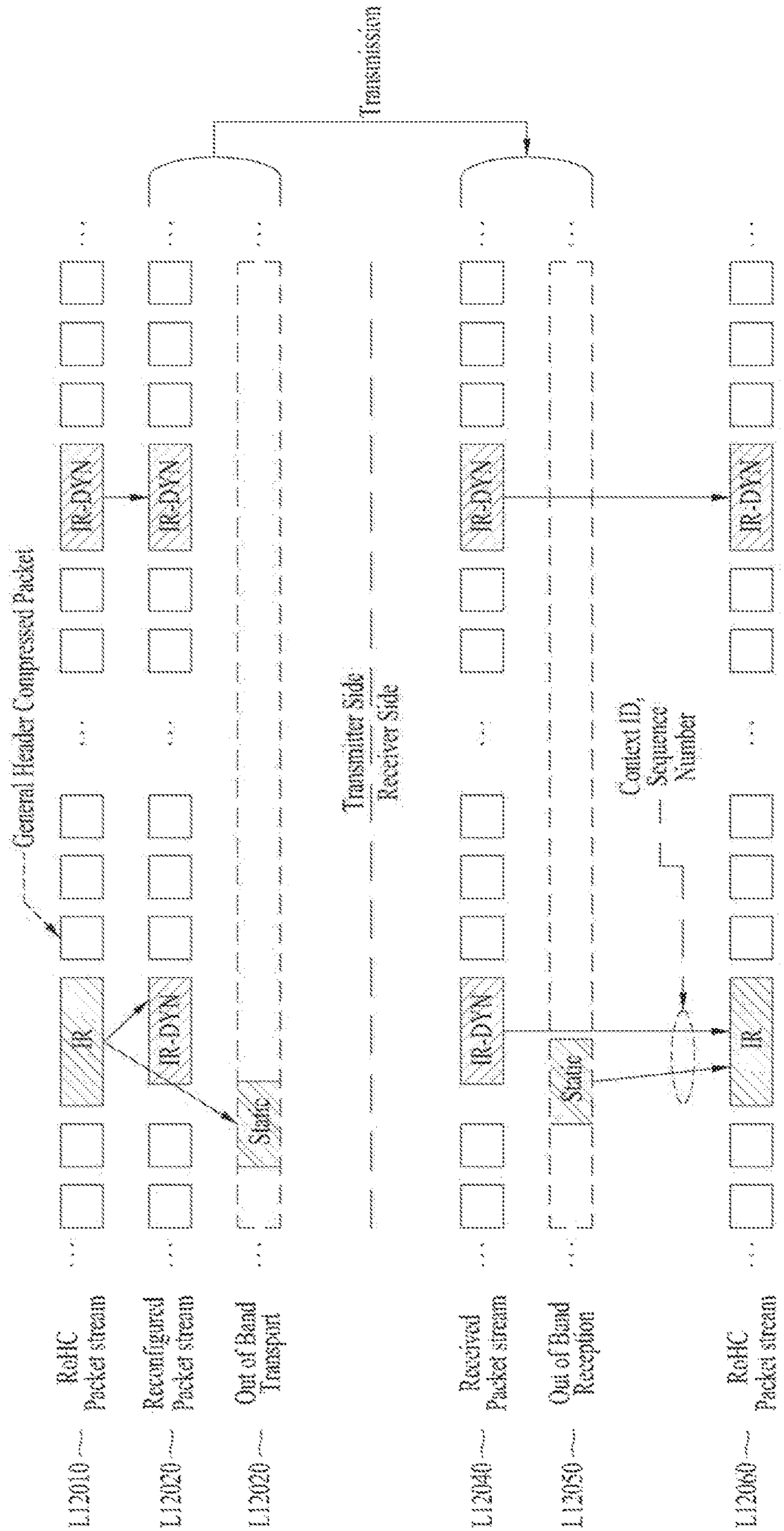
FIG. 27 illustrates processes of configuring and recovering an RoHC packet stream with respect to configuration mode #3 according to an embodiment of the present invention.

FIG. 27 illustrates processes of configuring and recovering an RoHC packet stream with respect to configuration mode #2 according to an embodiment of the present invention.

A description will be given of an RoHC packet stream configuration process in a transmitter according to an embodiment of the present invention.

The transmitter according to an embodiment can detect IR packets from an RoHC packet stream L12010 on the basis of RoHC header information. Then, the transmitter can extract a static chain from the IR packets and convert the IR packets into IR-DYN packets using parts of the IR packets other than the extracted static chain. The transmitter can replace headers of IR packets with headers of IR-DYN packets and extract static chains, for all RoHC packet streams, according to the aforementioned process. A reconfigured packet stream L12020 can be transmitted through a data pipe and the extracted static chain can be transported through out-of-band L12030.

A description will be given of a process of recovering an RoHC packet stream in a receiver according to an embodiment of the present invention.

The receiver according to an embodiment of the present invention can select a data pipe corresponding to a packet stream to be received using signaling information. Then, the receiver can receive the packet stream transmitted through the data pipe (S12040) and detect a static chain corresponding to the packet stream. Here, the static chain can be received through out-of-band (S12050). Subsequently, the receiver can detect IR-DYN packets from the packet stream transmitted through the data pipe. Then, the receiver can configure IR packets by combining the detected IR-DYN packets with the static chain. The configured IR packets can be transmitted to an RoHC decompressor. In addition, the receiver can configure an RoHC packet stream L12060 including the IR packets, the IR-DYN packets and/or general header compressed packets. The configured RoHC packet stream can be transmitted to the RoHC decompressor. The receiver according to an embodiment of the present invention can recover the RoHC packet stream using the static chain, SNs and/or context IDs of the IR-DYN packets.

FIG. 28 shows combinations of information that can be transported out of band according to an embodiment of the present invention.

According to an embodiment of the present invention, methods for transporting a static chain and/or a dynamic chain, extracted in an RoHC packet stream configuration process, out of band may include a method for transporting a static chain and/or a dynamic chain through signaling and a method for transporting a static chain and/or a dynamic chain through a data pipe through which parameters necessary for system decoding are delivered. In an embodiment of the present invention, the data pipe through which parameters necessary for system decoding are delivered may be called a base data pipe (DP).

As shown in the figure, the static chain and/or the dynamic chain can be transported through signaling or the base DP. In an embodiment of the present invention, transport mode #1, transport mode #2 and transport mode #3 can be used for configuration mode #1 or configuration mode #2 and transport mode #4 and transport mode #5 can be used for configuration mode #3.

According to an embodiment of the present invention, the configuration modes and the transport modes may be switched through additional signaling according to system state, and only one configuration mode and transport mode can be fixed and used according to system design.

As shown in the figure, the static chain and the dynamic chain can be transmitted through signaling and a general header compressed packet can be transmitted through a normal DP in transport mode #1.

Referring to the figure, the static chain can be transmitted through signaling, the dynamic chain can be transmitted through the base DP and the general header compressed packet can be transmitted through a normal DP in transport mode #2.

As shown in the figure, the static chain and the dynamic chain can be transmitted through the base DP and the general header compressed packet can be transmitted through a normal DP in transport mode #3.

Referring to the figure, the static chain can be transmitted through signaling, the dynamic chain can be transmitted through a normal DP and the general header compressed packet can be transmitted through a normal DP in transport mode #4.

As shown in the figure, the static chain can be transmitted through the base DP, the dynamic chain can be transmitted through a normal DP and the general header compressed packet can be transmitted through a normal DP in transport mode #5. Here, the dynamic chain can be transmitted through an IR-DYN packet.

Figure 29:
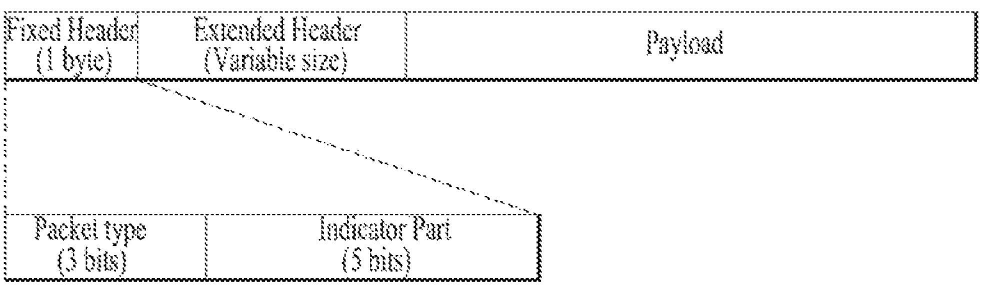
FIG. 29 illustrates a packet transmitted through a data pipe according to an embodiment of the present invention.

FIG. 29 illustrates a packet transmitted through a data pipe according to an embodiment of the present invention.

According to an embodiment of the present invention, it is possible to generate a link layer packet which is compatible irrespective of change of a protocol of an upper layer or a lower layer of the link layer by newly defining a packet structure in the link layer.

The link layer packet according to an embodiment of the present invention can be transmitted through a normal DP and/or the base DP.

The link layer packet can include a fixed header, an extended header and/or a payload.

The fixed header has a fixed size and the extended header has a size variable depending on a configuration of a packet of an upper layer. The payload is a region in which data of the upper layer is transmitted.

A packet header (fixed header or extended header) can include a field indicating the type of the payload of the packet. In the case of the fixed header, first 3 bits of 1 byte correspond to data indicating a packet type of the upper layer and the remaining 5 bits are used as an indicator part. The indicator part can include data indicating a payload configuration method and/or configuration information of the extended header and the configuration of the indicator part can be changed according to packet type.

The figure shows types of packets of the upper layer, included in the payload, according to packet type values.

The payload can carry an IP packet and/or an RoHC packet through a DP and carry a signaling packet through the base DP according to system configuration. Accordingly, even when packets of various types are simultaneously transmitted, a data packet and a signaling packet can be discriminated from each other by assigning packet type values.

A packet type value of 000 indicates that an IP packet of IPv4 is included in the payload.

A packet type value of 001 indicates that an IP packet of IPv6 is included in the payload.

A packet type value of 010 indicates that a compressed IP packet is included in the payload. The compressed IP packet may include a header-compressed IP packet.

A packet type value of 110 indicates that a packet including signaling data is included in the payload.

A packet type value of 111 indicates that a framed packet is included in the payload.

FIG. 30 illustrates a syntax of a link layer packet structure according to an embodiment of the present invention.

FIG. 30 shows the structure of the aforementioned packet transmitted through a data pipe. The link layer packet may have a Packet_Type field.

A field following the Packet_Type field can depend on the value of the Packet_Type field. When the Packet_Type field has a value of 000 or 001, as shown in the figure, the Packet_Type field can be followed by Link_Layer_Packet_Header_for_IP( ), that is, a header structure for IP packets. When the Packet_Type field has a value of 010, Link_Layer_Packet_Header_for_Compressed_IP( ), that is, a header structure for compressed IP packets can follow the Packet_Type field. When the Packet_Type field has a value of 011, the Packet_Type field can be followed by Link_Layer_Packet_Header_for_TS( ), that is, a header structure for TS packets. When the Packet_Type field has a value of 110, Link_Layer_Packet_Header_for_Signaling( ), that is, a header structure for signaling information can follow the Packet_Type field. When the Packet_Type field has a value of 111, the Packet_Type field can be followed by Link_Layer_Packet_Header_for_Framed_Packet( ), that is, a header structure for framed packets. Other values can be reserved for future use. Here, meaning of Packet_Type field values may be changed according to embodiments.

The field following the Packet_Type field can be followed by Link_Layer_Packet_Payload( ) which is a link layer packet payload.

Figure 31:
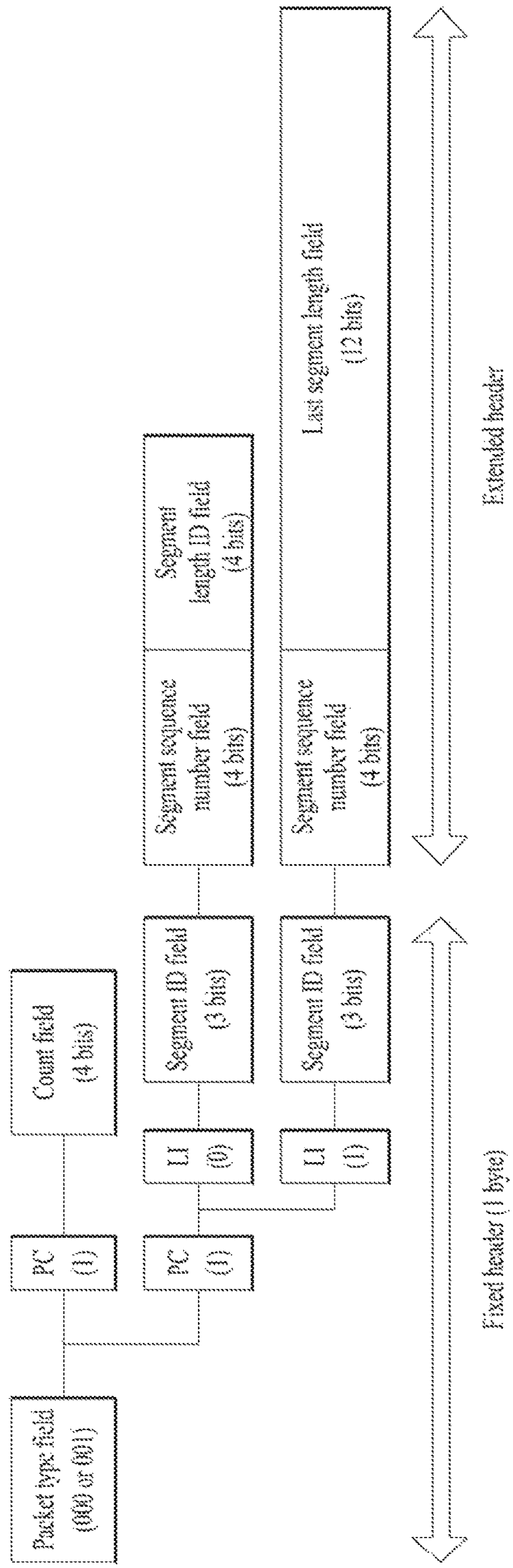
FIG. 31 illustrates a structure of a header of a link layer packet when IP packets are delivered to the link layer according to another embodiment of the present invention.

FIG. 31 illustrates a link layer packet header structure when an IP packet is delivered to the link layer according to another embodiment of the present invention.

In this case, the link layer packet header includes a fixed header and an extended header. The fixed header can have a length of 1 byte and the extended header can have a fixed length of a variable length. The length of each header can be changed according to design.

The fixed header can include a packet type field, a packet configuration (PC) field and/or a count field. According to another embodiment, the fixed header may include a packet type field, a PC field, an LI field and/or a segment ID field.

The extended header can include a segment sequence number field and/or a segment length ID field. According to another embodiment, the extended field may include a segment sequence number field and/or a last segment length field.

The fields of the fixed header will now be described.

The packet type field can indicate the type of a packet input to the link layer, as described above. When an IP packet is input to the link layer, the packet type field can have a value of 000B or 001B.

The PC field can indicate the remaining part of the fixed header, which follows the PC field, and/or the configuration of the extended header. That is, the PC field can indicate the form into which the input IP packet has been processed. Accordingly, the PC field can include information on the length of the extended header.

A PC field value of 0 can indicate that the payload of the link layer packet includes one IP packet or two or more concatenated IP packets. Here, concatenation means that short packets are connected to form a payload.

When the PC field has a value of 0, the PC field can be followed by a 4-bit count field. The count field can indicate the number of concatenated IP packets corresponding to one payload. The number of concatenated IP packets, indicated by the counter field, will be described later.

When the PC field value is 0, the link layer may not include the extended header. However, when the length of the link layer packet needs to be indicated according to an embodiment, a one or two-byte extended header can be added. In this case, the extended header can be used to indicate the length of the link layer packet.

A PC field value of 1 can indicate that the link layer packet payload includes a segmented packet. Here, segmentation of a packet means segmentation of a long IP packet into a plurality of segments. Each segmented piece can be called a segment or a segmented packet. That is, when the PC field value is 1, the link layer packet payload can include one segment.

When the PC field value is 1, the PC field can be followed by a 1-bit last segment indicator (LI) field and a 3-bit segment ID field.

The LI field can indicate whether the corresponding link layer packet includes the last segment from among segments. That is, the corresponding link layer includes the last segment when the LI field has a value of 1 and the corresponding link layer does not include the last segment when the LI field has a value of 0. The LI field can be used when a receiver reconfigures the original IP packet. The LI field may indicate information about the extended header of the link layer packet. That is, the length of the extended header can be 1 byte when the LI field value is 0 and 2 bytes when the LI field value is 1. Details will be described later.

The segment ID field can indicate the ID of a segment included in the corresponding link layer packet. When one IP packet is segmented into segments, the segments may be assigned the same ID. The segment ID enables the receiver to recognize that the segments are components of the same IP packet when reconfiguring the original IP packet. Since the segment ID field has a size of 3 bits, segmentation of 8 IP packets can be simultaneously supported.

When the PC field value is 1, the extended header can be used for information about segmentation. As described above, the extended header can include the segment sequence number field, the segment length ID field and/or the last segment length field.

The fields of the extended header will now be described.

When the aforementioned LI field has a value of 0, that is, when the link layer packet does not include the last segment, the extended header can include the segment sequence number field and/or the segment length ID field.

The segment sequence number field can indicate sequence numbers of segmented packets. Accordingly, link layer packets having segments obtained by segmenting one IP packet have different segment sequence number fields while having the same segment ID field. Since the segment sequence number field has a size of 4 bits, the IP packet can be segmented into a maximum of 16 segments.

The segment length ID field can indicate the length of segments other than the last segment. Segments other than the last segment may have the same length. Accordingly, the length of the segments can be represented using a predetermined length ID. The predetermined length ID can be indicated by the segment length ID field.

Segment lengths can be set according to a packet input size which is determined on the basis of an FEC code rate of the physical layer. That is, segment lengths can be determined according to the packet input size and designated by segment length IDs. To reduce header overhead, the number of segment lengths can be limited to 16.

Segment length ID field values according to segment lengths will be described later.

When the physical layer operates irrespective of segment lengths, a segment length can be obtained by adding a minimum segment length min_len to a product of the corresponding segment length ID and a length unit Len_Unit. Here, the length unit is a basic unit indicating a segment length and the minimum segment length means a minimum value of the segment length. The transmitter and the receiver need to always have the same length unit and the same minimum segment length, and it is desirable that the length unit and the minimum segment length not be changed for efficient system operation. The length unit and the minimum segment length can be determined in consideration of FEC processing capability of the physical layer in the system initialization process.

When the aforementioned LI field has a value of 1, that is, when the link layer packet includes the last segment, the extended header can include the segment sequence number field and/or the last segment length field.

The segment sequence number field has been described above.

The last segment length field can directly indicate the length of the last segment. When one IP packet is segmented into segments having specific lengths, the last segment may have a different length from those of other segments. Accordingly, the last segment length field can directly indicate the length of the last segment. The last segment length field can represent 1 to 4095 bytes. Bytes indicated by the last segment length field may be changed according to embodiments.

FIG. 32 illustrates a syntax of a link layer packet header structure when an IP packet is delivered to the link layer according to another embodiment of the present invention.

The link layer packet header can include the Packet_Type field and the PC field Payload_Config, as described above.

When the PC field has a value of 0, the PC field can be followed by the count field.

When the PC field has a value of 1, the PC field can be followed by a Last_Segment_Indicator field, Segment_ID field and Segment_Sequence_Number field. Here, the configuration of the part following the Last_Segment_Indicator field can be changed according to the value of the Last_Segment_Indicator field. When the Last_Segment_Indicator field is 0, the Segment_Length_ID field can follow the Segment_Sequence_Number field. When the Last_Segment_Indicator field is 1, the Last_Segment_Length field can follow the Segment_Sequence_Number field.

FIG. 33 illustrates indication of field values in a link layer packet header when an IP packet is delivered to the link layer according to another embodiment of the present invention.

As described above, the number of concatenated IP packets can be determined on the basis of a count field value (t61010). While the count field value can directly indicate the number of concatenated IP packets, the count field value is meaningless when 0 packets are concatenated. Accordingly, the count field can indicate that as many IP packets as the value obtained by adding 1 to the count field value have been concatenated. That is, a count field value of 0010 can indicate that 3 IP packets have been concatenated and a count field value of 0111 can indicate that 8 IP packets have been concatenated as shown in the table t61010.

A count field value of 0000 indicating that one IP packet has been concatenated can represent that the link layer packet payload includes one IP packet without concatenation.

As described above, a segment length can be indicated by a segment length ID field value (t61020).

For example, a segment length ID field value of 0000 can indicate a segment length of 512 bytes. This means that a segment included in the corresponding link layer packet payload is not the last segment and has a length of 512 bytes. Other segments from the same IP packet may also have a length of 512 bytes if the segments are not the last segment.

In the table, the length unit has a value of 256 and the minimum segment length has a value of 512. Accordingly, the minimum segment length is 512 bytes (segment length ID field=0000). Designated segment lengths increase at an interval of 256 bytes.

Figure 34:
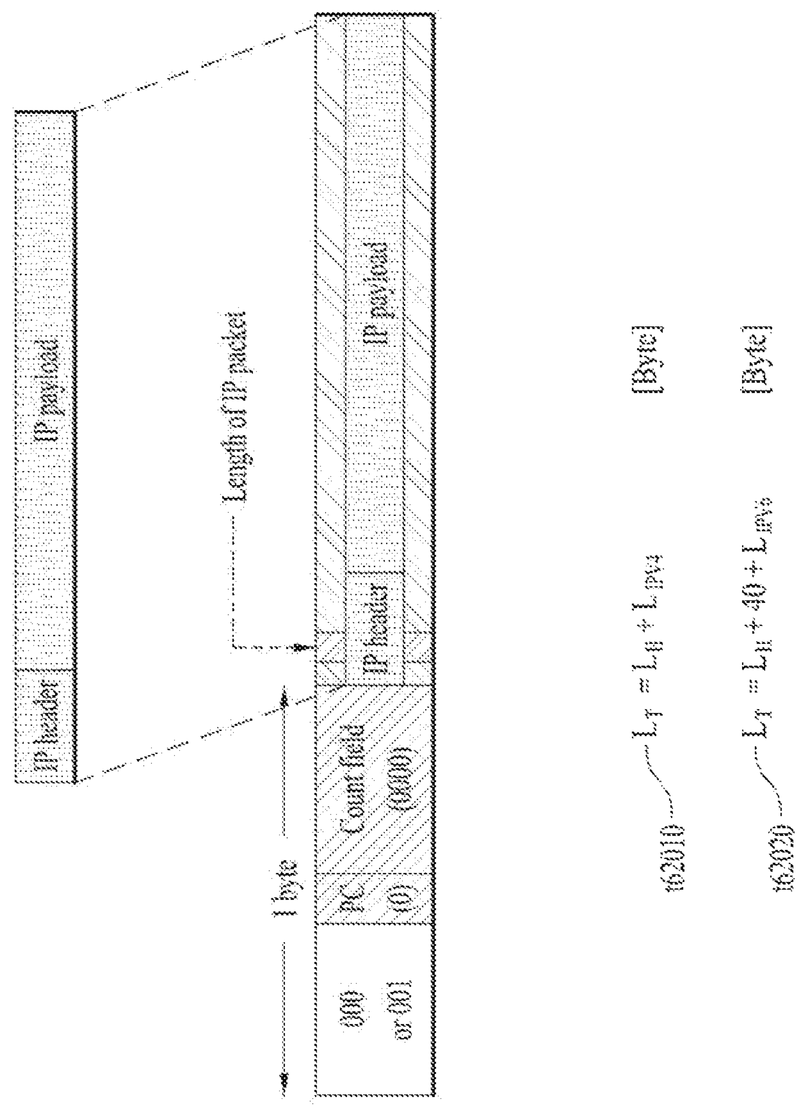
FIG. 34 illustrates a case in which one IP packet is included in a link layer payload, in a link layer packet header structure when IP packets are transmitted to the link layer, according to another embodiment of the present invention.

FIG. 34 illustrates a case in which one IP packet is included in a link layer payload in a link layer packet header structure when IP packets are delivered to the link layer according to another embodiment of the present invention.

A case in which one IP packet is included in the link layer payload, that is, a case in which concatenation or segmentation is not performed may be referred to as encapsulation into a normal packet. In this case, the IP packet is within a processing range of the physical layer.

In the present embodiment, the link layer packet has a 1-byte header. The header length may be changed according to embodiments. The packet type field may have a value of 000 (in the case of IPv4) or 001 (in the case of IPv6). Normal packet encapsulation can be equally applied to IPv4 and IPv6. The PC field value can be 0 since one packet is included in the payload. The count field following the PC field can have a value of 0000 since only one packet is included in the payload.

In the present embodiment, the link layer packet payload can include one whole IP packet.

In the present embodiment, information of the IP packet header can be used to confirm the length of the link layer packet. The IP packet header includes a field indicating the length of the IP packet. This field can be called a length field. The length field may be located at a fixed position in the IP packet. Since the link layer payload includes one whole IP packet, the length field can be located at a position at a distance from the starting point of the link layer packet payload by a predetermined offset. Accordingly, the length of the link layer payload can be recognized using the length field.

The length field can be located at a position at a distance from the starting point of the payload by 4 bytes in the case of IPv4 and at a position at a distance from the starting point of the payload by 2 bytes in the case of IPv6. The length field can have a length of 2 bytes.

In the case of IPv4, when the length field value is LIPv4 and the link layer packet header length is LH (1 byte), the total length of the link layer packet, LT, can be represented by an equation t62010 shown in the figure. Here, the length field value LIPv4 can indicate the length of the IPv4 packet.

In the case of IPv6, when the length field value is LIPv6 and the link layer packet header length is LH (1 byte), the total link layer packet length LT can be represented by an equation t62020 shown in the figure. Here, since the length field value LIPv6 indicates only the length of the IPv6 packet payload, the length (40 bytes) of the fixed header of the IPv6 packet needs to be added to the length field value in order to obtain the length of the link layer packet.

Figure 35:
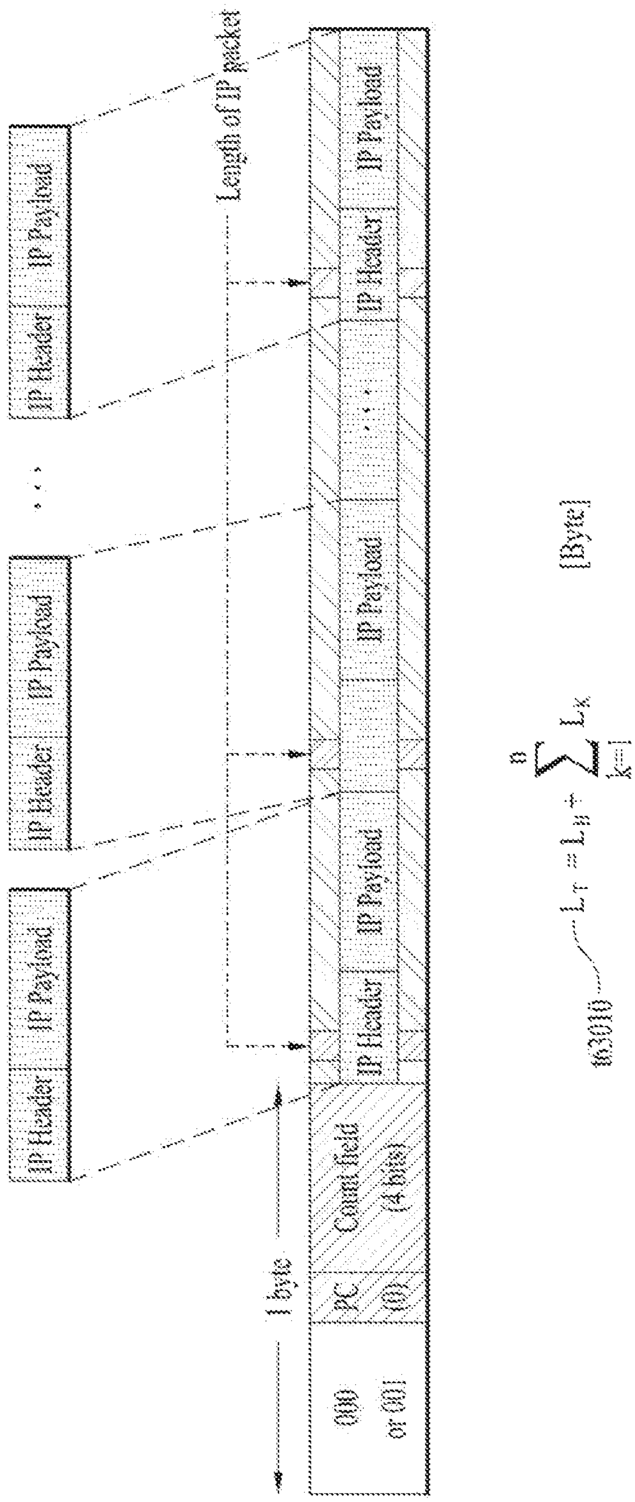
FIG. 35 illustrates a case in which multiple IP packets are concatenated and included in link layer payloads, in a link layer packet header structure when IP packets are transmitted to the link layer, according to another embodiment of the present invention.

FIG. 35 illustrates a case in which multiple IP packets are concatenated and included in a link layer payload in a link layer packet header structure when IP packets are delivered to the link layer according to another embodiment of the present invention.

When input IP packets are not within the processing range of the physical layer, multiple IP packets may be concatenated and encapsulated into a payload of one link layer packet.

In the present embodiment, the link layer packet can have a 1-byte header. The header length may be changed according to embodiments. The packet type field can have a value of 000 (in the case of IPv4) or 001 (in the case of IPv6). The encapsulation process of the present embodiment can be equally applied to IPv4 and IPv6. The PC field value can be 0 since the concatenated IP packets are included in the payload. The count field following the PC field (4 bits) can indicate the number of concatenated IP packets.

In the present embodiment, the link layer packet payload can include multiple IP packets. The multiple IP packets can be sequentially concatenated and included in the link layer packet payload. The concatenation method can be changed according to design.

In the present embodiment, to confirm the length of the link layer packet, information of headers of the concatenated IP packets can be used. As in the aforementioned normal packet encapsulation, the header of each IP packet may have the length field indicating the length of the IP packet. The length field can be located at a fixed position in the corresponding IP packet.

Accordingly, when the header length of the link layer packet is LH and the length of each IP packet is LK (K being equal to or greater than 1 and equal to or less than n), the total length of the link layer packet length, LT, can be represented by an equation t63010 shown in the figure. That is, the link layer packet length can be obtained by summing the lengths of the IP packets, respectively indicated by the length fields of the IP packets, and adding the header length of the link layer packet to the sum. LK can be confirmed by reading the length fields of the headers of the respective IP packets.

Figure 36:
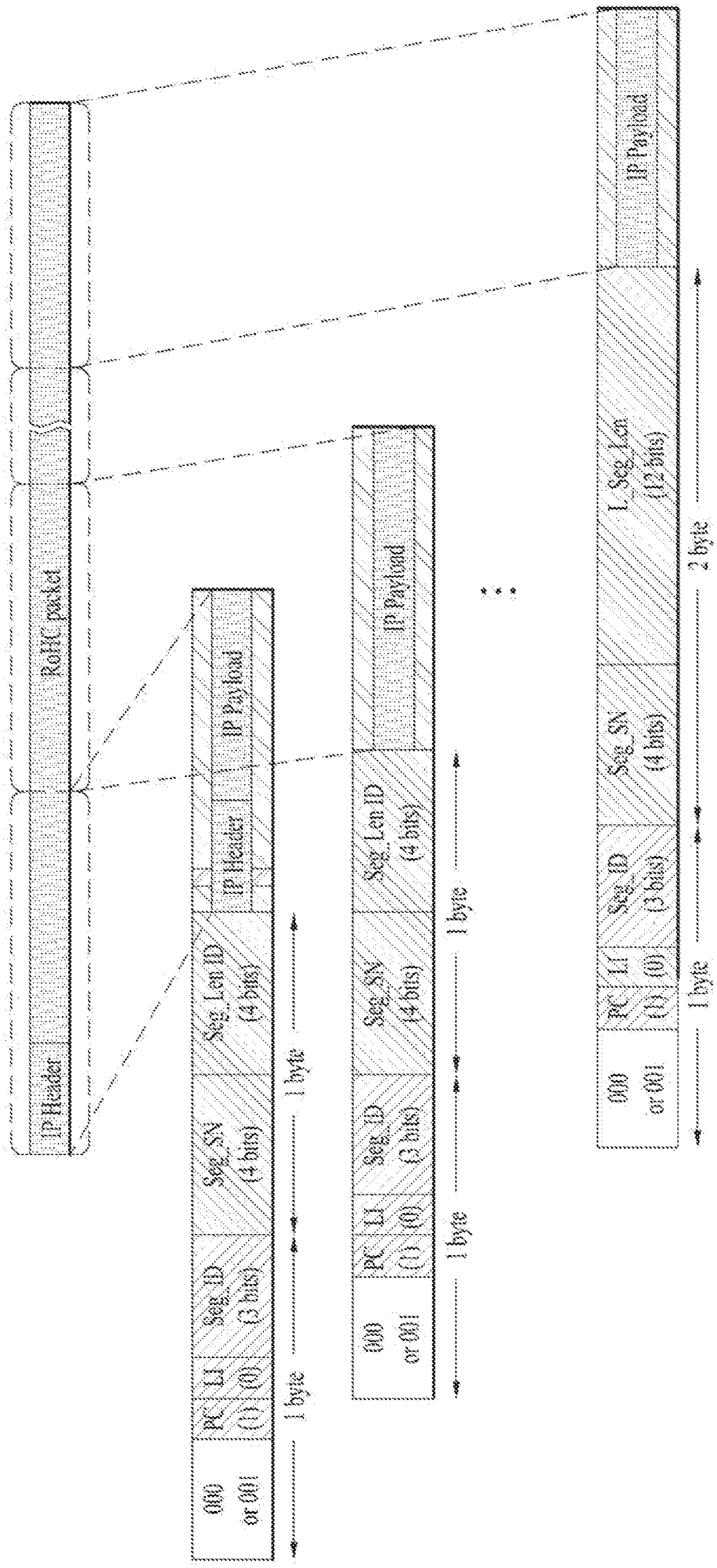
FIG. 36 illustrates a case in which one IP packet is segmented and included in link layer payloads, in a link layer packet header structure when IP packets are transmitted to the link layer, according to another embodiment of the present invention.

FIG. 36 illustrates a case in which one IP packet is segmented and included in a link layer payload in a link layer packet header structure when IP packets are delivered to the link layer according to another embodiment of the present invention.

When input IP packets exceed the processing range of the physical layer, one IP packet may be segmented into a plurality of segments. The segments can be respectively encapsulated in payloads of link layer packets.

In the present embodiment, link layer packets t64010, t64020 and t64030 can have fixed headers and extended headers. The fixed header length and extended header length may be changed according to embodiments. The packet type field value can be 000 (in the case of IPv4) or 001 (in the case of IPv6). The encapsulation process of the present embodiment can be equally applied to IPv4 and IPv6. The PC field value can be 1 since the segments are included in the payloads.

The link layer packets t64010 and t64020 including segments, which are not the last segment, in the payloads thereof can have an LI field value of 0 and the same segment ID field value since the segments are from the same IP packet. The segment sequence number field following the segment ID field can indicate the sequence of the corresponding segment. Here, the segment sequence field value of the first link layer packet t64010 can indicate that the link layer packet has the first segment as a payload. The segment sequence field value of the second link layer packet t64020 can indicate that the link layer packet has the second segment as a payload. The segment length ID field can represent the length of the corresponding segment as a predetermined length ID.

The link layer packet t64030 having the last segment as a payload may have an LI field value of 1. The segment ID field can have the same value as those of other link layer packets since the last segment is also from the same IP packet. The segment sequence number field following the segment ID field can indicate the sequence of the corresponding segment. The last segment length field can directly indicate the length of the last segment included in the link layer packet t64030.

In the present embodiment, to confirm the length of a link layer packet, the segment length ID field or the last segment length field can be used. Since the fields indicate only the length of the payload of the link layer packet, the header length of the link layer packet needs to be added thereto in order to obtain the length of the link layer packet. The header length of the link layer packet can be detected from the LI field, as described above.

Figure 37:
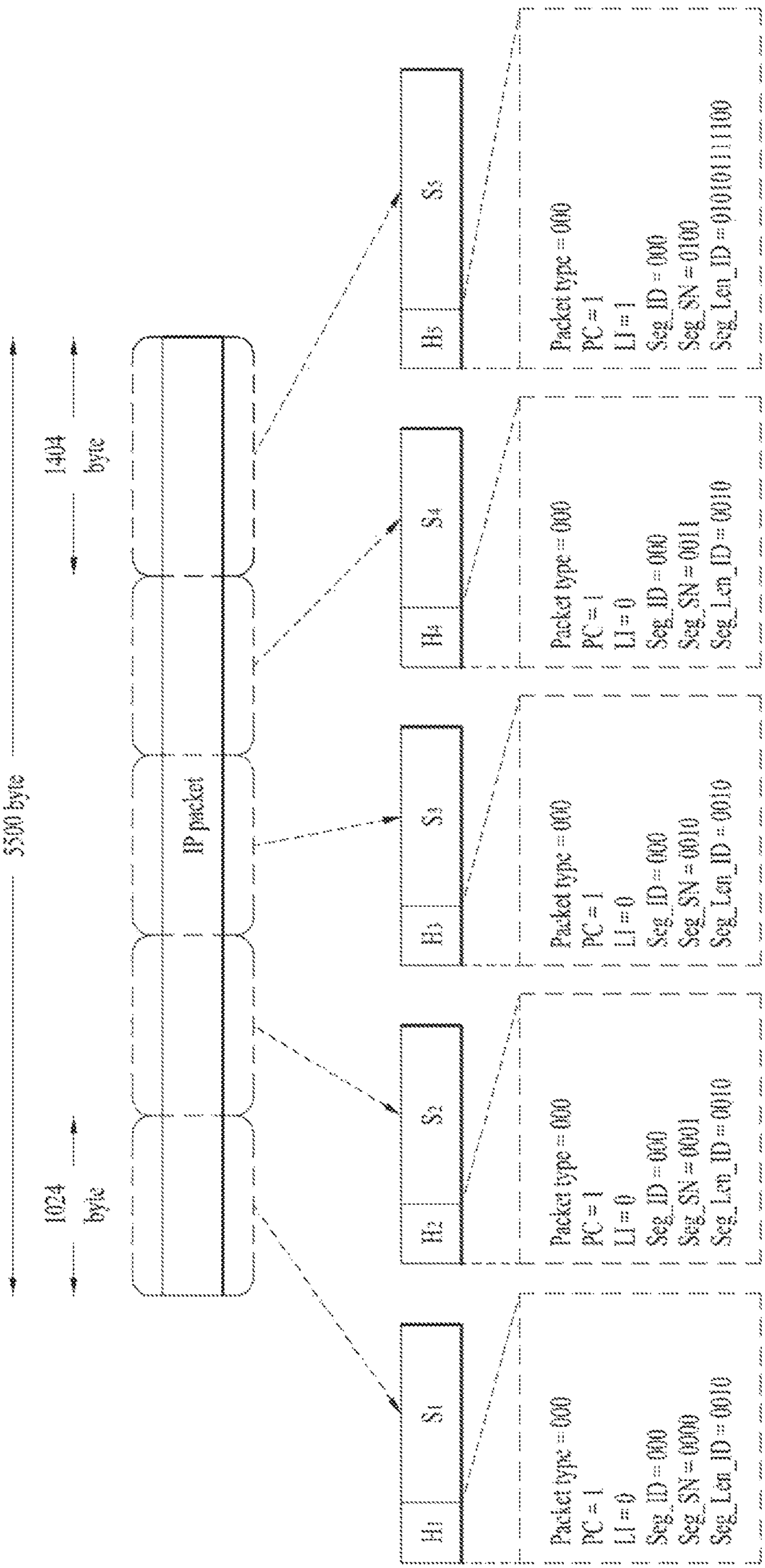
FIG. 37 illustrates link layer packets having segments, in a link layer packet header structure when IP packets are transmitted to the link layer, according to another embodiment of the present invention.

FIG. 37 illustrates link layer packets having segments in a link layer packet header structure when IP packets are transmitted to the link layer according to another embodiment of the present invention.

The present embodiment assumes that a 5500-byte IP packet is input. Since the value obtained by dividing 5500 by 5 is 1100, the IP packet can be segmented into segments each having a length of 1024 bytes closes to 1100. In this case, the last segment can be 1404 bytes (010101111100B). The segments can be respectively referred to as S1, S2, S3, S4 and S5 and headers corresponding thereto can be respectively referred to as H1, H2, H3, H4 and H5. The headers can be respectively added to the segments to generate respective link layer packets.

When the input IP packet is an IPv4 packet, the packet type fields of the headers H1 to H5 can have a value of 000. The PC fields of the headers H1 to H5 can have a value of 1 since the link layer packets have the segments of the packet as payloads.

LI fields of the headers H1 to H4 can have a value of 0 since the corresponding link layer packets do not have the last segment as a payload. The LI field of the header H5 can have a value of 1 since the corresponding link layer packet has the last segment as a payload. The segment ID fields, Seg_ID, of the headers H1 to H5 can have the same value, 000, since the corresponding link layer packets have segments from the same packet as payloads.

The segment sequence number fields, Seg_SN, of the headers H1 to H5 can be sequentially represented as 0000B to 0100B. The segment length ID fields of the headers H1 to H4 can have a value of 0010 corresponding to an ID that is 1024 bytes in length. The segment length ID field of the header H5 can have a value of 010101111100 which indicates 1404 bytes.

Figure 38:
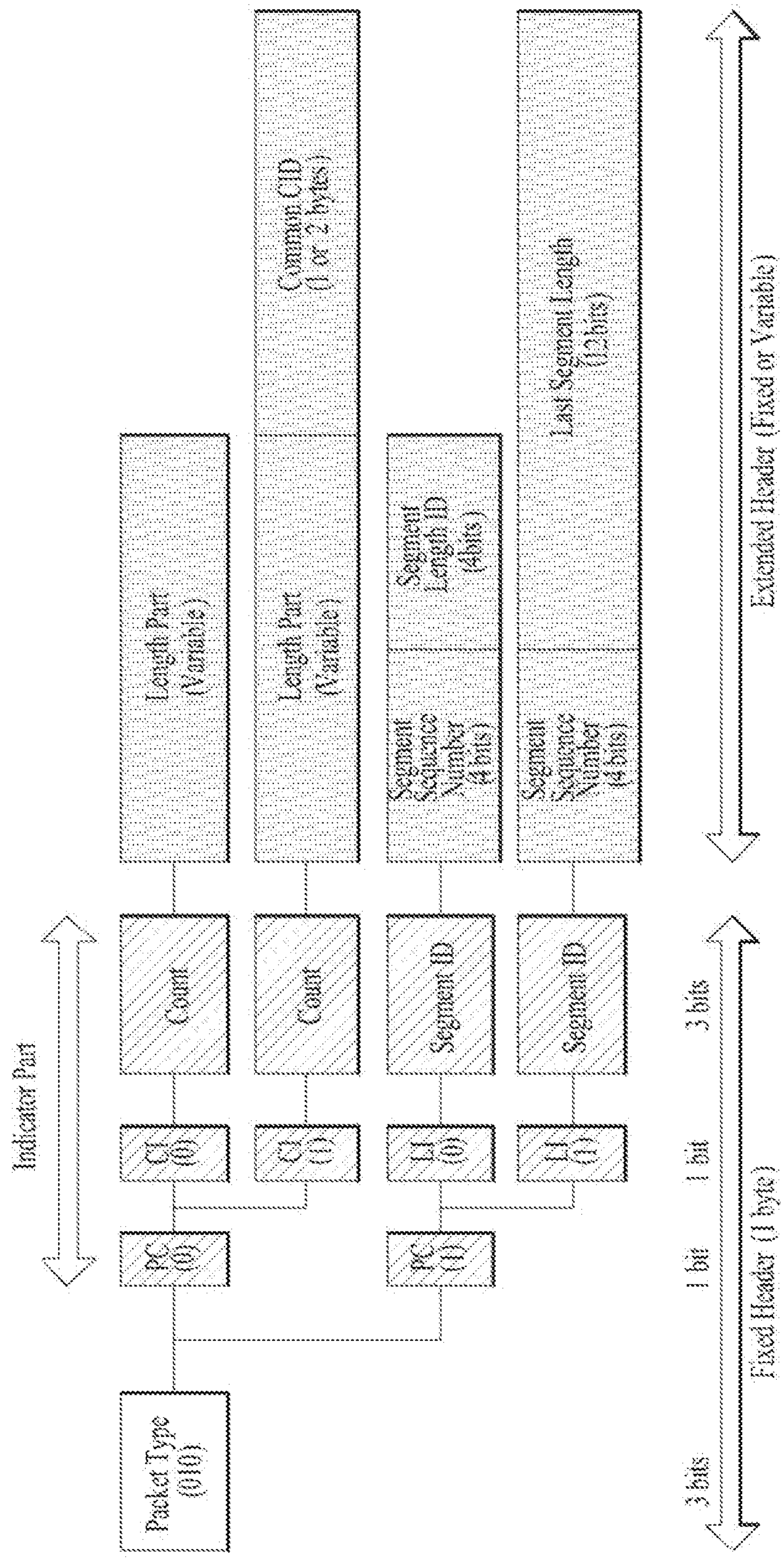
FIG. 38 illustrates a header of a link layer packet for RoHC transmission according to an embodiment of the present invention.

FIG. 38 illustrates a header of a link layer packet for RoHC transmission according to an embodiment of the present invention.

Even in an IP based broadcast environment, an IP packet can be compressed into a link layer packet and transmitted. When an IP based broadcast system streams IP packets, header information of the IP packets can generally remain unchanged. Using this fact, IP packet headers can be compressed.

Robust header compression (RoHC) is mainly used to compress an IP packet header (IP header). The present invention proposes an encapsulation method when RoHC packets are input to the link layer.

When RoHC packets are input to the link layer, the aforementioned packet type element may have a value of 010B, which indicates that a packet delivered from an upper layer to the link layer is a compressed IP packet.

When RoHC packets are input, the header of the link layer packet can include a fixed header and/or an extended header like the aforementioned other packets.

The fixed header can include a packet type field and/or a packet configuration (PC) field. The fixed header may have a size of 1 byte. Here, the packet type field can have a value of 010 since the input packet is a compressed IP packet. The extended header can have a fixed size or a variable size according to embodiments.

The PC field of the fixed header can indicate a form into which RoHC packets constituting the link layer packet payload are processed. Information of the remaining part of the fixed header, which follows the PC field, and the extended header can be determined by the value of the PC field. In addition, the PC field can include information on the length of the extended header according to the form into which RoHC packets are processed. The PC field can have a size of 1 bit.

A description will be given of a case in which the PC field has a value of 0B.

When the PC field has a value of 0B, the link layer packet payload is composed of one RoHC packet or two or more concatenated RoHC packets. Concatenation refers to connecting a plurality of short packets to configure a link layer packet payload.

When the PC field has a value of 0B, the PC field can be followed by a 1-bit common context ID indicator (CI) field and a 3-bit count field. Accordingly, common CID information and a length part can be added to the extended header. The length part can indicate the length of an RoHC packet.

The CI field can be set to 1 when RoHC packets constituting the payload of one link layer packet have the same context ID (CID) and set to 0 otherwise. When the CI field has a value of 1, an overhead processing method for a common CID can be applied. The CI field can be 1 bit.

The count field can indicate the number of RoHC packets included in the payload of one link layer packet. That is, when RoHC packets are concatenated, the number of concatenated RoHC packets can be indicated by the count field. The count filed can be 3 bits. Accordingly, a maximum of 8 RoHC packets can be included in the payload of one link layer packet, as shown in the following table. A count field value of 000 indicates that the link layer packet payload is composed of one RoHC packet rather than multiple concatenated RoHC packets.

TABLE 1

| Count (3 bits) | No. of Concatenated RoHC packets |
|---|---|
| 000 | 1 |
| 001 | 2 |
| 010 | 3 |
| 011 | 4 |
| 100 | 5 |
| 101 | 6 |
| 110 | 7 |
| 111 | 8 |

The length part can indicate an RoHC packet length, as described above. The RoHC packet has a header from which length information has been removed, and thus the length field in the RoHC packet header cannot be used. Accordingly, the header of the link layer packet can include the length part in order to enable the receiver to recognize the length of the corresponding RoHC packet.

An IP packet has a maximum of 65535-byte length when an MTU is not determined. Accordingly, 2-byte length information is necessary for the RoHC packet such that a maximum length thereof can be supported. When multiple RoHC packets are concatenated, as many length fields as the number designated by the count field can be added. In this case, the length part includes a plurality of length fields. However, when one RoHC packet is included in the payload, only one length field can be included in the length part. Length fields can be arranged in the same order as that of RoHC packets constituting the link layer packet payload. Each length field can be a value in bytes.

A common CID field is a field through which a common CID is transmitted. The header of the RoHC packet may include a context ID (CID) used to check the relation between compressed headers. The CID can be maintained as the same value in a stable link state. Accordingly, all RoHC packets included in the payload of one link layer packet may include the same CID. In this case, to reduce overhead, it is possible to remove the CID from the headers of concatenated RoHC packets constituting the payload, indicate the CID in the common CID field of the header of the link layer packet and transmit the link layer packet. The receiver can reconfigure the CID of the RoHC packets using the common CID field. When the common CID field is present, the aforementioned CI field needs to have a value of 1.

A description will be given of a case in which the PC field has a value of 1B.

A PC field value of 1B indicates that a link layer packet payload is composed of segmented packets of an RoHC packet. Here, a segmented packet refers to a segment from among a plurality of segments obtained by segmenting a long RoHC packet. One segment constitutes a link layer packet payload.

When the PC field has a value of 1B, the PC field can be followed by a 1-bit last segment indicator (LI) field and a 3-bit segment ID field. To add information about segmentation, a segment sequence number field, a segment length ID field and a last segment length field may be added to the extended header.

The LI field can be used when an RoHC packet is segmented. An RoHC packet can be segmented into a plurality of segments. An LI field value of 1 can indicate that a segment included in the current link layer packet is the last segment from among segments obtained from one RoHC packet. An LI field value of 0 can indicate that a segment included in the current link layer packet is not the last segment. The LI field can be used when the receiver determines whether all segments have been received when reconfiguring one RoHC packet by combining segments. The LI field can be 1 bit.

The segment ID field Seg_ID can indicate an ID assigned to an RoHC packet when the RoHC packet is segmented. Segments derived from one RoHC packet can have the same segment ID. The receiver can determine whether segments transmitted thereto are components of the same RoHC packet using the segment ID when combining the segments. The segment ID field can be 3 bits. Accordingly, the segment ID field can simultaneously support segmentation of 8 RoHC packets.

The segment sequence number field Seg_SN can be used to check the sequence of segments when an RoHC packet is segmented. That is, link layer packets having segments derived from one RoHC packet as payload thereof may have different segment sequence number fields while having the same sequence ID field. Accordingly, one RoHC packet can be segmented into a maximum of 16 segments.

The segment length ID field Seg_Len_ID can be used to represent the length of each segment. However, the segment length ID field can be used to indicate the length of segments other than the last segment from among a plurality of segments. The length of the last segment can be indicated by the last segment length field which will be described later. When a link layer packet payload does not correspond to the last segment of an RoHC packet, that is, when the LI field is 0, the segment length ID field can be present.

To reduce header overhead, the number of segment lengths can be limited to 16. A packet input size may be determined according to code rate of FEC processed in the physical layer. Segment lengths can be determined according to the packet input size and designated by Seg_Len_ID. When the physical layer operates irrespective of segment lengths, a segment length can be determined as follows.

$$\text{Segment Length}=\text{Seg\_Len\_ID}\times\text{Len\_Unit}+\text{min\_Len}\ [\text{bytes}] \qquad \text{[Equation 1]}$$

Here, a length unit Len_Unit is a basic unit indicating a segment length and min_Len indicates a minimum segment length. The transmitter and the receiver need to have the same Len_Unit and the same min_Len. It is efficient for system operation that Len_Unit and the same min_Len are not changed after being determined once. Furthermore, Len_Unit and min_Len can be determined in consideration of FEC processing capability of the physical layer in the system initialization process.

The following table shows segment lengths represented according to Seg_Len_ID values. A length allocated to Seg_Len_ID can be changed according to design. In the present embodiment, Len_Unit is 256 and min_Len is 512.

TABLE 2

| Seg_Len_ID | Segment Length (byte) |
|---|---|
| 0000 | 512 (=min_Len) |
| 0001 | 768 |
| 0010 | 1024 |
| 0011 | 1280 |
| 0100 | 1536 |
| 0101 | 1792 |
| 0110 | 2048 |
| 0111 | 2304 |
| 1000 | 2560 |
| 1001 | 2816 |
| 1010 | 3072 |
| 1011 | 3328 |
| 1100 | 3584 |
| 1101 | 3840 |
| 1110 | 4096 |
| 1111 | 4352 |

The last segment length field L_Seg_Len is used when a segment included in a link layer packet payload is the last segment of the corresponding RoHC packet. That is, the last segment length field is used when the LI field has a value of 1. An RoHC packet can be segmented into segments of the same size using Seg_Len_ID. In this case, however, the last segment may not have the size indicated by Seg_Len_ID. Accordingly, the length of the last segment can be directly indicated by the last segment length field. The last segment length field can indicate 1 to 4095 bytes. This can be changed according to embodiments.

FIG. 39 illustrates a syntax of a header of a link layer packet for RoHC packet transmission according to an embodiment of the present invention.

The link layer packet header may include the Packet_Type field and the PC field Payload_Config, which have been described above.

When the PC field has a value of 0, the PC field can be followed by a Common Context_ID Indication field and a count field. A plurality of length fields can be included in the link layer packet on the basis of a value indicated by the count field. When the CI field is 1, a Common_CID field can be additionally included in the link layer packet header.

When the PC field is 1, the PC field can be followed by a Last_Segment_Indicator field, a Segment_ID field and a Segment_Sequence_Number field. A configuration of the part following the Last_Segment_Indicator field can be changed according to the value of the Last_Segment_Indicator field. When the Last_Segment_Indicator field is 0, the Segment_Sequence_Number field can be followed by the Segment_Length_ID field. When the Last_Segment_Indicator field is 1, the Segment_Sequence_Number field can be followed by the Last_Segment_Length field.

Figure 40:
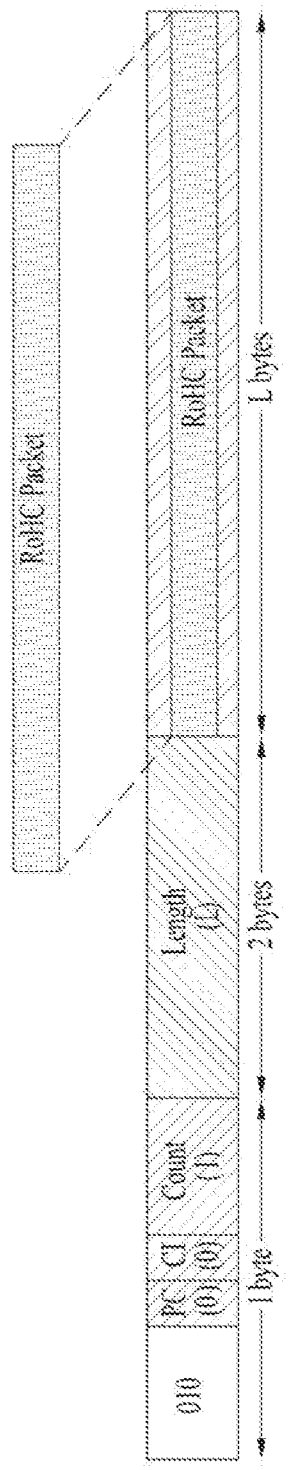
FIG. 40 illustrates a method for transmitting an RoHC packet through a link layer packet according to embodiment #1 of the present invention.

FIG. 40 illustrates a method for transmitting an RoHC packet through a link layer packet according to embodiment #1 of the present invention.

The present embodiment corresponds to a case in which one RoHC packet constitutes a link layer packet payload since the RoHC packet is within a processing range of the physical layer. Here, the RoHC packet may not be concatenated or segmented.

In this case, one RoHC packet can become a link layer packet payload. The packet type field can be 010B, the PC field can be 0B and the CI field can be 0B. The aforementioned count field can be 000B since one RoHC packet constitutes the payload (the number of RoHC packets constituting the payload being 1). The count field can be followed by a 2-byte length field indicating the length of the RoHC packet. In this case, the length part can include only one length field since only one packet constitutes the payload.

In the present embodiment, a 3-byte link layer header can be added. Accordingly, when the length of the RoHC packet, indicated by the length field, is L bytes, the length of the link layer packet is L+3 bytes.

Figure 41:
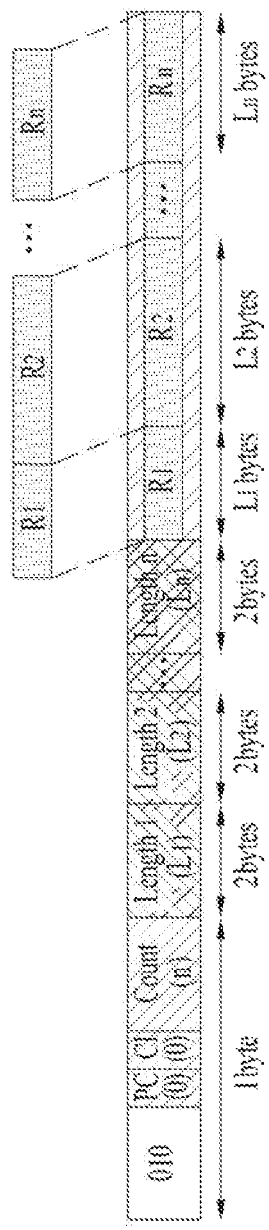
FIG. 41 illustrates a method for transmitting an RoHC packet through a link layer packet according to embodiment #2 of the present invention.

FIG. 41 illustrates a method for transmitting an RoHC packet through a link layer packet according to embodiment #2 of the present invention.

The present embodiment corresponds to a case in which an RoHC packet does not exceed the processing range of the physical layer and thus multiple RoHC packets are concatenated and included in a payload of a link layer packet.

In this case, the PC field and the CI field have same values as those in a case in which one RoHC packet is included in a link layer packet payload. The CI field is followed by the count field. The count field can have a value in the range of 001B to 111B on the basis of the number of RoHC packets included in the payload, as described above.

The count field can be followed by as many 2-byte length fields as the number indicated by the count field. Each length field can indicate the length of each RoHC packet. The length fields can be called a length part.

When the count field indicates n, RoHC packets R1, R2, . . . , Rn respectively having lengths L1, L2, . . . , Ln can be concatenated in the link layer packet payload.

The extended header can have a length of 2n bytes. The total length of the link layer packet, LT, can be represented by the following equation.

$$L_T = 1 + 2n + \sum_{k=1}^{n} L_k \text{ [bytes]} \quad \text{[Equation 2]}$$

Figure 42:
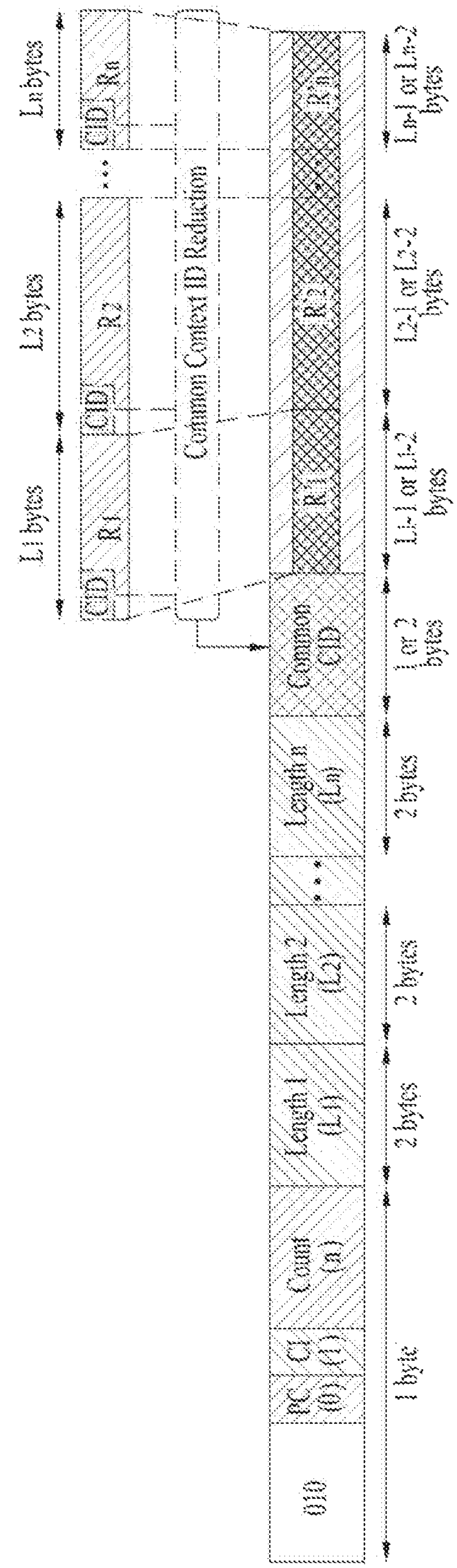
FIG. 42 illustrates a method for transmitting an RoHC packet through a link layer packet according to embodiment #3 of the present invention.

FIG. 42 illustrates a method for transmitting an RoHC packet through a link layer packet according to embodiment #3 of the present invention.

The present embodiment corresponds to a case in which RoHC packets are concatenated to constitute a payload of a link layer packet and the RoHC packets have the same CID.

When the RoHC packets have the same CID, even if the CID is indicated only once through the link layer packet and transmitted to the receiver, the receiver can recover the original RoHC packets and headers thereof. Accordingly, a common CID can be extracted from the RoHC packets and transmitted, reducing overhead.

In this case, the aforementioned CI field becomes 1, which represents that processing for the same CID has been performed. The RoHC packets having the same CID are indicated by [R1, R2, R3, . . . , Rn]. The same CID is referred to as a common CID. Packets other than CIDs in RoHC packet headers are referred to as R'k (k being 1, 2, . . . , n).

The link layer packet payload can include R'k (k being 1, 2, . . . , n). A common CID field can be added to the end of the extended header of the link layer packet. The common CID field may be a field for common CID transmission. The common CID field may be transmitted as a part of the extended header or a part of the link layer packet payload. It is possible to rearrange the common CID field in a part in which the position of the common CID field can be identified according to system operation.

The size of the common CID field can depend on RoHC packet configuration.

When the RoHC packet configuration is a small CID configuration, the CID of an RoHC packet can be 4 bits. However, when the CID is extracted from the RoHC packet and rearranged, the entire add-CID octet can be processed. That is, the common CID field can have a length of 1 byte. Alternatively, it is possible to extract a 1-byte add-CID octet from the RoHC packet, allocate only a 4-bit CID to the common CID field and reserve the remaining 4 bits for future use.

When the RoHC packet configuration is a large CID configuration, the CID of an RoHC packet can be 1 byte or 2 bytes. The CID size is determined in the RoHC initialization process. The common CID field can have a length of 1 byte or 2 bytes depending on the CID size.

In the present embodiment, the link layer packet payload can be calculated as follows. n RoHC packets R1, R2, . . . , Rn having the same CID are respectively referred to as L1, L2, . . . , Ln. When the length of the link layer packet header is LH, the length of the common CID field is LCID and the total length of the link layer packet is LT, LH is calculated as follows.

$$L_H = 1 + 2n + L_{CID} \text{ bytes} \quad \text{[Equation 3]}$$

$L_T$ can be calculated as follows.

$$L_T = L_H + \sum_{k=1}^{n} (L_k - L_{CID}) \text{ bytes} \quad \text{[Equation 4]}$$

As described above, $L_{CID}$ can be determined according to CID configuration of RoHC. That is, $L_{CID}$ can be 1 byte in the case of a small CID configuration and 1 byte or 2 bytes in the case of a large CID configuration.

Figure 43:
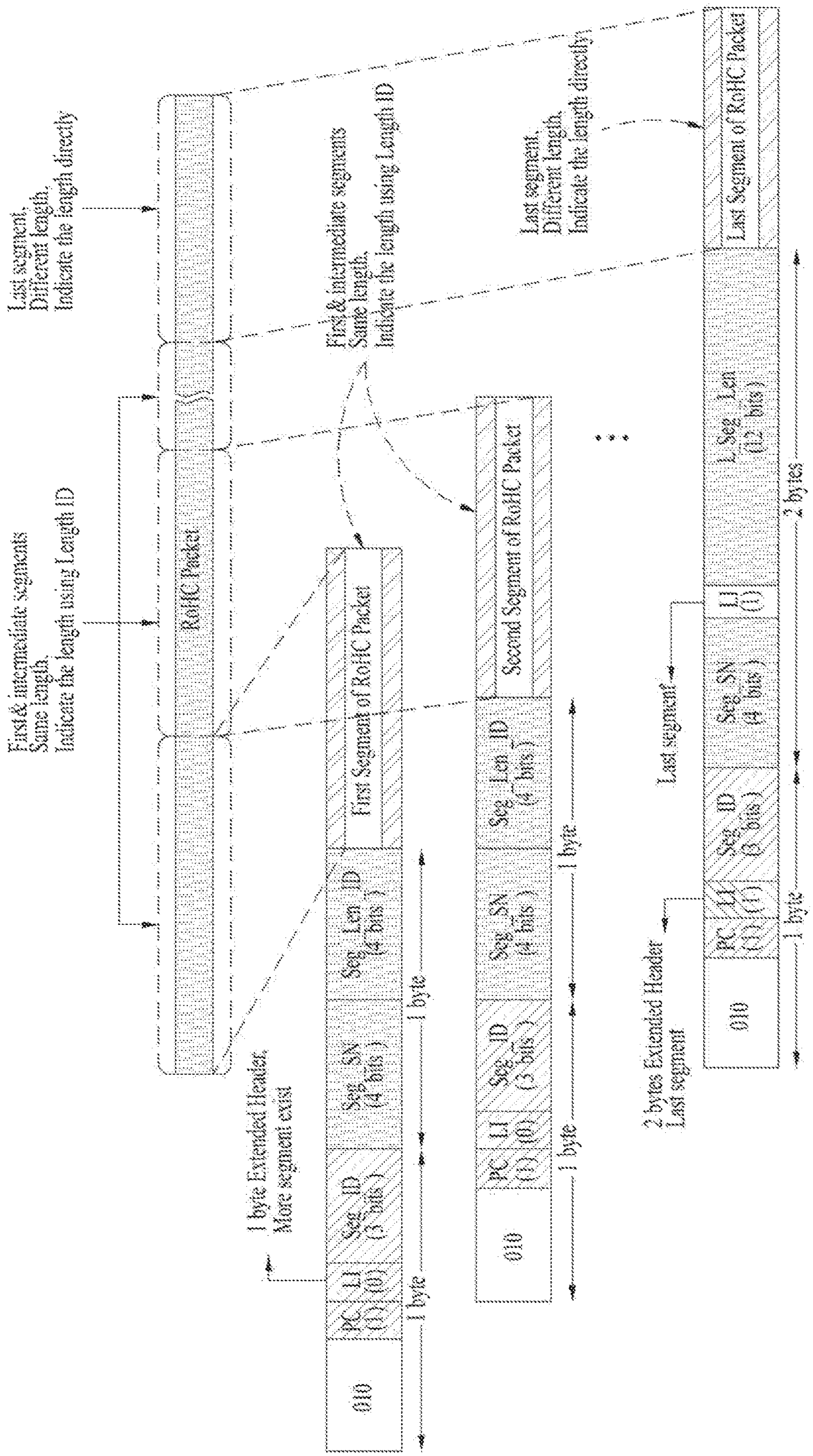
FIG. 43 illustrates a method for transmitting an RoHC packet through a link layer packet according to embodiment #4 of the present invention.

FIG. 43 illustrates a method for transmitting an RoHC packet through a link layer packet according to embodiment #4 of the present invention.

The present embodiment corresponds to a case in which an input RoHC packet exceeds the processing range of the physical layer and thus the RoHC packet is segmented and the segments of the RoHC packet are respectively encapsulated into link layer packet payloads.

To indicate that the link layer packet payloads are composed of segmented RoHC packets, the PC field can be 1B. The LI field becomes 1B only in a link layer packet having the last segment of the RoHC packet as a payload and becomes 0B for the remaining segments. The LI field also indicates information about the extended header of the corresponding link layer packet. That is, a 1-byte extended header can be added when the LI field is 0B and a 2-byte extended header can be added when the LI field is 1B.

The link layer packets need to have the same Seg_ID value in order to indicate that the segments have been derived from the same RoHC packet. To indicate the order of segments for normal RoHC packet reconfiguration in the receiver, a sequentially increasing Seg_SN value can be included in corresponding headers.

When the RoHC packet is segmented, a segment length can be determined, as described above, and segmentation can be performed. A Seg_Len_ID value corresponding to the segment length can be included in the corresponding headers. The length of the last segment can be directly included in a 12-bit L_Seg_Len field, as described above.

Length information indicated using the Seg_Len_ID and L_Seg_Len fields represents only information about a segment, that is, a payload of a link layer packet. Accordingly, the total length of the link layer packet can be calculated by adding the header length of the link layer packet, which can be detected from the LI field, to the length of the link layer packet payload.

When the receiver reconfigures the segments of the RoHC packet, it is necessary to check integrity of the reconfigured RoHC packet. To this end, a CRC can be added to the end of the RoHC packet in a segmentation process. Since the CRC is generally added to the end of the RoHC packet, the CRC can be included in the segment after segmentation.

Figure 44:
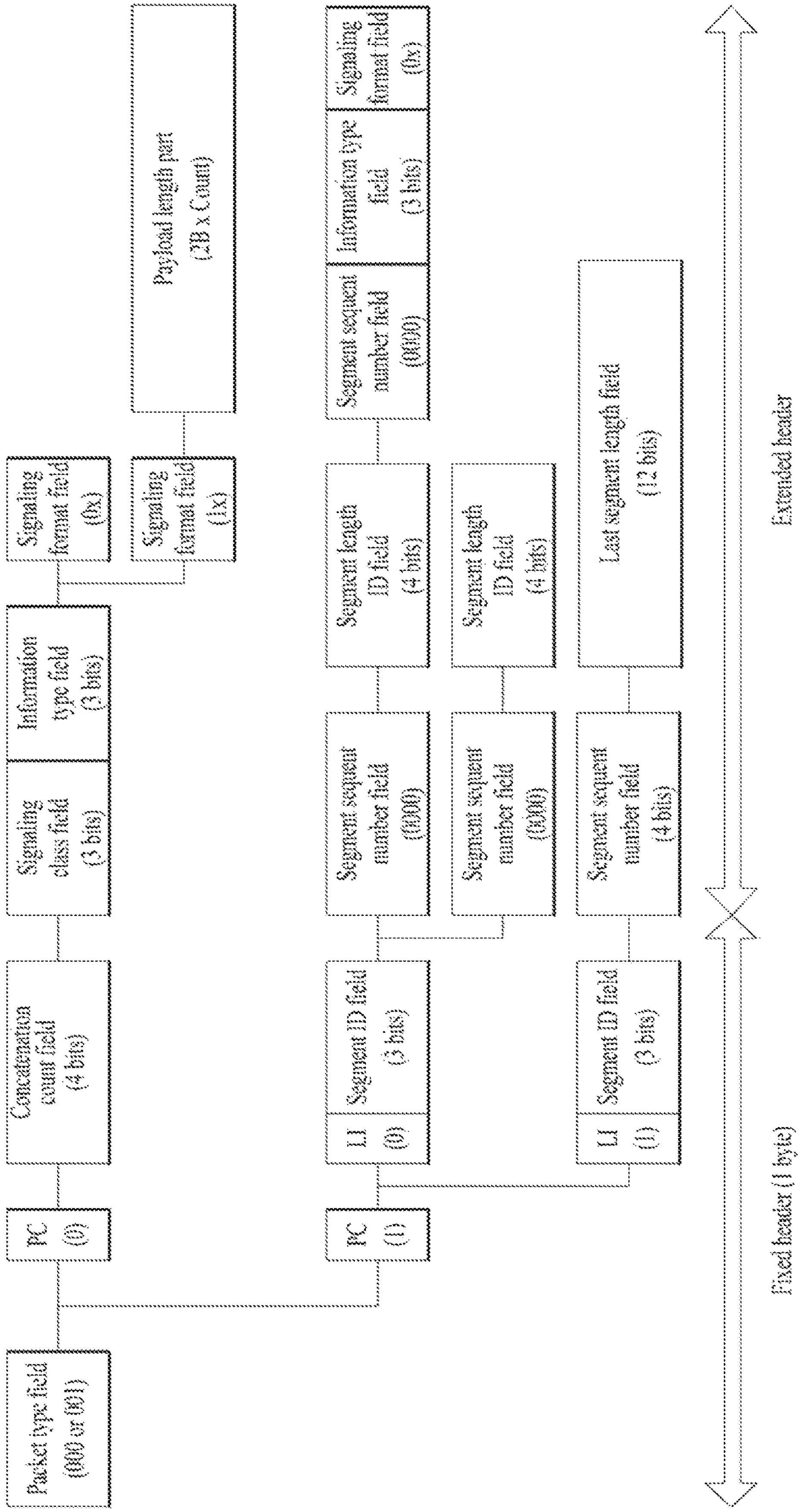
FIG. 44 illustrates a structure of a link layer packet when signaling information is transmitted to the link layer according to another embodiment of the present invention.

FIG. 44 illustrates a link layer packet structure when signaling information is delivered to the link layer according to another embodiment of the present invention.

In this case, the header of the link layer packet can include a fixed header and an extended header. The fixed header can have a length of 1 byte and the extended header can have a fixed length or a variable length. The length of each header can be changed according to design.

The fixed header can include a packet type field, a PC field and/or a concatenation count field. According to another embodiment, the fixed header may include the packet type field, the PC field, an LI field and/or a segment ID field.

The extended header can include a signaling class field, an information type field and/or a signaling format field. According to another embodiment, the extended header may further include a payload length part. According to another embodiment, the extended header may include a segment sequence number field, a segment length ID field, the signaling class field, the information type field and/or the signaling format field. According to another embodiment, the extended header may include the segment sequence number field and/or the segment length ID field. According to another embodiment, the extended header may include the segment sequence number field and/or a last segment length field.

The fields of the fixed header will now be described.

The packet type field can indicate the type of a packet input to the link layer, as described above. When signaling information is input to the link layer, the packet type field can be 110B.

The PC field, the LI field, the segment ID field, the segment sequence number field, the segment length ID field and the last segment field are as described above. The concatenation count field is as described above.

Description will be given of the fields of the extended header.

When the PC field is 0, the extended header can include the signaling class field, the information type field and/or the signaling format field. The extended header may further include a length part according to the value of the signaling format field.

The signaling class field can indicate the type of signaling information included in the link layer packet. Signaling information that can be indicated by the signaling class field can include fast information channel (FIC) information, header compression information and the like. The signaling information that can be indicated by the signaling class field will be described later.

The information type field can indicate details of signaling information of the type indicated by the signaling class field. Indication of the information type field can be separately defined according to the value of the signaling class field.

The signaling format field can indicate a format of signaling information included in the link layer packet. Formats that can be indicated by the signaling format field may include a section table, a descriptor, XML and the like. The formats that can be indicated by the signaling format field will be described later.

A payload length part can indicate the length of signaling information included in the payload of the link layer packet payload. The payload length part may be a set of length fields respectively indicating lengths of concatenated signaling information. While each length field may have a size of 2 bytes, the size can be changed according to system configuration. The total length of the payload length part can be represented by the sum of the respective length fields. A padding bit for byte arrangement can be added to the payload length part according to an embodiment. In this case, the total length of the payload length part can increase by the padding bit.

Presence or absence of the payload length part can be determined by the signaling format field value. When signaling information has a length value thereof, such as the section table and descriptor, an additional length field may not be needed. However, signaling information having no length value may require an additional length field. In the case of signaling information having no length value, the payload length part can be present. In this case, the payload length part can include as many length fields as the number of count fields.

When the PC field is 1 and the LI field is 1, the extended header can include the segment sequence number field and/or the last segment length field. When the PC field is 1 and the LI field is 0, the extended header can include the segment sequence number field and/or the segment length ID field.

The segment sequence number field, the last segment length field and the segment length ID field are as described above.

When the PC field is 1, the LI field is 1 and the payload of the corresponding link layer packet corresponds to the first segment, the extended header of the link layer packet can further include additional information. The additional information can include the signaling class field, the information type field and/or the signaling format field. The signaling class field, the information type field and the signaling format field are as described above.

FIG. 45 illustrates a syntax of a link layer packet structure when signaling information is delivered to the link layer according to another embodiment of the present invention.

The link layer packet header can include the Packet_Type field and the PC field Payload_Config, as described above.

When the PC field is 0, the PC field can be followed by a Count field, a Signaling_Class field, an Information Type field and a Signaling_Format field. When the Signaling_Format field is 1x (10 or 11), a plurality of length fields can be included in the link layer packet header on the basis of a value indicated by the count field.

When the PC field is 1, the PC field can be followed by a Last_Segment_Indicator field, a Segment_ID field and a Segment_Sequence_Number field. Here, a configuration of a part following the Last_Segment_Indicator field can be changed according to the value of the Last_Segment_Indicator field.

When the Last_Segment_Indicator field is 0, the Segment_Sequence_Number field can be followed by the Segment_Length_ID field. When the Segment_Sequence_Number field is 0000, the Segment_Sequence_Number field can be followed by the Signaling_Class field, the Information Type field and the Signaling_Format field.

When the Last_Segment_Indicator field is 1, the Segment_Sequence_Number field can be followed by the Last_Segment_Length field.

Figure 46:
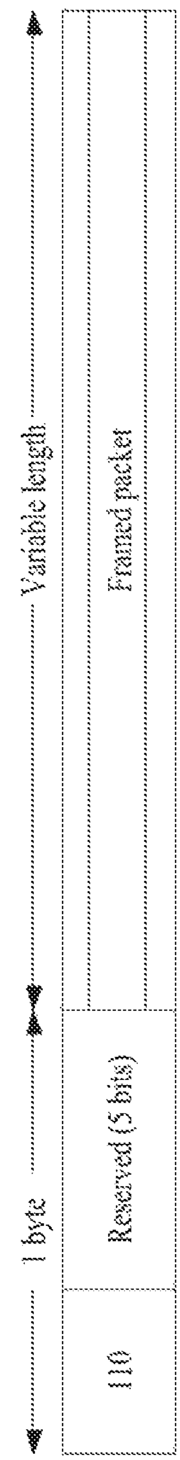
FIG. 46 illustrates a structure of a link layer packet for framed packet transmission according to an embodiment of the present invention.

FIG. 46 illustrates a structure of a link layer packet for framed packet transmission according to an embodiment of the present invention.

Packets used in normal networks, other than the IP packet and MPEG-2 TS packet, can be transmitted through a link layer packet. In this case, the packet type element of the header of the link layer packet can have a value of 111B to indicate that the payload of the link layer packet includes a framed packet.

FIG. 47 illustrates a syntax of a structure of a link layer packet for framed packet transmission according to an embodiment of the present invention.

The link layer packet header can include the Packet_Type field, as described above. The link layer packet header can include 5 bits reserved for future use after the Packet_Type field. A framed packet indicated by framed_packet( ) can follow the reserved bits.

FIG. 48 illustrates a syntax of a framed packet according to an embodiment of the present invention.

The syntax of the framed packet can include an Ethernet_type field, a length field, and/or a packet( ) field. The Ethernet_type field, which is 16 bits, can indicate the type of a packet in the packet( ) field according to IANA registry. Here, only registered values can be used. The length field, which is 16 bits, can set the total length of the packet structure in bytes. The packet( ) field having a variable length can include a network packet.

FIG. 49 illustrates a syntax of a fast information channel (FIC) according to an embodiment of the present invention.

Information included in the FIC can be transmitted in the form of a fast information table (FIT).

Information included in the FIT can be transmitted in the form of XML and/or a section table.

The FIC can include FIT_data version information, num_broadcast information, broadcast_id information, delivery_system_id information, base_DP_id information, base_DP_version information, num_service information, service_id information, service_category information, service_hidden_flag information, SP_indicator information, num_component information, component_id information, DP_id information and/or RoHC_init_descriptor information.

The FIT_data_version information can indicate version information about a syntax and semantics included in the fast information table. The receiver can determine whether to process signaling included in the fast information table using the FIT_data_version information. The receiver can determine whether to update prestored information of the FIC using the FIT_data_version information.

The num_broadcast information can indicate the number of broadcasting stations which transmit broadcast services and/or content through corresponding frequencies or transmitted transport frames.

The broadcast_id information can indicate identifies of broadcasting stations which transmit broadcast services and/or content through corresponding frequencies or transmitted transport frames. A broadcasting station transmitting MPEG-2 TS based data may have a broadcast_id identical to a transport_stream_id of an MPEG-2 TS.

The delivery_system_id information can indicate an identifier of a broadcast transmission system which performs processing using the same transmission parameter on a broadcast network.

The base_DP_id information indicates a base DP in a broadcast signal. The base DP can refer to a DP conveying service signaling including program specific information (PSI)/system information (SI) and/or overhead reduction of a broadcasting station corresponding to the broadcast_id. Otherwise, the base DP can refer to a representative DP which can be used to decode components constituting broadcast services in the corresponding broadcasting station.

The base_DP_version information can indicate version information about data transmitted through the base DP. For example, when service signaling such as PSI/IS through the base DP, the value of the base_DP_version information can increase by 1 if service signaling changes.

The num_service information can indicate the number of broadcast services transmitted by the broadcasting station corresponding to the broadcast_id in the corresponding frequency or transport frame.

The service_id information can be used as an identifier of a broadcast service.

The service_category information can indicate a broadcast service category. A service_category information value of 0x01 can indicate Basic TV, a service_category information value of 0x02 can indicate Basic Radio, a service_category information value of 0x03 can indicate RI service, a service_category information value of 0x08 can indicate Service Guide, and a service_category information value of 0x09 can indicate Emergency Alerting.

The service_hidden_flag information can indicate whether the corresponding broadcast service is hidden. When the broadcast service is hidden, the broadcast service is a test service or a service autonomously used in the corresponding system and thus a broadcast receiver can ignore the service or hide the same in a service list.

The SP_indicator information can indicate whether service protection is applied to one or more components in the corresponding broadcast service.

The num_component information can indicate the number of components constituting the corresponding broadcast service.

The component_id information can be used as an identifier for identifying the corresponding component in the broadcast service.

The DP_id information can be used as an identifier indicating a DP through which the corresponding component is transmitted.

The RoHC_init_descriptor can include information related to overhead reduction and/or header recovery. The RoHC_init_descriptor can include information for identifying a header compression method used at a transmitting end.

Figure 50:
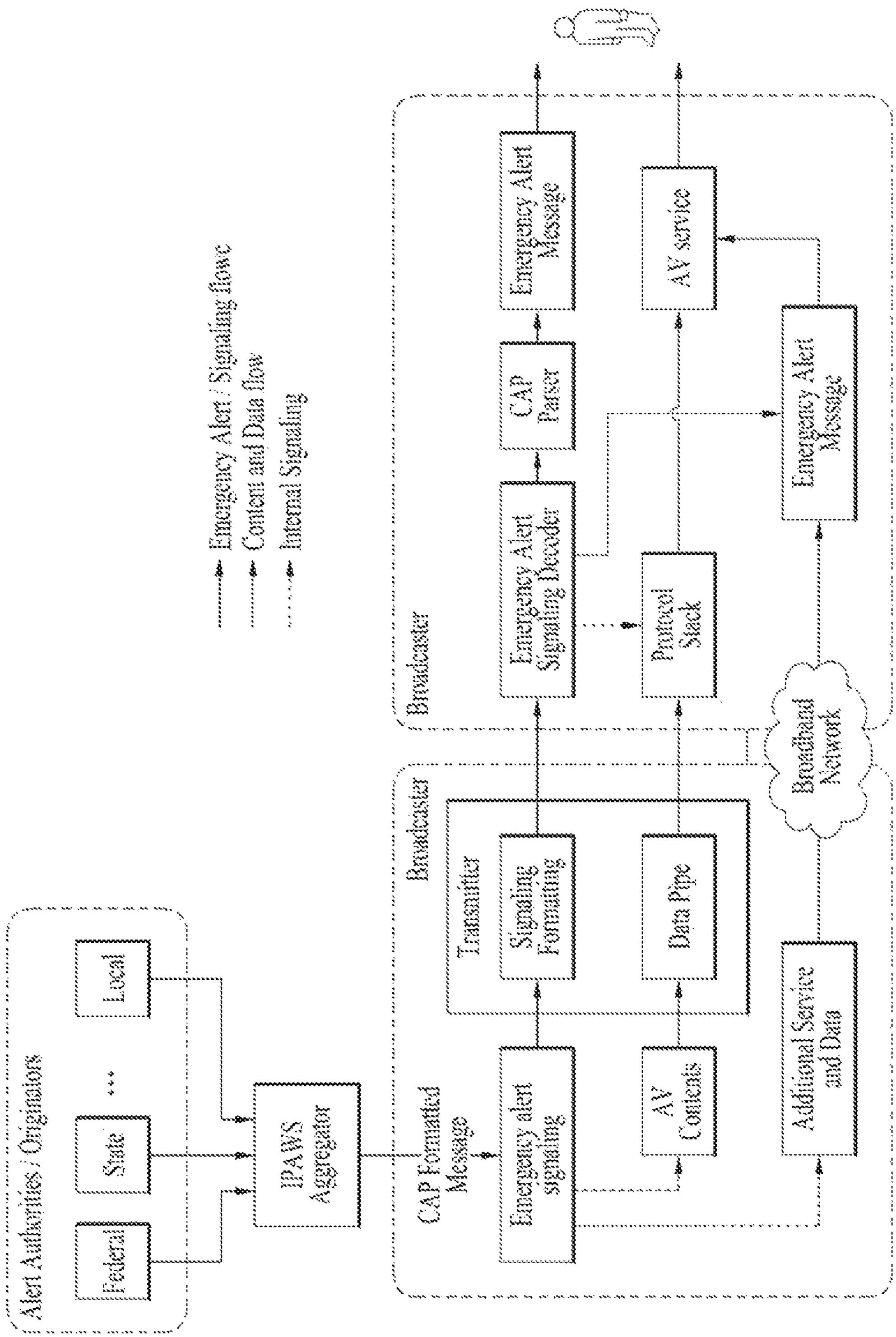
FIG. 50 illustrates a broadcast system which issues an emergency alert according to an embodiment of the present invention.

FIG. 50 illustrates a broadcast system issuing an emergency alert according to an embodiment of the present invention.

Upon reception of information related to an emergency alert from an alert authority/originator, a broadcasting station (transmitter) converts the information related to the emergency alert into emergency alert signaling in a format adapted to a broadcast system or generates emergency alert signaling including the information related to the emergency alert. In this case, the emergency alert signaling may include a common alerting protocol (CAP) message. The broadcasting station can transmit the emergency alert signaling to a receiver. Here, the broadcasting station can transmit the emergency alert signaling through a path through which normal broadcast data is delivered. Otherwise, the broadcasting station may transmit the emergency alert signaling through a path different from the path through which normal broadcast data is delivered. The emergency alert signaling may be generated in the form of an emergency alert table (EAT) which will be described later.

The receiver receives the emergency alert signaling. An emergency alert signaling decoder can parse the emergency alert signaling to obtain the CAP message. The receiver generates an emergency alert message using information of the CAP message and displays the emergency alert message.

FIG. 51 illustrates a syntax of an emergency alert table (EAT) according to an embodiment of the present invention.

Information related to an emergency alert can be transmitted through an EAC. The EAC corresponds to the aforementioned dedicated channel.

The EAT according to an embodiment of the present invention may include EAT_protocol_version information, automatic_tuning_flag information, num_EAS_messages information, EAS_message_id information, EAS_IP_version_flag information, EAS_message_transfer_type information, EAS_message_encoding_type information, EAS_NRT_flag information, EAS_message_length information, EAS_message_byte information, IP_address information, UDP_port_num information, DP_id information, automatic_tuning_channel_number information, automatic_tuning_DP_id information, automatic_tuning_service_id information and/or EAS_NRT_service_id information.

The EAT_protocol_version information indicates a protocol version corresponding to the received EAT.

The automatic_tuning_flag information indicates whether the receiver automatically performs channel tuning.

The num_EAS_messages information indicates the number of messages included in the EAT.

The EAS_message_id information identifies each EAS message.

The EAS_IP_version_flag information indicates IPv4 when the EAS_IP_version_flag information has a value of 0 and indicates IPv6 when the EAS_IP_version_flag information has a value of 1.

The EAS_message_transfer_type information indicates an EAS_message_transfer_type. The EAS_message_transfer_type information indicates "not specified" when the EAS_message_transfer_type information is 000, indicates "no alert message (only AV content)" when the EAS_message_transfer_type information is 001 and indicates that the corresponding EAT includes an EAS message when the AS_message_transfer_type information is 010. To this end, a length field and a field with respect to the corresponding EAS message are added. When the EAS_message_transfer_type information is 011, this information indicates that the corresponding EAS message is transmitted through a data pipe. The EAS can be transmitted in the form of an IP datagram within the data pipe. To this end, IP address information, UDP port information and DP information of a physical layer to which the EAS message is transmitted may be added.

The EAS_message_encoding_type information indicates information about encoding type of an emergency alert message. For example, an EAS_message_encoding_type information value of 000 can indicate "not specified", an EAS_message_encoding_type information value of 001 can indicate "no encoding", an EAS_message_encoding_type information value of 010 can indicate DEFLATE algorithm (RFC1951) and EAS_message_encoding_type information values of 011 to 111 can be reserved for other encoding types.

The EAS_NRT_flag information indicates presence or absence of NRT content and/or NRT data related to a received message. An EAS_NRT_flag information value of 0 indicates absence of NRT content and/or NRT data related to a received emergency message, whereas and an EAS_NRT_flag information value of 1 indicates presence of NRT content and/or NRT data related to the received emergency message.

The EAS_message_length information indicates the length of an EAS message.

The EAS_message_byte information includes content of the EAS message.

The IP_address information indicates the IP address of an IP packet carrying the EAS message.

The UDP_port_num information indicates the number of a UDP port through which the EAS message is transmitted.

The DP_id information identifies a data pipe through which the EAS message is transmitted.

The automatic_tuning_channel_number information includes information about the number of a channel to be tuned to.

The automatic_tuning_DP_id information identifies a data pipe through which corresponding content is transmitted.

The automatic_tuning_service_id information identifies a service to which the corresponding content belongs.

The EAS_NRT_service_id information identifies an NRT service corresponding to a case in which NRT content and data related to a received emergency alert message are transmitted, that is, when the EAS_NRT_flag is enabled.

FIG. 52 illustrates a method for identifying information related to header compression, which is included in a payload of a link layer packet according to an embodiment of the present invention.

When header compression is performed on a packet delivered from the link layer to an upper layer, as described above, necessary information needs to be generated in a signaling form and transmitted to the receiver such that the receiver can recover the header of the packet. Such information can be referred to as header compression signaling information.

The header compression signaling information can be included in a payload of a link layer packet. In this case, the transmitter can embed identification information for identifying the type of the header compression signaling information, which is included in the payload of the link layer packet, in the header of the link layer packet or a transmission parameter (signaling information of the physical layer) of the physical layer and transmit the link layer packet header or the transmission parameter including the identification information to the receiver.

According to an embodiment, the identification information can indicate that initialization information is included in the payload of the link layer packet when the value thereof is 000 and indicate that a configuration parameter is included in the payload of the link layer packet when the value thereof is 001. In addition, the identification information can indicate that static chain information is included in the payload of the link layer packet when the value thereof is 010 and indicate that dynamic chain information is included in the payload of the link layer packet when the value thereof is 011.

Here, the header compression signaling information may be called context information. According to an embodiment, the static chain information or the dynamic chain information may be called context information or both the static chain information and the dynamic chain information may be called context information.

FIG. 53 illustrates initialization information according to an embodiment of the present invention.

Initialization information included in a payload of a link layer packet may include num_RoHC_channel information, max_cid information, large_cids information, num_profiles information, profile( ) element, num_IP_stream information and/or IP_address ( ) element.

The num_RoHC_channel information indicates the number of RoHC channels.

The max_cid information is used to indicate a maximum CID value to a decompressor.

The large_cid information has a Boolean value and indicates whether a short CID (0-15) or embedded CID (0~16383) is used for a CID configuration. Accordingly, bytes representing a CID are determined.

The num_profiles information indicates the number of RoHC profiles.

The profile( ) element includes information about a header compression protocol in RoHC. In RoHC, a stream can be compressed and recovered only when the compressor and the decompressor have the same profile.

The num_IP_stream information indicates the number of IP streams.

The IP_address ( ) element includes the IP address of a header-compressed IP packet.

FIG. 54 illustrates a configuration parameter according to an embodiment of the present invention.

A configuration parameter included in a link layer packet payload may include RoHC_channel_id information, num_context information, context_id information, context_profile information, packet_configuration_mode information and/or context transmission mode information.

The RoHC_channel_id information identifies an RoHC channel.

The num_context information indicates the number of RoHC contexts.

The context_id information identifies an RoHC context. The context_id information can indicate a context to which the following RoHC related field corresponds. The context_id information can correspond to a context identifier (CID).

The context_profile information includes information about a header compression protocol in RoHC. In RoHC, a stream can be compressed and recovered only when the compressor and the decompressor have the same profile.

The packet_configuration_mode information identifies a packet_configuration_mode. Packet configuration modes have been described above.

The context_transmission_mode information identifies a context transmission mode. Context transmission modes have been described above. A context can be transmitted through a path through which normal broadcast data is delivered or a path allocated for signaling information transmission.

FIG. 55 illustrates static chain information according to an embodiment of the present invention.

Static chain information included in a link layer packet payload may include context_id information, context_profile information, static_chain_length information, static_chain ( ) element, dynamic_chain_incl information, dynamic_chain_length information and/or a dynamic_chain ( ) element.

The context_id information identifies an RoHC context. The context_id information can indicate a context to which the following RoHC related field corresponds. The context_id information can correspond to a context identifier (CID).

The context_profile information includes information about a header compression protocol in RoHC. In RoHC, a stream can be compressed and recovered only when the compressor and the decompressor have the same profile.

The static_chain_length information indicates the length of the static_chain ( ) element.

The static_chain ( ) element includes information belonging to a static chain extracted from an upper layer packet during RoHC header compression.

The dynamic_chain_incl information indicates whether dynamic chain information is included.

The dynamic_chain_length information indicates the length of the dynamic_chain ( ) element.

The dynamic_chain ( ) element includes information belonging to a dynamic chain extracted from the upper layer packet during RoHC header compression.

FIG. 56 illustrates dynamic chain information according to an embodiment of the present invention.

Dynamic chain information included in a link layer packet payload may include context_id information, context_profile information, dynamic_chain length information and/or a dynamic_chain ( ) element.

The context_id information identifies an RoHC context. The context_id information can indicate a context to which the following RoHC related field corresponds. The context_id information can correspond to a context identifier (CID).

The context_profile information includes information about a header compression protocol in RoHC. In RoHC, a stream can be compressed and recovered only when the compressor and the decompressor have the same profile.

The dynamic_chain_length information indicates the length of the dynamic_chain ( ) element.

The dynamic_chain ( ) element includes information belonging to a dynamic chain extracted from an upper layer packet during RoHC header compression.

Figure 57:
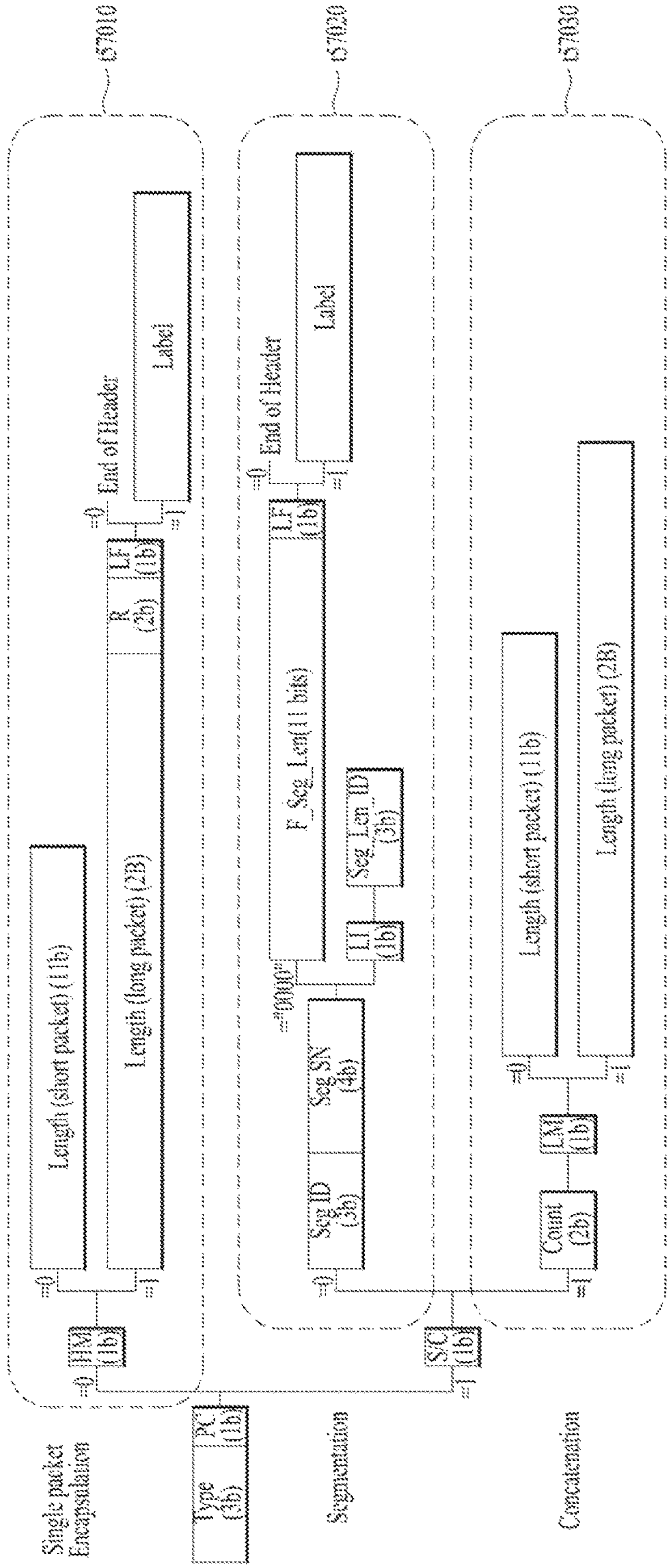
FIG. 57 illustrates a structure of a header of a link layer packet according to another embodiment of the present invention.

FIG. 57 illustrates header structures of a link layer packet according to other embodiments of the present invention.

Firstly, embodiment t57010 in which a single whole input packet is included and encapsulated in a link layer packet is described. This can be called single packet encapsulation, as described above.

In this case (t57010), the header of the link layer packet can start with the aforementioned Packet_Type field followed by the PC field. Here, the Packet_Type field can indicate the type of the input packet included in the link layer packet, as described above. The PC field can indicate a payload configuration of the link layer packet, as described above. The PC field can indicate whether a single whole packet is included in the payload or packets are concatenated and included in the payload or a packet is segmented and included in the payload according to the value thereof. In one embodiment, a PC field value of 0 indicates that a single whole input packet is included in the payload of the link layer packet. A PC field value of 1 indicates that segmented or concatenated input packets are included in the payload of the link layer packet.

The PC field can be followed by an HM field. The HM field can indicate a header mode of the link layer packet, as described above. That is, the HM field can indicate whether the single input packet included in the link layer packet is a short packet or a long packet, as described above. Accordingly, the header structure following the HM field can be changed.

When the input packet is a short packet, that is, when the HM field has a value of 0, an 11-bit length field can be present. This length field can indicate the length of the payload of the link layer packet.

When the input packet is a long packet, that is, when the HM field has a value of 1, the 11-bit length field can be followed by a 5-bit additional length field. The 2-byte length field can indicate the length of the link layer payload. Here, the length field can be divided into a base header corresponding to the 11-bit length field and an additional header corresponding to the remaining 5-bit length field. The two length fields can be followed by a 2-bit reserved field and an LF field. The reserved field corresponds to bits reserved for future use. The LF field is a flag indicating whether a label field follows the LF field. The label field is a kind of sub stream label and can be used to filter a specific upper layer packet stream at a link layer level, like a sub stream ID. An upper layer packet stream and sub stream label information can be mapped according to mapping information. The LF field can correspond to the aforementioned SIF field. The label field can correspond to the aforementioned SID field. Here, the label field may be called an optional header. The label field may have a size of 3 bytes according to an embodiment.

Secondly, an embodiment t57020 in which one segment of an input packet is included and encapsulated in the link layer packet is described. Here, the segment may be generated by segmenting one input packet. This case can be referred to as segmentation as described above.

The link layer header can start with the Packet_Type field and the PC field. The PC field can be followed by an S/C field. The S/C field can indicate whether the link layer payload includes concatenated input packets or segments of a packet, as described above. The link layer header structure can be changed according to whether the link layer payload includes concatenated input packets or segments of a packet.

When the S/C field is 0, that is, when the link layer payload includes segments of a packet, the S/C field can be sequentially followed by a segment ID field and a segment sequence number field. When the link layer packet includes segments other than the first segment, an LI field and/or the segment length ID field can be sequentially located. When the link layer packet includes the first segment, a first segment length field and/or an LF field can be located. That is, the link layer header including the first segment may not include the LI field. Here, the first segment length field can directly indicate the length of the first segment included in the link layer packet. The LF field may or may not be followed by the label field according to the value thereof, as described above. Other fields are as described above.

Thirdly, an embodiment t57030 in which multiple input packets are concatenated and encapsulated in the link layer packet is described. This case can be called concatenation.

The link layer header can start with the Packet_Type field and the PC field. The PC field can be followed by the S/C field as in the segmentation case. The S/C field can be followed by the aforementioned count field and a length mode (LM) field. The count field may be a 2-bit field and indicate that 2, 3, 4 and 5 input packets are concatenated when having values of 00, 01, 10 and 11, respectively. Otherwise, a 3-bit count field may be used, as described above.

The LM field can indicate whether short input packets are concatenated and encapsulated or long input packets are concatenated and encapsulated. When short input packets are concatenated, the LM field has a value of 0 and as many 11-bit length fields as the number of input packets may follow the LM field. When long input packets are concatenated, the LM field has a value of 1 and as many 2-byte length fields as the number of input packets may follow the LM field. Here, an input packet shorter than 2048 bytes can be classified as a short input packet and an input packet equal to or longer than 2048 bytes can be classified as a long input packet.

Short input packets and long input packets may be mixed and concatenated according to an embodiment. In this case, 11-bit length fields for the short input fields and 2-byte length fields for the long input packets can be mixed and located. These length fields can be positioned in the header in the same order as the input packets corresponding thereto.

Some fields may be omitted from the aforementioned link layer packet header structure according to an embodiment. In addition, some fields may be changed or added and the order thereof may be changed.

FIG. 58 illustrates a syntax of the link layer packet header structure according to another embodiment of the present invention.

The syntax indicates the aforementioned link layer packet header structure according to another embodiment of the present invention. As described above, the Packet_Type field and the PC field can be commonly positioned in the header structure.

When the PC field is 0, the header mode field is present. When the header mode field is 0, an 11-bit length field can be provided. When the header mode field is 1, a 2-byte length field, an LF field and reserved bits can be sequentially positioned. The label field may be additionally present according to the value of the LF field.

When the PC field is 1, the S/C field follows the PC field. When the S/C field is 0, the segment ID field and the segment sequence number field can follow the S/C field. When the segment sequence number field is 0000, that is, the first segment is included in the link layer packet, the first segment length field and the LF field can be positioned after the segment sequence number field. The label field may be additionally present according to the value of the LF field. When the segment sequence number field has a value other than 0000, the LI field and the segment length ID field can follow the same.

When the S/C field is 1, the count field and the LM field can follow the S/C field. As many length fields as the number indicated by the count field can be present. An 11-bit length field can be provided for a short input packet and a 2-byte length field can be provided for a long input packet.

Padding bits can be positioned in the remaining part.

Some fields may be omitted from the aforementioned link layer packet header structure according to an embodiment. In addition, some fields may be changed or added and the order thereof may be changed.

Figure 59:
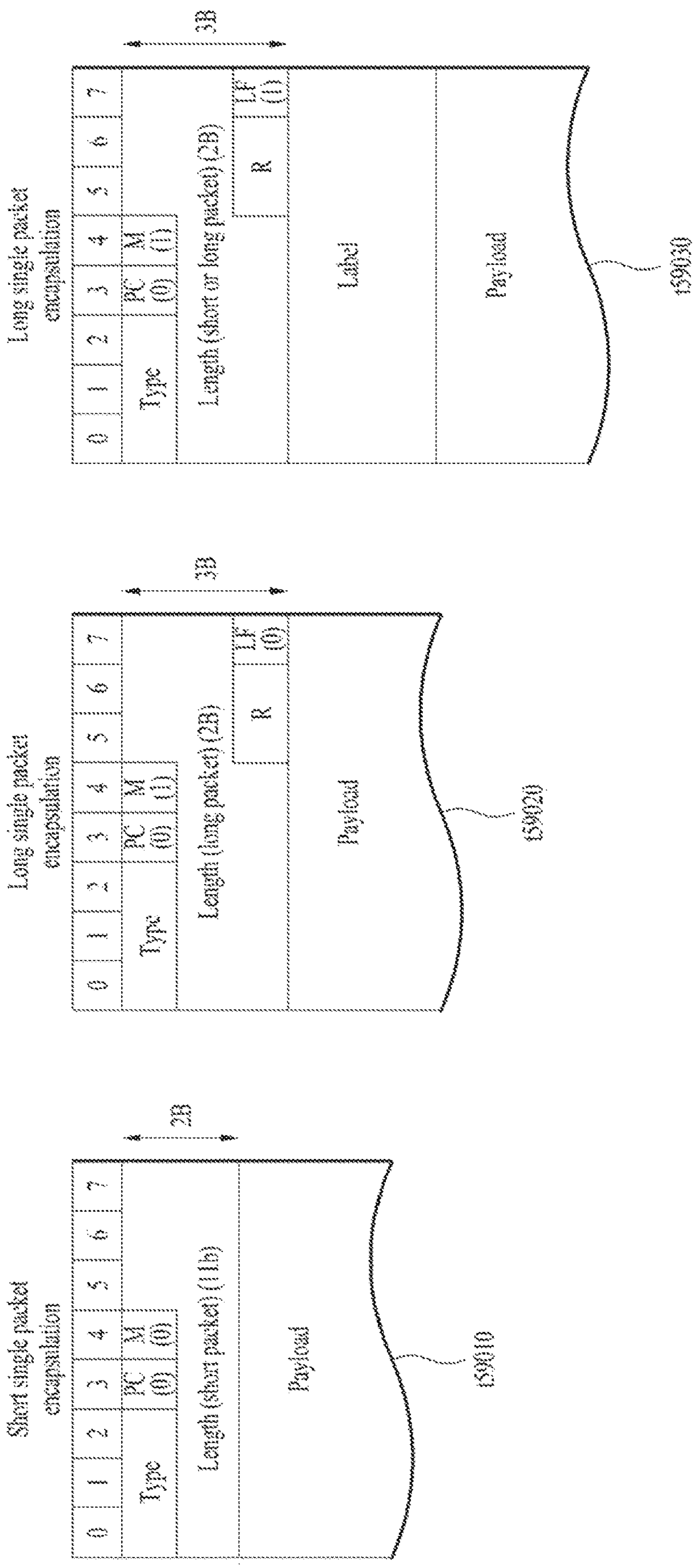
FIG. 59 illustrates a case in which one whole input packet is included in a link layer payload in a link layer packet header structure according to another embodiment of the present invention.

FIG. 59 illustrates a case in which a single whole input packet is included in a link layer payload, in the link layer packet header structure according to another embodiment of the present invention.

A first embodiment t59010 corresponds to short single packet insulation. As described above, the Packet_Type field, the PC field and the HM field, which are sequentially positioned, are followed by an 11-bit length field. The link layer packet can have a total header length of 2 bytes and the header can be followed by a link layer payload. Here, the PC field and the HM field can respectively have values of 0 and 0.

A second embodiment t59020 corresponds to long single packet encapsulation. As described above, the Packet_Type field, the PC field and the HM field, which are sequentially positioned, are followed by a 2-byte length field. The 2-byte length field may include an 11-bit length field and an additional 5-bit length field, as described above. These length fields may refer to an LSB part and an MSB part. The length field can be followed by reserved bits and the LF field. The link layer packet can have a total header length of 3 bytes and the header can be followed by a link layer payload. Here, the PC field, the HM field and the LF field can respectively have values of 0, 1 and 0.

A third embodiment t59030 corresponds to a case in which a long single packet is encapsulated and the label field is additionally included in the header structure. While the third embodiment corresponds to the aforementioned long single packet encapsulation case, the LF field is 1 and can be followed by the label field.

Figure 60:
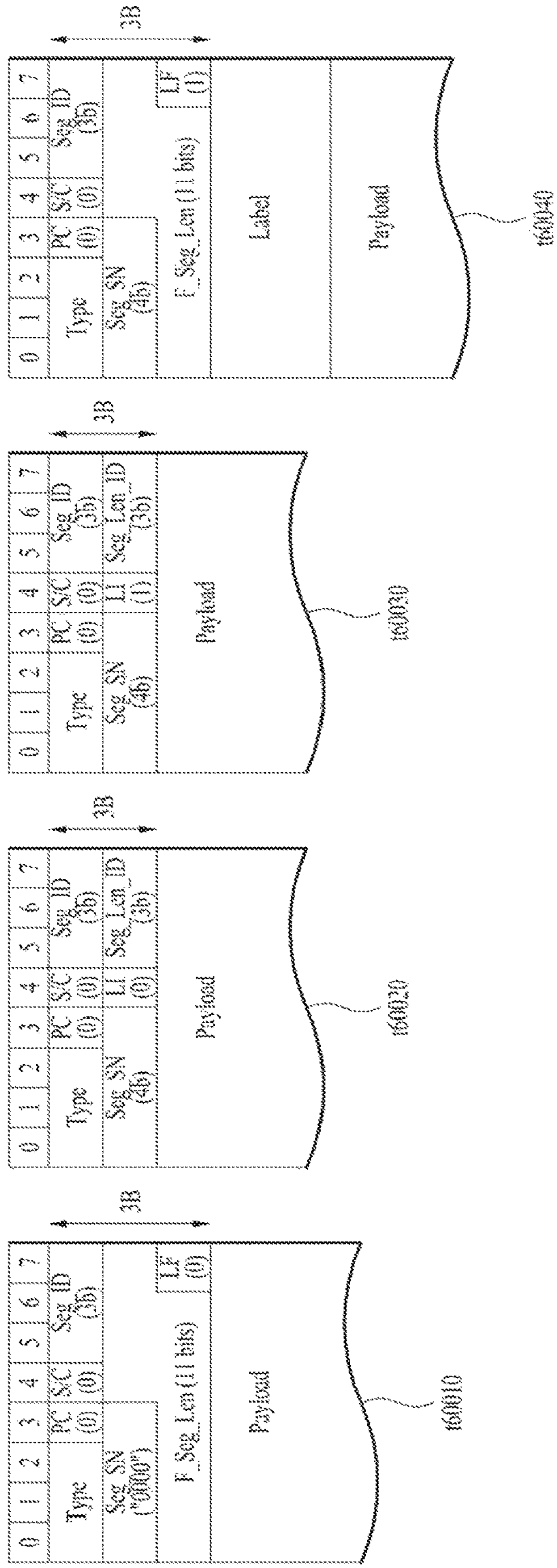
FIG. 60 illustrates a case in which one segment of an input packet is included in a link layer payload in a link layer packet header structure according to another embodiment of the present invention.

FIG. 60 illustrates a case in which one segment obtained by segmenting an input packet is included in a link layer payload in the link layer packet header structure according to another embodiment of the present invention.

A first embodiment t60010 corresponds to a link layer packet structure including the first segment from among segments of the input packet. As described above, the Packet_Type field, the PC field and the S/C field, which are sequentially positioned, are followed by the length ID field and the segment sequence number field. Here, the PC field, the S/C field and the segment sequence number field can be 0, 0 and 0000, respectively. The first segment length field can be positioned in the header structure since the first segment is included in the link layer packet. The first segment length field can directly indicate the length of the first segment, as described above. The first segment length field can be followed by the LF field.

A second embodiment t60020 corresponds to a link layer packet structure including a segment other than the first or last segment from among the segments of the input packet. As described above, the Packet_Type field, the PC field and the S/C field, which are sequentially positioned, can be followed by the length ID field and the segment sequence number field. Here, the PC field and the S/C field can be 0 and 0, respectively. The LI field is positioned in the header structure since the first segment is not included in the link layer packet, and the LI field can be 0 since the last segment is not included in the link layer packet. The segment length ID field can follow the LI field.

A third embodiment t60030 corresponds to a link layer packet structure including the last segment from among the segments of the input packet. As described above, the Packet_Type field, the PC field and the S/C field, which are sequentially positioned, can be followed by the length ID field and the segment sequence number field. Here, the PC field and the S/C field can be 0 and 0, respectively. The LI field is positioned in the header structure since the first segment is not included in the link layer packet, and the LI field can be 1 since the last segment is included in the link layer packet. The segment length ID field can follow the LI field.

A fourth embodiment t60040 corresponds to a link layer packet structure in which the first segment from among the segments of the input packet and the LF field is 1. While the fourth embodiment corresponds to the first embodiment, the label field may be added according to the value of the LF field.

FIG. 61 is a table showing a case in which one segment of an input packet is included in a link layer payload in the link layer packet header structure according to another embodiment of the present invention.

It is assumed that one input packet is segmented into 8 segments. All link layer packets including the segments have the same Packet_Type field value since the segments have been derived from one input packet. The PC field and the S/C field are 1 and 0, respectively, as described above. The link layer packets have the same segment ID field value since the segments have been derived from one input packet. The segment sequence number field can indicate the order of the segments. A 3-bit segment sequence number field may be used according to an embodiment.

A link layer packet having the first segment includes the first segment length field so as to indicate the length of the payload thereof. In this case, the LI field and the segment length ID field may not be present.

Link layer packets having segments other than the first segment can include the LI field and the segment length ID field without having the length field which directly indicates the payload length. The segment length ID field can select one of the aforementioned designated length IDs and indicate the length of the corresponding segment according to the selected value. The LI field can be 0 when the corresponding segment is not the last segment and 1 when the corresponding segment is the last segment.

Figure 62:
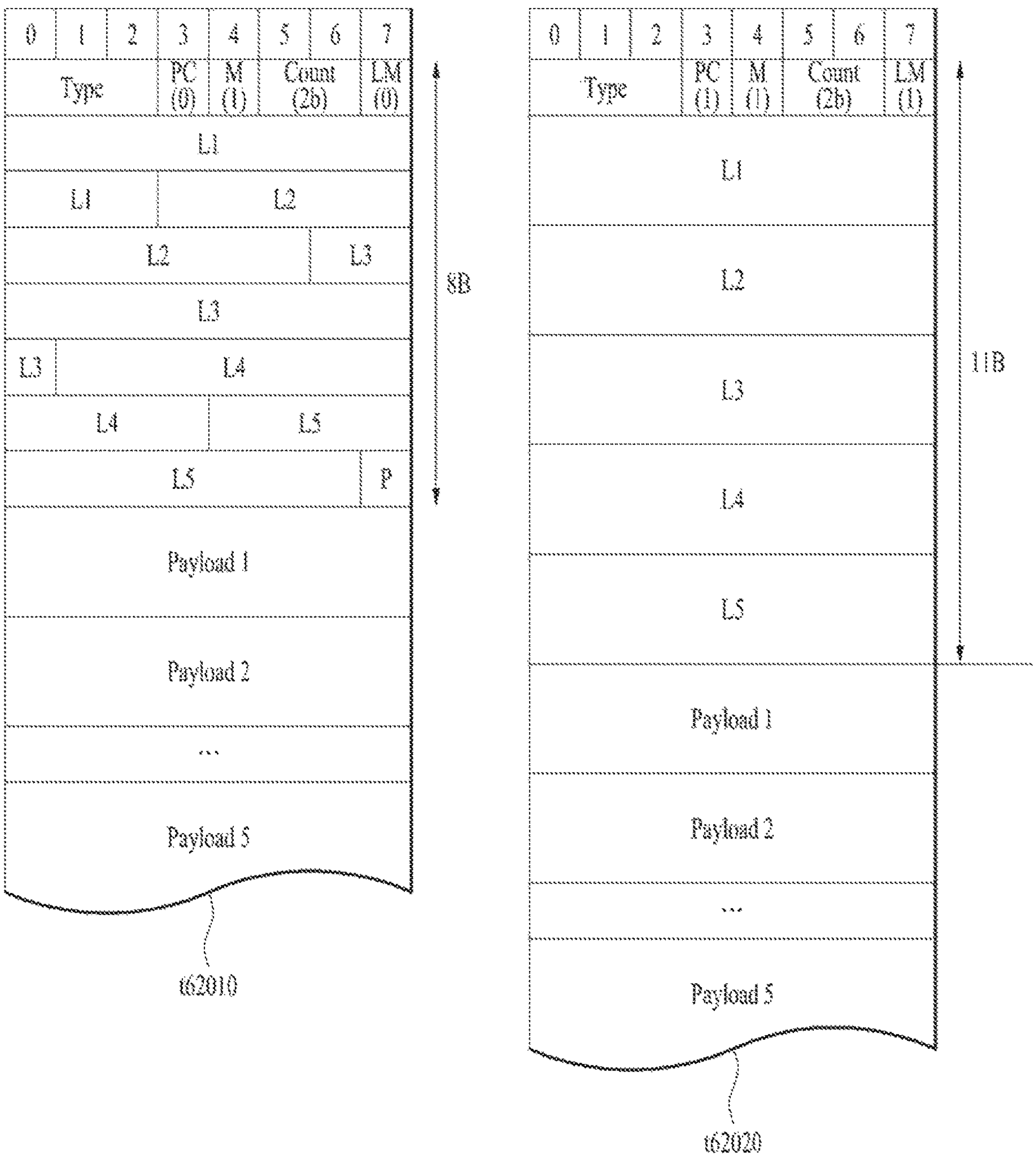
FIG. 62 illustrates a case in which multiple input packets are concatenated and included in link layer payloads in a link layer packet header structure according to another embodiment of the present invention.

FIG. 62 illustrates a case in which multiple input packets are concatenated and included in link layer payloads in the link layer packet header structure according to another embodiment of the present invention.

A first embodiment t62010 illustrates a case in which short input packets are concatenated and included in link layer payloads. The Packet_Type field, the PC field and the S/C field are sequentially positioned and followed by the count field and the LM field. The PC field, the S/C field and the LM field can be 1, 1 and 0, respectively, according to the aforementioned definition.

11-bit length fields can be sequentially positioned following the aforementioned fields. The length fields respectively indicating the lengths of the concatenated short input packets can be arranged in the same order as the input packets corresponding thereto. After the last length field, the remaining part can be filled with padding bits P corresponding to 8 bits. Subsequently, the concatenated input packets can be arranged.

A second embodiment t62020 illustrates a case in which long input packets are concatenated and included in link layer payloads. The Packet_Type field, the PC field and the S/C field are sequentially positioned and followed by the count field and the LM field. The PC field, the S/C field and the LM field can be 1, 1 and 1, respectively, according to the aforementioned definition.

2-bytes length fields can be sequentially positioned following the aforementioned fields. The length fields respectively indicating the lengths of the concatenated long input packets can be arranged in the same order as the input packets corresponding thereto. Subsequently, the concatenated input packets can be arranged.

Figure 63:
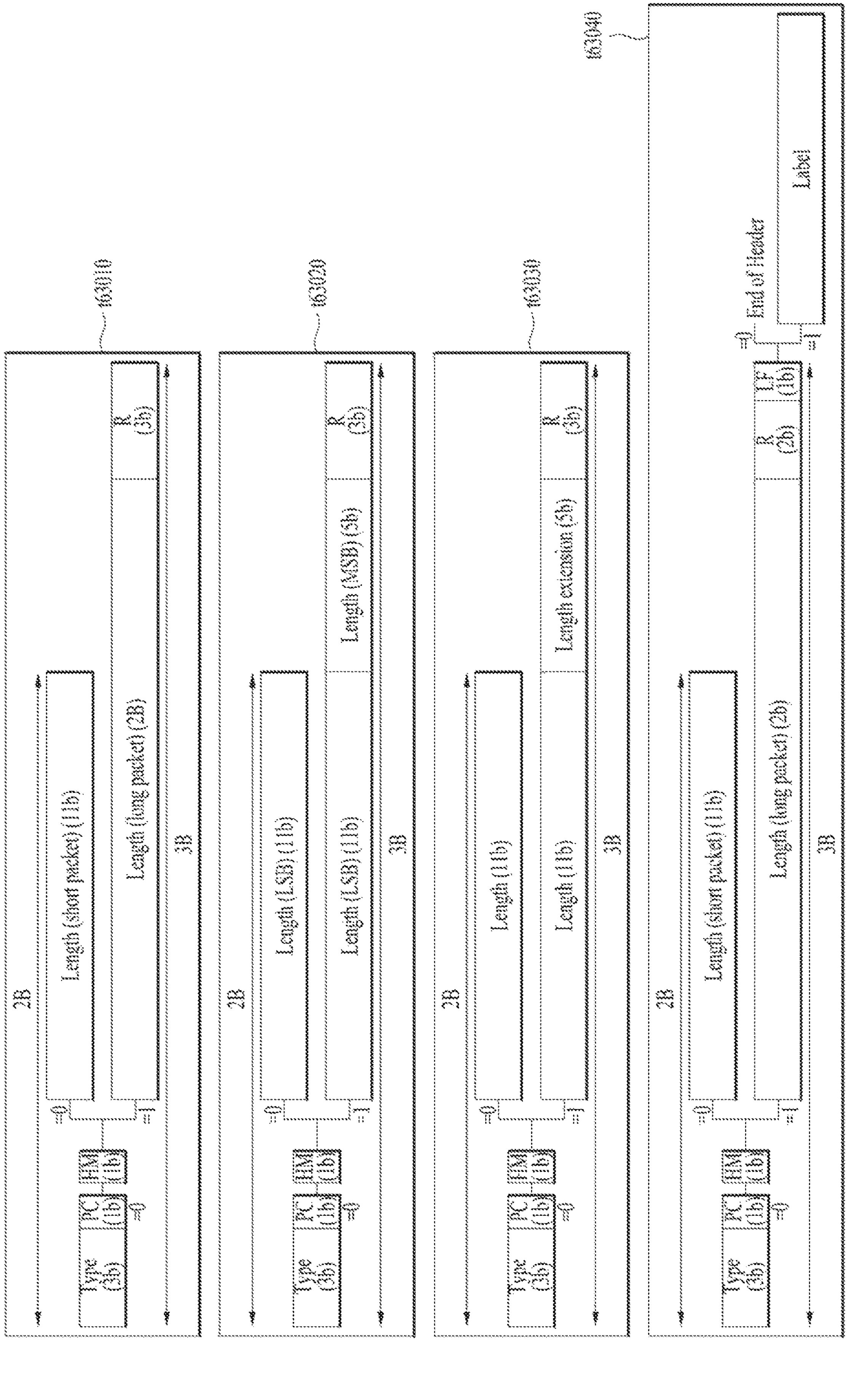
FIG. 63 illustrates a case in which one whole input packet is included in a link layer payload in a link layer packet header structure according to another embodiment of the present invention.

FIG. 63 illustrates a case in which a single whole input packet is included in a link layer payload in the link layer packet header structure according to another embodiment of the present invention.

First and second embodiments t63010 and t63020 can correspond to the aforementioned link layer packet header structure with respect to single packet encapsulation. However, a 2-byte length field is included in the header structure in the first embodiment and an 11-bit additional length field is included in the header structure in the second embodiment, for a case in which a long input packet is included in the link layer packet. In this case, the length fields can respectively refer to an LSB part and an MSB part which indicate lengths. The 2-byte length field can be followed by reserved bits. The last bit can be used as the LF field, as described above.

A third embodiment t63030 is similar to the aforementioned link layer packet header structure with respect to single packet encapsulation. The link layer packet header structure when a short input packet is included in the link layer packet payload corresponds to the aforementioned link layer packet header structure with respect to single packet encapsulation. When a long input packet is included in the link layer payload, a length extension field can replace the 5-bit additional length field.

The length extension field indicates extension of a length field. The number of bits occupied by the length extension field can be changed according to packet structure. It is assumed that the length extension field is 2 bits in the present embodiment for convenience of description. For example, when the length extension field is not used, that is, when HM=0, this indicates that a short input packet is encapsulated, and the 11-bit length field can indicate a payload length in the range of 0 to 2047 bytes. When the length extension field is used, the value of the length extension field can function as an offset in indication of the payload length. When the length extension field is 00, the 11-bit length field indicates a payload in the range of 2048 to 4095 bytes. When the length extension field is 01, 10 and 11, the 11-bit length field respectively indicates payload lengths in the ranges of 4096 to 6143 bytes, 6144 to 8191 bytes and 8192 to 10239 bytes. For example, when the 11-bit length field has a value indicating a "1-byte payload length" and the length extension field is 00, this indicates a payload length of 2049 bytes. If the 11-bit length field has a value indicating a "1-byte payload length" and the length extension field is 01, this indicates a payload length of 4097 bytes. In this manner, the payload length can be indicated even in the case of long single packet encapsulation.

A fourth embodiment t63040 corresponds to the aforementioned link layer header structure with respect to single packet encapsulation. The 2-byte length field can be replaced by the 11-bit length field and the additional 5-bit length field. In this case, the length fields can respectively refer to an LSB part and an MSB part. The label field may be added according to the value of the LF field value. The position of the label field can be changed according to embodiments.

FIG. 64 is a table showing header lengths in the link layer packet header structure according to another embodiment of the present invention.

When a short single input packet is encapsulated, the PC field and the HM field can have a value of 0. The total header length can be 2 bytes according to the 11-bit length field. In the table, x indicates that the corresponding bit can be any value. For example, the 11-bit length field is represented by 11 xs (xxxxxxxxxxx) since the 11-bit length field is determined by the payload length and thus is irrelevant to the header length.

When a long single input packet is encapsulated, the PC field and the HM field can respectively have values of 0 and 1. Subsequently, the 11-bit length field and the 5-bit additional length field are added and thus the total header length can be 3 bytes.

In a segmentation case, the PC field and the S/C field of each link layer packet can be 1 and 0, respectively. A link layer packet including the first segment can have a segment sequence number field of 0000. In the present embodiment, the LF field can be 0. In this case, the total header length can be 3 bytes. A link layer packet including a segment other than the first segment can have a 4-bit segment sequence number field followed by an LI field. In this case, the total header length can be 2 bytes.

When short input packets are concatenated, the PC field and the S/C field can be 1. The count field can indicate that n packets have been encapsulated. In this case, the LM field can be 0. The total header length can be represented by (11n/8+1) bytes since n 11-bit length fields are used and 1 byte is used for the front part of the header. However, P padding bits may need to be added for byte alignment. In this case, the header length can be represented by ((11n+P)/8+1) bytes.

When long input packets are concatenated, the PC field and the S/C field can be 1. The count field can indicate that n packets have been encapsulated. In this case, the LM field can be 1. The total header length can be represented by (2n+1) bytes since n 2-byte length fields are used and 1 byte is used for the front part of the header.

Figure 65:
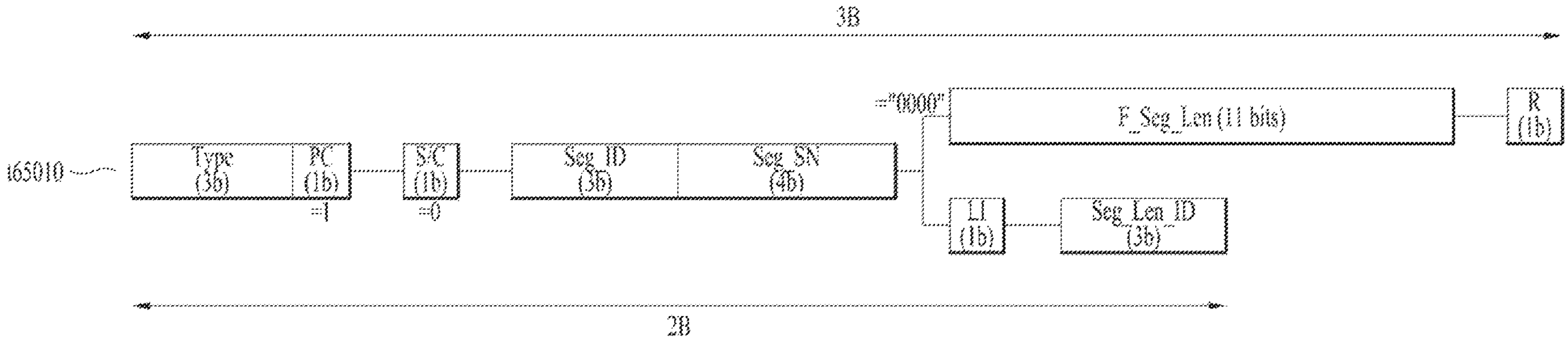
FIG. 65 illustrates a case in which one segment of an input packet is included in a link layer payload in a link layer packet header structure according to another embodiment of the present invention.

FIG. 65 illustrates a case in which one segment of an input packet is included in a link layer payload in the link layer packet header structure according to another embodiment of the present invention.

The illustrated embodiment t65010 corresponds to the aforementioned link layer packet header structure with respect to segmentation according to another embodiment of the present invention. The Packet_Type field, the PC field and the S/C field are sequentially arranged and followed by the segment ID field and the segment sequence number field. The PC field and the S/C field can be 1 and 0, respectively. When the link layer packet has the first segment, the link layer packet can include the first segment length field. 1 bit following the first segment length field may be a reserved bit or may be assigned to the LF field, as described above. When the link layer packet has a segment other than the first segment, the link layer packet can include the LI field and the segment length ID field.

In table t65020 showing the above embodiment, the Packet_Type field can have the same value, the PC field can be 1 and the S/C field can be 0, for a total of 5 segments. The segment ID field can have the same value. The segment sequence number field can indicate sequence numbers of the segments. In the case of the first segment, the first segment length field indicates the length thereof and the LI field may not be present. In the case of a segment other than the first segment, the length is indicated using the segment length ID field and the LI field can be 0 or 1 according to whether or not the segment is the last segment.

Figure 66:
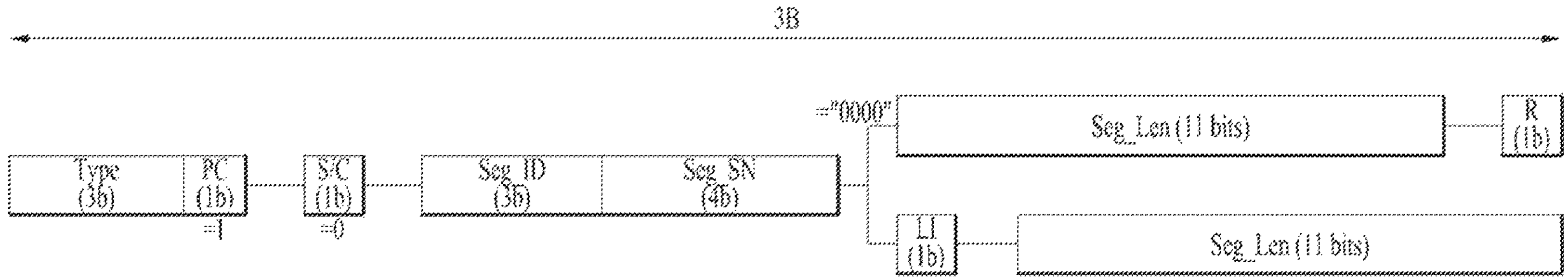
FIG. 66 illustrates a case in which one segment of an input packet is included in a link layer payload in a link layer packet header structure according to another embodiment of the present invention.

FIG. 66 illustrates a case in which one segment of an input packet is included in a link layer payload in the link layer packet header structure according to another embodiment of the present invention.

The illustrated embodiment t66010 is similar to the aforementioned link layer packet header structure with respect to segmentation according to another embodiment of the present invention. However, the header structure can be changed in the case of link layer packets having segments other than the first segment. In this case, the LI field can be followed by the segment length field instead of the segment length ID field. The segment length field can directly indicate the length of the segment included in the corresponding link layer packet. According to an embodiment, the segment length field may have a length of 11 bits. In this case, the first segment length field may be called a segment length field.

In table t66020 showing the above embodiment, the Packet_Type field can have the same value, the PC field can be 1 and the S/C field can be 0, for a total of 5 segments. The segment ID field can have the same value. The segment sequence number field can indicate sequence numbers of the segments. The length of the link layer payload can be indicated by the segment length field irrespective of whether the corresponding segment is the first segment. The LI field is not present when the corresponding link layer packet includes the first segment, whereas the LI field is present when the corresponding link layer packet includes a segment other than the first segment. The LI field can be 0 or 1 according to whether or not the corresponding segment is the last segment.

Figure 67:
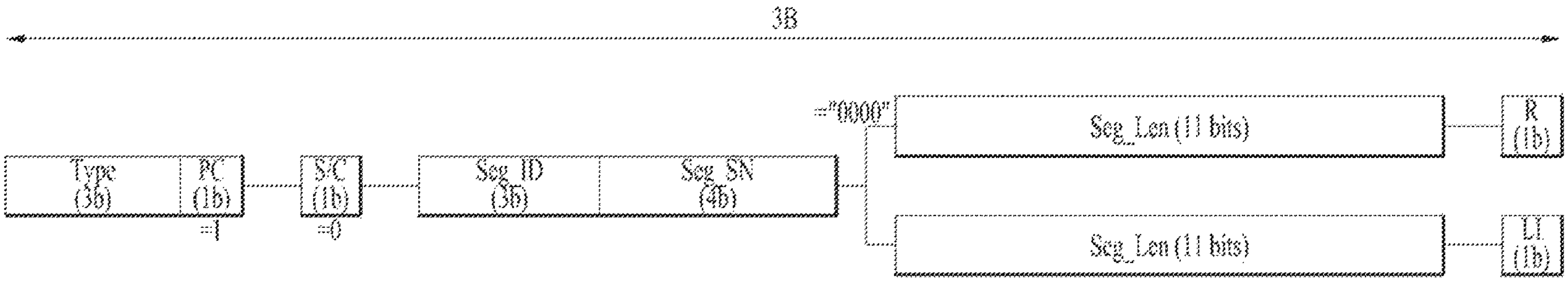
FIG. 67 illustrates a case in which one segment of an input packet is included in a link layer payload in a link layer packet header structure according to another embodiment of the present invention.

FIG. 67 illustrates a case in which one segment of an input packet is included in a link layer payload in the link layer packet header structure according to another embodiment of the present invention.

The illustrated embodiment t67010 is similar to the aforementioned link layer packet header structure with respect to segmentation according to another embodiment of the present invention. However, the header structure can be changed in the case of link layer packets having segments other than the first segment. In this case, the LI field can follow the segment length field. The segment length field is as described above, and the first segment length field may also be called a segment length field.

In table t67020 showing the above embodiment, the Packet_Type field can have the same value, the PC field can be 1 and the S/C field can be 0, for a total of 5 segments. The segment ID field can have the same value. The segment sequence number field can indicate sequence numbers of the segments. The length of the link layer payload can be indicated by the segment length field irrespective of whether the corresponding segment is the first segment. The LI field is not present when the corresponding link layer packet includes the first segment, whereas the LI field is present when the corresponding link layer packet includes a segment other than the first segment. The LI field can be 0 or 1 according to whether or not the corresponding segment is the last segment.

Figure 68:
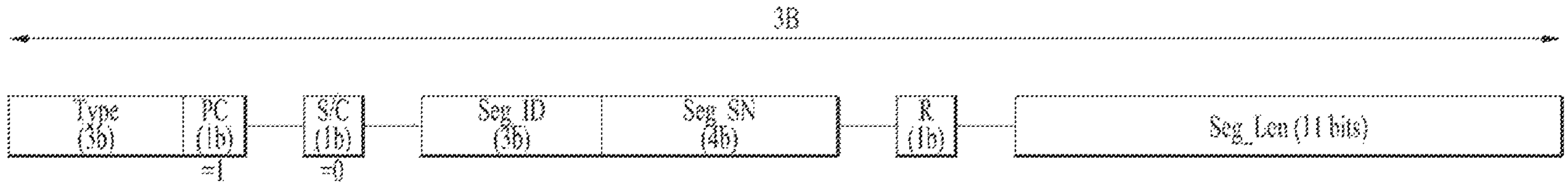
FIG. 68 illustrates a case in which one segment of an input packet is included in a link layer payload in a link layer packet header structure according to another embodiment of the present invention.

FIG. 68 illustrates a case in which one segment of an input packet is included in a link layer payload in the link layer packet header structure according to another embodiment of the present invention.

The illustrated embodiment t68010 is similar to the aforementioned link layer packet header structure with respect to segmentation according to another embodiment of the present invention. In this case, however, a common header structure can be used irrespective of whether the corresponding segment is the first segment. The Packet_Type field to the segment sequence number fields have the same structures as the above-described structures. The segment sequence number field can be followed by the LI field irrespective of whether or not the corresponding segment is the first segment, and the LI field can be followed by the segment length field which indicates the payload length of the corresponding link layer packet. The segment length field is as described above. In the present embodiment, the segment ID field can be omitted and the segment length field can follow the S/C field. The LI field can be followed by the aforementioned SIF field.

In table t68020 showing the above embodiment, the Packet_Type field can have the same value, the PC field can be 1 and the S/C field can be 0, for a total of 5 segments. The segment ID field can have the same value. The segment sequence number field can indicate sequence numbers of the segments. The LI field is present irrespective of whether or not the corresponding segment is the first segment. The LI field can be 0 or 1 according to whether or not the corresponding segment is the last segment. The length of the link layer payload can be indicated by the segment length field irrespective of whether the corresponding segment is the first segment.

Figure 69:
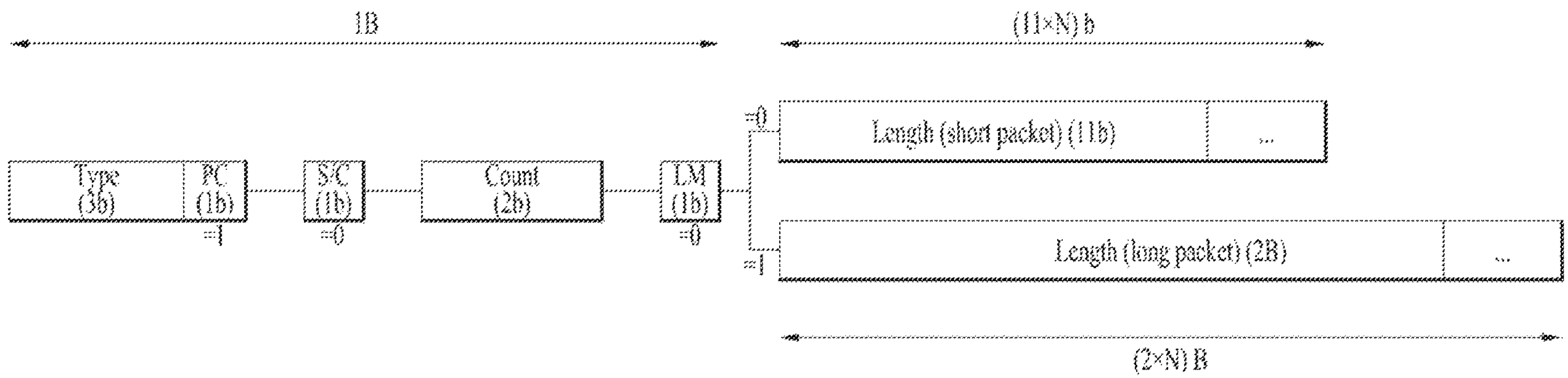
FIG. 69 illustrates a case in which multiple input packets are concatenated and included in a link layer payload in a link layer packet header structure according to another embodiment of the present invention.

FIG. 69 illustrates a case in which multiple input packets are concatenated and included in a link layer payload in the link layer packet header structure according to another embodiment of the present invention.

The illustrated embodiment t69010 may correspond to the aforementioned link layer packet header structure with respect to concatenation according to another embodiment of the present invention. The Packet_Type field, the PC field and the S/C field can be sequentially arranged and followed by the count field and the LM field. The PC field and the S/C field can be 1. When short packets are concatenated and encapsulated, as many 11-bit length fields as the number of concatenated packets can be present according to the value of the LM field. When long packets are concatenated and encapsulated, as many 2-byte length fields as the number of concatenated packets can be present.

The present embodiment can be represented by table t69020 on the basis of the number of concatenated input packets. When the link layer packet has the first segment, the link layer packet can include the first segment length field. 1 bit following the first segment length field may be a reserved bit or may be assigned to the LF field, as described above. When the link layer packet has a segment other than the first segment, the link layer packet can include the LI field and the segment length ID field. A count field value of 00 indicates that 2 input packets have been concatenated. In this case, 2 length fields, that is, 22 bits are used, and 2 padding bits can be used for byte alignments. Accordingly, the total header length can be 4 bytes and a header portion per input packet can be 2 bytes.

Count field values of 01, 10 and 11 respectively indicate that 3, 4 and 5 input packets have been concatenated. In this case, 3, 4 and 5 length fields, that is, 33, 44 and 55 bits are respectively used for the respective cases and 7, 4 and 1 padding bits can be used for byte alignment in the respective cases. Accordingly, the total header lengths can be 6, 7 and 8 bytes and a header portion per input packet can be 2.0, 1.75 and 1.60 bytes in the respective cases.

Figure 70:
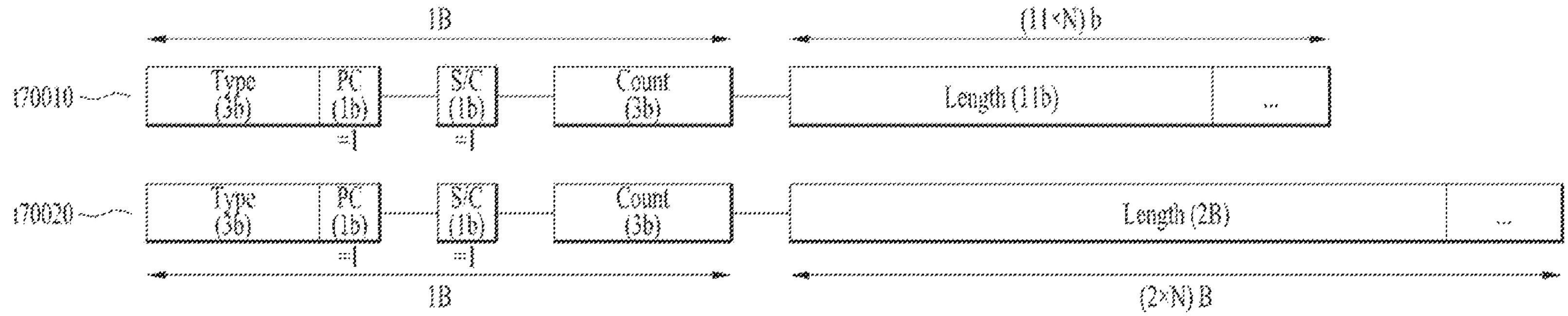
FIG. 70 illustrates a case in which multiple input packets are concatenated and included in a link layer payload in a link layer packet header structure according to another embodiment of the present invention.

FIG. 70 illustrates a case in which multiple input packets are concatenated and included in a link layer payload in the link layer packet header structure according to another embodiment of the present invention.

The illustrated embodiments t70010 and t70020 may correspond to the aforementioned link layer packet header structure with respect to concatenation according to another embodiment of the present invention. In this case, however, the LM field can be omitted from the aforementioned header structure. The Packet_Type field, the PC field and the S/C field can be sequentially arranged and followed by the count field. The PC field and the S/C field can be 1.

In the illustrated embodiment t70010, as many 11-bit length fields as the number of concatenated packets can be present. Here, the length of a short input packet, which can be represented by 11 bits, is indicated by the 11-bit length field. In the case of an input packet longer than 11 bits, the aforementioned single packet encapsulation or segment can be used instead of concatenation. The link layer header structure of the present embodiment can be used when whether concatenation or single packet encapsulation/segmentation is used has been designated on the basis of the size that can be represented by 11 bits.

In the illustrated embodiment t70020, as many 2-byte length fields as the number of concatenated packets can be present. The link layer header structure of the present embodiment supports concatenation for all packets having lengths which can be represented by 2 bytes.

The above embodiments can be represented by tables t70030 and t70040 on the basis of the number of concatenated input packets. Description of the tables has been given above.

In table t70030 with respect to the embodiment t70010, when the count field is 000, for example, 2 input packets have been concatenated, 2 length fields, that is, 22 bits are used, and 2 padding bits are used for byte alignment. Accordingly, the total header length can be 4 bytes and a header portion per input packet can be 2 bytes. When the count field is 001, 3 input packets have been concatenated, 3 length fields, that is, 33 bits are used, and 7 padding bits are used for byte alignment. Accordingly, the total header length can be 6 bytes and a header portion per input packet can be 2 bytes.

In table t70040 with respect to embodiment t70020, when the count field is 000, for example, 2 input packets have been concatenated, and 2 length fields, that is, 4 bytes can be used. Accordingly, the total header length can be 5 bytes and a header portion per input packet can be 2.50 bytes. When the count field is 001, 3 input packets have been concatenated, and 3 length fields, that is, 6 bytes can be used. Accordingly, the total header length can be 7 bytes and a header portion per input packet can be 2.33 bytes. In this case, padding bits may not be needed.

Figure 71:
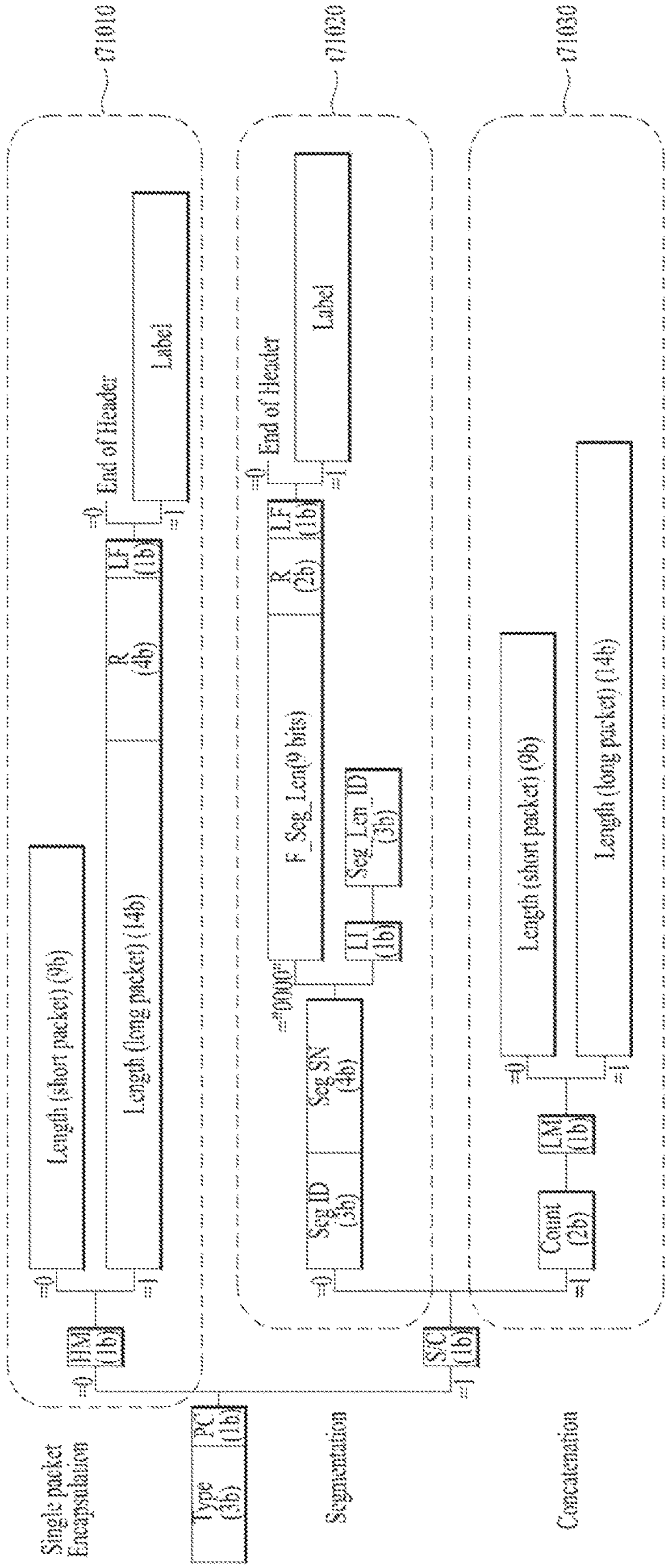
FIG. 71 illustrates a link layer packet structure when word based length indication is used in a link layer packet header structure according to another embodiment of the present invention.

FIG. 71 illustrates a link layer packet structure when word based length indication is used according to another embodiment of the present invention.

When a packet of an upper layer is generated on a word basis, a length field can indicate a length on a word basis instead of a byte basis. That is, when an input packet has a length of 4 bytes, the link layer header can be further optimized because the sizes of the aforementioned length fields can be reduced when a length is indicated on a word basis.

When a length is indicated on a word basis, the link layer header structure is similar to the aforementioned link layer packet header structure according to another embodiment of the present invention. The positions, configurations and operations of the respective fields are as described above. However, the sizes of the fields are reduced.

In single packet encapsulation (t71010), the field indicating the payload length can be reduced by 2 bits. That is, the 11-bit length field can be reduced to 9 bits and 2 bits can be reserved for future use. In addition, when a long input packet is used, the 16-bit length field can be reduced to 14 bits. That is, bits corresponding to the length field used as an MSB can be reduced. An input packet length of up to 2044 bytes (511 words) can be indicated using a 9-bit length field and an input packet length of up to 64 kbytes (65532 bytes, 16383 words) can be indicated using a 14-bit length field. The 2 bits can be reserved for future use. The reserved bits may be used as an indicator (HEF field) indicating presence or absence of the aforementioned optional header.

In the case of segmentation or concatenation (t71020 and t71030), the length fields can be optimized similarly. The 11-bit segment length field and the first segment length field can be reduced to 9 bits. In addition, the 11-bit length fields and 2-byte length fields indicating the lengths of segments can be reduced to 9 bits and 14 bits, respectively. In this case, padding bits may be added for byte alignment.

This optimization method can be applied to all link layer packet structures described in the present invention.

FIG. 72 is a table showing a link layer packet header structure when word-based length indication is used according to another embodiment of the present invention on the basis of the number of input packets.

The first table t72010 shows a case in which short input packets are concatenated. When the count field is 00, 2 input packets have been concatenated, 2 length fields, that is, 18 bits, can be used and 6 padding bits can be used for byte alignment. Accordingly, the total header length can be 4 bytes and a header portion per input packet can be 2.0 bytes.

Count field values of 01, 10 and 11 respectively indicate that 3, 4 and 5 input packets have been concatenated. In this case, 3, 4 and 5 length fields, that is, 27, 36 and 45 bits can be used and 5, 4 and 3 padding bits can be used for byte alignment for the respective cases. Accordingly, the total header length can be 5, 6 and 7 bytes and a header portion for each input packet can be 1.67, 1.50 and 1.40 bytes in the respective cases.

The second table t72020 shows a case in which long input packets are concatenated. When the count field is 00, 2 input packets have been concatenated, 2 length fields, that is, 28 bits, can be used and 4 padding bits can be used for byte alignment. Accordingly, the total header length can be 5 bytes and a header portion for each input packet can be 2.50 bytes. When word-based length indication is used, padding bits may be needed even when long input packets are concatenated.

Count field values of 01, 10 and 11 respectively indicate that 3, 4 and 5 input packets have been concatenated. In this case, 3, 4 and 5 length fields, that is, 42, 56 and 70 bits can be used and 6, 0 and 2 padding bits can be used for byte alignment for the respective cases. Accordingly, the total header length can be 7, 8 and 10 bytes and a header portion for each input packet can be 2.33, 2.00 and 2.00 bytes in the respective cases.

Figure 73:
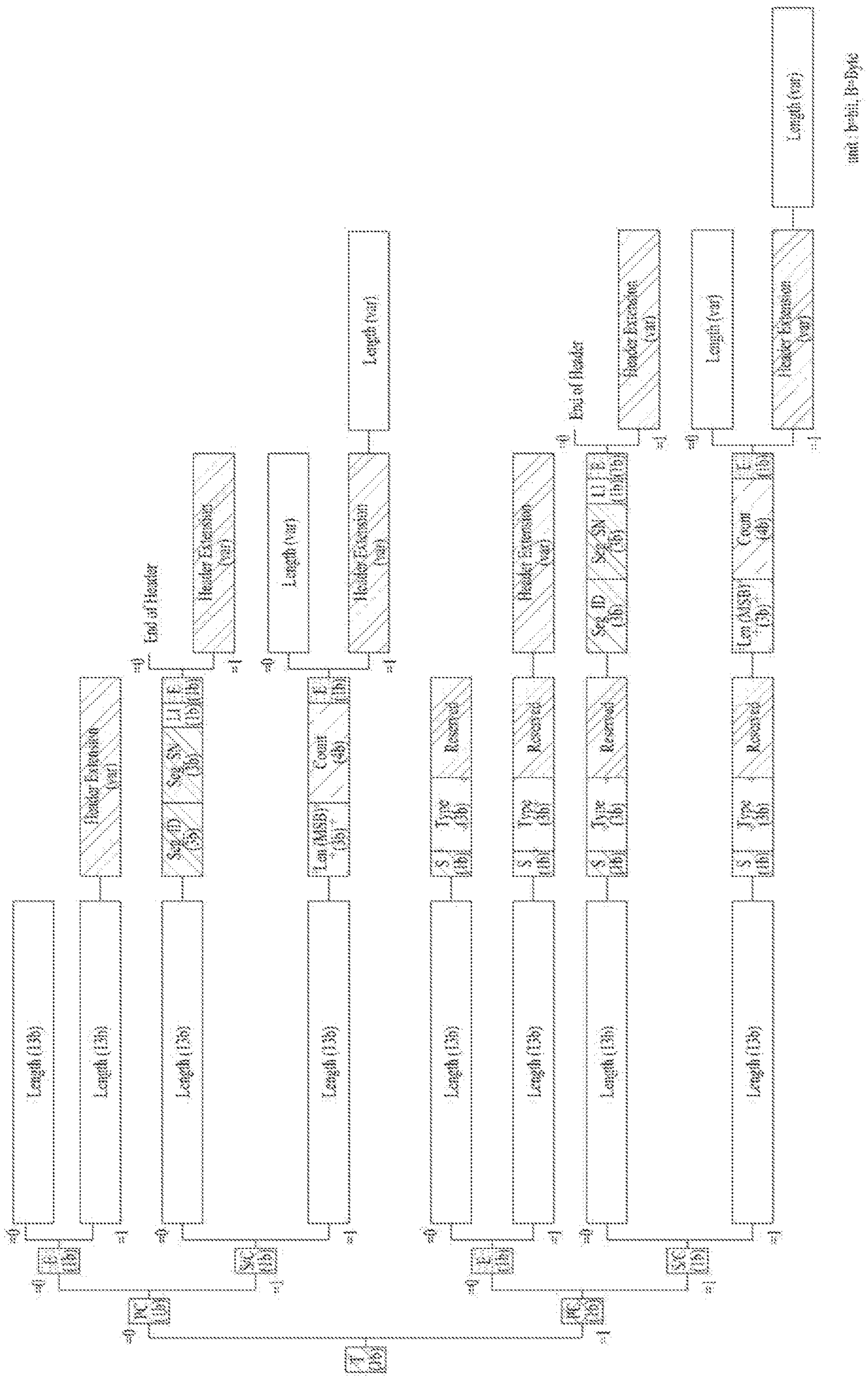
FIG. 73 is a view illustrating the structure of a link layer packet of a first version according to an embodiment of the present invention.

FIG. 73 is a view illustrating the structure of a link layer packet of a first version according to an embodiment of the present invention.

Referring to this figure, it can be seen that the structure of a header of the link layer packet may exist in various forms based on the value of each element or field included in the link layer packet. Each element or field has been previously described.

Figure 74:
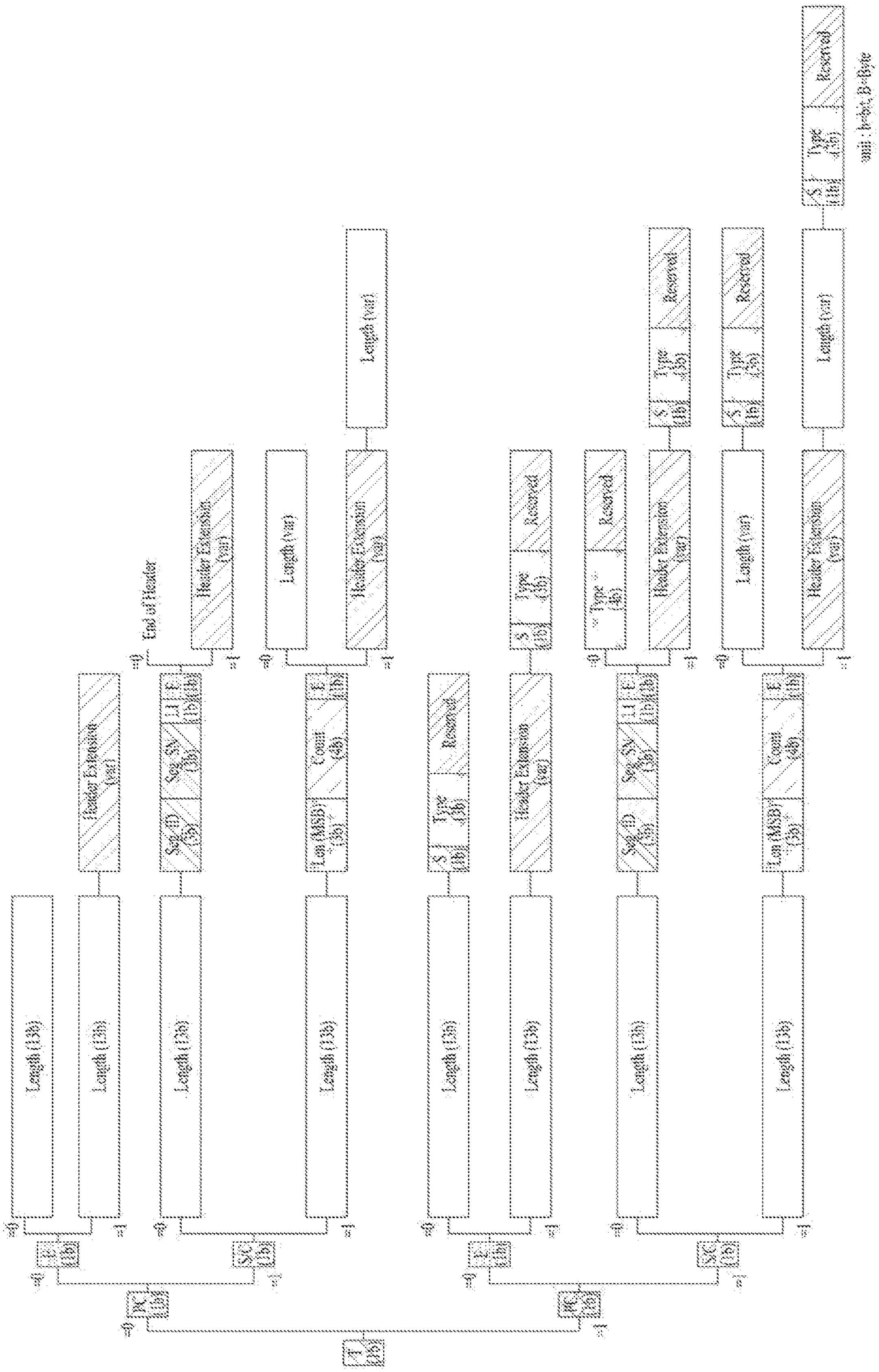
FIG. 74 is a view illustrating the structure of a link layer packet of a second version according to another embodiment of the present invention.

FIG. 74 is a view illustrating the structure of a link layer packet of a second version according to another embodiment of the present invention.

Referring to this figure, it can be seen that the structure of a header of the link layer packet may exist in various forms based on the value of each element or field included in the link layer packet. Each element or field has been previously described.

Although the structure of the link layer packet (or the header of the link layer packet) is illustrated in various forms, it may be assumed that the link layer packet of the first version and the link layer packet of the second version each have a 2-byte header.

In addition, according to the structure of the illustrated link layer packet, signaling may be performed for encapsulation of a default protocol, which occupies most of the packet, using the minimum indication fields.

In addition, according to the structure of the illustrated link layer packet, signaling may be performed such that an IP packet can be processed up to 64 kB even in a link layer, since the length of the IP packet may be supported to have a maximum of 64 kB (65535 bytes).

In addition, according to the structure of the illustrated link layer packet, an extension header may be included in the link layer packet in order to provide correct information about packet processing in all number of cases. In addition, the link layer packet may include an extension flag in order to identify the existence of the extension header.

For all elements and/or fields included in the header of the link layer packet, the sequence of the elements and/or fields mapped in the header may be changed. The mapping sequence of the elements and/or fields may be changed as shown in the illustrated embodiment.

The link layer packet of the first version and/or the link layer packet of the second version may include a T element, a PC element, an S/C element, an E element, a length element, and/or an S element. Here, the terms "element" and "field" may have the same meaning.

The T element may identify whether a packet constituting a payload of the link layer packet is based on a default protocol. For example, in a case in which the value of the T element is '0', the T element may indicate that an input packet included in the payload is based on the default protocol. In an IP-based broadcasting system, a packet based on the default protocol may correspond to an IP packet. In a case in which the value of the T element is '1', the T element may indicate that the packet is not based on the default protocol. In this case, a detailed protocol on which the input packet is based may be indicated using an additional field or element.

A packet configuration (PC) element indicates the configuration of the payload of the link layer packet. For example, in a case in which the value of the PC element is '0', the PC element may indicate that one packet is included in the payload. In this case, the E element (or field), which indicates whether the extension header exists, may be included in the header. In a case in which the value of the PC element is '1', the PC element may indicate that segmentation, in which one input packet is segmented into a plurality of segments and one of the segments is included in the payload, or concatenation, in which one or more input packets are included in the payload, has been performed. In this case, the header may include information that identifies whether segmentation or concatenation has been performed.

The S/C element may indicate whether segmentation or concatenation has been performed for the input packet in the payload of the link layer packet. For example, in a case in which the value of the S/C element is '0', the S/C element may indicate that segmentation has been performed. In a case in which the value of the S/C element is '1', the S/C element may indicate that concatenation has been performed.

The E element identifies whether the extension header exists. For example, in a case in which the value of the E element is '0', the E element may indicate that no extension header exists. In a case in which the value of the E element is '1', the E element may indicate that the extension header exists. The length of the extension header and the configuration of the fields included in the extension header may be changed based on the use of the packet.

The length element may indicate the length of the payload. 13 bits may be assigned to the length element. In this case, the length element may indicate a maximum length of 8191 bytes.

The S element may indicate the type of data included in the payload. For example, in a case in which the value of the S element is '0', the packet included in the payload may correspond to a data packet including broadcast data. In this case, the type of the data packet may be identified using an additional field or element. In a case in which the value of the S element is '1', the S element may indicate that the packet included in the payload is a signaling packet including signaling information.

FIG. 75 is a view illustrating a combination that identifies the type of a packet included in a payload according to an embodiment of the present invention.

According to an embodiment of the present invention, as shown in the illustrated table, it is possible to identify various input packets using a combination of a T element, an S element, and/or a packet type element (type element).

In a case in which the value of the T element is '0', the T element may indicate that an IPv4 packet or an IPv6 packet based on an IP, which is a default protocol, is an input packet, as previously described. In this case, whether the version of the IP is 4 or 6 may be identified using the first bit (for example, n=4) included in the payload. In a case in which the value of the T element is '1', the type of the input packet may be identified using a combination of the S element and/or the packet type element, which follows the T element.

In a case in which the value of the S element is '0', the S element may indicate that the payload include a data packet that includes broadcast data. In a case in which the value of the S element is '1', the S element may indicate that the payload include a signaling packet that includes signaling information.

In a case in which the value of the S element is '0', the packet type element may indicate whether the input packet corresponds to a compressed IP packet (a packet to which RoHC has been applied), an MPEG2-TS, or an extension based on the value thereof. Here, extension may indicate another type of packet which has not been mentioned above. In a case in which the value of the S element is '1', the packet type element may identify the type of L2 (Layer 2 or link layer) signaling based on the value thereof. The L2 signaling may indicate that signaling for channel scanning and service acquisition, signaling for emergency alert, signaling for header compression, and/or a plurality of kinds of signaling may be included together.

FIG. 76 is a view illustrating the size of data assigned to each element or field for signaling segmentation and/or concatenation according to an embodiment of the present invention.

FIG. 76(*a*) shows the number of bits assigned to each element or field when an input packet having a maximum of 64 kB is supported without considering an overhead for the header in a case in which 11 bits are assigned for length indication.

In a case in which the input packet is included in the payload of the link layer packet by segmentation or concatenation, a 2-byte header may be added to the header of the link layer packet for byte alignment.

FIG. 76(*b*) shows the number of bits assigned to each element or field when a 1-byte overhead is used in a case in which 11 bits are assigned for length indication. When the 1-byte overhead is added, the link layer protocol may support an input packet having a maximum of 16 kB.

FIG. 76(*c*) shows the number of bits assigned to each element or field when a 1-byte overhead is used in a case in which 13 bits are assigned for length indication. In this case, only a 1-byte header is added to the header of the link layer packet while the link layer protocol supports an input packet having up to 64 kB.

Figure 77:
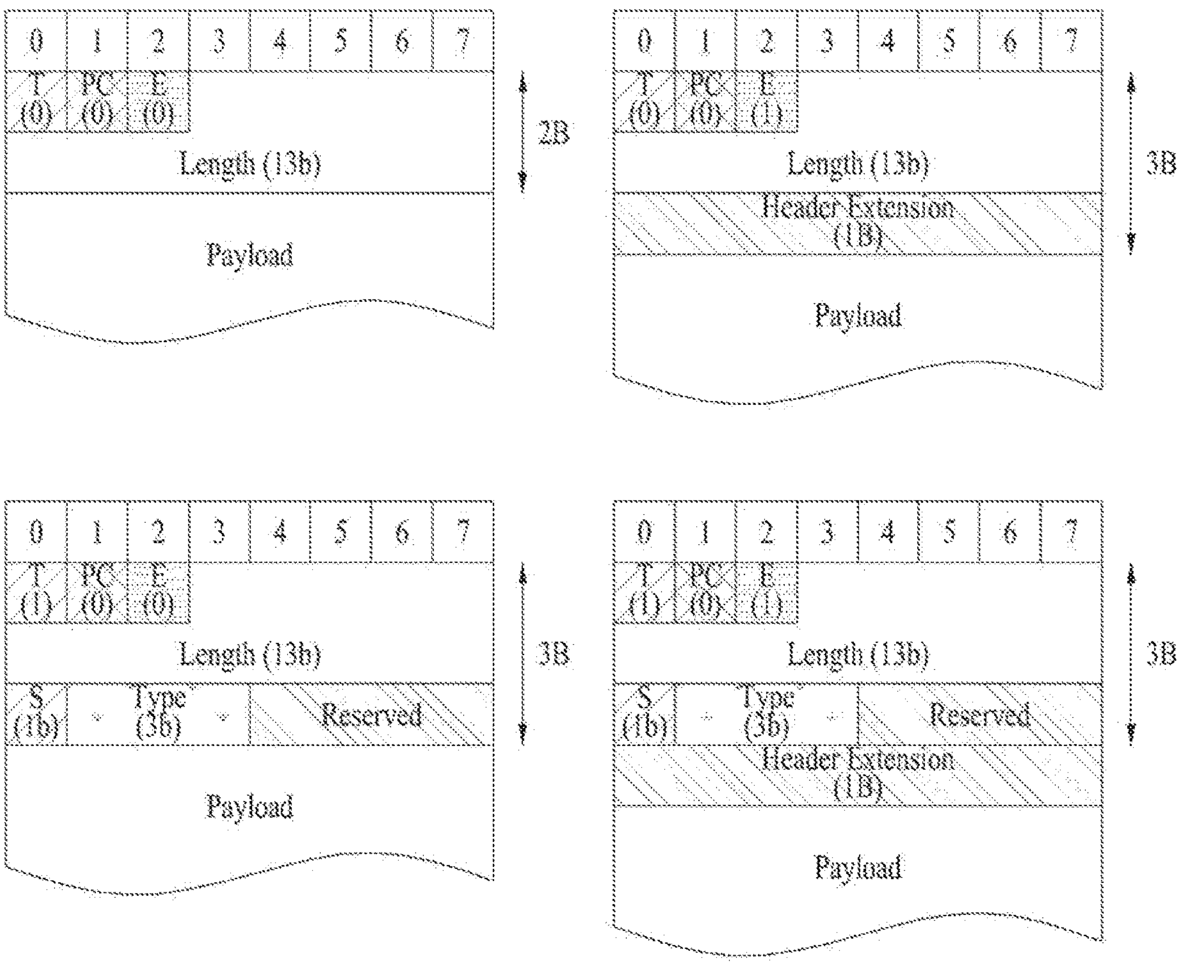
FIG. 77 is a view illustrating the structure of a header of a link layer packet, in a case in which one input packet is included in a payload of the link layer packet, according to an embodiment of the present invention.

FIG. 77 is a view illustrating the structure of a header of a link layer packet, in a case in which one input packet is included in a payload of the link layer packet, according to an embodiment of the present invention.

In a case in which the value of the aforementioned PC element is '0', the structure of the header may be changed as shown based on the value of the T element and/or the E element.

This embodiment shows a case in which, when an extension header exists, the size of the extension header is 1 byte.

The elements or fields included in the respective structures of the header have been previously described.

Figure 78:
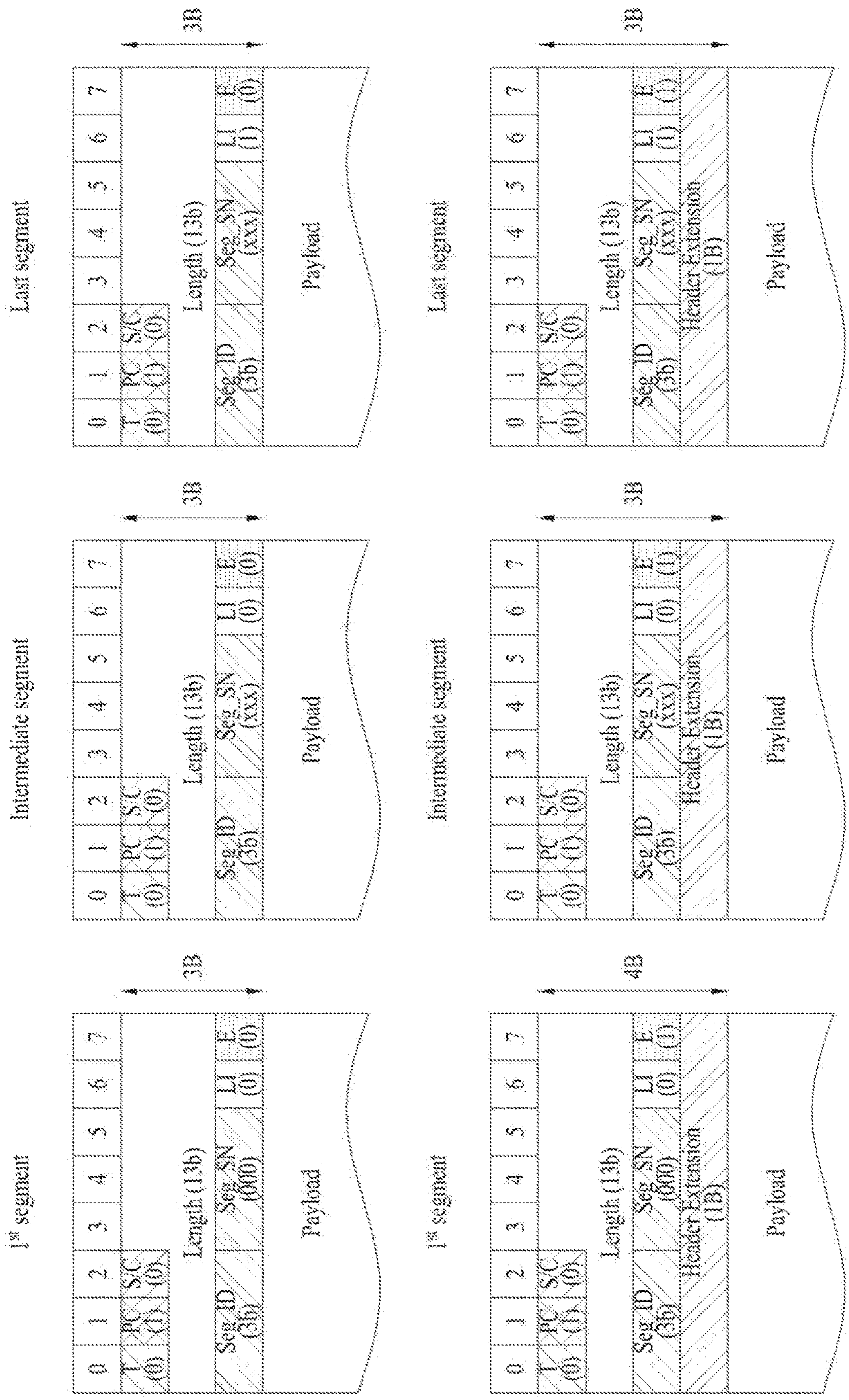
FIG. 78 is a view illustrating the structure of a header of a link layer packet, in a case in which a segment of an input packet is included in a payload of the link layer packet, according to an embodiment of the present invention.

FIG. 78 is a view illustrating the structure of a header of a link layer packet, in a case in which a segment of an input packet is included in a payload of the link layer packet, according to an embodiment of the present invention.

In a case in which the value of the aforementioned T element is '0', the value of the PC element is '1', and the value of the S/C element is '1', the structure of the header may be changed as shown based on the value of the E element.

This embodiment shows a case in which, when an extension header exists, the size of the extension header is 1 byte.

This embodiment shows the structure of the header in a case in which an IP packet is included in the link layer packet.

The elements or fields included in the respective structures of the header have been previously described.

Figure 79:
FIG. 79 is a view illustrating the structure of a header of a link layer packet, in a case in which a segment of an input packet is included in a payload of the link layer packet, according to an embodiment of the present invention.

FIG. 79 is a view illustrating the structure of a header of a link layer packet, in a case in which a segment of an input packet is included in a payload of the link layer packet, according to an embodiment of the present invention.

In a case in which the value of the aforementioned T element is '1', the value of the PC element is '1', and the value of the S/C element is '1', the structure of the header may be changed as shown based on the value of the E element.

This embodiment shows a case in which, when an extension header exists, the size of the extension header is 1 byte.

This embodiment shows the structure of the header in a case in which another input packet, rather than the IP packet, is included in the link layer packet. The type of the input packet may be identified using the S element and/or the packet type element (the type element), as previously described.

The elements or fields included in the respective structures of the header have been previously described.

Figure 80:
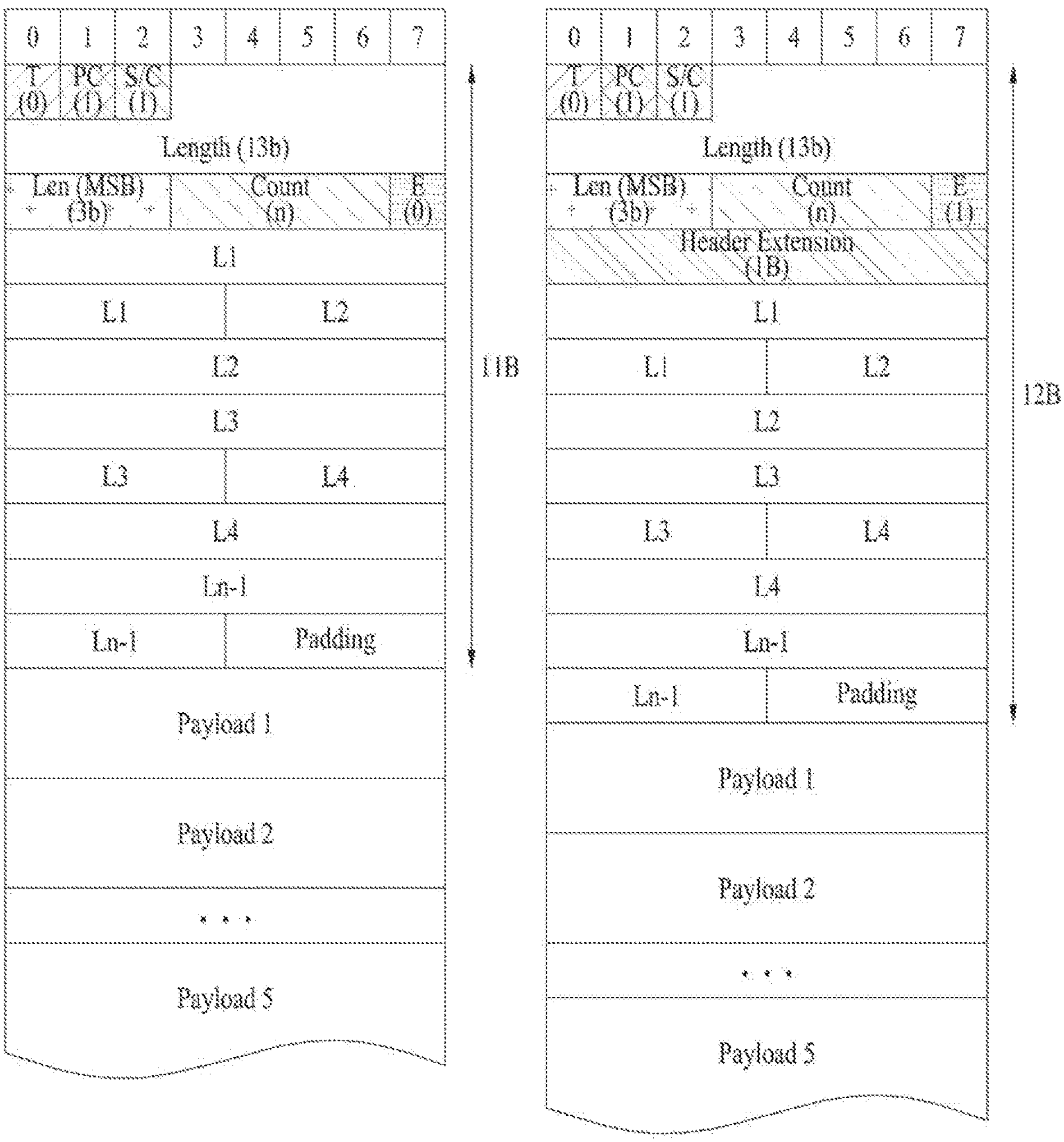
FIG. 80 is a view illustrating the structure of a header of a link layer packet, in a case in which two or more input packets are included in a payload of the link layer packet, according to an embodiment of the present invention.

FIG. 80 is a view illustrating the structure of a header of a link layer packet, in a case in which two or more input packets are included in a payload of the link layer packet, according to an embodiment of the present invention.

In a case in which the value of the aforementioned T element is '0', the value of the PC element is '1', and the value of the S/C element is '1', the structure of the header may be changed as shown based on the value of the E element.

This embodiment shows a case in which, when an extension header exists, the size of the extension header is 1 byte.

This embodiment shows the structure of the header in a case in which an IP packet, which is an input packet, is included in the link layer packet.

The elements or fields included in the respective structures of the header have been previously described.

Figure 81:
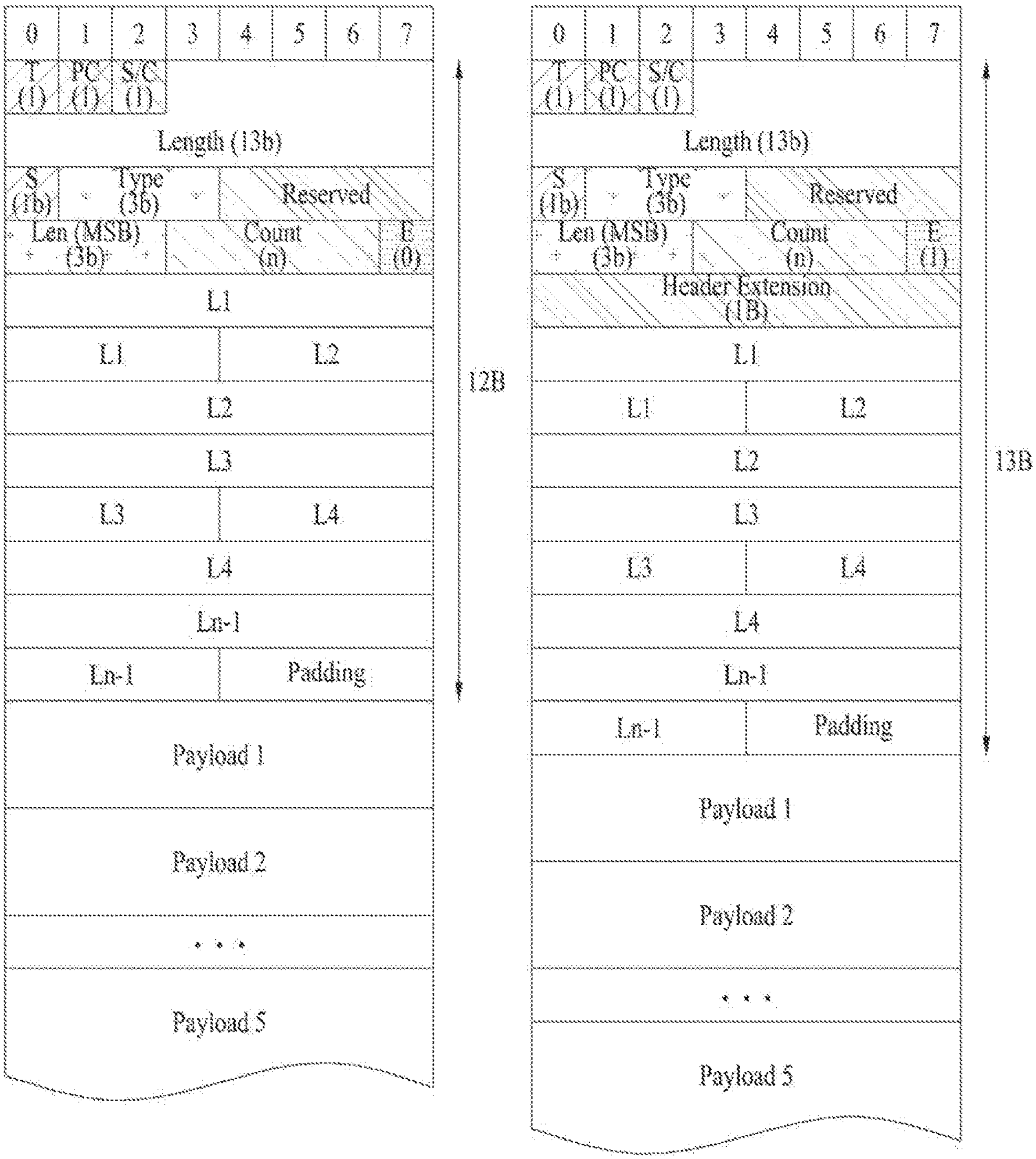
FIG. 81 is a view illustrating the structure of a header of a link layer packet, in a case in which two or more input packets are included in a payload of the link layer packet, according to an embodiment of the present invention.

FIG. 81 is a view illustrating the structure of a header of a link layer packet, in a case in which two or more input packets are included in a payload of the link layer packet, according to an embodiment of the present invention.

In a case in which the value of the aforementioned T element is '1', the value of the PC element is '1', and the value of the S/C element is '1', the structure of the header may be changed as shown based on the value of the E element.

This embodiment shows a case in which, when an extension header exists, the size of the extension header is 1 byte.

This embodiment shows the structure of the header in a case in which another input packet, rather than an IP packet, is included in the link layer packet. The type of the input packet may be identified using the S element and/or the packet type element (the type element), as previously described.

The elements or fields included in the respective structures of the header have been previously described.

Figure 82:
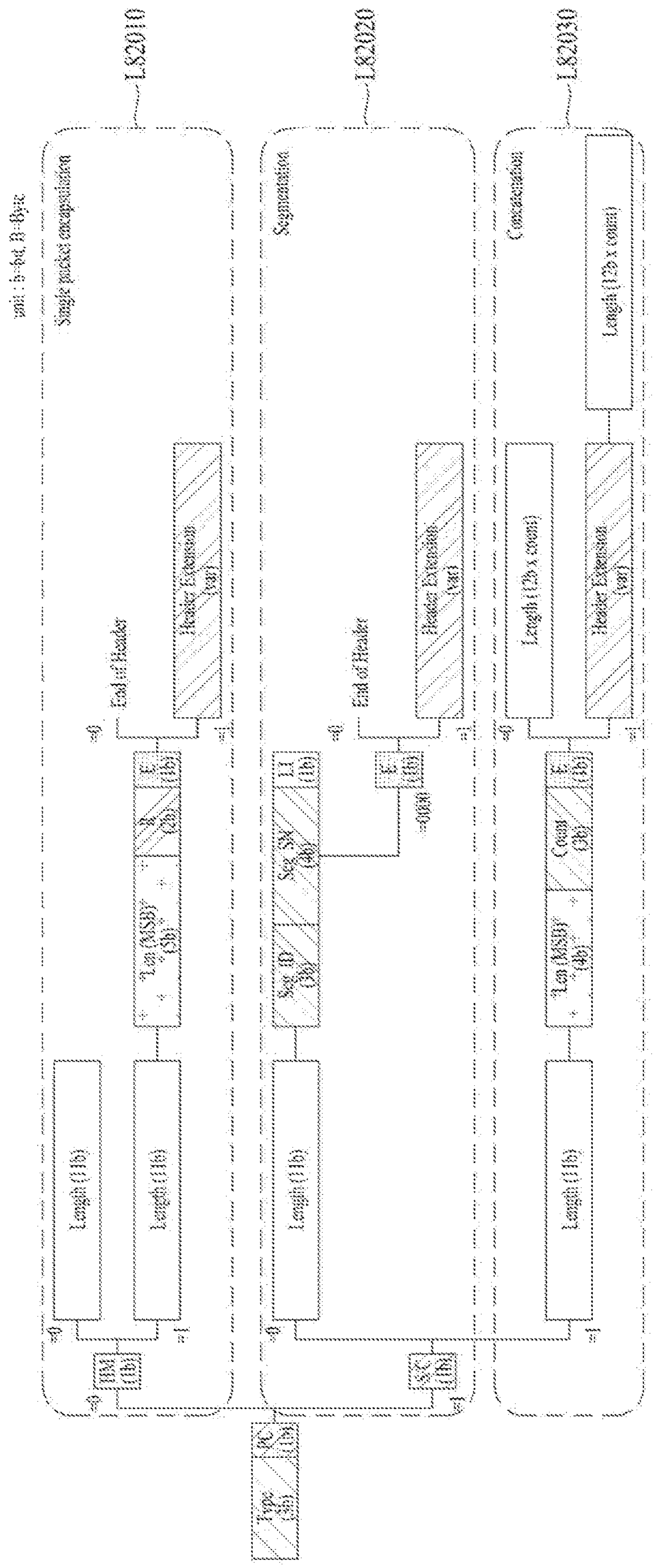
FIG. 82 is a view illustrating the structure of a link layer packet of a first option according to an embodiment of the present invention.

FIG. 82 is a view illustrating the structure of a link layer packet of a first option according to an embodiment of the present invention.

Referring to this figure, it can be seen that the structure of a header of the link layer packet may exist in various forms based on the value of each element or field included in the link layer packet. In this specification, the terms "element" and "field" may have the same meaning.

According to an embodiment of the present invention, the structure of the header of the link layer packet of the first option may be changed based on a mode in which an input packet is encapsulated into the link layer packet.

According to a first embodiment of the present invention, in a case in which one input packet is encapsulated into one link layer packet (single packet encapsulation) (L82010), the header of the link layer packet of the first option may include a base header, an additional header, and/or an optional header. The base header may include a type element, a PC element, an HM element, and/or a length element. The additional header may include a Len (MSB) element, an R element, and/or an E element. The optional header may include a header extension element. The respective elements will be described hereinafter in detail.

According to a second embodiment of the present invention, in a case in which one input packet is segmented into a plurality of segments, and one of the segments is encapsulated into one link layer packet (segmentation) (L82020), the header of the link layer packet of the first option may include a base header, an additional header, and/or an optional header. The base header may include a type element, a PC element, an S/C element, and/or a length element. The additional header may include a Seg_ID element, a Seg_SN element, an LI element, and/or an E element. The optional header may include a header extension element. The respective elements will be described hereinafter in detail.

According to a third embodiment of the present invention, in a case in which a plurality of input packets is encapsulated into one link layer packet (concatenation) (L82030), the header of the link layer packet of the first option may include a base header, an additional header, and/or an optional header. The base header may include a type element, a PC element, an S/C element, and/or a length element. The additional header may include a Len (MSB) element, a count element, an E element, and/or a component length element. The optional header may include a header extension element. The respective elements will be described hereinafter in detail.

In the link layer packet of the first option according to the second embodiment of the present invention, the payload may be supported to have a length of up to 32 kB.

In the link layer packet of the first option according to the second embodiment of the present invention, the header extension element may be included only in a header of a link layer packet including the first segment.

In the link layer packet of the first option according to the third embodiment of the present invention, the payload may be supported to have a length of up to 16 or 32 kB. In a case in which 11b are assigned to the component length element, the payload may be supported to have a length of up to 16 kB (11b Component Length*3b Count=16 kB). In a case in which 12b are assigned to the component length element, the payload may be supported to have a length of up to 32 kB (12b Component Length*3b Count=32 kB).

Figure 83:
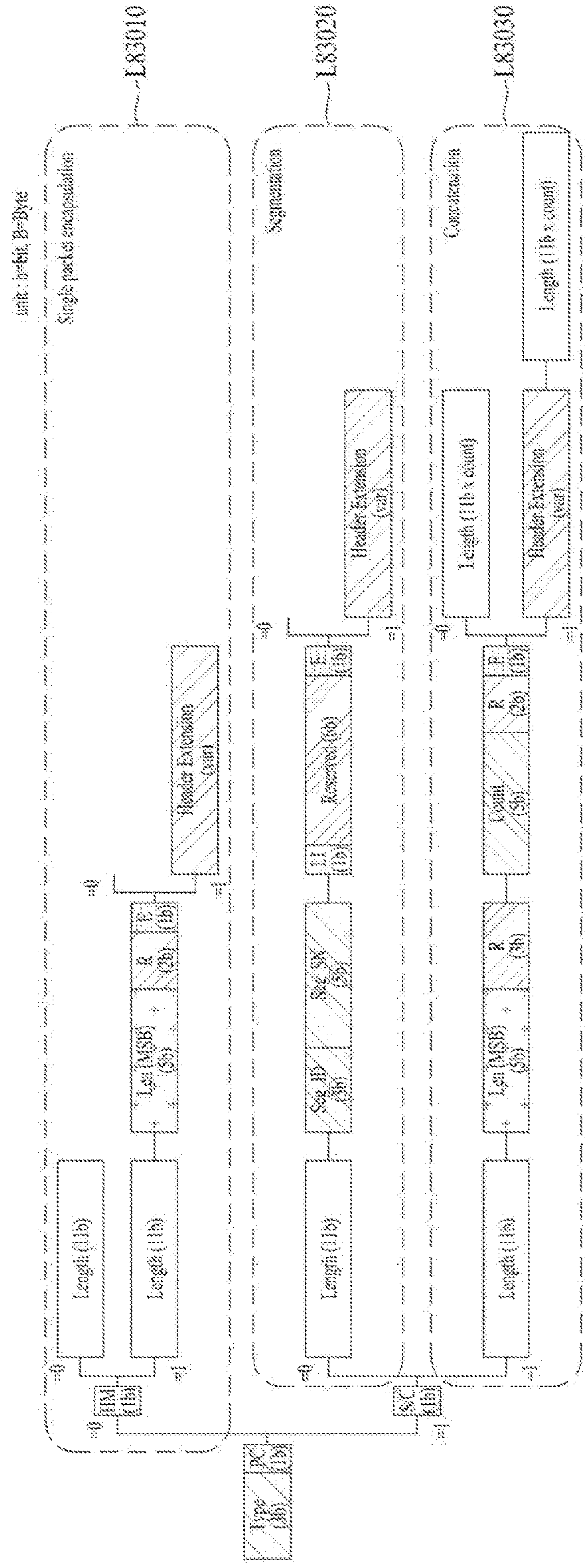
FIG. 83 is a view illustrating the structure of a link layer packet of a second option according to an embodiment of the present invention.

FIG. 83 is a view illustrating the structure of a link layer packet of a second option according to an embodiment of the present invention.

Referring to this figure, it can be seen that the structure of a header of the link layer packet may exist in various forms based on the value of each element or field included in the link layer packet. In this specification, the terms "element" and "field" may have the same meaning.

According to an embodiment of the present invention, the structure of the header of the link layer packet of the second option may be changed based on a mode in which an input packet is encapsulated into the link layer packet.

According to a first embodiment of the present invention, in a case in which one input packet is encapsulated into one link layer packet (single packet encapsulation) (L83010), the header of the link layer packet of the second option may include a base header, an additional header, and/or an optional header. The base header may include a type element, a PC element, an HM element, and/or a length element. The additional header may include a Len (MSB) element, an R element, and/or an E element. The optional header may include a header extension element. The respective elements will be described hereinafter in detail.

According to a second embodiment of the present invention, in a case in which one input packet is segmented into a plurality of segments, and one of the segments is encapsulated into one link layer packet (segmentation) (L83020), the header of the link layer packet of the second option may include a base header, an additional header, and/or an optional header. The base header may include a type element, a PC element, an S/C element, and/or a length element. The additional header may include a Seg_ID element, a Seg_SN element, an LI element, a reserved element, and/or an E element. The optional header may include a header extension element. The respective elements will be described hereinafter in detail.

According to a third embodiment of the present invention, in a case in which a plurality of input packets is encapsulated into one link layer packet (concatenation) (L83030), the header of the link layer packet of the second option may include a base header, an additional header, and/or an optional header. The base header may include a type element, a PC element, an S/C element, and/or a length element. The additional header may include a Len (MSB) element, an R element, a count element, an E element, and/or a component length element. The optional header may include a header extension element. The respective elements will be described hereinafter in detail.

In the link layer packet of the second option described above, a packet having a maximum of 64 kB may be supported.

In the link layer packet of the second option according to the second embodiment of the present invention, a 1B overhead may be generated, compared to the link layer packet of the first option. The link layer packet of the second option according to the second embodiment of the present invention may have 6 reserved bits (reserved element).

In the link layer packet of the second option according to the third embodiment of the present invention, a 1B overhead may be generated, compared to the link layer packet of the first option. The link layer packet of the second option according to the third embodiment of the present invention may have 5 reserved bits. The link layer packet of the second option according to the third embodiment of the present invention may have a component length element having 11 bits.

The respective elements included in the base header of the first option and/or the second option will be described hereinafter in detail.

The type element may identify the protocol type of an input packet. That is, this element may indicate the original protocol type or packet type of input data before the input data are encapsulated into a light layer packet. This element may have a size of 3 bits. In a case in which the value of this element is 000, this element may indicate that the packet type of the input packet is an IPv4 packet. In a case in which the value of this element is 001, this element may indicate that the packet type of the input packet is a compressed IP packet. In a case in which the value of this element is 010, this element may indicate that the packet type of the input packet is an MPEG-2 Transport Stream packet. In a case in which the value of this element is 100, this element may indicate that the packet type of the input packet is a link layer signaling packet (L2 Signaling). In a case in which the value of this element is 111, this element may indicate a packet type extension. Here, the meanings indicated by the values of this element may be changed. That is, in a case in which the value of this element is 010, it may be used as a value indicating that the packet type of the input packet is a compressed IP packet. This element may be named a Packet_Type field. The detailed description of this element has been previously made in the description of the Packet_Type field.

The PC element (the packet configuration element) may indicate the configuration of a payload. This element may have a size of 1 bit. In a case in which the value of this element is 0, this element may indicate that this link layer packet transmits the entirety of one input packet. In addition, in a case in which the value of this element is 0, this element may indicate that the following element is an HM element. In a case in which the value of this element is 1, this element may indicate that this link layer packet transmits one or more input packets (concatenation) or transmits a portion of a single input packet (segmentation). In addition, in a case in which the value of this element is 1, this element may indicate that the following element is an S/C element. This element may be named a Payload_Configuration field. The detailed description of this element has been previously made in the description of the Payload_Configuration field.

The HM element (the header mode element) indicates whether this link layer packet is a short packet or a long packet. In a case in which this element is set to 0, this element may be a 1-bit field indicating that no additional header exists and the length of the payload of the link layer packet is less than 2048 bytes. This value may be changed depending on embodiments. In a case in which the value of this element is 1, this element may indicate that an additional header for one packet exists after a length element. In this case, the length of the payload may be greater than 2047 bytes, and/or option features may be used (sub stream identification, header extension, etc.). This value may be changed depending on embodiments. This field may exist only in a case in which the Payload_Configuration element of the link layer packet has a value of 0. This element may be named a Header_Mode field. The detailed description of this element has been previously made in the description of the Header_Mode field.

The S/C element may be a 1-bit field indicating that, in a case in which the value of the S/C element is set to 0, a payload transmits segments of an input packet, and an additional header for segmentation exists after a length element. In a case in which the value of this element is 1, this element may indicate that the payload transmits more than one complete input packet, and an additional header for concatenation exists after a length field. This field may exist only in a case in which the value of the Payload_Configuration field is 0. This element may be named a Segmentation_Concatenation (S/C) field. The detailed description of this element has been previously made in the description of the Segmentation_Concatenation (S/C) field.

The length element indicates the length of each packet in bytes. This element may have a size of 11 bits. The number of bits in this element may be changed to a number of bits other than 11. This element may be named a length field. The detailed description of this element has been previously made in the description of the length field.

The respective elements included in the additional header of the link layer packet according to the first embodiment (single packet encapsulation) of the first option and/or the second option will be described hereinafter in detail.

The Len (MSB) element indicates most significant bits (MSBs) of the length of the payload in bytes in the current link layer packet. This element may have a size of 5 bits. Accordingly, the maximum length of the payload may be 65535 bytes. The number of bits in this element may be changed to a number of bits other than 5. This element may be named a Length_MSB field. The detailed description of this element has been previously made in the description of the Length_MSB field.

The R element indicates reserved bits.

The E element indicates whether an optional header exists. In a case in which the value of this element is 0, this element indicates that no header extension for the optional header exists. In a case in which the value of this element is 1, this element indicates that a header extension for the optional header exists. This element may be named an HEF field. The detailed description of this element has been previously made in the description of the HEF field.

The respective elements included in the additional header of the link layer packet according to the second embodiment (segmentation) of the first option and/or the second option will be described hereinafter in detail.

The Seg_ID element is used in a case in which segments of an input packet are included in the payload of the link layer packet. This element may have a size of 3 bits. The number of bits in this element may be changed to a number of bits other than 3. Link layer packets including one or more segments belonging to the same input packet may have the same segment ID value. The segment ID value indicated by this element is not reused until the transmission of the last segment of the input packet is completed. According to an embodiment of the present invention, this element may be omitted.

The Seg_SN element indicates the number of segments included in the payload of this link layer packet. This element may have an unsigned integer value of 4 bits. The number of bits in this element may be changed. The value of this element for the first segment of the input packet may be set to '0x0'. This element may be incremented by 1 for every additional segment belonging to the input packet. This element may be named a Segment_Sequence_Number field. The detailed description of this element has been previously made in the description of the Segment_Sequence_Number field.

The LI element indicates whether the segment included in the payload of this link layer packet is the last segment. This element may have a size of 1 bit. The number of bits in this element may be changed. In a case in which this segment is the last segment, this element may have a value of 1. This element may exist in a case in which the value of the Seg_SN element is not 0x0'. This element may be named a Last_Segment_Indicator (LSI) field. The detailed description of this element has been previously made in the description of the Last_Segment_Indicator (LSI) field.

The reserved element indicates reserved bits.

The E element indicates whether the optional header exists. In a case in which the value of this element is 0, this element indicates that no header extension for the optional header exists. In a case in which the value of this element is 1, this element indicates that header extension for the optional header exists. This element may be named an HEF field. The detailed description of this element has been previously made in the description of the HEF field. The E element included in the header of the link layer packet of the first option according to the second embodiment may exist only in a case in which the value of the Seg_ID element is '0x0'. According to another embodiment of the present invention, the E element included in the header of the link layer packet of the first option according to the second embodiment may always be included, irrespective of the value of the Seg_ID element.

The respective elements included in the additional header of the link layer packet according to the third embodiment (concatenation) of the first option and/or the second option will be described hereinafter in detail.

The Len (MSB) element indicates most significant bits (MSBs) of the length of the payload in bytes in the current link layer packet. This element may have a size of 4 bits. Accordingly, the maximum length of the payload for concatenation may be 32767 bytes. The number of bits in this element may be changed to a number of bits other than 4. This element may be named a Length_MSB field. The detailed description of this element has been previously made in the description of the Length_MSB field.

The count element indicates the number of input packets included in this link layer packet in a case which two or more input packets exist in the payload of this link layer packet. This element may be named a count field. The detailed description of this element has been previously made in the description of the count field.

The E element indicates whether an optional header exists. In a case in which the value of this element is 0, this element indicates that no header extension for the optional header exists. In a case in which the value of this element is 1, this element indicates that a header extension for the optional header exists. This element may be named an HEF field. The detailed description of this element has been previously made in the description of the HEF

FIELD

The component length element may indicate the length of each packet in bytes. That is, this element may indicate the length of each of two or more input packets included in the payload. This element may have a size of 12 bits or 2 bytes. The number of bits in this element may be changed. This element may be named a Component_Length field. The detailed description of this element has been previously made in the description of the Component_Length field.

The respective elements included in the optional header of the link layer packet of the first option and/or the second option will be described hereinafter in detail.

The header extension element, i.e. Header_Extension ( ), may include fields defined as follows. Extension_Type may be an 8-bit field that is capable of indicating the type of Header_Extension ( ). Extension_Length may be an 8-bit field that is capable of indicating the byte length of Header_Extension ( ) counted from the next byte to the last byte of Header_Extension ( ). Extension_Byte may be bytes indicating the value of Header_Extension ( ). This element may be named Header_Extension ( ). The detailed description of this element has been previously made in the description of the Header_Extension ( ) field.

According to another embodiment of the present invention, the additional header of the link layer packet of the first option and/or the second option according to the first embodiment and/or the second embodiment may further include an SIF element, and the optional header of the link layer packet of the first option and/or the second option may further include an SID element. The SIF element may be named a Sub-stream Identifier Flag (SIF) field, and the detailed description of this element has been previously made in the description of the Sub-stream Identifier Flag (SIF) field. The SID element may be named an SID field, and the detailed description of this element has been previously made in the description of the SID field.

FIG. 84 is a view illustrating the description of a PC element based on the value thereof according to an embodiment of the present invention.

The detailed description of this figure has been previously made in the description of the PC element, which was described with reference to the preceding figure.

Figure 85:
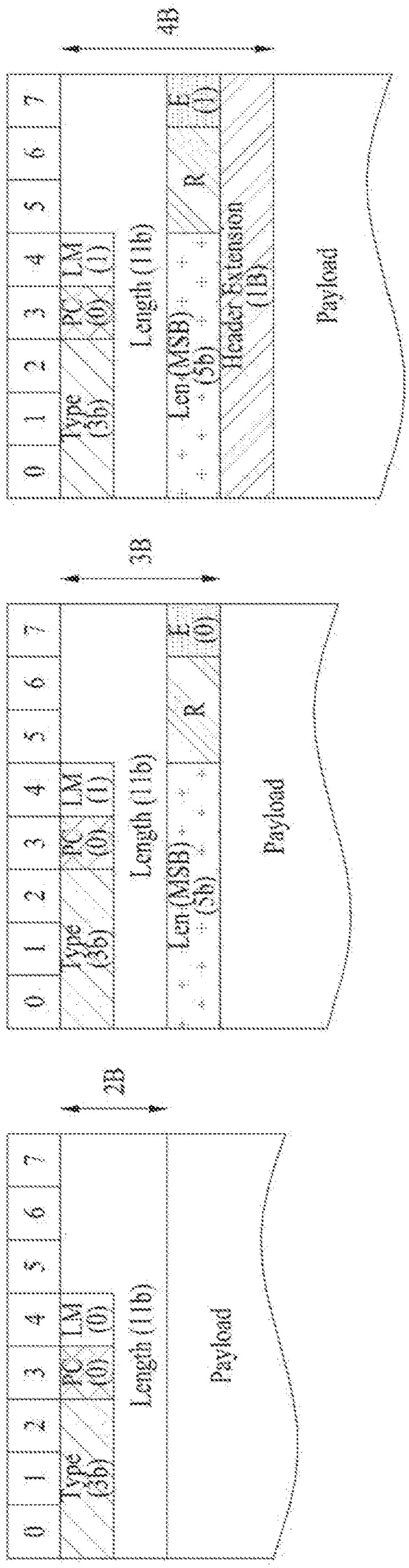
FIG. 85 is a view illustrating the structure of a link layer packet of a first option according to a first embodiment (single packet encapsulation) of the present invention.

FIG. 85 is a view illustrating the structure of a link layer packet of a first option according to a first embodiment (single packet encapsulation) of the present invention.

In a case in which the value of the aforementioned PC element is '0', the structure of the header may be changed as shown based on the value of the HM element and/or the E element.

This embodiment shows a case in which, when an extension header exists, the size of the extension header is 1 byte. The size of the extension header may be changed.

This embodiment shows the structure of the header in a case in which an IP packet, as an input packet, is included in the link layer packet.

The elements or fields included in the respective structures of the header have been previously described.

Figure 86:
FIG. 86 is a view illustrating the structure of a link layer packet of a first option according to a second embodiment (segmentation) of the present invention.

FIG. 86 is a view illustrating the structure of a link layer packet of a first option according to a second embodiment (segmentation) of the present invention.

In a case in which the value of the aforementioned PC element is '1' and the value of the S/C element is '0', the structure of the header may be changed as shown based on the value of the E element.

This embodiment shows a case in which, when an extension header exists, the size of the extension header is 1 byte. The size of the extension header may be changed.

The elements or fields included in the respective structures of the header have been previously described.

Figure 87:
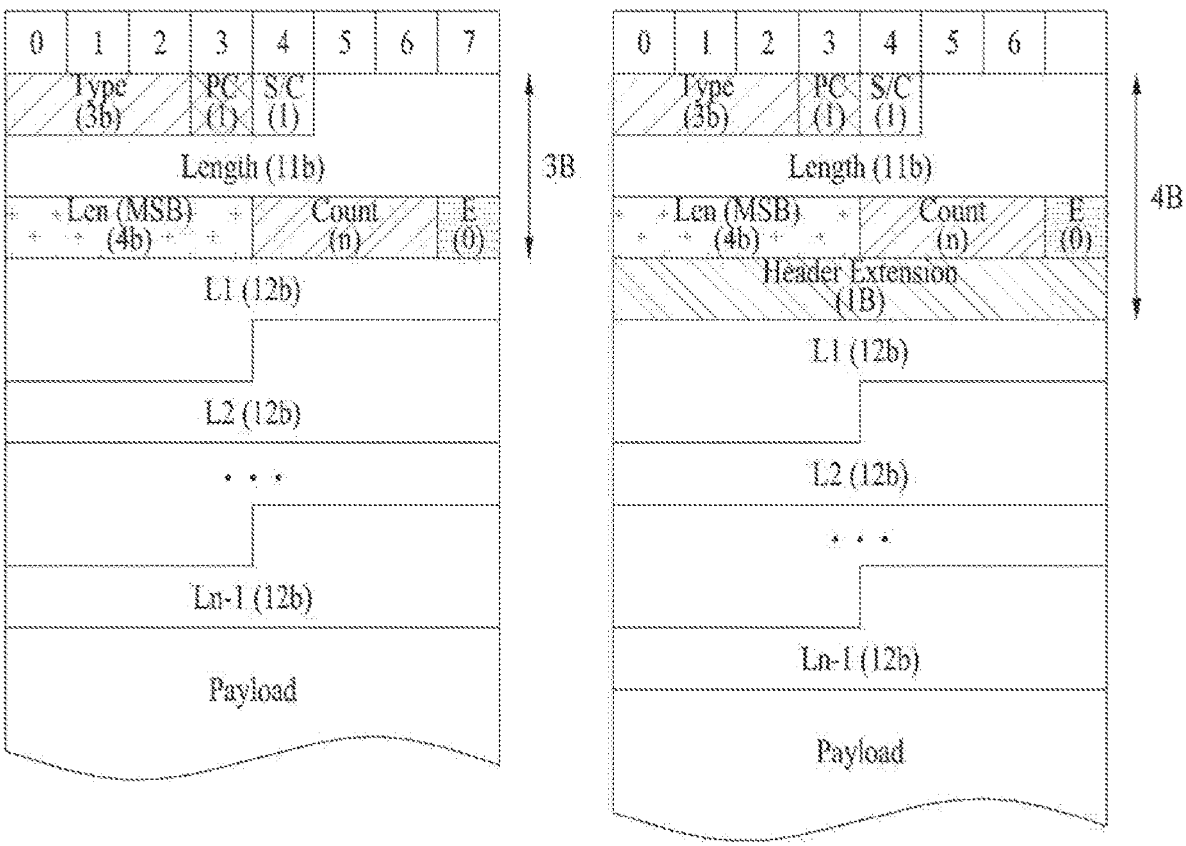
FIG. 87 is a view illustrating the structure of a link layer packet of a first option according to a third embodiment (concatenation) of the present invention.

FIG. 87 is a view illustrating the structure of a link layer packet of a first option according to a third embodiment (concatenation) of the present invention.

In a case in which the value of the aforementioned PC element is '1' and the value of the S/C element is '1', the structure of the header may be changed as shown based on the value of the E element.

This embodiment shows a case in which, when an extension header exists, the size of the extension header is 1 byte. The size of the extension header may be changed.

This embodiment shows the structure of the header in a case in which an IP packet, as an input packet, is included in the link layer packet.

In this embodiment, a component length element having a size of 12 bits is used.

The elements or fields included in the respective structures of the header have been previously described.

Figure 88:
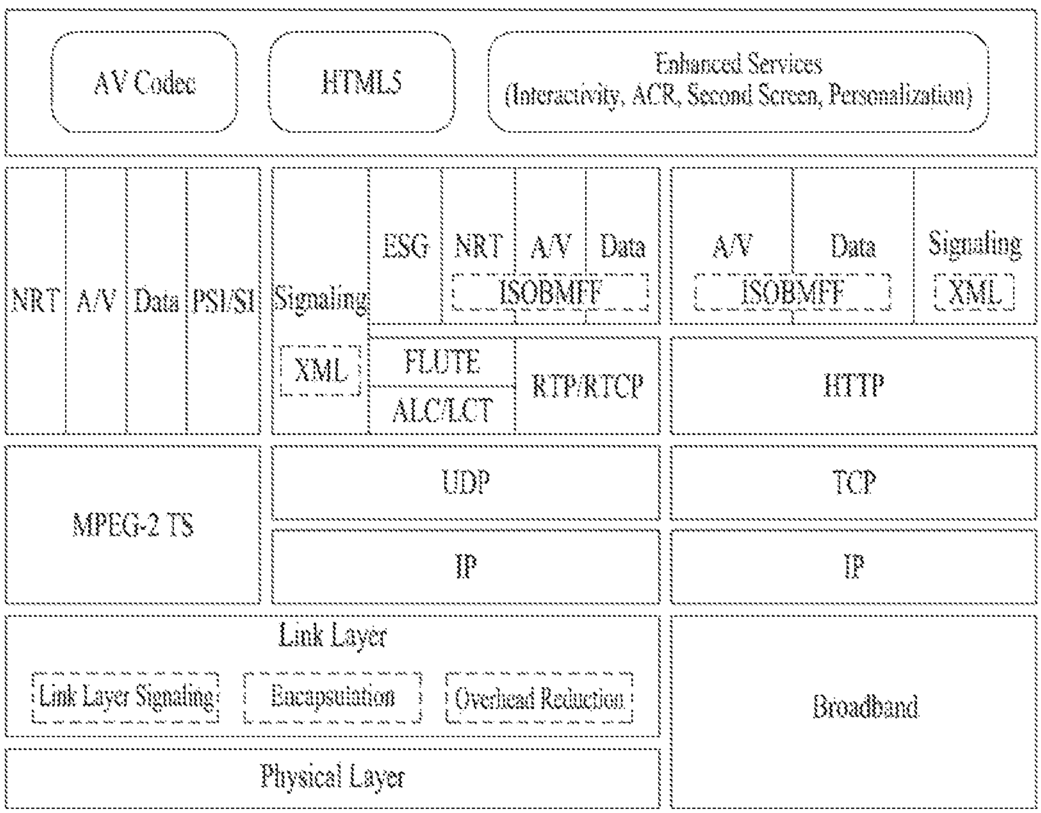
FIG. 88 is a view illustrating a protocol stack for a next generation broadcasting system according to an embodiment of the present invention.

FIG. 88 is a view showing a protocol stack for a next generation broadcasting system according to an embodiment of the present invention.

The broadcasting system according to the present invention may correspond to a hybrid broadcasting system in which an Internet Protocol (IP) centric broadcast network and a broadband are coupled.

The broadcasting system according to the present invention may be designed to maintain compatibility with a conventional MPEG-2 based broadcasting system.

The broadcasting system according to the present invention may correspond to a hybrid broadcasting system based on coupling of an IP centric broadcast network, a broadband network, and/or a mobile communication network (or a cellular network).

Referring to the figure, a physical layer may use a physical protocol adopted in a broadcasting system, such as an ATSC system and/or a DVB system. For example, in the physical layer according to the present invention, a transmitter/receiver may transmit/receive a terrestrial broadcast signal and convert a transport frame including broadcast data into an appropriate form.

In an encapsulation layer, an IP datagram is acquired from information acquired from the physical layer or the acquired IP datagram is converted into a specific frame (for example, an RS Frame, GSE-lite, GSE, or a signal frame). The frame main include a set of IP datagrams. For example, in the encapsulation layer, the transmitter include data processed from the physical layer in a transport frame or the receiver extracts an MPEG-2 TS and an IP datagram from the transport frame acquired from the physical layer.

A fast information channel (FIC) includes information (for example, mapping information between a service ID and a frame) necessary to access a service and/or content. The FIC may be named a fast access channel (FAC).

The broadcasting system according to the present invention may use protocols, such as an Internet Protocol (IP), a User Datagram Protocol (UDP), a Transmission Control Protocol (TCP), an Asynchronous Layered Coding/Layered Coding Transport (ALC/LCT), a Rate Control Protocol/RTP Control Protocol (RCP/RTCP), a Hypertext Transfer Protocol (HTTP), and a File Delivery over Unidirectional Transport (FLUTE). A stack between these protocols may refer to the structure shown in the figure.

In the broadcasting system according to the present invention, data may be transported in the form of an ISO based media file format (ISOBMFF). An Electrical Service Guide (ESG), Non Real Time (NRT), Audio/Video (A/V), and/or general data may be transported in the form of the ISOBMFF.

Transport of data through a broadcast network may include transport of a linear content and/or transport of a non-linear content.

Transport of RTP/RTCP based A/V and data (closed caption, emergency alert message, etc.) may correspond to transport of a linear content.

An RTP payload may be transported in the form of an RTP/AV stream including a Network Abstraction Layer (NAL) and/or in a form encapsulated in an ISO based media file format. Transport of the RTP payload may correspond to transport of a linear content. Transport in the form encapsulated in the ISO based media file format may include an MPEG DASH media segment for A/V, etc.

Transport of a FLUTE based ESG, transport of non-timed data, transport of an NRT content may correspond to transport of a non-linear content. These may be transported in an MIME type file form and/or a form encapsulated in an ISO based media file format. Transport in the form encapsulated in the ISO based media file format may include an MPEG DASH media segment for A/V, etc.

Transport through a broadband network may be divided into transport of a content and transport of signaling data.

Transport of the content includes transport of a linear content (A/V and data (closed caption, emergency alert message, etc.)), transport of a non-linear content (ESG, non-timed data, etc.), and transport of a MPEG DASH based Media segment (A/V and data).

Transport of the signaling data may be transport including a signaling table (including an MPD of MPEG DASH) transported through a broadcasting network.

In the broadcasting system according to the present invention, synchronization between linear/non-linear contents transported through the broadcasting network or synchronization between a content transported through the broadcasting network and a content transported through the broadband may be supported. For example, in a case in which one UD content is separately and simultaneously transported through the broadcasting network and the broadband, the receiver may adjust the timeline dependent upon a transport protocol and synchronize the content through the broadcasting network and the content through the broadband to reconfigure the contents as one UD content.

An applications layer of the broadcasting system according to the present invention may realize technical characteristics, such as Interactivity, Personalization, Second Screen, and automatic content recognition (ACR). These characteristics are important in extension from ATSC 2.0 to ATSC 3.0. For example, HTML5 may be used for a characteristic of interactivity.

In a presentation layer of the broadcasting system according to the present invention, HTML and/or HTML5 may be used to identify spatial and temporal relationships between components or interactive applications.

In the present invention, signaling includes signaling information necessary to support effective acquisition of a content and/or a service. Signaling data may be expressed in a binary or XMK form. The signaling data may be transmitted through the terrestrial broadcasting network or the broadband.

A real-time broadcast A/V content and/or data may be expressed in an ISO Base Media File Format, etc. In this case, the A/V content and/or data may be transmitted through the terrestrial broadcasting network in real time and may be transmitted based on IP/UDP/FLUTE in non-real time. Alternatively, the broadcast A/V content and/or data may be received by receiving or requesting a content in a streaming mode using Dynamic Adaptive Streaming over HTTP (DASH) through the Internet in real time. In the broadcasting system according to the embodiment of the present invention, the received broadcast A/V content and/or data may be combined to provide various enhanced services, such as an Interactive service and a second screen service, to a viewer.

In a hybrid-based broadcast system of a TS and an IP stream, a link layer may be used to transmit data having a TS or IP stream type. When various types of data are to be transmitted through a physical layer, the link layer may convert the data into a format supported by the physical layer and deliver the converted data to the physical layer. In this way, the various types of data may be transmitted through the same physical layer. Here, the physical layer may correspond to a step of transmitting data using an MIMO/MISO scheme or the like by interleaving, multiplexing, and/or modulating the data.

The link layer needs to be designed such that an influence on an operation of the link layer is minimized even when a configuration of the physical layer is changed. In other words, the operation of the link layer needs to be configured such that the operation may be compatible with various physical layers.

The present invention proposes a link layer capable of independently operating irrespective of types of an upper layer and a lower layer. In this way, it is possible to support various upper layers and lower layers. Here, the upper layer may refer to a layer of a data stream such as a TS stream, an IP stream, or the like. Here, the lower layer may refer to the physical layer. In addition, the present invention proposes a link layer having a correctable structure in which a function supportable by the link layer may be extended/added/deleted. Moreover, the present invention proposes a scheme of including an overhead reduction function in the link layer such that radio resources may be efficiently used.

In this figure, protocols and layers such as IP, UDP, TCP, ALC/LCT, RCP/RTCP, HTTP, FLUTE, and the like are as described above.

In this figure, a link layer t88010 may be another example of the above-described data link (encapsulation) part. The present invention proposes a configuration and/or an operation of the link layer t88010. The link layer t88010 proposed by the present invention may process signaling necessary for operations of the link layer and/or the physical layer. In addition, the link layer t88010 proposed by the present invention may encapsulate TS and IP packets and the like, and perform overhead reduction in this process.

The link layer t88010 proposed by the present invention may be referred to by several terms such as data link layer, encapsulation layer, layer 2, and the like. According to a given embodiment, a new term may be applied to the link layer and used.

Figure 89:
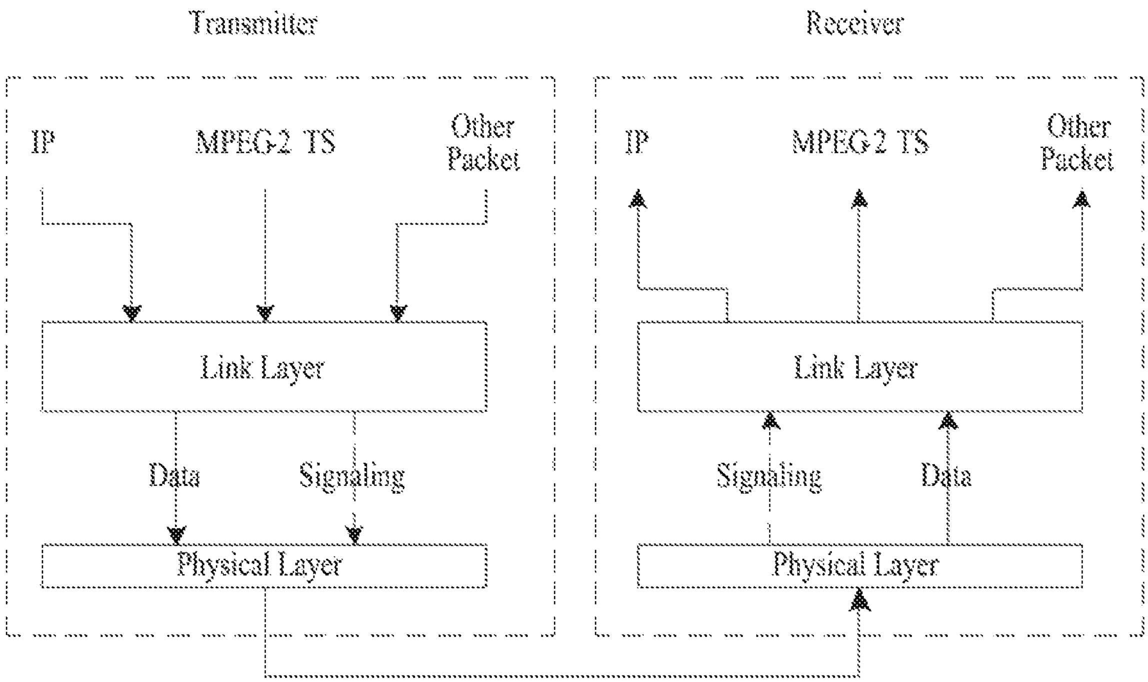
FIG. 89 is a view illustrating the interface of a link layer according to an embodiment of the present invention.

FIG. 89 is a conceptual diagram illustrating an interface of a link layer according to an embodiment of the present invention.

Referring to FIG. 89, the transmitter may consider an exemplary case in which IP packets and/or MPEG-2 TS packets mainly used in the digital broadcasting are used as input signals. The transmitter may also support a packet structure of a new protocol capable of being used in the next generation broadcast system. The encapsulated data of the link layer and signaling information may be transmitted to a physical layer. The transmitter may process the transmitted data (including signaling data) according to the protocol of a physical layer supported by the broadcast system, such that the transmitter may transmit a signal including the corresponding data.

On the other hand, the receiver may recover data and signaling information received from the physical layer into other data capable of being processed in an upper layer. The receiver may read a header of the packet, and may determine whether a packet received from the physical layer indicates signaling information (or signaling data) or recognition data (or content data).

The signaling information (i.e., signaling data) received from the link layer of the transmitter may include first signaling information that is received from an upper layer and needs to be transmitted to an upper layer of the receiver; second signaling information that is generated from the link layer and provides information regarding data processing in the link layer of the receiver; and/or third signaling information that is generated from the upper layer or the link layer and is transferred to quickly detect specific data (e.g., service, content, and/or signaling data) in a physical layer.

Figure 90:
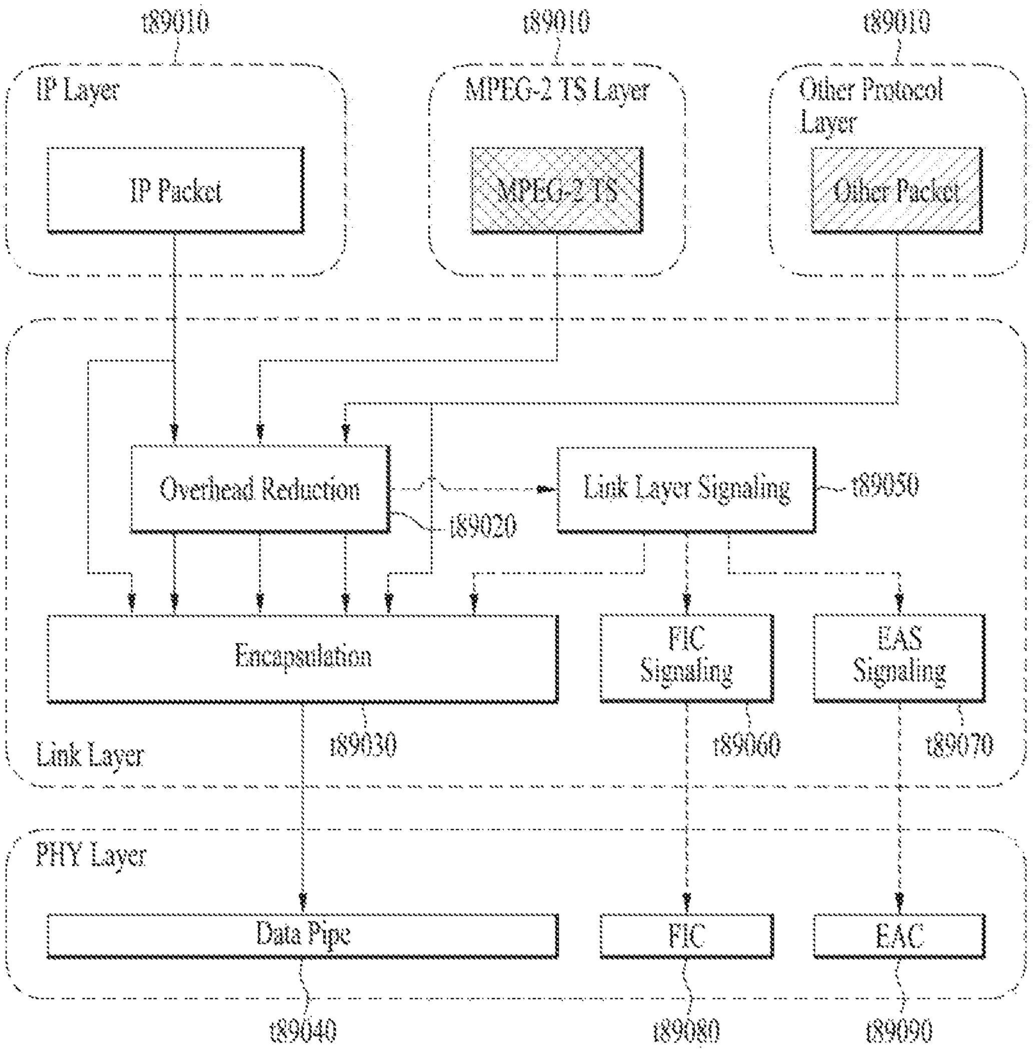
FIG. 90 is a view illustrating an operation diagram of a normal mode, which is one of the operation modes of a link layer according to an embodiment of the present invention.

FIG. 90 illustrates an operation in a normal mode corresponding to one of operation modes of a link layer according to an embodiment of the present invention.

The link layer proposed by the present invention may have various operation modes for compatibility between an upper layer and a lower layer. The present invention proposes a normal mode and a transparent mode of the link layer. Both the operation modes may coexist in the link layer, and an operation mode to be used may be designated using signaling or a system parameter. According to a given embodiment, one of the two operation modes may be implemented. Different modes may be applied according to an IP layer, a TS layer, and the like input to the link layer. In addition, different modes may be applied for each stream of the IP layer and for each stream of the TS layer.

According to a given embodiment, a new operation mode may be added to the link layer. The new operation mode may be added based on configurations of the upper layer and the lower layer. The new operation mode may include different interfaces based on the configurations of the upper layer and the lower layer. Whether to use the new operation mode may be designated using signaling or a system parameter.

In the normal mode, data may be processed through all functions supported by the link layer, and then delivered to a physical layer.

First, each packet may be delivered to the link layer from an IP layer, an MPEG-2 TS layer, or another particular layer t89010. In other words, an IP packet may be delivered to the link layer from an IP layer. Similarly, an MPEG-2 TS packet may be delivered to the link layer from the MPEG-2 TS layer, and a particular packet may be delivered to the link layer from a particular protocol layer.

Each of the delivered packets may go through or not go through an overhead reduction process t89020, and then go through an encapsulation process t89030.

First, the IP packet may go through or not go through the overhead reduction process t89020, and then go through the encapsulation process t89030. Whether the overhead reduction process t89020 is performed may be designated by signaling or a system parameter. According to a given embodiment, the overhead reduction process t89020 may be performed or not performed for each IP stream. An encapsulated IP packet may be delivered to the physical layer.

Second, the MPEG-2 TS packet may go through the overhead reduction process t89020, and go through the encapsulation process t89030. The MPEG-2 TS packet may not be subjected to the overhead reduction process t89020 according to a given embodiment. However, in general, a TS packet has sync bytes (0x47) and the like at the front and thus it may be efficient to eliminate such fixed overhead. The encapsulated TS packet may be delivered to the physical layer.

Third, a packet other than the IP or TS packet may or may not go through the overhead reduction process t89020, and then go through the encapsulation process t89030. Whether or not the overhead reduction process t89020 is performed may be determined according to characteristics of the corresponding packet. Whether the overhead reduction process t89020 is performed may be designated by signaling or a system parameter. The encapsulated packet may be delivered to the physical layer.

In the overhead reduction process t89020, a size of an input packet may be reduced through an appropriate scheme. In the overhead reduction process t89020, particular information may be extracted from the input packet or generated. The particular information is information related to signaling, and may be transmitted through a signaling region. The signaling information enables a receiver to restore an original packet by restoring changes due to the overhead reduction process t89020. The signaling information may be delivered to a link layer signaling process t89050.

The link layer signaling process t89050 may transmit and manage the signaling information extracted/generated in the overhead reduction process t89020. The physical layer may have physically/logically divided transmission paths for signaling, and the link layer signaling process t89050 may deliver the signaling information to the physical layer according to the divided transmission paths. Here, the above-described FIC signaling process t89060, EAS signaling process t89070, or the like may be included in the divided transmission paths. Signaling information not transmitted through the divided transmission paths may be delivered to the physical layer through the encapsulation process t89030.

Signaling information managed by the link layer signaling process t89050 may include signaling information delivered from the upper layer, signaling information generated in the link layer, a system parameter, and the like. Specifically, the signaling information may include signaling information delivered from the upper layer to be subsequently delivered to an upper layer of the receiver, signaling information generated in the link layer to be used for an operation of a link layer of the receiver, signaling information generated in the upper layer or the link layer to be used for rapid detection in a physical layer of the receiver, and the like.

Data going through the encapsulation process t89030 and delivered to the physical layer may be transmitted through a data pipe (DP) t89040. Here, the DP may be a physical layer pipe (PLP). Signaling information delivered through the above-described divided transmission paths may be delivered through respective transmission paths. For example, an FIC signal may be transmitted through an FIC t89080 designated in a physical frame. In addition, an EAS signal may be transmitted through an EAC t89090 designated in a physical frame. Information about presence of a dedicated channel such as the FIC, the EAC, or the like may be transmitted to a preamble area of the physical layer through signaling, or signaled by scrambling a preamble using a particular scrambling sequence. According to a given embodiment, FIC signaling/EAS signaling information may be transmitted through a general DP area, PLS area, or preamble rather than a designated dedicated channel.

The receiver may receive data and signaling information through the physical layer. The receiver may restore the received data and signaling information into a form processable in the upper layer, and deliver the restored data and signaling information to the upper layer. This process may be performed in the link layer of the receiver. The receiver may verify whether a received packet is related to the signaling information or the data by reading a header of the packet and the like. In addition, when overhead reduction is performed at a transmitter, the receiver may restore a packet, overhead of which has been reduced through the overhead reduction process, to an original packet. In this process, the received signaling information may be used.

Figure 91:
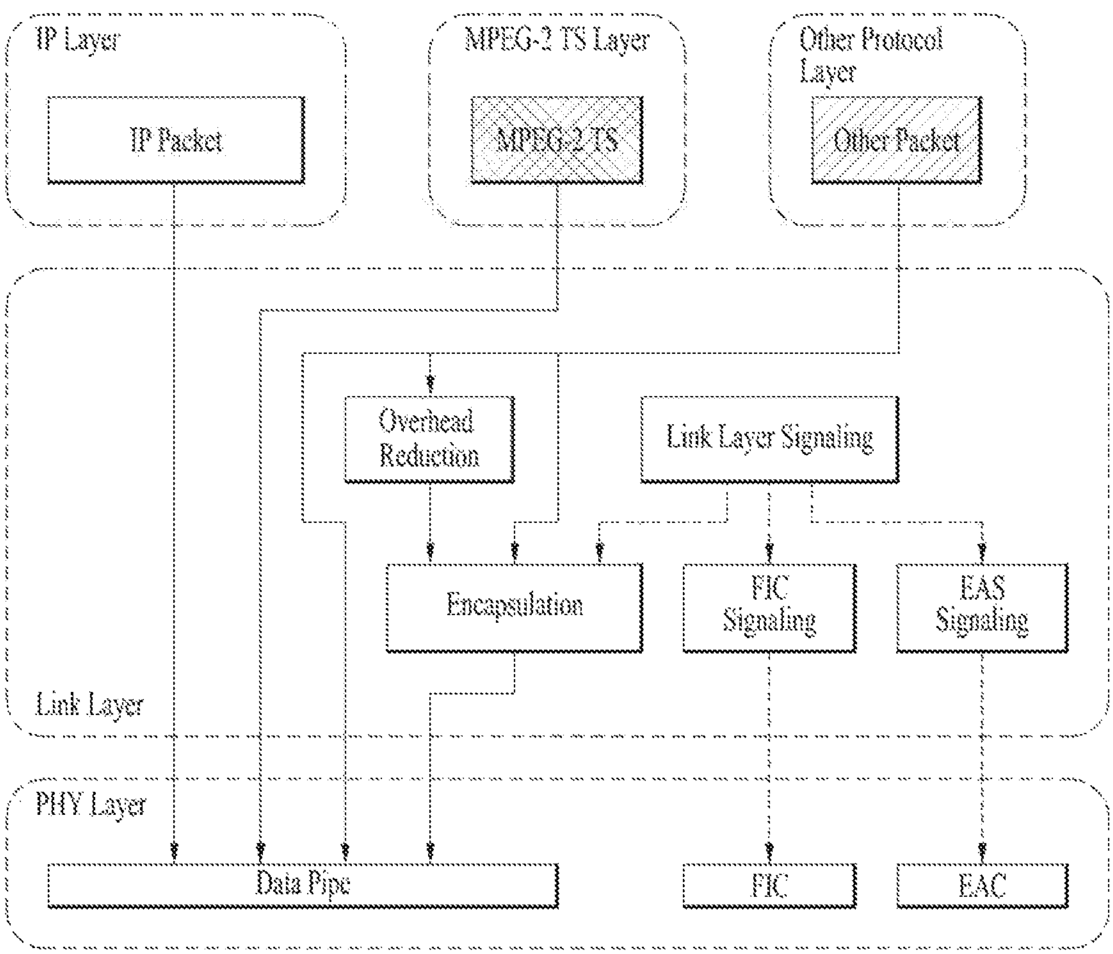
FIG. 91 is a view illustrating an operation diagram of a transparent mode, which is one of the operation modes of a link layer according to an embodiment of the present invention.

FIG. 91 illustrates an operation in a transparent mode corresponding to one of operation modes of a link layer according to an embodiment of the present invention.

In the transparent mode, data may not be subjected to functions supported by the link layer or may be subjected to some of the functions, and then delivered to a physical layer. In other words, in the transparent mode, a packet delivered to an upper layer may be delivered to a physical layer without going through a separate overhead reduction and/or encapsulation process. Other packets may go through the overhead reduction and/or encapsulation process as necessary. The transparent mode may be referred to as a bypass mode, and another term may be applied to the transparent mode.

According to a given embodiment, some packets may be processed in the normal mode and some packets may be processed in the transparent mode based on characteristics of the packets and a system operation.

A packet to which the transparent mode may be applied may be a packet having a type well known to a system. When the packet may be processed in the physical layer, the transparent mode may be used. For example, a well-known TS or IP packet may go through separate overhead reduction and input formatting processes in the physical layer and thus the transparent mode may be used in a link layer step. When the transparent mode is applied and a packet is processed through input formatting and the like in the physical layer, an operation such as the above-described TS header compression may be performed in the physical layer. On the other hand, when the normal mode is applied, a processed link layer packet may be treated as a GS packet and processed in the physical layer.

In the transparent mode, a link layer signaling module may be included when signal transmission needs to be supported. As described above, the link layer signaling module may transmit and manage signaling information. The signaling information may be encapsulated and transmitted through a DP, and FIC signaling information and EAS signaling information having divided transmission paths may be transmitted through an FIC and an EAC, respectively.

In the transparent mode, whether information corresponds to signaling information may be displayed using a fixed IP address and port number. In this case, the signaling information may be filtered to configure a link layer packet, and then transmitted through the physical layer.

Figure 92:
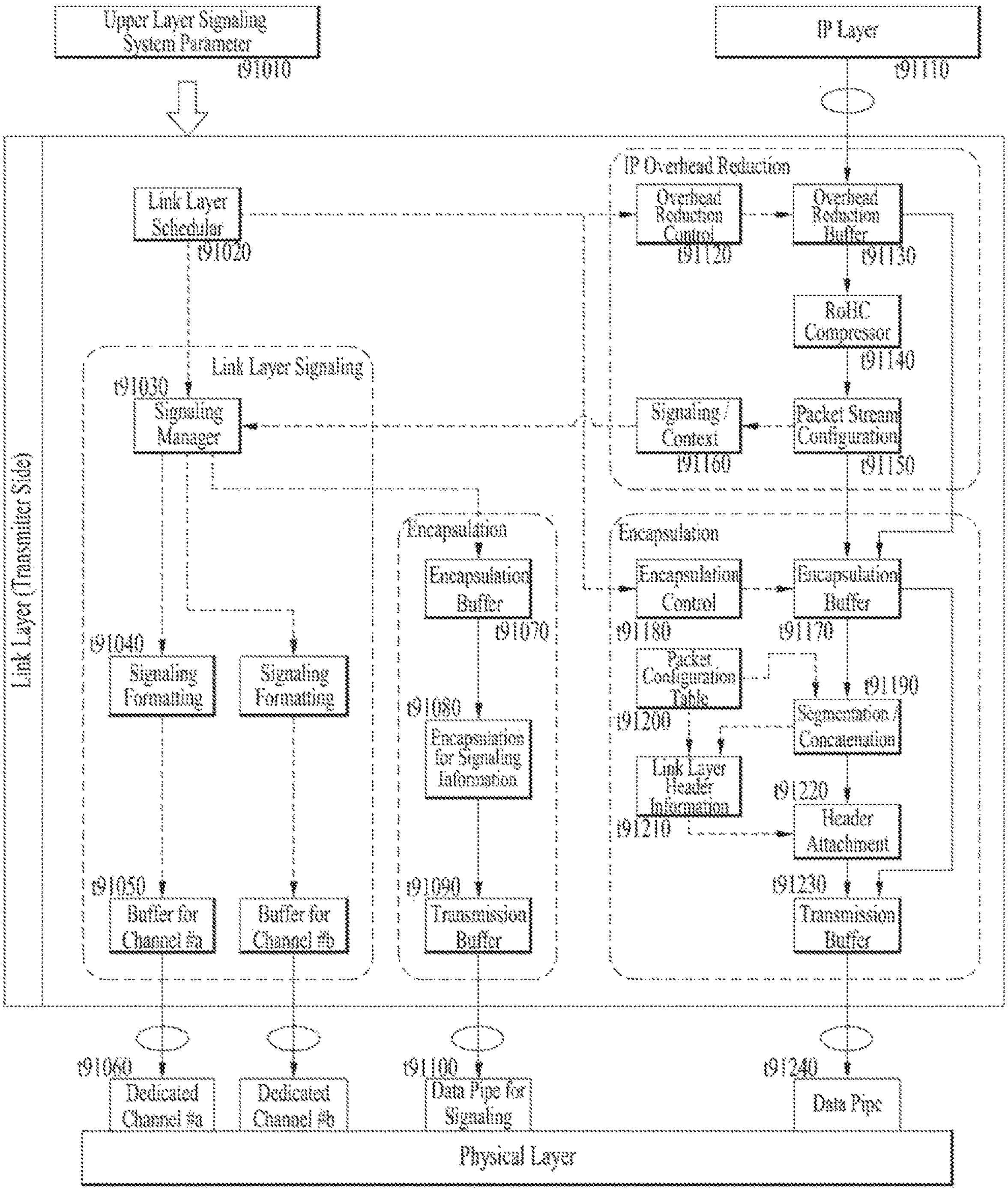
FIG. 92 is a view illustrating the structure of a link layer on a transmitter side according to an embodiment of the present invention (normal mode)

FIG. 92 illustrates a configuration of a link layer at a transmitter according to an embodiment of the present invention (normal mode).

The present embodiment is an embodiment presuming that an IP packet is processed. The link layer at the transmitter may largely include a link layer signaling part for processing signaling information, an overhead reduction part, and/or an encapsulation part from a functional perspective. The link layer at the transmitter may further include a scheduler t91020 for a control of the entire operation of the link layer and scheduling, input and output parts of the link layer, and/or the like.

First, upper layer signaling information and/or system parameter t91010 may be delivered to the link layer. In addition, an IP stream including IP packets may be delivered to the link layer from an IP layer t91110.

As described above, the scheduler t91020 may determine and control operations of several modules included in the link layer. The delivered signaling information and/or system parameter t91010 may be filtered or used by the scheduler t91020. Information corresponding to a part of the delivered signaling information and/or system parameter t91010 and necessary for a receiver may be delivered to the link layer signaling part. In addition, information corresponding to a part of the signaling information and necessary for an operation of the link layer may be delivered to an overhead reduction control block t91120 or an encapsulation control block t91180.

The link layer signaling part may collect information to be transmitted as signaling in the physical layer, and transform/configure the information in a form suitable for transmission. The link layer signaling part may include a signaling manager t91030, a signaling formatter t91040, and/or a buffer for channels t91050.

The signaling manager t91030 may receive signaling information delivered from the scheduler t91020, signaling delivered from the overhead reduction part, and/or context information. The signaling manager t91030 may determine paths for transmission of the signaling information with respect to delivered data. The signaling information may be delivered through the paths determined by the signaling manager t91030. As described in the foregoing, signaling information to be transmitted through divided channels such as an FIC, an EAS, and the like may be delivered to the signaling formatter t91040, and other signaling information may be delivered to an encapsulation buffer t91070.

The signaling formatter t91040 may format associated signaling information in forms suitable for respective divided channels so that the signaling information may be transmitted through separately divided channels. As described in the foregoing, the physical layer may include physically/logically divided separate channels. The divided channels may be used to transmit FIC signaling information or EAS-related information. The FIC or EAS-related information may be divided by the signaling manager t91030 and input to the signaling formatter t91040. The signaling formatter t91040 may format information such that the information is suitable for respective separate channels. Besides the FIC and the EAS, when the physical layer is designed to transmit particular signaling information through separately divided channels, a signaling formatter for the particular signaling information may be added. Through this scheme, the link layer may be compatible with various physical layers.

The buffer for channels t91050 may deliver signaling information delivered from the signaling formatter t91040 to designated dedicated channels t91060. The number and content of the dedicated channels t91060 may vary depending on an embodiment.

As described in the foregoing, the signaling manager t91030 may deliver signaling information which is not delivered to a dedicated channel to the encapsulation buffer t91070. The encapsulation buffer t91070 may function as a buffer that receives the signaling information not delivered to the dedicated channel.

An encapsulation for signaling information t91080 may encapsulate the signaling information not delivered to the dedicated channel. A transmission buffer t91090 may function as a buffer that delivers the encapsulated signaling information to a DP for signaling information t91100. Here, the DP for signaling information t91100 may refer to the above-described PLS area.

The overhead reduction part may allow efficient transmission by eliminating overhead of packets delivered to the link layer. It is possible to configure overhead reduction parts, the number of which is the same as the number of IP streams input to the link layer.

An overhead reduction buffer t91130 may receive an IP packet delivered from an upper layer. The delivered IP packet may be input to the overhead reduction part through the overhead reduction buffer t91130.

An overhead reduction control block t91120 may determine whether to perform overhead reduction on a packet stream input to the overhead reduction buffer t91130. The overhead reduction control block t91120 may determine whether to perform overhead reduction for each packet stream. When overhead reduction is performed on the packet stream, packets may be delivered to an RoHC compressor t91140 and overhead reduction may be performed. When overhead reduction is not performed on the packet stream, packets may be delivered to the encapsulation part and encapsulation may be performed without overhead reduction. Whether to perform overhead reduction on packets may be determined by signaling information t91010 delivered to the link layer. The signaling information t91010 may be delivered to the encapsulation control block t91180 by the scheduler t91020.

The RoHC compressor t91140 may perform overhead reduction on a packet stream. The RoHC compressor t91140 may compress headers of packets. Various schemes may be used for overhead reduction. Overhead reduction may be performed by schemes proposed in the present invention. The present embodiment presumes an IP stream and thus the compressor is expressed as the RoHC compressor. However, the term may be changed according to a given embodiment. In addition, an operation is not restricted to compression of an IP stream, and overhead reduction may be performed on all types of packets by the RoHC compressor t91140.

A packet stream configuration block t91150 may divide IP packets having compressed headers into information to be transmitted to a signaling region and information to be transmitted to a packet stream. The information to be transmitted to the packet stream may refer to information to be transmitted to a DP area. The information to be transmitted to the signaling region may be delivered to a signaling and/or context control block t91160. The information to be transmitted to the packet stream may be transmitted to the encapsulation part.

The signaling and/or context control block t91160 may collect signaling and/or context information and deliver the collected information to the signaling manager t91030. In this way, the signaling and/or context information may be transmitted to the signaling region.

The encapsulation part may encapsulate packets in suitable forms such that the packets may be delivered to the physical layer. The number of configured encapsulation parts may be the same as the number of IP streams.

An encapsulation buffer t91170 may receive a packet stream for encapsulation. Packets subjected to overhead reduction may be received when overhead reduction is performed, and an input IP packet may be received without change when overhead reduction is not performed.

An encapsulation control block t91180 may determine whether to perform encapsulation on an input packet stream. When encapsulation is performed, the packet stream may be delivered to segmentation/concatenation t91190. When encapsulation is not performed, the packet stream may be delivered to a transmission buffer t91230. Whether to perform encapsulation of packets may be determined based on the signaling information t91010 delivered to the link layer. The signaling information t91010 may be delivered to the encapsulation control block t91180 by the scheduler t91020.

In the segmentation/concatenation t91190, the above-descried segmentation or concatenation operation may be performed on packets. In other words, when an input IP packet is longer than a link layer packet corresponding to an output of the link layer, one IP packet may be divided into several segments to configure a plurality of link layer packet payloads. In addition, when the input IP packet is shorter than the link layer packet corresponding to the output of the link layer, several IP packets may be combined to configure one link layer packet payload.

A packet configuration table t91200 may have information about a configuration of segmented and/or concatenated link layer packets. A transmitter and a receiver may have the same information of the packet configuration table t91200. The transmitter and the receiver may refer to the information of the packet configuration table t91200. An index value of the information of the packet configuration table t91200 may be included in headers of the link layer packets.

A link layer header information block t91210 may collect header information generated in an encapsulation process. In addition, the link layer header information block t91210 may collect information included in the packet configuration table t91200. The link layer header information block t91210 may configure header information according to a header configuration of a link layer packet.

A header attachment block t91220 may add headers to payloads of the segmented and/or concatenated link layer packets. The transmission buffer t91230 may function as a buffer for delivering a link layer packet to a DP t91240 of the physical layer.

Each block or module and parts may be configured as one module/protocol or a plurality of modules/protocols in the link layer.

Figure 93:
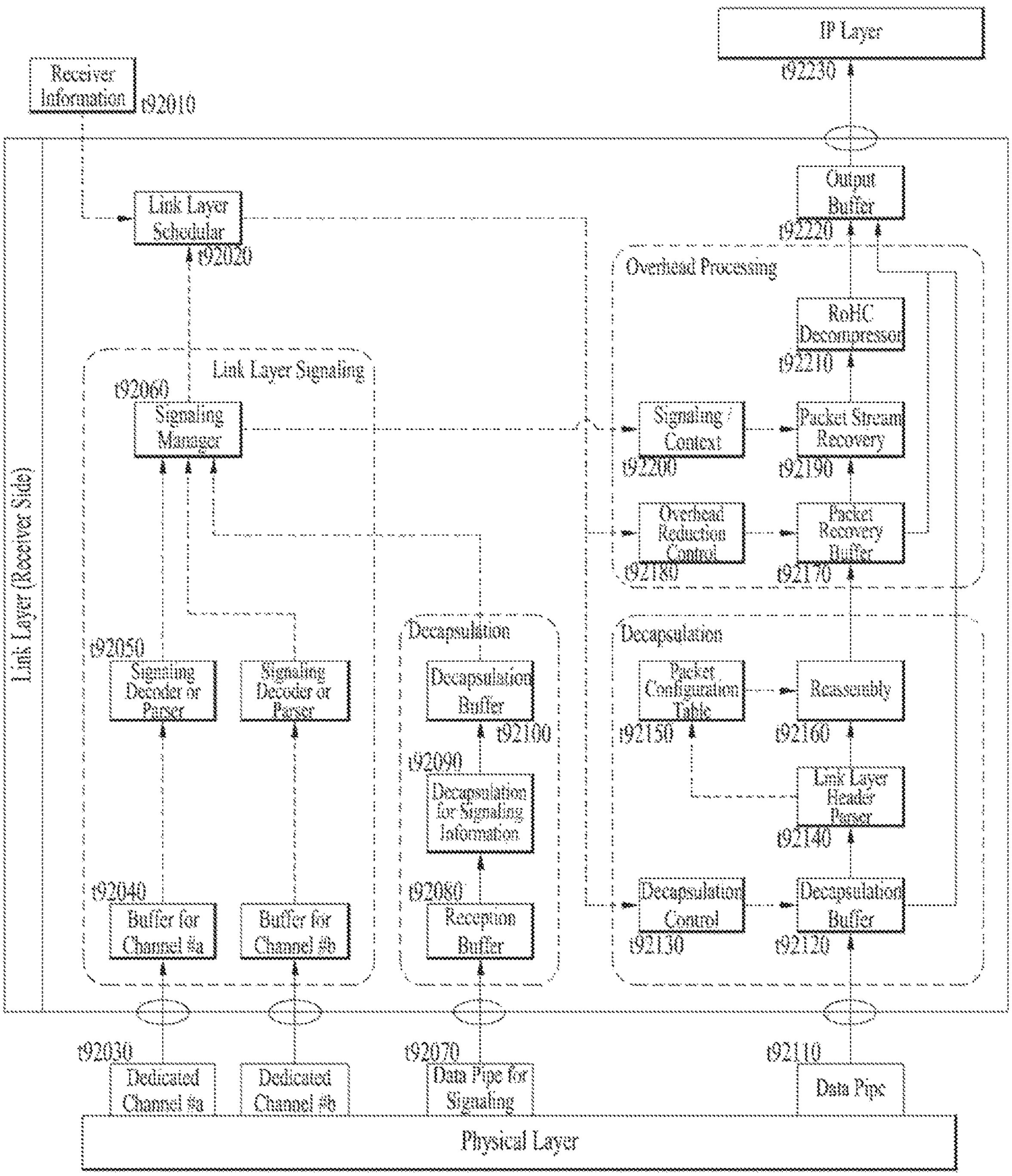
FIG. 93 is a view illustrating the structure of a link layer on a receiver side according to an embodiment of the present invention (normal mode)

FIG. 93 illustrates a configuration of a link layer at a receiver according to an embodiment of the present invention (normal mode).

The present embodiment is an embodiment presuming that an IP packet is processed. The link layer at the receiver may largely include a link layer signaling part for processing signaling information, an overhead processing part, and/or a decapsulation part from a functional perspective. The link layer at the receiver may further include a scheduler for a control of the entire operation of the link layer and scheduling, input and output parts of the link layer, and/or the like.

First, information received through a physical layer may be delivered to the link layer. The link layer may process the information to restore the information to an original state in which the information is not yet processed by a transmitter, and deliver the information to an upper layer. In the present embodiment, the upper layer may be an IP layer.

Information delivered through dedicated channels t92030 separated from the physical layer may be delivered to the link layer signaling part. The link layer signaling part may distinguish signaling information received from the physical layer, and deliver the distinguished signaling information to each part of the link layer.

A buffer for channels t92040 may function as a buffer that receives signaling information transmitted through the dedicated channels. As described above, when physically/logically divided separate channels are present in the physical layer, it is possible to receive signaling information transmitted through the channels. When the information received from the separate channels is in a divided state, the divided information may be stored until the information is in a complete form.

A signaling decoder/parser t92050 may check a format of signaling information received through a dedicated channel, and extract information to be used in the link layer. When the signaling information received through the dedicated channel is encoded, decoding may be performed. In addition, according to a given embodiment, it is possible to check integrity of the signaling information.

A signaling manager t92060 may integrate signaling information received through several paths. Signaling information received through a DP for signaling t92070 to be described below may be integrated by the signaling manager t92060. The signaling manager t92060 may deliver signaling information necessary for each part in the link layer. For example, context information for recovery of a packet and the like may be delivered to the overhead processing part. In addition, signaling information for control may be delivered to a scheduler t92020.

General signaling information not received through a separate dedicated channel may be received through the DP for signaling t92070. Here, the DP for signaling may refer to a PLS or the like. A reception buffer t92080 may function as a buffer for receiving the signaling information received from the DP for signaling t92070. The received signaling information may be decapsulated in a decapsulation for signaling information block t92090. The decapsulated signaling information may be delivered to the signaling manager t92060 through a decapsulation buffer t92100. As described in the foregoing, the signaling manager t92060 may collect signaling information and deliver the collected signaling information to a desired part in the link layer.

The scheduler t92020 may determine and control operations of several modules included in the link layer. The scheduler t92020 may control each part of the link layer using receiver information t92010 and/or information delivered from the signaling manager t92060. In addition, the scheduler t92020 may determine an operation mode and the like of each part. Here, the receiver information t92010 may refer to information previously stored by the receiver. The scheduler t92020 may use information changed by a user such as a channel change and the like for control.

The decapsulation part may filter a packet received from a DP t92110 of the physical layer, and separate the packet based on a type of the packet. The number of configured decapsulation parts may be the same as the number of DPs that may be simultaneously decoded in the physical layer.

A decapsulation buffer t92120 may function as a buffer that receives a packet stream from the physical layer to perform decapsulation. A decapsulation control block t92130 may determine whether to decapsulate the received packet stream. When decapsulation is performed, the packet stream may be delivered to a link layer header parser t92140. When decapsulation is not performed, the packet stream may be delivered to an output buffer t92220. The signaling information delivered from the scheduler t92020 may be used to determine whether to perform decapsulation.

The link layer header parser t92140 may identify a header of a received link layer packet. When the header is identified, it is possible to identify a configuration of an IP packet included in a payload of the link layer packet. For example, the IP packet may be segmented or concatenated.

A packet configuration table t92150 may include payload information of link layer packets configured through segmentation and/or concatenation. The transmitter and the receiver may have the same information as information of the packet configuration table t92150. The transmitter and the receiver may refer to the information of the packet configuration table t92150. A value necessary for reassembly may be found based on index information included in the link layer packets.

A reassembly block t92160 may configure payloads of the link layer packets configured through segmentation and/or concatenation as packets of an original IP stream. The reassembly block t92160 may reconfigure one IP packet by collecting segments, or reconfigure a plurality of IP packet streams by separating concatenated packets. The reassembled IP packets may be delivered to the overhead processing part.

The overhead processing part may perform a reverse process of overhead reduction performed by the transmitter. In the reverse process, an operation of returning packets experiencing overhead reduction to original packets is performed. This operation may be referred to as overhead processing. The number of configured overhead processing parts may be the same as the number of DPs that may be simultaneously decoded in the physical layer.

A packet recovery buffer t92170 may function as a buffer that receives an RoHC packet or an IP packet decapsulated for overhead processing.

An overhead control block t92180 may determine whether to perform packet recovery and/or decompression of decapsulated packets. When the packet recovery and/or decompression are performed, the packets may be delivered to a packet stream recovery t92190.

When the packet recovery and/or decompression are not performed, the packets may be delivered to the output buffer t92220. Whether to perform the packet recovery and/or decompression may be determined based on the signaling information delivered by the scheduler t92020.

The packet stream recovery t92190 may perform an operation of integrating a packet stream separated from the transmitter and context information of the packet stream. The operation may correspond to a process of restoring the packet stream such that the packet stream may be processed by an RoHC decompressor t92210. In this process, signaling information and/or context information may be delivered from a signaling and/or context control block t92200. The signaling and/or context control block t92200 may distinguish signaling information delivered from the transmitter and deliver the signaling information to the packet stream recovery t92190 such that the signaling information may be mapped to a stream suitable for a context ID.

The RoHC decompressor t92210 may recover headers of packets of a packet stream. When the headers are recovered, the packets of the packet stream may be restored to original IP packets. In other words, the RoHC decompressor t92210 may perform overhead processing.

The output buffer t92220 may function as a buffer before delivering an output stream to an IP layer t92230.

The link layer of the transmitter and the receiver proposed in the present invention may include the blocks or modules described above. In this way, the link layer may independently operate irrespective of the upper layer and the lower layer, and efficiently perform overhead reduction. In addition, a function which is supportable depending on the upper and lower layers may be easily extended/added/deleted.

FIG. 94 is a diagram illustrating definition according to link layer organization type according to an embodiment of the present invention.

When a link layer is actually embodied as a protocol layer, a broadcast service can be transmitted and received through one frequency slot. Here, an example of one frequency slot may be a broadcast channel that mainly has a specific bandwidth. As described above, according to the present invention, in a broadcast system in which a configuration of a physical layer is changed or in a plurality of broadcast systems with different physical layer configurations, a compatible link layer may be defined.

The physical layer may have a logical data path for an interface of a link layer. The link layer may access the logical data path of the physical layer and transmit information associated with the corresponding data path to the logical data path. The following types may be considered as the data path of the physical layer interfaced with the link layer.

In a broadcast system, a normal data pipe (Normal DP) may exist as a type of data path. The normal data pipe may be a data pipe for transmission of normal data and may include one or more data pipes according to a configuration of a physical layer.

In a broadcast system, a base data pipe (Base DP) may exist as a type of data path. The base data pipe may be a data pipe used for specific purpose and may transmit signaling information (entire or partial signaling information described in the present invention) and/or common data in a corresponding frequency slot. As necessary, in order to effectively manage a bandwidth, data that is generally transmitted through a normal data pipe may be transmitted through a base data pipe. When the amount of information to be transmitted when a dedicated channel is present exceeds processing capacity of a corresponding channel, the base data pipe may perform a complementary function. That is, data that exceeds the processing capacity of the corresponding channel may be transmitted through the base data pipe.

In general, the base data pipe continuously uses one designated data pipe. However, one or more data pipes may be dynamically selected for the base data pipe among a plurality of data pipes using a method such as physical layer signaling, link layer signaling, or the like in order to effectively manage a data pipe.

In a broadcast system, a dedicated channel may exist as a type of data path. The dedicated channel may be a channel used for signaling in a physical layer or a similar specific purpose and may include a fast information channel (FIC) for rapidly acquiring matters that are mainly served on a current frequency slot and/or an emergency alert channel (EAC) for immediately transmitting notification of emergency alert to a user.

In general, a logical data path is embodied in a physical layer in order to transmit the normal data pipe. A logical data path for the base data pipe and/or the dedicated channel may not be embodied in a physical layer.

A configuration of data to be transmitted in the link layer may be defined as illustrated in the drawing.

Organization Type 1 may refer to the case in which a logical data path includes only a normal data pipe.

Organization Type 2 may refer to the case in which a logical data path includes a normal data pipe and a base data pipe.

Organization Type 3 may refer to the case in which a logical data path includes a normal data pipe and a dedicated channel.

Organization Type 4 may refer to the case in which a logical data path includes a normal data pipe, a data base pipe, and a dedicated channel.

As necessary, the logical data path may include a base data pipe and/or a dedicated channel.

According to an embodiment of the present invention, a transmission procedure of signaling information may be determined according to configuration of a logical data path. Detailed information of signaling transmitted through a specific logical data path may be determined according to a protocol of an upper layer of a link layer defined in the present invention. Regarding a procedure described in the present invention, signaling information parsed through an upper layer may also be used and corresponding signaling may be transmitted in the form of an IP packet from the upper layer and transmitted again after being encapsulated in the form of a link layer packet.

When such signaling information is transmitted, a receiver may extract detailed signaling information from session information included in an IP packet stream according to protocol configuration. When signaling information of an upper layer is used, a database (DB) may be used or a shared memory may be used. For example, in the case of extracting the signaling information from the session information included in the IP packet stream, the extracted signaling information may be stored in a DB, a buffer, and/or a shared memory of the receiver. Next, when the signaling information is needed in a procedure of processing data in a broadcast signal, the signaling information may be obtained from the above storage device.

Figure 95:
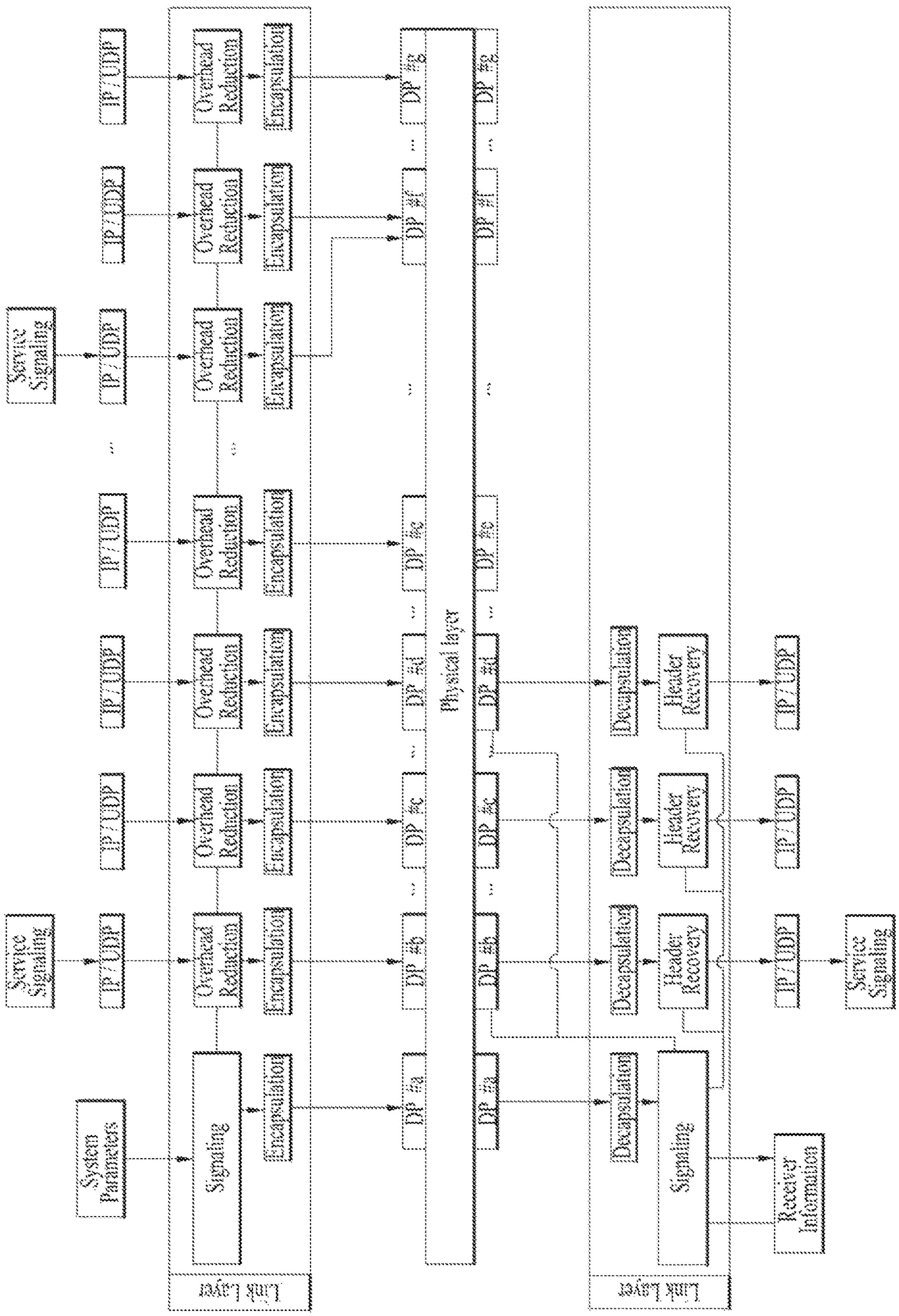
FIG. 95 is a view illustrating the processing of a broadcast signal, in a case in which a logical data path includes only a normal data pipe, according to an embodiment of the present invention.

FIG. 95 is a diagram illustrating processing of a broadcast signal when a logical data path includes only a normal data pipe according to an embodiment of the present invention.

The diagram illustrates a structure of a link layer when the logical of the physical layer includes only a normal data pipe. As described above, the link layer may include a link layer signaling processor, an overhead reduction processor, and an encapsulation (decapsulation) processor. Transmission of information output from each functional module (which may be embodied as hardware or software) to an appropriate data path of the physical layer may be one of main functions of the link layer.

With regard to an IP stream configured on an upper layer of a link layer, a plurality of packet streams may be transmitted according to a data rate at which data is to be transmitted, and overhead reduction and encapsulation procedures may be performed for each respective corresponding packet stream. A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, and/or signaling transmitted in an upper layer and collect information to be transmitted via signaling. Since only a normal data pipe is configured in a physical layer, corresponding signaling needs to be transmitted in the form of packet. Accordingly, signaling may be indicated using a header, etc. of a packet during link layer packet configuration. In this case, a header of a packet including signaling may include information for identifying whether signaling data is contained in a payload of the packet.

In the case of service signaling transmitted in the form of IP packet in an upper layer, in general, it is possible to process different IP packets in the same way. However, information of the corresponding IP packet can be read for a configuration of link layer signaling. To this end, a packet including signaling may be found using a filtering method of an IP address. For example, since IANA designates an IP address of 224.0.23.60 as ATSC service signaling, the receiver may check an IP packet having the corresponding IP address use the IP packet for configuration of link layer signaling. In this case, the corresponding packet needs to also be transmitted to a receiver, processing for the IP packet is performed without change. The receiver may parse an IP packet transmitted to a predetermined IP address and acquire data for signaling in a link layer.

When a plurality of broadcast services are transmitted through one frequency band, the receiver does not have to decode all DPs, and it is efficient to pre-check signaling information and to decode only a DP associated with a required service. Accordingly, with regard to an operation for a link layer of the receiver, the following procedures may be performed.

When a user selects or changes a service to be received, the receiver tunes a corresponding frequency and reads information of the receiver, stored in a DB, etc. with regard to a corresponding channel.

The receiver checks information about a DP that transmits link layer signaling and decodes the corresponding DP to acquire a link layer signaling packet.

The receiver parses the link layer signaling packet and acquires information about a DP that transmits data associated with a service selected by the user among one or more DPs transmitted through a current channel and overhead reduction information about a packet stream of the corresponding DP. The receiver may acquire information for identification of a DP that transmits the data associated with the service selected by the user from a link layer signaling packet and obtain a corresponding DP based on the information. In addition, the link layer signaling packet may include information indicating overhead reduction applied to the corresponding DP, and the receiver may restore a DP to which overhead reduction is applied, using the information.

The receiver transmits DP information to be received, to a physical layer processor that processes a signal or data in a physical layer and receives a packet stream from a corresponding DP.

The receiver performs encapsulation and header recovery on the packet stream decoded by the physical layer processor.

Then the receiver performs processing according to a protocol of an upper layer and provides a broadcast service to the user.

Figure 96:
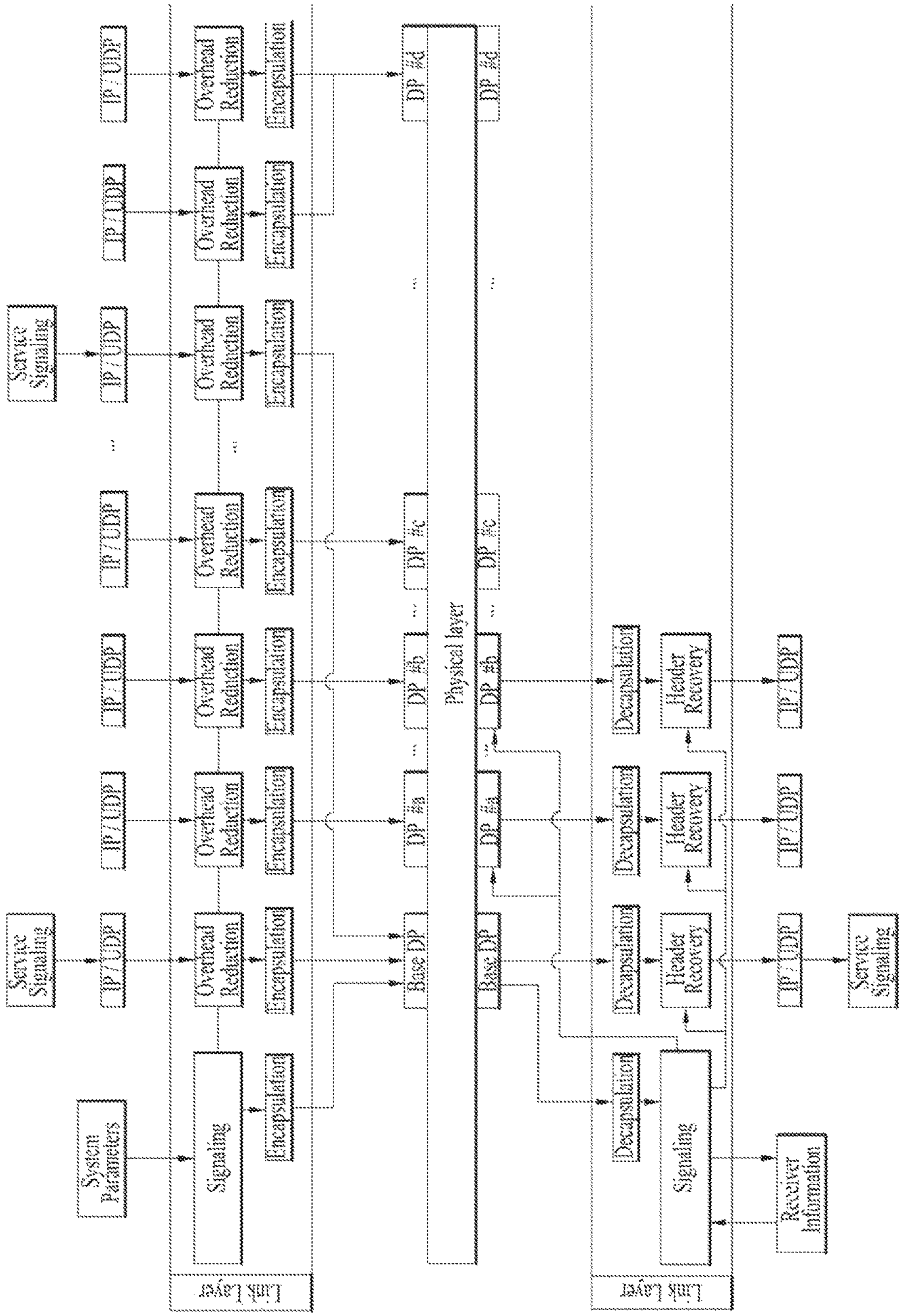
FIG. 96 is a view illustrating the processing of a broadcast signal, in a case in which a logical data path includes a normal data pipe and a base data pipe, according to an embodiment of the present invention.

FIG. 96 is a diagram illustrating processing of a broadcast signal when a logical data path includes a normal data pipe and a base data pipe according to an embodiment of the present invention.

The diagram illustrates a structure of a link layer when the logical data path of the physical layer includes a base data pipe and a normal data pipe. As described above, the link layer may include a link layer signaling part, an overhead reduction part, and an encapsulation (decapsulation) part. In this case, a link layer processor for processing a signal and/or data in a link layer may include a link layer signaling processor, an overhead reduction processor, and an encapsulation (decapsulation) processor.

Transmission of information output from each functional module (which may be embodied as hardware or software) to an appropriate data path of the physical layer may be one of main functions of the link layer.

With regard to an IP stream configured on an upper layer of a link layer, a plurality of packet streams may be transmitted according to a data rate at which data is to be transmitted, and overhead reduction and encapsulation procedures may be performed for each respective corresponding packet stream.

A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, upper layer signaling, etc. and collect information to be transmitted via signaling. Since a broadcast signal of the physical layer includes a base DP and a normal DP, signaling may be transmitted to the base DP and signaling data may be transmitted in the form of packet appropriate for transmission of the base DP in consideration of a data rate. In this case, signaling may be indicated using a header, etc. of a packet during link layer packet configuration. For example, a header of a link layer packet may include information indicating that data contained in a payload of the packet is signaling data.

In a physical layer structure in which a logical data path such as a base DP exists, it may be efficient to transmit data that is not audio/video content, such as signaling information to the base DP in consideration of a data rate. Accordingly, service signaling that is transmitted in the form of IP packet in an upper layer may be transmitted to the base DP using a method such as IP address filtering, etc. For example, IANA designates an IP address of 224.0.23.60 as ATSC service signaling, an IP packet stream with the corresponding IP address may be transmitted to the base DP.

When a plurality of IP packet streams about corresponding service signaling is present, the IP packet streams may be transmitted to one base DP using a method such as multiplexing, etc. However, a packet about different service signaling may be divided into field values such as a source address and/or a port. In this case, information required for configuration of link layer signaling can also be read from the corresponding service signaling packet.

When a plurality of broadcast services are transmitted through one frequency band, the receiver may not have to decode all DPs, may pre-check signaling information, and may decode only a DP that transmits data and/or a signal about a corresponding service. Accordingly, the receiver may perform the following operation with regard to data and/or processing in a link layer.

When a user selects or changes a service to be received, the receiver tunes a corresponding frequency and reads information of the receiver, stored in a DB, etc. with regard to a corresponding channel. Here, the information stored in the DB, etc. may include information for identification of the base DP.

The receiver decodes the base DP and acquires a link layer signaling packet included in the base DP.

The receiver parses the link layer signaling packet to acquire DP information for reception of the service selected by the user and overhead reduction information about a packet stream of the corresponding DP among a plurality of DPs transmitted through a current channel and overhead reduction information about a packet stream of the corresponding DP. The link layer signaling packet may include information for identification of a DP that transmits a signal and/or data associated with a specific service, and/or information for identification of a type of overhead reduction applied to a packet stream transmitted to the corresponding DP. The receiver may access one or more DPs or restore the packet included in the corresponding DP using the above information.

The receiver is a physical layer processor that processes a signal and/or data according to a protocol of a physical layer, transmits information about a DP to be received for a corresponding service, and receives a packet stream from the corresponding DP.

The receiver performs decapsulation and header recovery on the packet stream decoded in the physical layer and transmits the packet stream to an upper layer of the receiver in the form of IP packet stream.

Then, the receiver performs processing according to an upper layer protocol and provides a broadcast service to the user.

In the above-described process of acquiring the link layer packet by decoding the base DP, information about the base DP (e.g., an identifier (ID) information of the base DP, location information of the base DP, or signaling information included in the base DP) may be acquired during previous channel scan and then stored in a DB and the receiver may use the stored base DP. Alternatively, the receiver may acquire the base DP by first seeking a DP that the receiver has pre-accessed.

In the above-described process of acquiring the DP information for a service selected by the user and the overhead reduction information about a DP packet stream transmitting the corresponding service, by parsing the link layer packet, if the information about the DP transmitting the service selected by the user is transmitted through upper layer signaling (e.g., a layer higher than a link layer, or an IP layer), the receiver may acquire corresponding information from the DB, the buffer, and/or the shared memory as described above and use the acquired information as information about a DP requiring decoding.

If link layer signaling (link layer signaling information) and normal data (e.g., broadcast content data) is transmitted through the same DP or if only a DP of one type is used in a broadcast system, the normal data transmitted through the DP may be temporarily stored in the buffer or the memory while the signaling information is decoded and parsed. Upon acquiring the signaling information, the receiver may transmit a command for extracting a DP that should be obtained according to the corresponding signaling information to a device for extracting and processing the DP by a method using interior command words of the system.

Figure 97:
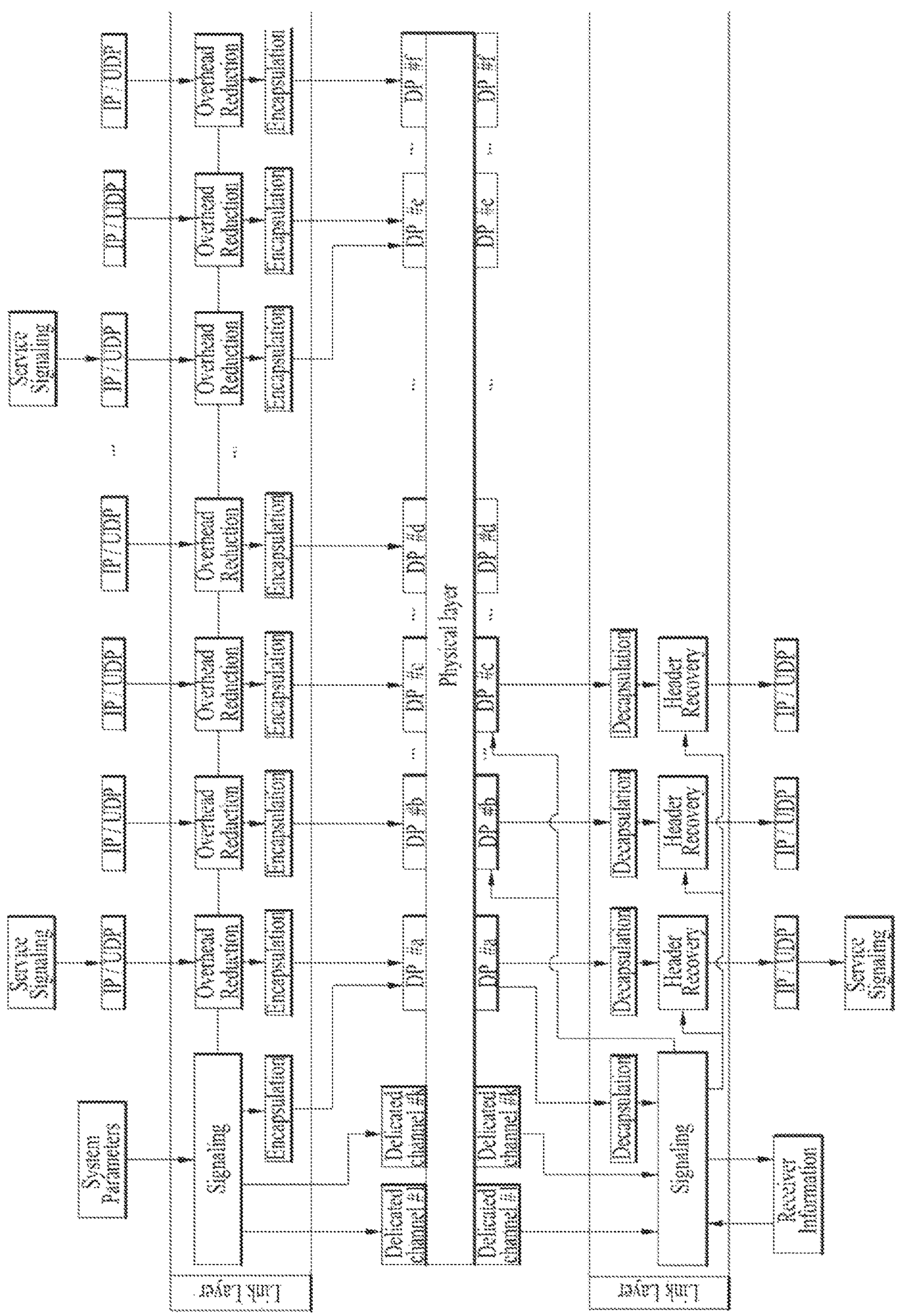
FIG. 97 is a view illustrating the processing of a broadcast signal, in a case in which a logical data path includes a normal data pipe and a dedicated channel, according to an embodiment of the present invention.

FIG. 97 is a diagram illustrating processing of a broadcast signal when a logical data path includes a normal data pipe and a dedicated channel according to an embodiment of the present invention.

The diagram illustrates a structure of a link layer when the logical data path of the physical layer includes a dedicated channel and a normal data pipe. As described above, the link layer may include a link layer signaling part, an overhead reduction part, and an encapsulation (decapsulation) part. In this regard, a link layer processor to be included in the receiver may include a link layer signaling processor, an overhead reduction processor, and/or an encapsulation (decapsulation) processor. Transmission of information output from each functional module (which may be embodied as hardware or software) to an appropriate data path of the physical layer may be one of main functions of the link layer.

With regard to an IP stream configured on an upper layer of a link layer, a plurality of packet streams may be transmitted according to a data rate at which data is to be transmitted, and overhead reduction and encapsulation procedures may be performed for each respective corresponding packet stream. A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, upper layer signaling, etc. and collect information to be transmitted via signaling. In a physical layer structure in which a logical data path such as a dedicate channel exists, it may be efficient to mainly transmit signaling information through a dedicated channel in consideration of a data rate. However, when a large amount of data needs to be transmitted through a dedicated channel, a bandwidth for the dedicated channel corresponding to the amount of the dedicated channel needs to be occupied, and thus it is general to set a high data rate of the dedicated channel. In addition, since a dedicated channel is generally received and decoded at higher speed than a DP, it is more efficient to signaling data in terms of information that needs to be rapidly acquired from the receiver. As necessary, when sufficient signaling data cannot be transmitted through the dedicated channel, signaling data such as the aforementioned link layer signaling packet may be transmitted through the normal DP, and signaling data transmitted through the dedicated channel may include information for identification of the corresponding link layer signaling packet.

A plurality of dedicated channels may exist as necessary and a channel may be enable/disable according to a physical layer.

In the case of service signaling transmitted in the form of IP packet in an upper layer, in general, it is possible to process different IP packets in the same way. However, information of the corresponding IP packet can be read for a configuration of link layer signaling. To this end, a packet including signaling may be found using a filtering method of an IP address. For example, since IANA designates an IP address of 224.0.23.60 as ATSC service signaling, the receiver may check an IP packet having the corresponding IP address use the IP packet for configuration of link layer signaling. In this case, the corresponding packet needs to also be transmitted to a receiver, processing for the IP packet is performed without change.

When a plurality of IP packet streams about service signaling is present, the IP packet streams may be transmitted to one DP together with audio/video data using a method such as multiplexing, etc. However, a packet about service signaling and audio/video data may be divided into field values of an IP address, a port, etc.

When a plurality of broadcast services are transmitted through one frequency band, the receiver does not have to decode all DPs, and it is efficient to pre-check signaling information and to decode only a DP that transmit signal and/or data associated with a required service. Thus, the receiver may perform processing according to a protocol of a link layer as the following procedure.

When a user selects or changes a service to be received, the receiver tunes a corresponding frequency and reads information stored in a DB, etc. with regard to a corresponding channel. The information stored in the DB may include information for identification of a dedicated channel and/or signaling information for acquisition of channel/service/program.

The receiver decodes data transmitted through the dedicated channel and performs processing associated with signaling appropriate for purpose of the corresponding channel. For example, a dedicated channel for transmission of FIC may store and update information such as a service and/or a channel, and a dedicated channel for transmission of EAC may transmit emergency alert information.

The receiver may acquire information of DP to be decoded using information transmitted to the dedicated channel. As necessary, when link layer signaling is transmitted through a DP, the receiver may pre-decode a DP that transmits signaling and transmit the DP to a dedicated channel in order to pre-acquire signaling information. In addition, a packet for link layer signaling may be transmitted through a normal DP, and in this case, the signaling data transmitted through the dedicated channel may include information for identification of a DP including a packet for link layer signaling.

The receiver acquires DP information for reception of a service selected by a user among a plurality of DPs that are transmitted to a current channel and overhead reduction information about a packet stream of the corresponding DP using the link layer signaling information. The link layer signaling information may include information for identification of a DP for transmission of a signal and/or data associated with a specific service, and/or information for identification of a type of overhead reduction applied to a packet stream transmitted to the corresponding DP. The receiver may access one or more DPs for a specific service or restore a packet included in the corresponding DP using the information.

The receiver transmits information for identification of a DP to be received by a physical layer to a physical layer processor that processes a signal and/or data in a physical layer and receives a packet stream from the corresponding DP.

The receiver performs decapsulation and header recovery on a packet stream decoded in a physical layer and transmits the packet stream to an upper layer of the receiver in the form of IP packet stream.

Then the receiver performs processing according to a protocol of an upper layer and provides a broadcast service to the user.

Figure 98:
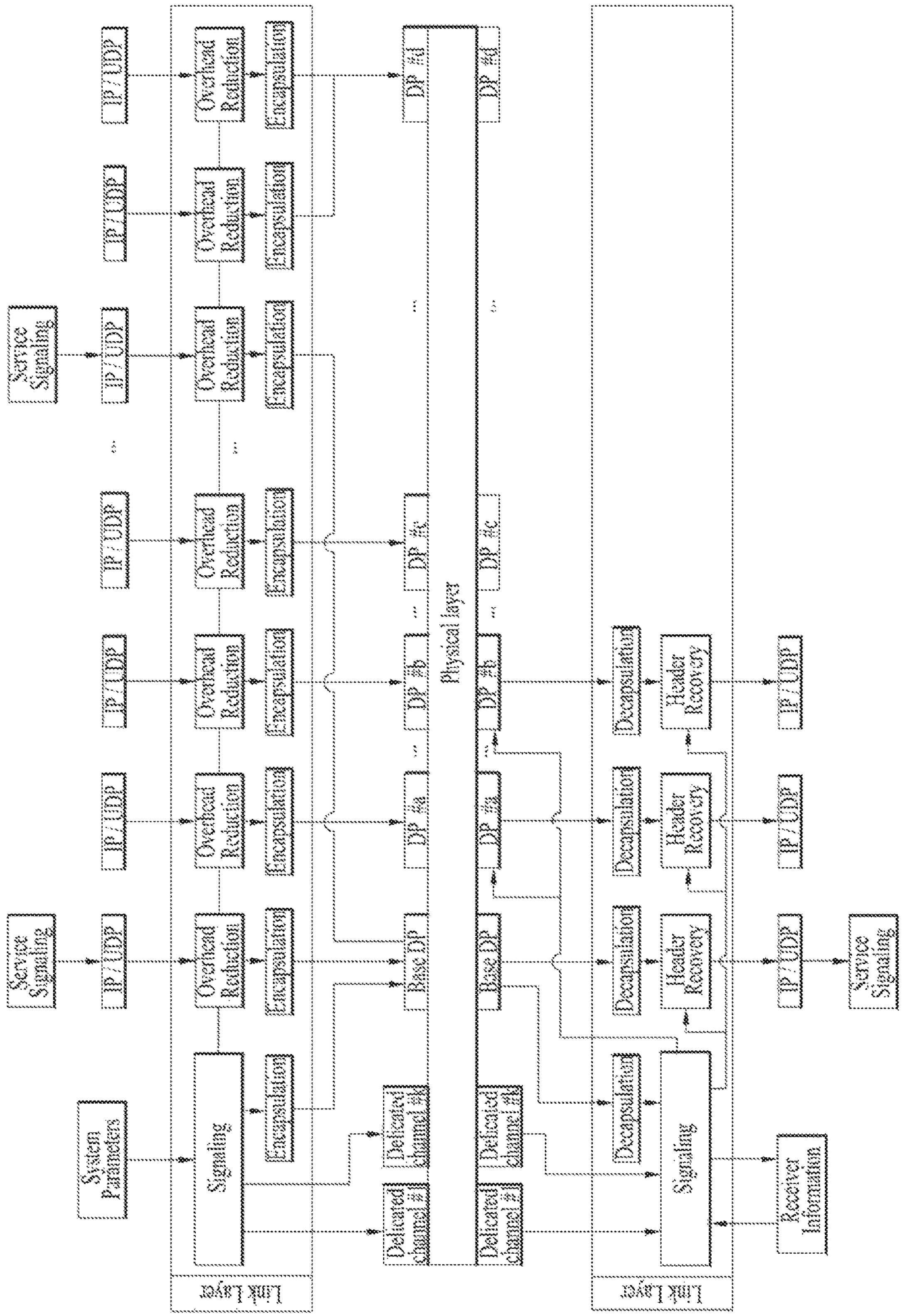
FIG. 98 is a view illustrating the processing of a broadcast signal, in a case in which a logical data path includes a normal data pipe, a base data pipe, and a dedicated channel, according to an embodiment of the present invention.

FIG. 98 is a diagram illustrating processing of a broadcast signal when a logical data path includes a normal data pipe, a base data pipe, and a dedicated channel according to an embodiment of the present invention.

The diagram illustrates a structure of a link layer when the logical data path of the physical layer includes a dedicated channel, a base data pipe, and a normal data pipe. As described above, the link layer may include a link layer signaling part, an overhead reduction part, and an encapsulation (decapsulation) part. In this regard, a link layer processor to be included in the receiver may include a link layer signaling processor, an overhead reduction processor, and/or an encapsulation (decapsulation) processor. Transmission of information output from each functional module (which may be embodied as hardware or software) to an appropriate data path of the physical layer may be one of main functions of the link layer.

With regard to an IP stream configured on an upper layer of a link layer, a plurality of packet streams may be transmitted according to a data rate at which data is to be transmitted, and overhead reduction and encapsulation procedures may be performed for each respective corresponding packet stream. A physical layer may include a data pipe (DP) as a plurality of logical data paths that a link layer can access in one frequency band and may transmit a packet stream processed in a link layer for each respective packet stream. When the number of DPs is lower than that of packet streams to be transmitted, some of the packet streams may be multiplexed and input to a DP in consideration of a data rate.

The signaling processor may check transmission system information, related parameters, upper layer signaling, etc. and collect information to be transmitted via signaling. Since a signal of the physical layer includes a base DP and a normal DP, it may be efficient to transmit signaling to the base DP in consideration of a data rate. In this case, the signaling data needs to be transmitted in the form of packet appropriate for transmission through the base DP. Signaling may be indicated using a header, etc. of a packet during link layer packet configuration. That is, a header of a link layer signaling packet including signaling data may include information indicating that signaling data is contained in a payload of the corresponding packet.

In a physical layer structure in which a dedicate channel and a base DP exist simultaneously, signaling information may be divided and transmitted to the dedicated channel and the base DP. In general, since a high data rate of the dedicated channel is not set, signaling information that has a small amount of signaling and needs to be rapidly acquired may be transmitted to the dedicated channel and signaling with a high amount of signaling to the base DP. As necessary, a plurality of dedicated channels may exist and a channel may be enable/disable according to a physical layer. In addition, the base DP may be configured with a separate structure from a normal DP. In addition, it is possible to designate one of normal DPs and use the normal DP as a base DP.

Service signaling that is transmitted in the form of IP packet in an upper layer may be transmitted to the base DP using a method such as IP address filtering, etc. An IP packet stream with a specific IP address and including signaling information may be transmitted to the base DP. When a plurality of IP packet streams about corresponding service signaling is present, the IP packet streams may be transmitted to one base DP using a method such as multiplexing, etc. A packet about different service signaling may be divided into field values such as a source address and/or a port. The receiver may read information required for configuration of the link layer signaling in the corresponding service signaling packet.

When a plurality of broadcast services are transmitted through one frequency band, the receiver may not have to decode all DPs, and it may be efficient to pre-check the signaling information and to decode only a DP that transmits a signal and/or data associated with a required service. Thus, the receiver may perform the following processors as processing according to a protocol of a link layer.

When a user selects or changes a service to be received, the receiver tunes a corresponding frequency and reads information stored in a database DB, etc. with regard to a corresponding channel. The information stored in the DB may include information for identification of a dedicated channel, information for identification of a base data pipe, and/or signaling information for acquisition of channel/service/program.

The receiver decodes data transmitted through the dedicated channel and performs processing associated with signaling appropriate for purpose of the corresponding channel. For example, a dedicated channel for transmission of FIC may store and update information such as a service and/or a channel, and a dedicated channel for transmission of EAC may transmit emergency alert information.

The receiver may acquire information of the base DP using information transmitted to the dedicated channel. The information transmitted to the dedicated channel may include information for identification of the base DP (e.g., an identifier of the base DP and/or an IP address of the base DP). As necessary, the receiver may update signaling information pre-stored in a DB of the receiver and related parameters to information transmitted in the dedicated channel.

The receiver may decode the base DP and acquire a link layer signaling packet. As necessary, the link layer signaling packet may be combined with signaling information received from the dedicated channel. The receiver may find the base DP using the dedicate channel and the signaling information pre-stored in the receiver.

The receiver acquires DP information for reception of a service selected by a user among a plurality of DPs that are transmitted to a current channel and overhead reduction information about a packet stream of the corresponding DP using the link layer signaling information. The link layer signaling information may include information for identification of a DP for transmission of a signal and/or data associated with a specific service, and/or information for identification of a type of overhead reduction applied to a packet stream transmitted to the corresponding DP. The receiver may access one or more DPs for a specific service or restore a packet included in the corresponding DP using the information.

The receiver transmits information for identification of a DP to be received by a physical layer to a physical layer processor that processes a signal and/or data in a physical layer and receives a packet stream from the corresponding DP.

The receiver performs decapsulation and header recovery on a packet stream decoded in a physical layer and transmits the packet stream to an upper layer of the receiver in the form of IP packet stream.

Then the receiver performs processing according to a protocol of an upper layer and provides a broadcast service to the user.

According to an embodiment of the present invention, when information for service signaling is transmitted by one or more IP packet streams, the IP packet streams may be multiplexed and transmitted as one base DP. The receiver may distinguish between packets for different service signaling through a field of a source address and/or a port. The receiver may read out information for acquiring/configuring link layer signaling from a service signaling packet.

In the process of processing signaling information transmitted through the dedicated channel, the receiver may obtain version information of the dedicated channel or information identifying whether update has been performed and, if it is judged that there is no change in the signaling information in the dedicated channel, the receiver may omit processing (decoding or parsing) of the signaling information transmitted through the dedicated channel. If it is confirmed that the dedicated channel has not been updated, the receiver may acquire information of a base DP using prestored information.

In the above-described process of acquiring the DP information for a service selected by the user and the overhead reduction information about the DP packet stream transmitting the corresponding service, if the information about the DP transmitting the service selected by the user is transmitted through upper layer signaling (e.g., a layer higher than a link layer, or an IP layer), the receiver may acquire the corresponding information from the DB, the buffer, and/or the shared memory as described above and use the acquired information as information about a DP requiring decoding.

If link layer signaling (link layer signaling information) and normal data (e.g., broadcast content data) is transmitted through the same DP or if only type of DP is used in a broadcast system, the normal data transmitted through the DP may be temporarily stored in the buffer or the memory while the signaling information is decoded and parsed. Upon acquiring the signaling information, the receiver may transmit a command for extracting a DP that should be obtained according to the corresponding signaling information to a device for extracting and processing the DP by a method using system interior command words.

Figure 99:
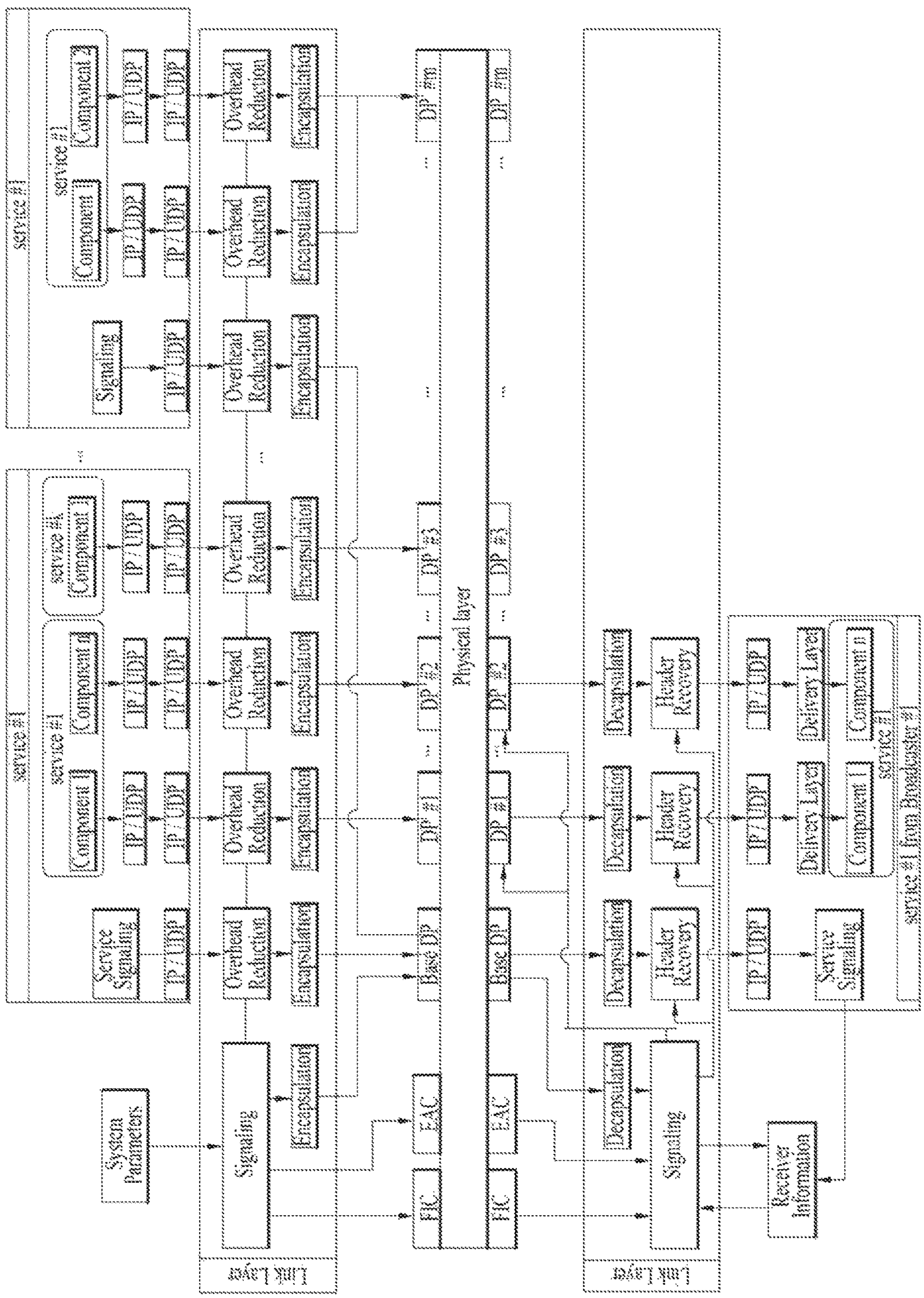
FIG. 99 is a view illustrating a detailed processing operation of signals and/or data in a link layer of a receiver, in a case in which a logical data path includes a normal data pipe, a base data pipe, and a dedicated channel, according to an embodiment of the present invention.

FIG. 99 is a diagram illustrating a detailed processing operation of a signal and/or data in a link layer of a receiver when a logical data path includes a normal data pipe, a base data pipe, and a dedicated channel according to an embodiment of the present invention.

The present embodiment considers a situation in which one or more services provided by one or more broadcasters are transmitted in one frequency band. It may be considered that one broadcaster transmits one or more broadcast services, one service includes one or more components and a user receives content in units of broadcast services. In addition, some of one or more components included in one broadcast service may be replaced with other components according to user selection.

A fast information channel (FIC) and/or emergency alert channel (EAC) may be transmitted to a dedicated channel. A base DP and a normal DP may be differentiated in a broadcast signal and transmitted or managed. Configuration information of the FIC and/or the EAC may be transmitted through physical layer signaling so as to notify the receiver of the FIC and/or the EAC, and the link layer may format signaling according to the characteristic of the corresponding channel. Transmission of data to a specific channel of a physical layer is performed from a logical point of view and an actual operation may be performed according to the characteristic of a physical layer.

Information about a service of each broadcaster, transmitted in a corresponding frequency, and information about a path for reception of the service may be transmitted through the FIC. To this end, the following information may be provided (signaled) via link layer signaling.

System Parameter: Transmitter related parameter, and/or parameter related to a broadcaster that provides a service in a corresponding channel.

Link layer: which includes context information associated with IP header compression and/or ID of a DP to which corresponding context is applied.

Upper layer: IP address and/or UDP port number, service and/or component information, emergency alert information, and mapping relation information between a DP and an IP address of a packet stream transmitted in an IP layer.

When a plurality of broadcast services is transmitted through one frequency band, a receiver may not have to decode all DPs, and it may be efficient to pre-check signaling information and to decode only a DP about a required service. In a broadcast system, a transmitter may transmit information for identification of only a required DP through an FIC, and the receiver may check a DP to be accessed for a specific serviced, using the FIC. In this case, an operation associated with the link layer of the receiver may be performed as follows.

When a user selects or changes a service to be received by a user, the receiver tunes a corresponding frequency and reads information of a receiver, stored in a DB, etc. in regard to a corresponding channel. The information stored in the DB of the receiver may be configured by acquiring an FIC during initial channel scan and using information included in the FIC.

The receiver may receive an FIC and update a pre-stored DB or acquire information about a component about a service selected by the user and information about a mapping relation for DPs that transmit components from the FIC. In addition, the information about a base DP that transmits signaling may be acquired from the FIC.

When initialization information related to robust header compression (RoHC) is present in signaling transmitted through the FIC, the receiver may acquire the initialization information and prepare header recovery.

The receiver decodes a base DP and/or a DP that transmits a service selected by a user based on information transmitted through the FIC.

The receiver acquires overhead reduction information about a DP that is being received, included in the base DP, performs decapsulation and/or header recovery on a packet stream received in a normal DP using the acquired overhead information, and transmits the packet stream to an upper layer of the receiver in the form of IP packet stream.

The receiver may receive service signaling transmitted in the form of IP packet with a specific address through a base DP and transmit the packet stream to the upper layer with regard to a received service.

When emergency alert occurs, in order to rapidly transmit an emergency alert message to a user, the receiver receives signaling information included in a CAP message through signaling, parses the signaling information, and immediately transmits the signaling information to a user, and finds a path for reception of a corresponding service and receives service data when information of a path through which an audio/video service can be received via signaling can be confirmed. In addition, when information transmitted through a broadband and so on is present, an NRT service and additional information are received using corresponding uniform resource identifier (URI) information and so on. Signaling information associated with emergency alert will be described below in detail.

The receiver processes the emergency alert as follows.

The receiver recognizes a situation in which an emergency alert message is transmitted through a preamble and so on of a physical layer. The preamble of the physical layer may be a signaling signal included in a broadcast signal and may correspond to signaling in the physical layer. The preamble of the physical layer may mainly include information for acquisition of data, a broadcast frame, a data pipe, and/or a transmission parameter that are included in a broadcast signal.

The receiver checks configuration of an emergency alert channel (EAC) through physical layer signaling of the receiver and decodes the EAC to acquire EAT. Here, the EAC may correspond to the aforementioned dedicated channel.

The receiver checks the received EAT, extracts a CAP message, and transmits the CAP message to a CAP parser.

The receiver decodes a corresponding DP and receives service data when service information associated with the emergency alert is present in the EAT. The EAT may include information for identification of a DP for transmitting a service associated with the emergency alert.

When information associated with NRT service data is present in the EAT or the CAP message, the receiver receives the information through a broadband.

FIG. 100 is a diagram illustrating syntax of a fast information channel (FIC) according to an embodiment of the present invention.

Information included in the FIC may be transmitted in the form of fast information table (FIT).

Information included in the FIT may be transmitted in the form of XML and/or section table.

The FIT may include table_id information, FIT_data_version information, num_broadcast information, broadcast_id information, delivery_system_id information, base_DP_id information, base_DP_version information, num_service information, service_id information, service_category information, service_hidden_flag information, SP_indicator information, num_component information, component_id information, DP_id information, context_id information, RoHC_init_descriptor, context_profile information, max_cid information, and/or large_cid information.

The table_id information indicates that a corresponding table section refers to fast information table.

The FIT_data_version information may indicate version information about syntax and semantics contained in the fast information table. The receiver may determine whether signaling contained in the corresponding fast information table is processed, using the FIT_data_version information. The receiver may determine whether information of pre-stored FIC is updated, using the information.

The num_broadcast information may indicate the number of broadcasters that transmit a broadcast service and/or content through a corresponding frequency or a transmitted transport frame.

The broadcast_id information may indicate a unique identifier of a broadcaster that transmits a broadcast service and/or content through a corresponding frequency or a transmitted transport frame. In the case of a broadcaster that transmits MPEG-2 TS-based data, broadcast_id may have a value such as transport_stream_id of MPEG-2 TS.

The delivery_system_id information may indicate an identifier for a broadcast transmission system that applies and processes the same transmission parameter on a broadcast network that performs transmission.

The base_DP_id information is information for identification of a base DP in a broadcast signal. The base DP may refer to a DP that transmits service signaling including overhead reduction and/or program specific information/system information (PSI/SI) of a broadcaster corresponding to broadcast_id. Alternatively, the base_DP_id information may refer to a representative DP that can decode a component included in a broadcast service in the corresponding broadcaster.

The base_DP_version information may refer to version information about data transmitted through a base DP. For example, when service signaling such as PSI/SI and so on is transmitted through the base DP, if service signaling is changed, a value of the base_DP_version information may be increased one by one.

The num_service information may refer to the number of broadcast services transmitted from a broadcaster corresponding to the broadcast_id in a corresponding frequency or a transport frame.

The service_id information may be used as an identifier for identification of a broadcast service.

The service_category information may refer to a category of a broadcast service. According to a value of a corresponding field, the service_category information may have the following meaning. When a value of the service_category information is 0x01, the service_category information may refer to a basic TV, when the value of the service_category information is 0x02, the service_category information may refer to a basic radio, when the value of the service_category information is 0x03, the service_category information may refer to an RI service, when the value of the service_category information is 0x08, the service_category information may refer to a service guide, and when the value of the service_category information is 0x09, the service_category information may refer to emergency alerting.

The service_hidden_flag information may indicate whether a corresponding broadcast service is hidden. When the service is hidden, the broadcast service may be a test service or a self-used service and may be processed to be disregarded or hidden from a service list by a broadcast receiver.

The SP_indicator information may indicate whether service protection is applied to one or more components in a corresponding broadcast service.

The num_component information may indicate the number of components included in a corresponding broadcast service.

The component_id information may be used as an identifier for identification of a corresponding component in a broadcast service.

The DP_id information may be used as an identifier indicating a DP that transmits a corresponding component.

The RoHC_init_descriptor may include information associated with overhead reduction and/or header recovery. The RoHC_init_descriptor may include information for identification of a header compression method used in a transmission terminal.

The context_id information may represent a context corresponding to a following RoHC related field. The context_id information may correspond to a context identifier (CID).

The context_profile information may represent a range of a protocol for compression of a header in RoHC. When a compressor and a decompressor have the same profile, it is possible to compress and restore a stream in the RoHC.

The max_cid information is used for indicating a maximum value of a CID to a decompressor.

The large_cid information has a boolean value and indicates whether a short CID (0 to 15) or an embedded CID (0 to 16383) is used for CID configuration. Accordingly, the sized of byte for representing the CID is determined together.

FIG. 101 is a diagram illustrating syntax of an emergency alert table (EAT) according to an embodiment of the present invention.

Information associated with emergency alert may be transmitted through the EAC. The EAC may correspond to the aforementioned dedicated channel.

The EAT according to an embodiment of the present invention may include EAT_protocol_version information, automatic_tuning_flag information, num_EAS_messages information, EAS_message_id information, EAS_IP_version_flag information, EAS_message_transfer_type information, EAS_message_encoding_type information, EAS_NRT_flag information, EAS_message_length information, EAS_message_byte information, IP_address information, UDP_port_num information, DP_id information, automatic_tuning_channel_number information, automatic_tuning_DP_id information, automatic_tuning_service_id information, and/or EAS_NRT_service_id information.

The EAT_protocol_version information indicates a protocol version of received EAT.

The automatic_tuning_flag information indicates whether a receiver automatically performs channel conversion.

The num_EAS_messages information indicates the number of messages contained in the EAT.

The EAS_message_id information is information for identification of each EAS message.

The EAS_IP_version_flag information indicates IPv4 when a value of the EAS_IP_version_flag information is 0, and indicates IPv6 when a value of the EAS_IP_version_flag information is 1.

The EAS_message_transfer_type information indicates the form in which an EAS message is transmitted. When a value of the EAS_message_transfer_type information is 000, the EAS_message_transfer_type information indicates a not specified state, when a value of the EAS_message_transfer_type information is 001, the EAS_message_transfer_type information indicates a no alert message (only AV content), and when a value of the EAS_message_transfer_type information is 010, the EAS_message_transfer_type information indicates that an EAS message is contained in corresponding EAT. To this end, a length field and a field about the corresponding EAS message are added. When a value of the EAS_message_transfer_type information is 011, the EAS_message_transfer_type information indicates that the EAS message is transmitted through a data pipe. The EAS may be transmitted in the form of IP datagram in a data pipe. To this end, IP_address, UDP port information, and DP information of a transmitted physical layer may be added.

The EAS_message_encoding_type information indicates information about an encoding type of an emergence alert message. For example, when a value of the EAS_message_encoding_type information is 000, the EAS_message_encoding_type information indicates a not specific state, when a value of the EAS_message_encoding_type information is 001, the EAS_message_encoding_type information indicates No Encoding, when a value of the EAS_message_encoding_type information is 010, the EAS_message_encoding_type information indicates DEFLATE algorithm (RFC1951), and 001 to 111 among values of the EAS_message_encoding_type information may be reserved for other encoding types.

The EAS_NRT_flag information indicates whether NRT contents and/or NRT data associated with a received message is present. When a value of the EAS_NRT_flag information is 0, the EAS_NRT_flag information indicates that NRT contents and/or NRT data associated with a received emergency message is not present, and when a value of the EAS_NRT_flag information is 1, the EAS_NRT_flag information indicates that NRT contents and/or NRT data associated with a received emergency message is present.

The EAS_message_length information indicates a length of an EAS message.

The EAS_message_byte information includes content of an EAS message.

The IP_address information indicates an IP address of an IP address for transmission of an EAS message.

The UDP_port_num information indicates a UDP port number for transmission of an EAS message.

The DP_id information identifies a data pipe that transmits an EAS message.

The automatic_tuning_channel_number information includes information about a number of a channel to be converted.

The automatic_tuning_DP_id information is information for identification of a data pipe that transmits corresponding content.

The automatic_tuning_service_id information is information for identification of a service to which corresponding content belongs.

The EAS_NRT_service_id information is information for identification of an NRT service corresponding to the case in which NRT contents and data associated with a received emergency alert message and transmitted, that is, the case in which an EAS_NRT_flag is enabled.

Figure 102:
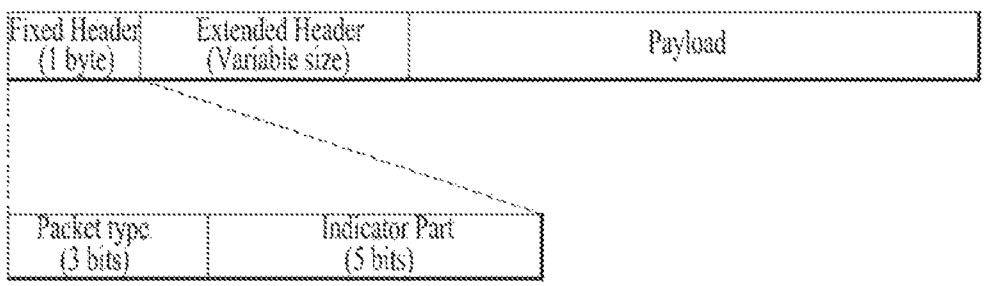
FIG. 102 is a view illustrating a packet that is transmitted through a data pipe according to an embodiment of the present invention.

FIG. 102 is a diagram illustrating a packet transmitted to a data pipe according to an embodiment of the present invention.

According to an embodiment of the present invention, configuration of a packet in a link layer is newly defined so as to generate a compatible link layer packet irrespective of change in protocol of an upper layer or the link layer or a lower layer of the link layer.

The link layer packet according to an embodiment of the present invention may be transmitted to a normal DP and/or a base DP.

The link layer packet may include a fixed header, an expansion header, and/or a payload.

The fixed header is a header with a fixed size and the expansion header is a header, the size of which can be changed according to configuration of the packet of the upper layer. The payload is a region in which data of the upper layer is transmitted.

A header (the fixed header or the expansion header) of a packet may include a field indicating a type of the payload of the packet. In the case of the fixed header, first 3 bits (packet type) of 1 byte may include data for identification of a packet type of the upper layer, and the remaining 5 bits may be used as an indicator part. The indicator part may include data for identification of a configuring method of a payload and/or configuration information of the expansion header and may be changed according to a packet type.

A table shown in the diagram represents a type of an upper layer included in a payload according to a value of a packet type.

According to system configuration, an IP packet and/or an RoHC packet of the payload may be transmitted through a DP, and a signaling packet may be transmitted through a base DP. Accordingly, when a plurality of packets are mixed and transmitted, packet type values may also be applied so as to differentiate a data packet and a signaling packet.

When a packet type value is 000, an IP packet of IPv4 is included in a payload.

When a packet type value is 001, an IP packet of IPv6 is included in a payload.

When a packet type value is 010, a compressed IP packet is included in a payload. The compressed IP packet may include an IP packet to which header compression is applied.

When a packet type value is 110, a packet including signaling data is included in a payload.

When a packet type value is 111, a framed packet type is included in a payload.

Figure 103:
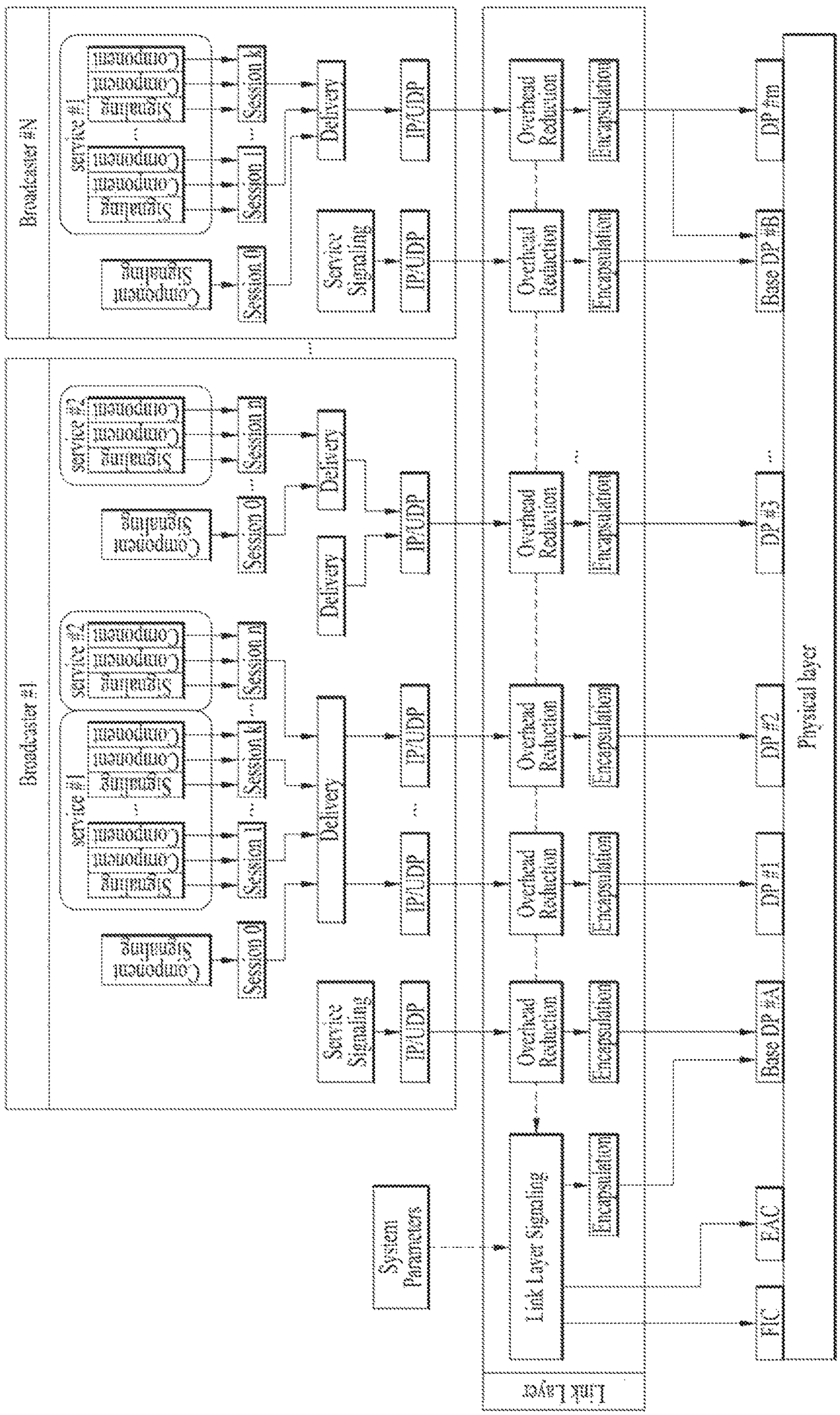
FIG. 103 is a view illustrating the detailed processing operation of signals and/or data in each protocol stack of a transmitter, in a case in which a logical data path of a physical layer includes a dedicated channel, a base DP, and a normal data DP, according to another embodiment of the present invention.

FIG. 103 is a diagram illustrating a detailed processing operation of a signal and/or data in each protocol stack of a transmitter when a logical data path of a physical layer includes a dedicated channel, a base DP, and a normal data DP, according to another embodiment of the present invention.

In one frequency band, one or more broadcasters may provide broadcast services. A broadcaster transmits multiple broadcast services and one broadcast service may include one or more components. A user may receive content in units of broadcast services.

In a broadcast system, a session-based transmission protocol may be used to support IP hybrid broadcast and the contents of signaling delivered to each signaling path may be determined according to the structure of the corresponding transmission protocol.

As described above, data related to the FIC and/or the EAC may be transmitted/received over the dedicated channel. In the broadcast system, a base DP and a normal DP may be used to distinguish therebetween.

Configuration information of the FIC and/or EAC may be included in physical layer signaling (or a transmission parameter). A link layer may format signaling according to characteristics of a corresponding channel. Transmission of data to a specific channel of a physical layer may be performed from a logical point of view and actual operation may be performed according to characteristics of a physical layer.

The FIC may include information about services of each broadcaster, transmitted in a corresponding frequency and information about paths for receiving the services. The FIC may include information for service acquisition and may be referred to as service acquisition information.

The FIC and/or the EAC may be included in link layer signaling.

Link layer signaling may include the following information.

System Parameter—A parameter related to a transmitter or a parameter related to a broadcaster that provides a service in a corresponding channel.

Link layer: Context information associated with IP header compression and an ID of a DP to which a corresponding context is applied.

Upper layer: IP_address and UDP port number, service and component information, emergency alert information, and a mapping relationship between an ID address, a UDP port number, a session ID, and a DP of a packet stream and signaling transmitted in an IP layer.

As described above, one or more broadcast services are transmitted in one frequency band, the receiver does not need to decode all DPs and it is efficient to pre-check signaling information and to decode only a DP related to a necessary service.

In this case, referring to the drawing, the broadcast system may provide and acquire information for mapping a DP and a service, using the FIC and/or the base DP.

A process of processing a broadcast signal or broadcast data in a transmitter of the drawing will now be described. One or more broadcasters (broadcasters #1 to #N) may process component signaling and/or data for one or more broadcast services so as to be transmitted through one or more sessions. One broadcast service may be transmitted through one or more sessions. The broadcast service may include one or more components included in the broadcast service and/or signaling information for the broadcast service. Component signaling may include information used to acquire components included in the broadcast service in a receiver. Service signaling, component signaling, and/or data for one or more broadcast services may be transmitted to a link layer through processing in an IP layer.

In the link layer, the transmitter performs overhead reduction when overhead reduction for an IP packet is needed and generates related information as link layer signaling. Link layer signaling may include a system parameter specifying the broadcast system, in addition to the above-described information. The transmitter may process an IP packet in a link layer processing procedure and transmit the processed IP packet to a physical layer in the form of one or more DPs.

The transmitter may transmit link layer signaling to the receiver in the form or configuration of an FIC and/or an EAC. Meanwhile, the transmitter may also transmit link layer signaling to the base DP through an encapsulation procedure of the link layer.

Figure 104:
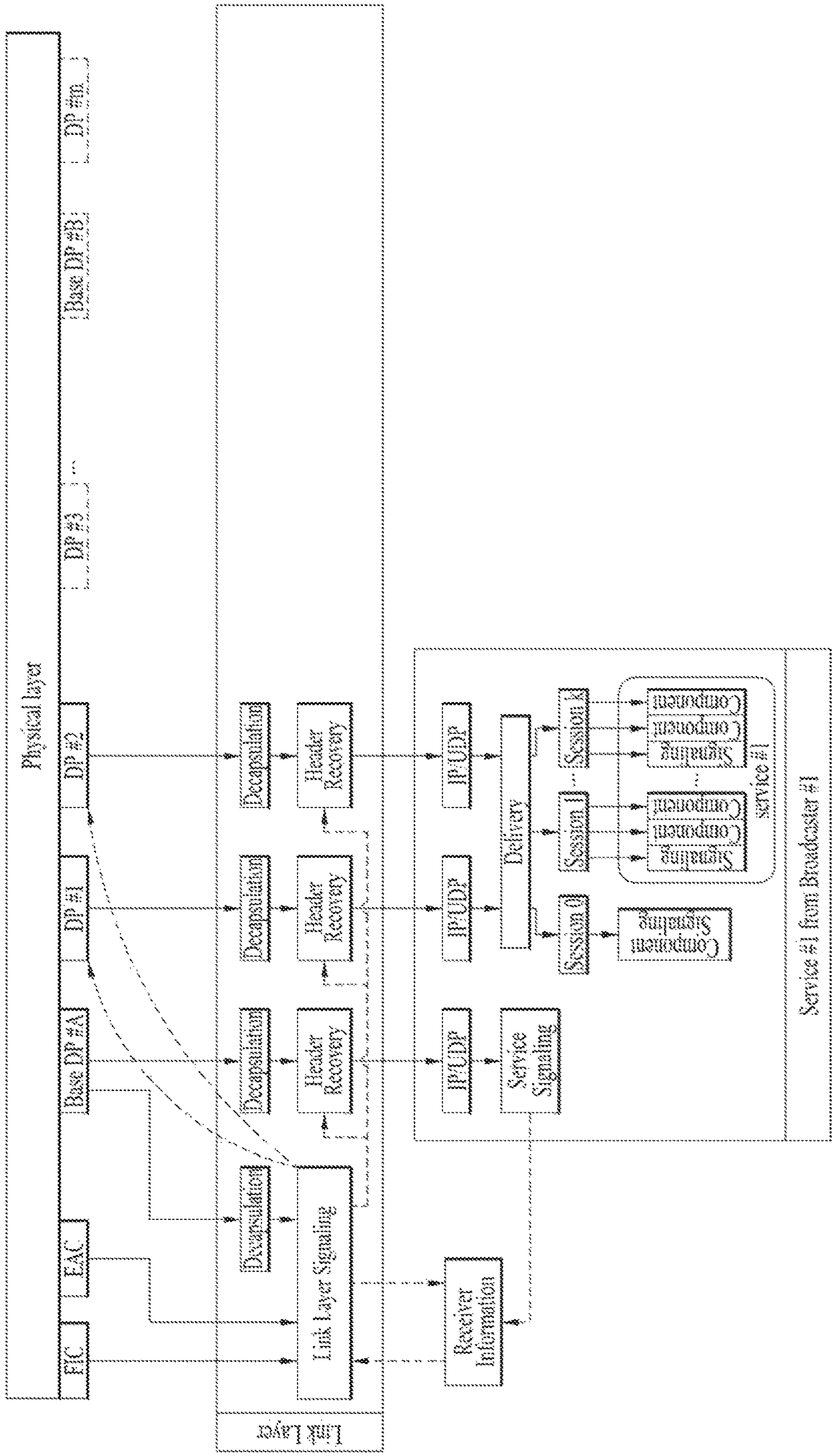
FIG. 104 is a view illustrating a detailed processing operation of signals and/or data in each protocol stack of a receiver, in a case in which a logical data path of a physical layer includes a dedicated channel, a base DP, and a normal data DP, according to another embodiment of the present invention.

FIG. 104 is a diagram illustrating a detailed processing operation of a signal and/or data in each protocol stack of a receiver when a logical data path of a physical layer includes a dedicated channel, a base DP, and a normal data DP, according to another embodiment of the present invention.

If a user selects or changes a service desired to be received, a receiver tunes to a corresponding frequency. The receiver reads information stored in a DB etc. in association with a corresponding channel. The information stored in the DB etc. of the receiver may be information included upon acquiring an FIC and/or an EAC during initial channel scan. Alternatively, the receiver may extract transmitted information as described above in this specification.

The receiver may receive the FIC and/or the EAC, receive information about a channel that the receiver desires to access, and then update information pre-stored in the DB. The receiver may acquire components for a service selected by a user and information about a mapping relationship of a DP transmitted by each component or acquire a base DP and/or a normal DP through which signaling necessary to obtain such information is transmitted. Meanwhile, when it is judged that there is no change in corresponding information using version information of the FIC or information identifying whether to require additional update of a dedicated channel, the receiver may omit a procedure of decoding or parsing the received FIC and/or EAC.

The receiver may acquire a link layer signaling packet including link layer signaling information by decoding a base DP and/or a DP through which signaling information is transmitted, based on information transmitted through the FIC. The receiver may use, when necessary, the received link layer signaling information by a combination with signaling information (e.g., receiver information in the drawing) received through the dedicated channel.

The receiver may acquire information about a DP for receiving a service selected by the user among multiple DPs that are being transmitted over a current channel and overhead reduction information about a packet stream of the corresponding DP, using the FIC and/or the link layer signaling information.

When the information about the DP for receiving the selected service is transmitted through upper layer signaling, the receiver may acquire signaling information stored in the DB and/or the shared memory as described above and then acquire information about a DP to be decoded, indicated by the corresponding signaling information.

When the link layer signaling information and normal data (e.g., data included in broadcast content) are transmitted through the same DP or only one DP is used for transmission of the link layer signaling information and normal data, the receiver may temporarily store the normal data transmitted through the DP in a device such as a buffer while the signaling information is decoded and/or parsed.

The receiver may acquire the base DP and/or the DP through which the signaling information is transmitted, acquire overhead reduction information about a DP to be received, perform decapsulation and/or header recovery for a packet stream received in a normal DP, using the acquired overhead information, process the packet stream in the form of an IP packet stream, and transmit the IP packet stream to an upper layer of the receiver.

FIG. 105 is a diagram illustrating a syntax of an FIC according to another embodiment of the present invention.

Information included in the FIC described in this drawing may be selectively combined with other information included in the FIC and may configure the FIC.

The receiver may rapidly acquire information about a channel, using the information included in the FIC. The receiver may acquire bootstrap related information using the information included in the FIC. The FIC may include information for fast channel scan and/or fast service acquisition. The FIC may be referred to by other names, for example, a service list table or service acquisition information. The FIC may be transmitted by being included in an IP packet in an IP layer according to a broadcast system. In this case, an IP address and/or a UDP port number, transmitting the FIC, may be fixed to specific values and the receiver may recognize that the IP packet transmitted with the corresponding IP address and/or UDP port number includes the FIC, without an additional processing procedure.

The FIC may include FIC_protocol_version information, transport_stream_id information, num_partitions information, partition_id information, partition_protocol version information, num_services information, service_id information, service_data_version information, service_channel_number information, service_category information, service_status information, service_distribution information, sp_indicator information, IP_version_flag information, SSC_source_IP_address_flag information, SSC_source_IP_address information, SSC_destination_IP_address information, SSC_destination_UDP_port information, SSC_TSI information, SSC_DP_ID information, num_partition level descriptors information, partition_level_descriptor( ) information, num_FIC_level_descriptors information, and/or FIC_level_descriptor( ) information.

FIC_protocol_version information represents a version of a protocol of an FIC.

transport_stream_id information identifies a broadcast stream. transport_stream_id information may be used as information for identifying a broadcaster.

num_partitions information represents the number of partitions in a broadcast stream. The broadcast stream may be transmitted after being divided into one or more partitions. Each partition may include one or more DPs. The DPs included in each partition may be used by one broadcaster. In this case, the partition may be defined as a data transmission unit allocated to each broadcaster.

partition_id information identifies a partition. partition_id information may identify a broadcaster.

partition_protocol_version information represents a version of a protocol of a partition.

num_services information represents the number of services included in a partition. A service may include one or more components.

service_id information identifies a service.

service_data_version information represents change when a signaling table (signaling information) for a service is changed or a service entry for a service signaled by an FIC is changed. service_data_version information may increment a value thereof whenever such change is present.

service_channel_number information represents a channel number of a service.

service_category information represents a category of a service. The category of a service includes A/V content, audio content, an electronic service guide (ESG), and/or content on demand (CoD).

service_status information represents a state of a service. A state of a service may include an active or suspended state and a hidden or shown state. The state of a service may include an inactive state. In the inactive state, broadcast content is not currently provided but may be provided later. Accordingly, when a viewer scans a channel in a receiver, the receiver may not show a scan result for a corresponding service to the viewer.

service_distribution information represents a distribution state of data for a service. For example, service_distribution information may represent that entire data of a service is included in one partition, partial data of a service is not included in a current partition but content is presentable only by data in this partition, another partition is needed to present content, or another broadcast stream is needed to present content.

sp_indicator information identifies whether service protection has been applied. sp_indicator information may identify, for example, for meaningful presentation, whether one or more necessary components are protected (e.g., a state in which a component is encrypted).

IP version flag information identifies whether an IP address indicated by SSC_source_IP_address information and/or SSC_destination_IP_address information is an IPv4 address or an IPv6 address.

SSC_source_IP_address_flag information identifies whether SSC_source_IP_address information is present.

SSC_source_IP_address information represents a source IP address of an IP datagram that transmits signaling information for a service. The signaling information for a service may be referred to as service layer signaling. Service layer signaling includes information specifying a broadcast service. For example, service layer signaling may include information identifying a data unit (a session, a DP, or a packet) that transmits components constituting a broadcast service.

SSC_destination_IP_address information represents a destination IP address of an IP datagram (or channel) that transmits signaling information for a service.

SSC_destination_UDP_port information represents a destination UDP port number for a UDP/IP stream that transmits signaling information for a service.

SSC_TSI information represents a transport session identifier (TSI) of an LCT channel (or session) that transmits signaling information (or a signaling table) for a service.

SSC_DP_ID information represents an ID for identifying a DP including signaling information (or a signaling table) for a service. As a DP including the signaling information, the most robust DP in a broadcast transmission process may be allocated.

num_partition_level_descriptors information identifies the number of descriptors of a partition level for a partition.

partition_level_descriptor( ) information includes zero or more descriptors that provide additional information for a partition.

num_FIC_level_descriptors information represents the number of descriptors of an FIC level for an FIC.

FIC_level_descriptor( ) information includes zero or more descriptors that provide additional information for an FIC.

Figure 106:
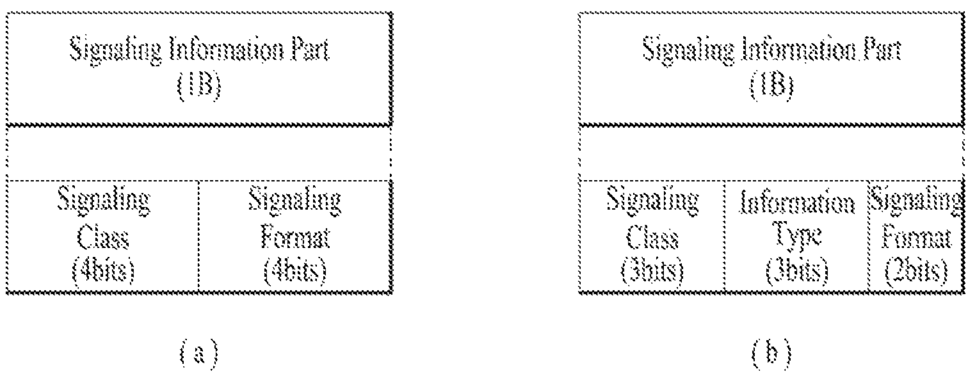
FIG. 106 is a view illustrating Signaling Information Part( ) according to an embodiment of the present invention.

FIG. 106 is a diagram illustrating signaling_Information_Part( ) according to an embodiment of the present invention.

A broadcast system may add additional information to an extended header part in the case of a packet for transmitting signaling information in a structure of a packet transmitted through the above-described DP. Such additional information will be referred to as Signaling_Information_Part( ).

Signaling_Information_Part( ) may include information used to determine a processing module (or processor) for received signaling information. In a system configuration procedure, the broadcast system may adjust the number of fields indicating information and the number of bits allocated to each field, in a byte allocated to Signaling_Information_Part( ). When signaling information is transmitted through multiplexing, a receiver may use information included in Signaling_Information_Part( ) to determine whether corresponding signaling information is processed and determine to which signaling processing module signaling information should be transmitted.

Signaling_Information_Part( ) may include Signaling_Class information, Information Type information, and/or signaling format information.

Signaling_Class information may represent a class of transmitted signaling information. Signaling information may correspond to an FIC, an EAC, link layer signaling information, service signaling information, and/or upper layer signaling information. Mapping for a class of signaling information indicated by each value of configuration of the number of bits of a field of Signaling_Class information may be determined according to system design.

Information Type information may be used to indicate details of signaling information identified by signaling class information. Meaning of a value indicated by Information Type information may be additionally defined according to class of signaling information indicated by Signaling_Class information.

Signaling format information represents a form (or format) of signaling information configured in a payload. The signaling format information may identify formats of different types of signaling information illustrated in the drawing and identify a format of additionally designated signaling information.

Signaling_Information_Part( ) of (a) and (b) illustrated in the drawing is one embodiment and the number of bits allocated to each field thereof may be adjusted according to characteristics of the broadcast system.

Signaling_Information_Part( ) as in (a) of the drawing may include signaling class information and/or signaling format information. Signaling_Information_Part( ) may be used when a type of signaling information need not be designated or an information type can be judged in signaling information. Alternatively, when only one signaling format is used or when an additional protocol for signaling is present so that signaling formats are always equal, only a 4-bit signaling class field may be used without configuring a signaling field and the other fields may be reserved for later use or an 8-bit signaling class maybe configured to support various types of signaling.

Signaling_Information_Part( ) as in (b) of the drawing may further include information type information for indicating a type or characteristic of more detailed information in a signaling class when the signaling class is designated and may also include signaling format information. Signaling class information and information type information may be used to determine decapsulation of signaling information or a processing procedure of corresponding signaling. A detailed structure or processing of link layer signaling may refer to the above description and a description which will be given below.

Figure 107:
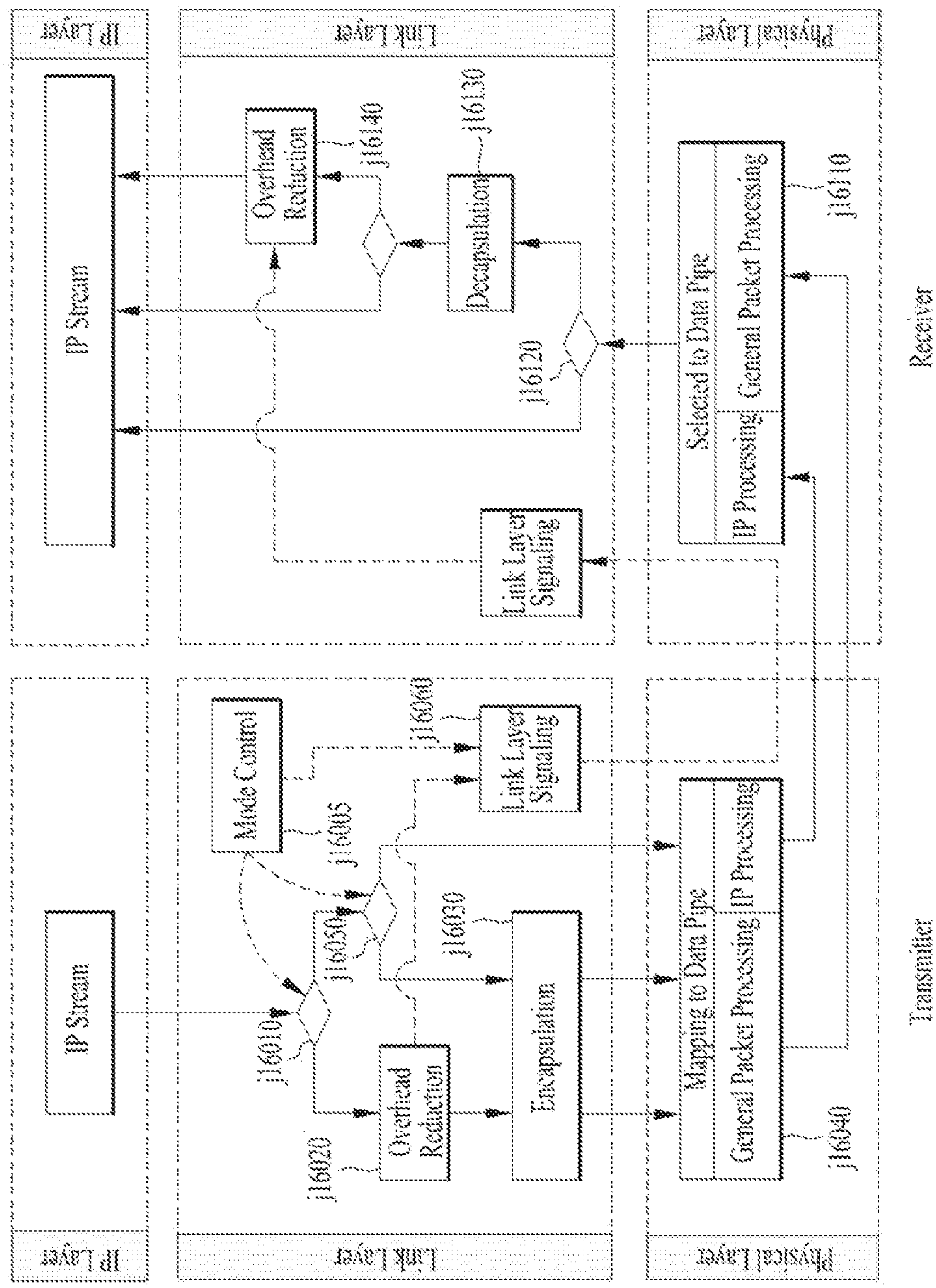
FIG. 107 is a view illustrating a process of controlling an operation mode of a transmitter and/or a receiver in a link layer according to an embodiment of the present invention.

FIG. 107 is a diagram illustrating a procedure for controlling an operation mode of a transmitter and/or a receiver in a link layer according to an embodiment of the present invention.

When the operation mode of the transmitter or the receiver of the link layer is determined, a broadcast system can be more efficiently used and can be flexibly designed. The method of controlling the link layer mode proposed according to the present invention can dynamically convert a mode of a link layer in order to efficiently manage a system bandwidth and processing time. In addition, the method of controlling the link layer mode according to the present invention may easily cope with the case in which a specific mode needs to be supported due to change in a physical layer or on the other hand, the specific mode does not have to be changed any more. In addition, the method of controlling the link layer mode according to the present invention may also allow a broadcast system to easily satisfy requirements of a corresponding broadcaster when a broadcaster providing a broadcast service intends to designate a method of transmitting a corresponding service.

The method of controlling the mode of the link layer may be configured to be performed only in a link layer or to be performed via change in data configuration in the link layer. In this case, it is possible to perform an independent operation of each layer in a network layer and/or a physical layer without embodiment of a separate function. In the mode of the link layer proposed according to the present invention, it is possible to control the mode with signaling or parameters in a system without changing a system in order to satisfy configuration of a physical layer. A specific mode may be performed only when processing of corresponding input is supported in a physical layer.

The diagram is a flowchart illustrating processing of signal and/or data in an IP layer, a link layer, and a physical layer by a transmitter and/or a receiver.

A function block (which may be embodied as hardware and/or software) for mode control may be added to the link layer and may manage parameter and/or signaling information for determination of whether a packet is processed. The link layer may determine whether a corresponding function is performed during processing of a packet stream using information of a mode control functional block.

First, an operation of the transmitter will be described.

When an IP is input to a link layer, the transmitter determines whether overhead reduction (j16020) is performed using a mode control parameter (j16005). The mode control parameter may be generated by a service provider in the transmitter. The mode control parameter will be described below in detail.

When the overhead reduction (j16020) is performed, information about overhead reduction is generated and is added to link layer signaling (j16060) information. The link layer signaling (j16060) information may include all or some of mode control parameters. The link layer signaling (j16060) information may be transmitted in the form of link layer signaling packet. The link layer signaling packet may be mapped to a DP and transmitted to the receiver, but may not be mapped to the DP and may be transmitted to the receiver in the form of link layer signaling packet through a predetermined region of a broadcast signal.

A packet stream on which the overhead reduction (j16020) is performed is encapsulated (j16030) and input to a DP of a physical layer (j16040). When overhead reduction is not performed, whether encapsulation is performed is re-determined (j16050).

A packet stream on which the encapsulation (j16030) is performed is input to a DP (j16040) of a physical layer. In this case, the physical layer performs an operation for processing a general packet (a link layer packet). When overhead reduction and encapsulation are not performed, an IP packet is transmitted directly to a physical layer. In this case, the physical layer performs an operation for processing the IP packet. When the IP packet is directly transmitted, a parameter may be applied to perform the operation only when the physical layer support IP packet input. That is, a value of a mode control parameter may be configured to be adjusted such that a process of transmitting an IP packet directly to a physical layer is not performed when the physical layer does not support processing of an IP packet.

The transmitter transmits a broadcast signal on which this process is performed, to the receiver.

An operation of the receiver will be described below.

When a specific DP is selected for the reason such channel change and so on according to user manipulation and a corresponding DP receives a packet stream (j16110), the receiver may check a mode in which a packet is generated, using a header and/or signaling information of the packet stream (j16120). When the operation mode during transmission of the corresponding DP is checked, decapsulation (j16130) and overhead reduction (j16140) processes are performed through a receiving operating process of a link layer and then an IP packet is transmitted to an upper layer. The overhead reduction (j16140) process may include an overhead recovery process.

FIG. 108 is a diagram illustrating an operation in a link layer according to a value of a flag and a type of a packet transmitted to a physical layer according to an embodiment of the present invention.

In order to determine an operation mode of the link layer, the aforementioned signaling method may be used. Signaling information associated with the method may be transmitted directly to a receiver. In this case, the aforementioned signaling data or link layer signaling packet may include mode control that will be described below and related information.

In consideration of the complexity of the receiver, an operation mode of the link layer may be indirectly indicated to the receiver.

The following two flags may be configured with regard to control of an operation mode.

Header compression flag (HCF): This may be a flag for determination of whether header compression is applied to a corresponding link layer and may have a value indicating enable or disable.

Encapsulation flag (EF): This may be a flag for determination of whether encapsulation is applied in a corresponding link layer and may have a value indicating enable or disable. However, when encapsulation needs to be performed according to a header compression scheme, the EF may be defined to be dependent upon a HCF.

A value mapped to each flag may be applied according to system configuration as long as the value represents Enable and Disable, and a bit number allocated to each flag can be changed. According to an embodiment of the present invention, an enable value may be mapped to 1 and a disable value may be mapped to 0.

The diagram shows whether header compression and encapsulation included in a link layer are performed according to values of HCF and EF and in this case, a packet format transmitted to a physical layer. That is, according to an embodiment of the present invention, the receiver can know a type of a packet input to the physical layer as information about the HCF and the EF.

FIG. 109 is a diagram a descriptor for signaling a mode control parameter according to an embodiment of the present invention.

Flags as information about mode control in a link layer may be signaling information, generated by the transmitter in the form of descriptor, and transmitted to the receiver. Signaling including a flag as information about mode control may be used to control an operation mode in a transmitter of a headend terminal, and whether a flag as information about mode control is included in signaling transmitted to the receiver may be optionally selected.

When signaling including a flag as information about mode control is transmitted to the receiver, the receiver may directly select an operation mode about a corresponding DP and perform a packet decapsulation operation. When signaling including a flag as information about mode control is not transmitted to the receiver, the receiver can determine a mode in which the signaling is transmitted, using physical layer signaling or field information of a packet header, which is transmitted to the receiver.

The link layer mode control description according to an embodiment of the present invention may include DP_id information, HCF information, and/or EF information. The link layer mode control description may be included in a transmission parameter in the aforementioned FIC, link layer signaling packet, signaling via a dedicated channel, PSI/SI, and/or physical layer.

The DP_id information identifies a DP to which a mode in a link layer is applied.

The HCF information identifies whether header compression is applied in the DP identified by the DP_id information.

The EF information identifies whether encapsulation is performed on the DP identified by the DP_id information.

Figure 110:
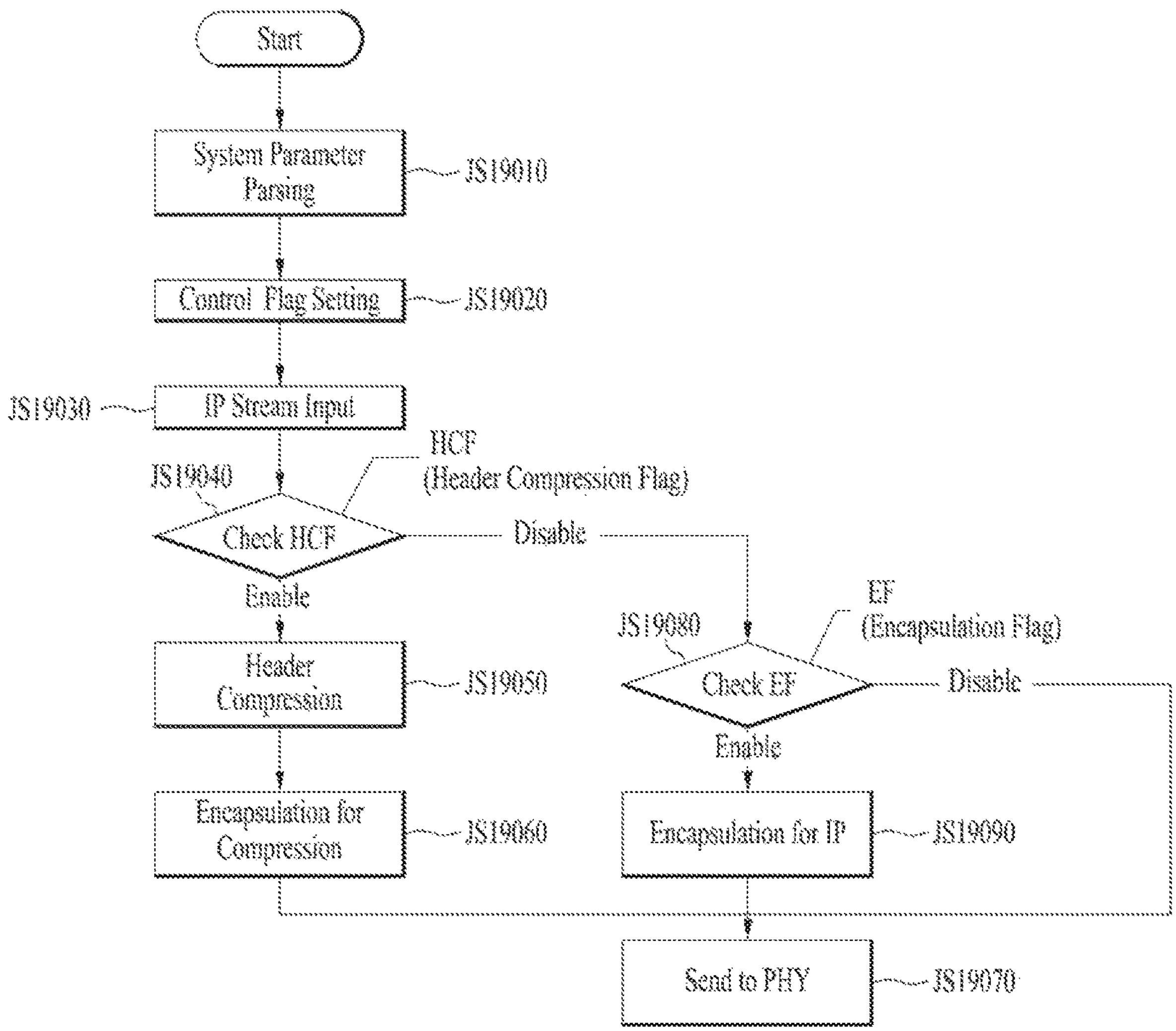
FIG. 110 is a view illustrating the operation of a transmitter that controls an operation mode according to an embodiment of the present invention.

FIG. 110 is a diagram illustrating an operation of a transmitter for controlling an operation mode according to an embodiment of the present invention.

Although not illustrated in the diagram, prior to a processing process of al ink layer, a transmitter may perform processing in an upper layer (e.g., an IP layer). The transmitter may generate an IP packet including broadcast data for a broadcast service.

The transmitter parses or generates a system parameter (JS19010). Here, the system parameter may correspond to the aforementioned signaling data and signaling information.

The transmitter may receive or set mode control related parameter or signaling information during a broadcast data processing process in a link layer and sets a flag value associated with operation mode control (JS19020). The transmitter may perform this operation after the header compression operation or the encapsulation operation. That is, the transmitter may perform the header compression or encapsulation operation and generate information associated with this operation.

The transmitter acquires a packet of an upper layer that needs to be transmitted through a broadcast signal (JS19030). Here, the packet of the upper layer may correspond to an IP packet.

The transmitter checks HCF in order to determine whether header compression is applied to the packet of the upper layer (JS19040).

When the HCF is enabled, the transmitter applies the header compression to the packet of the upper layer (JS19050). After header compression is performed, the transmitter may generate the HCF. The HCF may be used to signal whether header compression is applied, to the receiver.

The transmitter performs encapsulation on the packet of the upper layer to which header compression is applied to generate a link layer packet (JS19060). After the encapsulation process is performed, the transmitter may generate an EF. The EF may be used to signal whether encapsulation is applied to the upper layer packet, to the receiver.

The transmitter transmits the link layer packet to a physical layer processor (JS19070). Then the physical layer processor generates a broadcast signal including the link layer packet and transmits the broadcast signal to the receiver.

When the HCF is disabled, the transmitter checks the EF in order to determine whether encapsulation is applied (JS19080).

When the EF is enabled, the transmitter performs encapsulation on the upper layer packet (JS19090). When the EF is disabled, the transmitter does not perform separate processing on the corresponding packet stream. The transmitter transmits the packet stream (link layer packet) on which processing is completed in the link layer, to a physical layer (JS19070). Header compression, encapsulation, and/or generation of link layer may be performed by a link layer packet generator (i.e. link layer processor) in the transmitter.

The transmitter may generate service signaling channel (SCC) data. The service signaling channel data may be generated by a service signaling data encoder. The service signaling data encoder may be included in a link layer processor and may present separately from the link layer processor. The service signaling channel data may include the aforementioned FIC and/or EAT. The service signaling channel data may be transmitted to the aforementioned dedicated channel.

Figure 111:
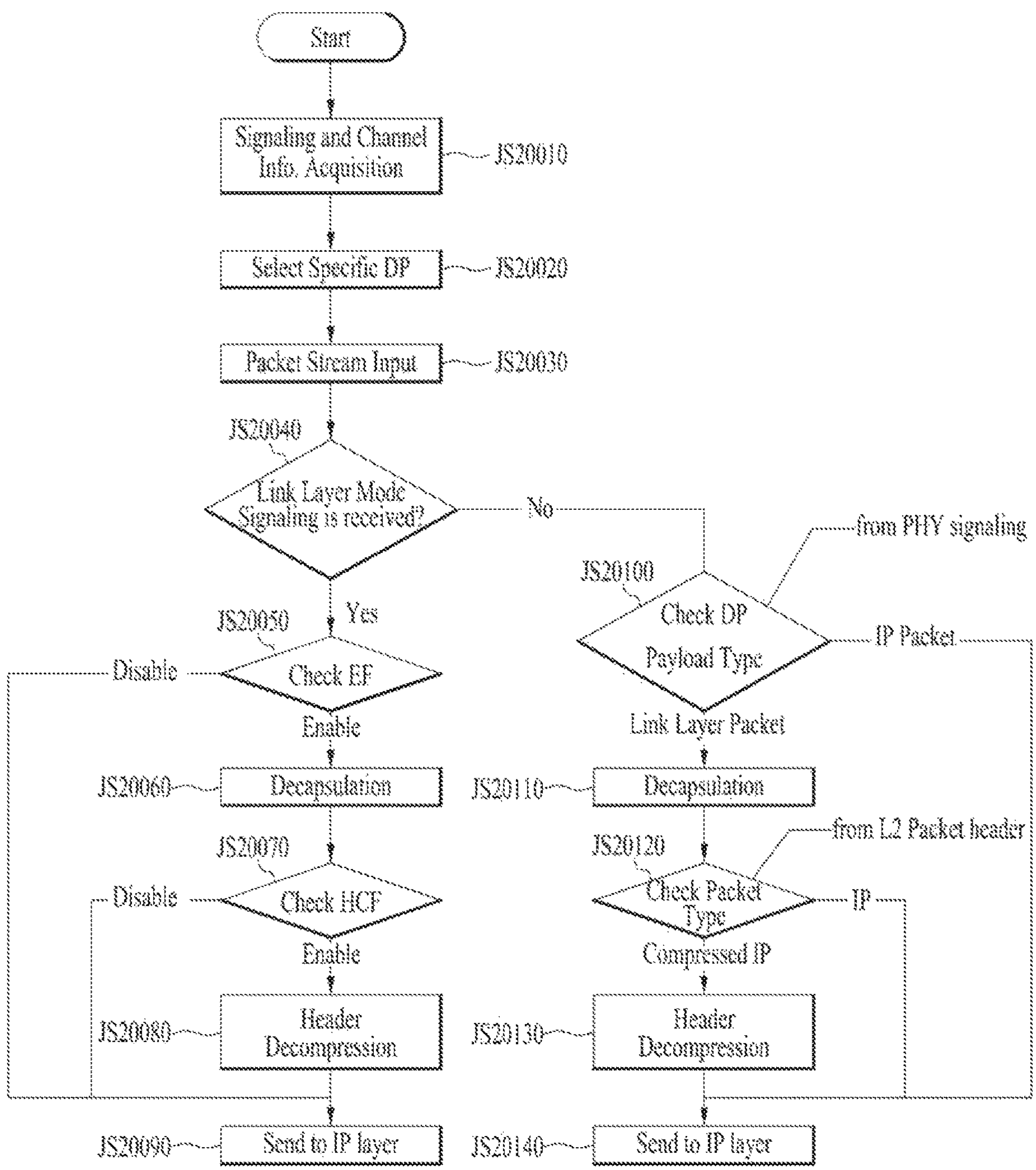
FIG. 111 is a view illustrating the operation of a transmitter that processes a broadcast signal based on an operation mode according to an embodiment of the present invention.

FIG. 111 is a diagram illustrating an operation of a receiver for processing a broadcast signal according to an operation mode according to an embodiment of the present invention.

A receiver may receive information associated with an operation mode in a link layer together with a packet stream.

The receiver receives signaling information and/or channel information (JS20010). Here, a description of the signaling information and/or the channel information is replaced with the above description.

The receiver selects a DP for receiving and processing according to the signaling information and/or the channel information (JS20020).

The receiver performs decoding of a physical layer on the selected DP and receives a packet stream of a link layer (JS20030).

The receiver checks whether link layer mode control related signaling is included in the received signaling (JS20040).

When the receiver receives the link layer mode related information, the receiver checks an EF (JS20050).

When the EF is enabled, the receiver performs a decapsulation process on a link layer packet (JS20060).

The receiver checks an HCF after decapsulation of the packet, and performs a header decompression process when the HCF is enabled (JS20080).

The receiver transmits the packet on which header decompression is performed, to an upper layer (e.g., an IP layer) (JS20090). During the aforementioned process, when the HCF and the EF are disabled, the receiver recognizes the processed packet stream as an IP packet and transmits the corresponding packet to the IP layer.

When the receiver does not receive link layer mode related information or a corresponding system does not transmit the link layer mode related information to the receiver, the following operation is performed.

The receiver receives signaling information and/or channel information (JS20010) and selects a DP for reception and processing according to corresponding information (JS20020). The receiver performs decoding of the physical layer on the selected DP to acquire a packet stream (JS20030).

The receiver checks whether the received signaling includes link layer mode control related signaling (JS20040).

Since the receiver does not receive link layer mode related signaling, the receiver checks a format of the packet transmitted using physical layer signaling, etc. (J520100). Here, the physical layer signaling information may include information for identification of a type of the packet included in a payload of the DP. When the packet transmitted from the physical layer is an IP packet, the receiver transmits the packet to the IP layer without a separate process in a link layer.

When a packet transmitted from a physical layer is a packet on which encapsulation is performed, the receiver performs a decapsulation process on the corresponding packet (J520110).

The receiver checks the form of a packet included in a payload using information such as a header, etc. of the link layer packet during the decapsulation process (J520120), and the receiver transmits the corresponding packet to the IP layer processor when the payload is an IP packet.

When the payload of the link layer packet is a compressed IP, the receiver performs a decompression process on the corresponding packet (JS20130).

The receiver transmits the IP packet to an IP layer processor (JS20140).

FIG. 112 is a diagram illustrating information for identifying an encapsulation mode according to an embodiment of the present invention.

In a broadcast system, when processing in a link layer operates in one or more modes, a procedure for determining as which mode processing in the link layer operates (in a transmitter and/or a receiver) may be needed. In a procedure of establishing a transmission link between the transmitter and the receiver, the transmitter and/or the receiver may confirm configuration information of the link layer. This case may correspond to the case in which the receiver is initially set up or performs a scan procedure for a service or a mobile receiver newly enters an area within a transmission radius of the transmitter. This procedure may be referred to as an initialization procedure or a bootstrapping procedure. This procedure may be configured as a partial process of a procedure supported by the system without being configured by an additional procedure. In this specification, this procedure will be referred to as an initialization procedure.

Parameters needed in the initialization procedure may be determined according to functions supported by a corresponding link layer and types of operating modes possessed by each function. A description will be given hereinafter of the parameters capable of determining functions constituting the link layer and operation modes according to the functions.

The above-described drawing illustrates parameters for identifying an encapsulation mode.

When a procedure for encapsulating a packet in a link layer or an upper layer (e.g., an IP layer) can be configured, indexes are assigned to respective encapsulation modes and a proper field value may be allocated to each index. The drawing illustrates an embodiment of a field value mapped to each encapsulation mode. While it is assumed that a 2-bit field value is assigned in this embodiment, the field value may be expanded within a range permitted by the system in actual implementation, when more supportable encapsulation modes are present.

In this embodiment, if a field of information indicating an encapsulation mode is set to '00', the corresponding information may represent that encapsulation in a link layer is bypasses and not performed. If a field of information indicating an encapsulation mode is set to '01', the corresponding information may represent that data is processed by a first encapsulation scheme in the link layer. If a field of information indicating an encapsulation mode is set to '10', the corresponding information may represent that data is processed by a second encapsulation scheme in the link layer. If a field of information indicating an encapsulation mode is set to '11', the corresponding information may represent that data is processed by a third encapsulation scheme in the link layer.

FIG. 113 is a diagram illustrating information for identifying a header compression mode according to an embodiment of the present invention.

Processing in a link layer may include a function of header compression of an IP packet. If a few IP header compression schemes are capable of being supported in the link layer, a transmitter may determine which scheme the transmitter is to use.

Determination of a header compression mode generally accompanies an encapsulation function. Therefore, when the encapsulation mode is disabled, the header compression mode may also be disabled. The above-described drawing illustrates an embodiment of a field value mapped to each header compression mode. While it is assumed that a 3-bit field value is assigned in this embodiment, the field value may be expanded or shortened within a range permitted by the system in actual implementation according to a supportable header compression mode.

In this embodiment, if a field of information indicating the header compression mode is set to '000', the corresponding information may indicate that header compression processing for data is not performed in a link layer. If a field of information indicating the header compression mode is set to '001', the corresponding information may indicate that header compression processing for data in the link layer uses an RoHC scheme. If a field of information indicating the header compression mode is set to '010', the corresponding information may indicate that header compression processing for data in the link layer uses a second RoHC scheme. If a field of information indicating the header compression mode is set to '011', the corresponding information may indicate that header compression processing for data in the link layer uses a third RoHC scheme. If a field of information indicating the header compression mode is set to '100' to '111', the corresponding information may indicate that header compressing for data is reserved as a region for identifying a new header compression processing scheme for data in the link layer.

FIG. 114 is a diagram illustrating information for identifying a packet reconfiguration mode according to an embodiment of the present invention.

To apply a header compression scheme to a unidirectional link such as a broadcast system, the broadcast system (transmitter and/or receiver) needs to rapidly acquire context information. The broadcast system may transmit/receive a packet stream after a header compression procedure in an out-of-band form through reconfiguration of partial compressed packets and/or extraction of context information. In the present invention, a mode for reconfiguring a packet or performing processing such as addition of information capable of identifying the structure of the packet may be referred to as a packet reconfiguration mode.

The packet reconfiguration mode may use a few schemes and the broadcast system may designate a corresponding scheme in an initialization procedure of a link layer. The above-described drawing illustrates an embodiment of an index and a field value mapped to the packet reconfiguration mode. While it is assumed that a 2-bit field value is assigned in this embodiment, the field value may be expanded or shortened within a range permitted by the system in actual implementation according to a supportable packet reconfiguration mode.

In this embodiment, if a field of information indicating the packet reconfiguration mode is set to '00', corresponding information may represent that reconfiguration for a packet transmitting data is not performed in a link layer. If a field of information indicating the packet reconfiguration mode is set to '01', corresponding information may represent that a first reconfiguration scheme is performed for a packet transmitting data in the link layer. If a field of information indicating the packet reconfiguration mode is set to '10', corresponding information may represent that a second reconfiguration scheme is performed for a packet transmitting data in the link layer. If a field of information indicating the packet reconfiguration mode is set to '11', corresponding information may represent that a third reconfiguration scheme is performed for a packet transmitting data in the link layer.

FIG. 115 is a diagram illustrating a context transmission mode according to an embodiment of the present invention.

A transmission scheme of the above-described context information may include one or more transmission modes. That is, the broadcast system may transmit the context information in many ways. In the broadcast system, a context transmission mode may be determined according to the system and/or a transmission path of a logical physical layer and information for identifying the context transmission scheme may be signaled. The above-described drawing illustrates an embodiment of an index and a field value mapped to the context transmission mode. While it is assumed that a 3-bit field value is assigned in this embodiment, the field value may be expanded or shortened within a range permitted by the system in actual implementation according to a supportable context transmission mode.

In this embodiment, if a field of information indicating the context transmission mode is set to '000', corresponding field information may represent that context information is transmitted as a first transmission mode. If a field of information indicating the context transmission mode is set to '001', corresponding information may represent that context information is transmitted as a second transmission mode. If a field of information indicating the context transmission mode is set to '010', corresponding information may represent that context information is transmitted as a third transmission mode. If a field of information indicating the context transmission mode is set to '011', corresponding information may represent that context information is transmitted as a fourth transmission mode. If a field of information indicating the context transmission mode is set to '100', corresponding information may represent that context information is transmitted as a fifth transmission mode. If a field of information indicating a context transmission mode is set to '101' to '111', corresponding information may represent that context information is reserved to identify a new transmission mode.

FIG. 116 is a diagram illustrating initialization information when RoHC is applied by a header compression scheme according to an embodiment of the present invention.

While the case in which RoHC is used for header compression has been described by way of example in the present invention, similar initialization information may be used in the broadcast system even when a header compression scheme of other types is used.

In the broadcast system, transmission of initialization information suitable for a corresponding compression scheme according to a header compression mode may be needed. In this embodiment, an initialization parameter for the case in which a header compression mode is set to RoHC is described. Initialization information for RoHC may be used to transmit information about configuration of an RoHC channel which is a link between a compressor and a decompressor.

One RoHC channel may include one or more context information and information commonly applied to all contexts in the RoHC channel may be transmitted/received by being included in the initialization information. A path through which related information is transmitted by applying RoHC may be referred to as an RoHC channel and, generally, the RoHC channel may be mapped to a link. In addition, the RoHC channel may be generally transmitted through one DP and, in this case, the RoHC channel may be expressed using information related to the DP.

The initialization information may include link_id information, max_cid information, large_cids information, num_profiles information, profiles( ) information, num_IP_stream information, and/or IP_address( ) information.

link_id information represents an ID of a link (RoHC channel) to which corresponding information is applied. When the link or the RoHC channel is transmitted through one DP, link_id information may be replaced with DP_id.

max_cid information represents a maximum value of a CID. max_cid information may be used to inform a decompressor of the maximum value of the CID.

large_cids information has a Boolean value and identifies whether a short CID (0 to 15) is used or an embedded CID (0 to 16383) is used in configuring a CID. Therefore, a byte size expressing the CID may also be determined.

num_profiles information represents the number of profiles supported in an identified RoHC channel.

profiles( ) information represents a range of a protocol header-compressed in RoHC. Since a compressor and a decompressor should have the same profile in RoHC to compress and recover a stream, a receiver may acquire a parameter of RoHC used in a transmitter from profiles( ) information.

num_IP_stream information represents the number of IP streams transmitted through a channel (e.g., an RoHC channel).

IP_address information represents an address of an IP stream. IP_address information may represent a destination address of a filtered IP stream which is input to an RoHC compressor (transmitter).

FIG. 117 is a diagram illustrating information for identifying link layer signaling path configuration according to an embodiment of the present invention.

In the broadcast system, generally, a path through which signaling information is delivered is designed not to be changed. However, when the system is changed or while replacement between different standards occurs, information about configuration of a physical layer in which link layer signaling information rather than an IP packet is transmitted needs to be signaled. In addition, when a mobile receiver moves between regions covered by transmitters having different configurations, since paths through which link layer signaling information is transmitted may differ, the case in which link layer signaling path information should be transmitted may occur. The above-described drawing illustrates information for identifying a signaling path which is a path through which the link layer signaling information is transmitted/received. Indexes may be expanded or shortened with respect to the link layer signaling information according to a signaling transmission path configured in a physical layer. Separately from configuration in a link layer, operation of a corresponding channel may conform to a procedure of the physical layer.

The above-described drawing illustrates an embodiment in which information about signaling path configuration is allocated to a field value. In this specification, when multiple signaling paths are supported, indexes may be mapped to signaling paths having great importance in order of small values. Signaling paths having priority prioritized according to an index value may also be identified.

Alternatively, the broadcast system may use all signaling paths having higher priority than signaling paths indicated by the information about signaling path configuration. For example, when a signaling path configuration index value is 3, a corresponding field value may be ‘011’ indicating that all of a dedicated data path, a specific signaling channel (FIC), and a specific signaling channel (EAC), priorities of which are 1, 2, and 3, are being used.

Signaling of the above scheme can reduce the amount of data that transmits signaling information.

FIG. 118 is a diagram illustrating information about signaling path configuration by a bit mapping scheme according to an embodiment of the present invention.

The above-described information about signaling path configuration may be transmitted/received through definition of a bit mapping scheme. In this embodiment, allocation of 4 bits to the information about signaling path configuration is considered and signaling paths corresponding to respective bits b1, b2, b3, and b4 may be mapped. If a bit value of each position is 0, this may indicate that a corresponding path is disabled and, if a bit value of each position is 1, this may indicate that a corresponding path is enabled. For example, if a 4-bit signaling path configuration field value is ‘1100’, this may indicate that the broadcast system is using a dedicated DP and a specific signaling channel (FIC) in a link layer.

Figure 119:
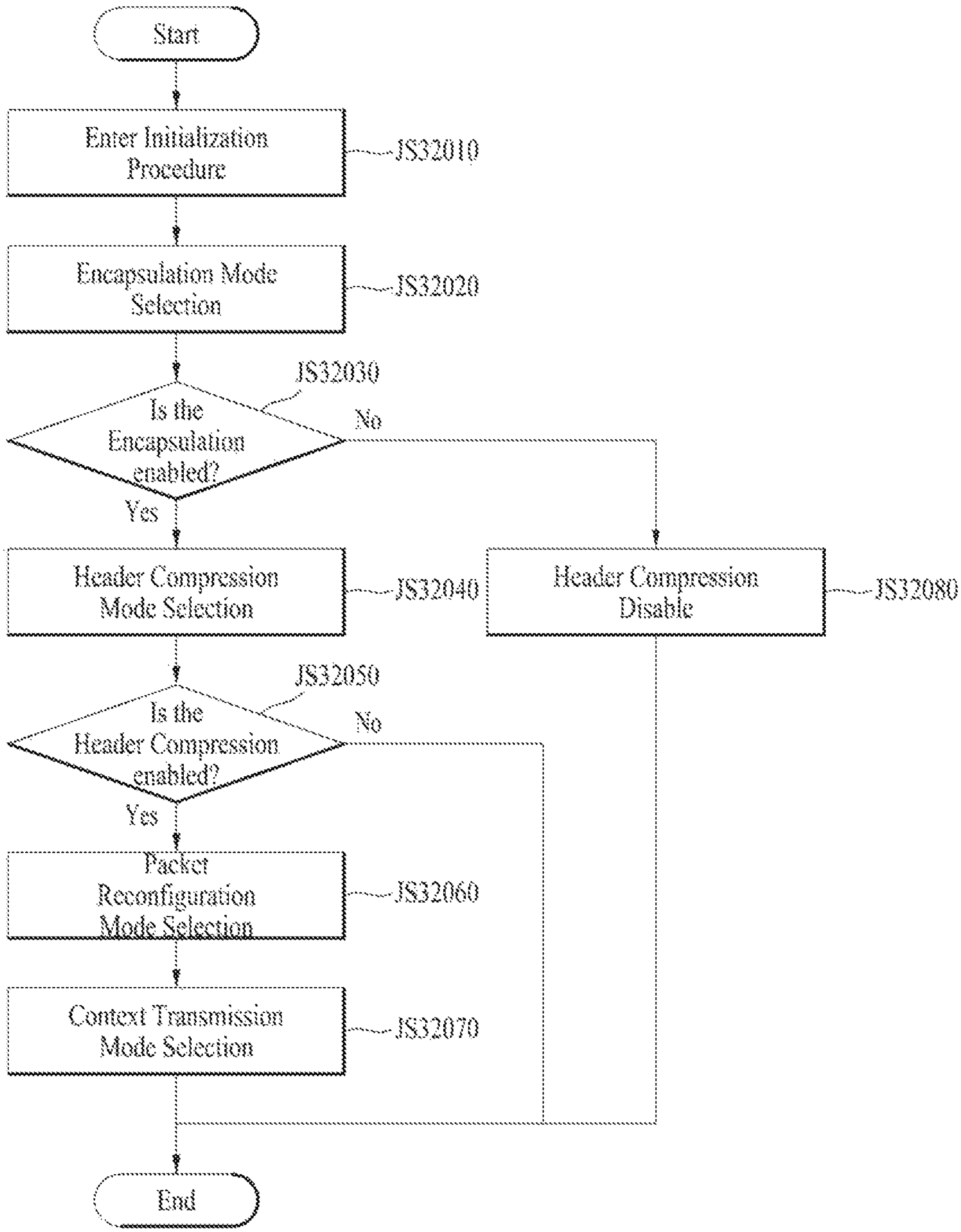

FIG. 119 is a flowchart illustrating a link layer initialization procedure according to an embodiment of the present invention.

If a receiver is powered on or a mobile receiver enters a transmission region of a new transmitter, the receiver may perform an initialization procedure for all or some system configurations. In this case, an initialization procedure for a link layer may also be performed. Initial setup of the link layer in the receiver, using the above-described initialization parameters may be performed as illustrated in the drawing.

The receiver enters an initialization procedure of a link layer (J532010).

Upon entering the initialization procedure of the link layer, the receiver selects an encapsulation mode (J532020). The receiver may select the encapsulation mode using the above-described initialization parameters in this procedure.

The receiver determines whether encapsulation is enabled (J532030). The receiver may determine whether encapsulation is enabled using the above-described initialization parameters in this procedure.

Generally, since a header compression scheme is applied after the encapsulation procedure, if an encapsulation mode is disabled, the receiver may determine that a header compression mode is disabled (JS32080). In this case, since it is not necessary for the receiver to proceed to the initialization procedure any more, the receiver may immediately transmit data to another layer or transition to a data processing procedure.

The receiver selects a header compression mode (JS32040) when the encapsulation mode is enabled. Upon selecting the header compression mode, the receiver may determine a header compression scheme applied to a packet, using the above-described initialization parameter.

The receiver determines whether header compression is enabled (JS32050). If header compression is disabled, the receiver may immediately transmit data or transition to a data processing procedure.

If header compression is enabled, the receiver selects a packet stream reconfiguration mode and/or a context transmission mode (JS32060 and JS32070) with respect to a corresponding header compression scheme. The receiver may select respective modes using the above-described information in this procedure.

Next, the receiver may transmit data for another processing procedure or perform the data processing procedure.

Figure 120:
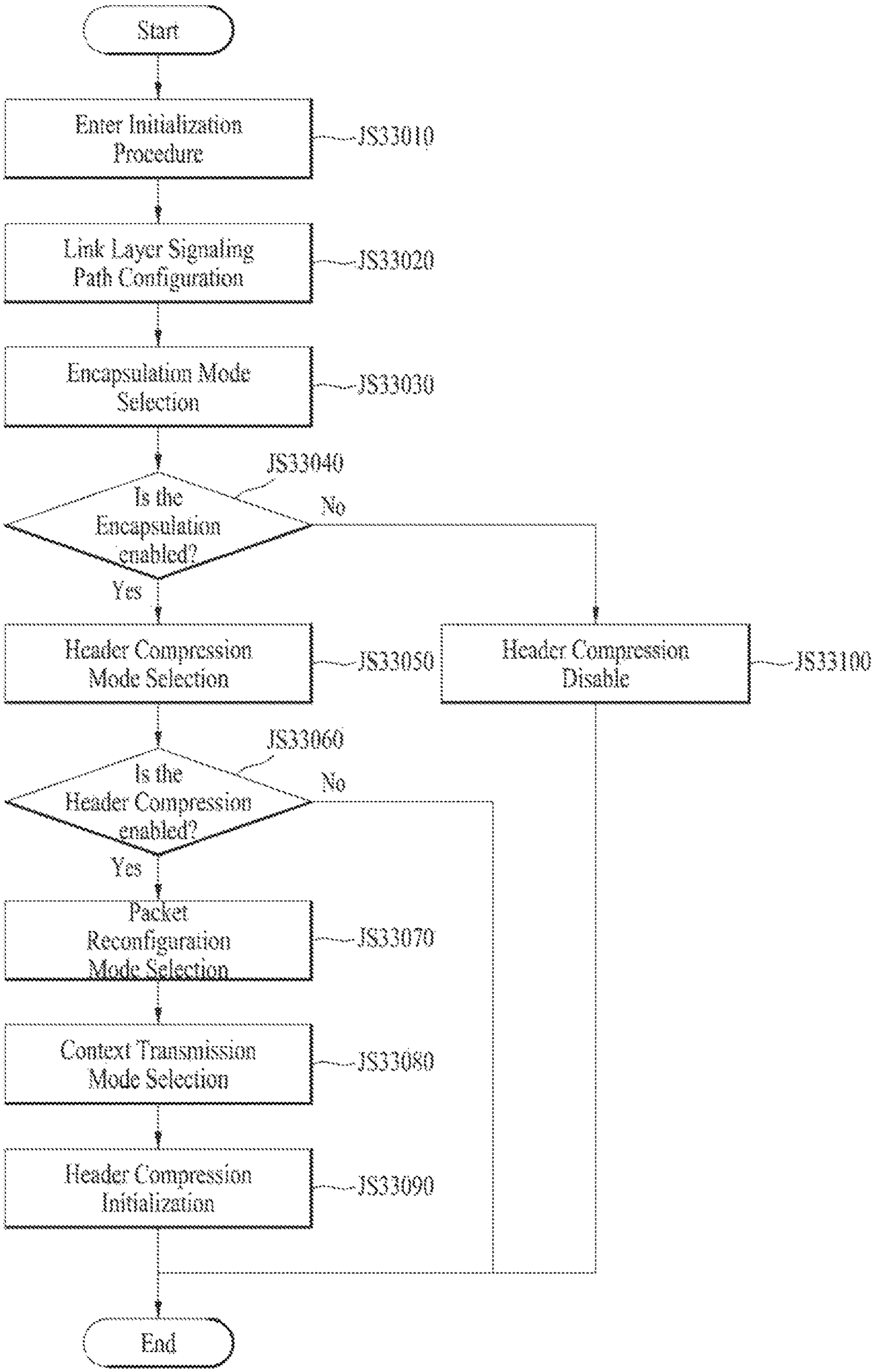

FIG. 120 is a flowchart illustrating a link layer initialization procedure according to another embodiment of the present invention.

The receiver enters an initialization procedure of a link layer (JS33010).

The receiver identifies link layer signaling path configuration (JS33020). The receiver may identify a path through which link layer signaling information is transmitted, using the above-described information.

The receiver selects an encapsulation mode (JS33030). The receiver may select the encapsulation mode using the above-described initialization parameter.

The receiver determines whether encapsulation is enabled (JS33040). The receiver may determine whether encapsulation is enabled, using the above-described initialization parameter in this procedure.

Generally, since a header compression scheme is applied after the encapsulation procedure, if an encapsulation mode is disabled, the receiver may determine that a header compression mode is disabled (JS34100). In this case, since it is not necessary for the receiver to proceed to the initialization procedure any more, the receiver may immediately transmit data to another layer or transition to a data processing procedure.

The receiver selects a header compression mode (JS33050) when the encapsulation mode is enabled. Upon selecting the header compression mode, the receiver may determine a header compression scheme applied to a packet, using the above-described initialization parameter.

The receiver determines whether header compression is enabled (JS33060). If header compression is disabled, the receiver may immediately transmit data or transition to the data processing procedure.

If header compression is enabled, the receiver selects a packet stream reconfiguration mode and/or a context transmission mode (JS33070 and JS32080) with respect to a corresponding header compression scheme. The receiver may select respective modes using the above-described information in this procedure.

The receiver performs header compression initialization (JS33090). The receiver may use the above-described information in a procedure of performing header compression initialization. Next, the receiver may transmit data for another processing procedure or perform the data processing procedure.

FIG. 121 is a diagram illustrating a signaling format for transmitting an initialization parameter according to an embodiment of the present invention.

To actually transmit the above-described initialization parameter to a receiver, the broadcast system may transmit/receive corresponding information in the form of a descriptor. When multiple links operated in a link layer configured in the system are present, link_id information capable of identifying the respective links may be assigned and different parameters may be applied according to link_id information. For example, if a type of data transmitted to the link layer is an IP stream, when an IP address is not changed in the corresponding IP stream, configuration information may designate n IP address transmitted by an upper layer.

The link layer initialization descriptor for transmitting the initialization parameter according to an embodiment of the present invention may include descriptor_tag information, descriptor_length information, num_link information, link_id information, encapsulation_mode information, header_compression_mode information, packet_reconfiguration_mode information, context_transmission_mode information, max_cid information, large_cids information, num_profiles information, and/or profiles( ) information. A description of the above information is replaced with a description of the above-described information having a similar or identical name.

FIG. 122 is a diagram illustrating a signaling format for transmitting an initialization parameter according to another embodiment of the present invention.

The drawing illustrates a descriptor of another form to actually transmit the above-described initialization parameter to a receiver. In this embodiment, the above-described initial configuration information of header compression is excluded. When an additional header compression initialization procedure is performed in data processing of each link layer or an additional header compression parameter is given to a packet of each link layer, the descriptor configured in the same form as in this embodiment may be transmitted and received.

The link layer initialization descriptor for transmitting the initialization parameter according to another embodiment of the present invention may include descriptor_tag information, descriptor_length information, num_link information, link_id information, encapsulation_mode information, header_compression_mode information, packet_reconfiguration_mode information, and/or context_transmission_mode information. A description of the above information is replaced with a description of the above-described information having a similar or identical name.

FIG. 123 is a diagram illustrating a signaling format for transmitting an initialization parameter according to another embodiment of the present invention.

The drawing illustrates a descriptor of another form to actually transmit the above-described initialization parameter to a receiver. In this embodiment, a descriptor for transmitting the initialization parameter includes configuration information about a signaling transmission path without including initial configuration information of header compression.

The configuration parameter about the signaling transmission path may use a 4-bit mapping scheme as described above. When a broadcast system (or transmitter or a receiver) for processing a broadcast signal is changed, a link layer signaling transmission scheme or the contents of link layer signaling may differ. In this case, if the initialization parameter is transmitted in the same form as in this embodiment, the initialization parameter may be used even in the case of change of link layer signaling.

The link layer initialization descriptor for transmitting the initialization parameter according to another embodiment of the present invention may include descriptor_tag information, descriptor_length information, num_link information, signaling_path_configuration information, dedicated_DP_id information, link_id information, encapsulation_mode information, header_compression_mode information, packet_reconfiguration_mode information, and/or context_transmission_mode information.

When the link layer signaling information is transmitted through a dedicated DP, dedicated_DP_id information is information identifying the corresponding DP. When the dedicated DP is determined as a path for transmitting the signaling information in signaling path configuration, DP_id may be designated to include DP_id information in the descriptor for transmitting the initialization parameter.

A description of the above information contained in the descriptor is replaced with a description of the above-described information having a similar or identical name.

Figure 124:
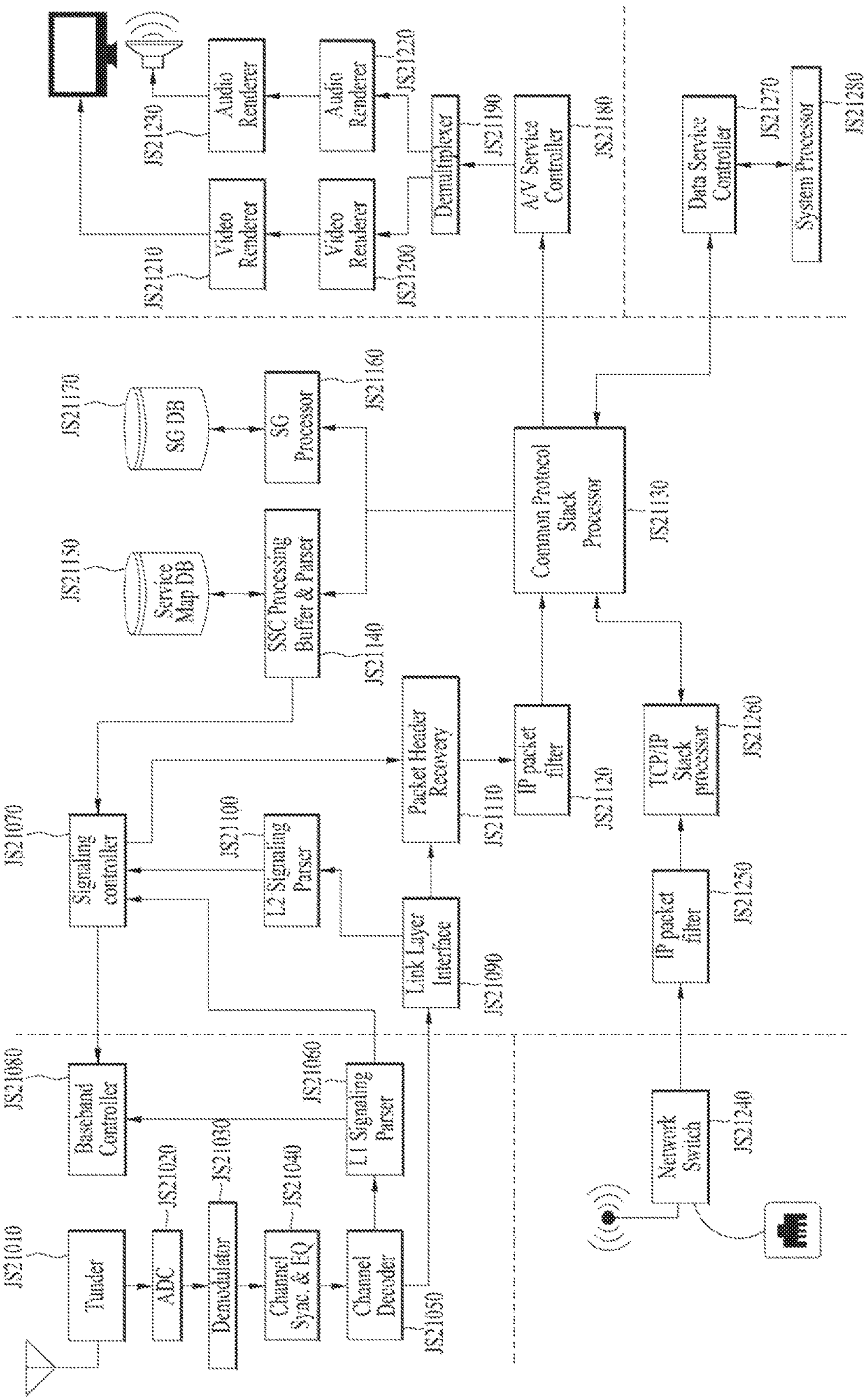

FIG. 124 is a diagram illustrating a receiver according to an embodiment of the present invention.

The receiver according to an embodiment of the present invention may include a tuner JS21010, an ADC JS21020, a demodulator JS21030, a channel synchronizer & equalizer JS21040, a channel decoder JS21050, an L1 signaling parser JS21060, a signaling controller JS21070, a baseband controller JS21080, a link layer interface JS21090, an L2 signaling parser JS21100, packet header recovery JS21110, an IP packet filter JS21120, a common protocol stack processor JS21130, an SSC processing buffer and parser JS21140, a service map database (DB) JS21150, a service guide (SG) processor JS21160, a SG DB JS21170, an AV service controller JS21180, a demultiplexer JS21190, a video decoder JS21200, a video renderer JS21210, an audio decoder JS21220, an audio renderer JS21230, a network switch JS21240, an IP packet filter JS21250, a TCP/IP stack processor JS21260, a data service controller JS21270, and/or a system processor JS21280.

The tuner JS21010 receives a broadcast signal.

When a broadcast signal is an analog signal, the ADC JS21020 converts the broadcast signal to a digital signal.

The demodulator JS21030 demodulates the broadcast signal.

The channel synchronizer & equalizer JS21040 performs channel synchronization and/or equalization.

The channel decoder JS21050 decodes a channel in the broadcast signal.

The L1 signaling parser JS21060 parses L1 signaling information from the broadcast signal. The L1 signaling information may correspond to physical layer signaling information. The L1 signaling information may include a transmission parameter.

The signaling controller JS21070 processes the signaling information or the broadcast receiver transmits the signaling information to an apparatus that requires the corresponding signaling information.

The baseband controller JS21080 controls processing of the broadcast signal in a baseband. The baseband controller JS21080 may perform processing in the physical layer on the broadcast signal using the L1 signaling information. When a connection relation between the baseband controller JS21080 and other apparatuses is not indicated, the baseband controller JS21080 may transmit the processed broadcast signal or broadcast data to another apparatus in the receiver.

The link layer interface JS21090 accesses the link layer packet and acquires the link layer packet.

The L2 signaling parser JS21100 parses L2 signaling information. The L2 signaling information may correspond to information included in the aforementioned link layer signaling packet.

When header compression is applied to a packet of an upper layer (e.g., an IP packet) than a link layer, the packet header recovery JS21110 performs header decompression on the packet. Here, the packet header recovery JS21110 may restore a header of the packet of the upper layer using information for identification of whether the aforementioned header compression is applied.

The IP packet filter JS21120 filters the IP packet transmitted to a specific IP address and/or UDP number. The IP packet transmitted to the specific IP address and/or UDP number may include signaling information transmitted through the aforementioned dedicated channel. The IP packet transmitted to the specific IP address and/or UDP number may include the aforementioned FIC, FIT, EAT, and/or emergency alert message (EAM).

The common protocol stack processor JS21130 processes data according to a protocol of each layer. For example, the common protocol stack processor JS21130 decodes or parses the corresponding IP packet according to a protocol of an IP layer and/or an upper layer than the IP layer.

The SSC processing buffer and parser JS21140 stores or parses signaling information transmitted to a service signaling channel (SSC). The specific IP packet may be designated as an SSC and the SSC may include information for acquisition of a service, attribute information included in the service, DVB-SI information, and/or PSI/PSIP information.

The service map DB JS21150 stores a service map table. The service map table includes attribute information about a broadcast service. The service map table may be included in the SSC and transmitted.

The SG processor JS21160 parses or decodes a service guide.

The SG DB JS21170 stores the service guide.

The AV service controller JS21180 performs overall control for acquisition of broadcast AV data.

The demultiplexer JS21190 divides broadcast data into video data and audio data.

The video decoder JS21200 decodes video data.

The video renderer JS21210 generates video provided to a user using the decoded video data.

The audio decoder JS21220 decodes audio data.

The audio renderer JS21230 generates audio provided to the user using the decoded audio data.

The network switch JS21240 controls an interface with other networks except for a broadcast network. For example, the network switch JS21240 may access an IP network and may directly receive an IP packet.

The IP packet filter JS21250 filters an IP packet having a specific IP address and/or a UDP number.

TCP/IP stack processor JS21260 decapsulates an IP packet according to a protocol of TCP/IP.

The data service controller JS21270 controls processing of a data service.

The system processor JS21280 performs overall control on the receiver.

Figure 125:
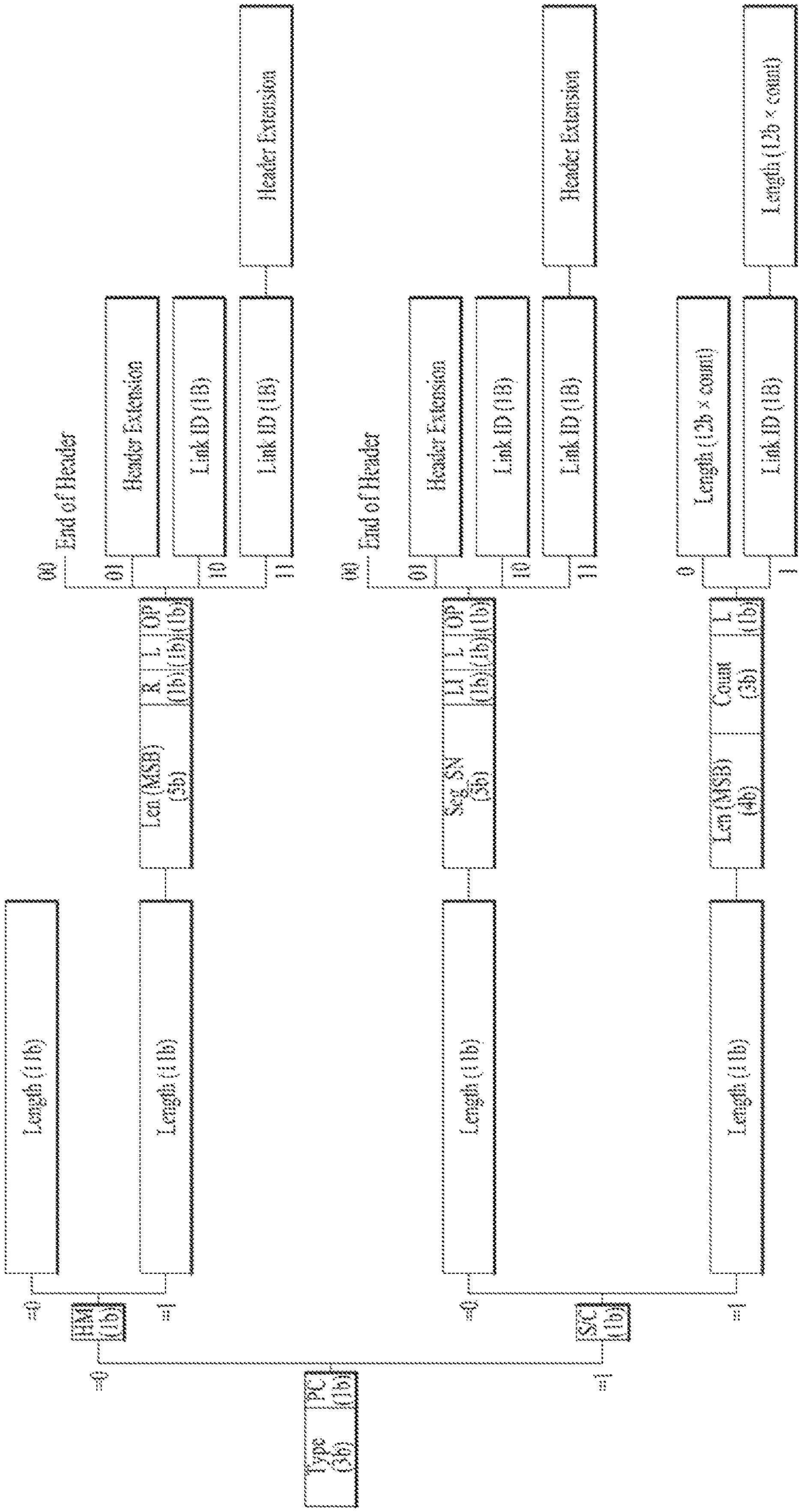

FIG. 125 is a view illustrating the structure of a header of a link layer packet according to another embodiment of the present invention.

As previously described, the link layer packet may include a header and a payload. The header may include a base header, an additional header, and/or an optional header.

The base header may include a packet type field, a PC field, and/or a length field. The respective fields have been previously described. The respective fields may be identical to the Packet_Type field, the PC field, and the length field that were previously described. In addition, the base header may include an HM field or an S/C field based on the value of the PC field. These fields may be identical to the HM field and the S/C field that were previously described.

The additional header may have various types as previously described.

In a case in which the PC field indicates that a single packet is encapsulated into a link layer packet and the HM field indicates that the corresponding signal packet is a long packet, an additional header for the long single packet may be further added. This additional header may include a Length_MSB field, an SIF field, and/or an HEF field. The respective fields have been previously described. Here, the SIF field may be indicated as an L field, and the HEF field may be indicated as an OP field. As previously described, whether the optional header exists or the configuration thereof may be indicated based on the value of the SIF field and the HEF field.

In a case in which the PC field indicates that segmentation or concatenation is utilized and the S/C field indicates that segmentation is utilized, an additional header for segmentation may be further added. This additional header may include a Seg_SN field, and LSI field, an SIF field, and/or an HEF field. The respective fields have been previously described. Here, the Seg_SN field may correspond to the Segment_Sequence_Number field, which has been previously described. The LSI field, the SIF field, and the HEF field are shown as an LI field, an L field, and an OP field, respectively. Here, depending on embodiments, the HEF field may be included only in a link layer packet having the first segment, may be included only in a link layer packet having the last segment, or may be included in all link layer packets having segments.

As previously described, this additional header may or may not include a Segment_ID field. The Segment_ID field may have the same value for link layer packets having segments included in the same packet. The Segment_ID field may not reuse the same value until the last segment is transmitted. In a case in which the packet transmission sequence is not changed in a physical layer like a broadcast stream, the packet may be reconfigured using only the Segment_Sequence_Number field and the LSI field. That is, the Segment_ID field may not be used. Even in a case of segmentation, an optional header may also be further added to the back of the additional header.

In a case in which the PC field indicates that segmentation or concatenation is utilized and the S/C field indicates that concatenation is utilized, an additional header for concatenation may be further added. This additional header may include a Length_MSB field, a Count field, and/or an HEF field. The respective fields have been previously described. Depending on embodiments, an SIF field may be located in place of the HEF field.

As previously described, this additional header may further include Component_Length fields. These Component_Length fields may be located behind the HEF field. In a case in which the HEF field indicates that an optional header exists, the corresponding optional header may be located behind the additional header, i.e. the Component_Length fields. Depending on embodiments, the optional header may be located between the HEF field and the Component_Length fields. In a case in which the SIF field is used in place of the HEF field and the SIF field indicates that an SID exists, the SID of the optional header may be located behind the additional header, i.e. the Component_Length fields. Depending on embodiments, the SID of the optional header may be located between the SIF field and the Component_Length fields.

The optional header will be described. As previously described, the optional header may include SID information and/or header extension information. The SID information has been previously described, and the header extension information may correspond to the header extension or Header_Extension( ), which has been previously described.

Here, the SID may be referred to as a link ID. The SID may serve as an identifier that is capable of identifying an upper level packet stream in a link layer. When a plurality of packet streams is transited through a signal link layer, the SID may be used to identify packet stream to which data transmitted by the corresponding link layer packet belong. That is, the SID may indicate which packet stream the corresponding link layer packet is transmitting. Here, the packet stream may be an upper layer packet stream, such as an IP stream.

As previously described, the SID may be used to identify the sub stream/packet stream. In a case in which a plurality of services is transmitted depending on embodiments, the SID may be used to identify packet streams that transmit a specific service as an identifier of the specific service. Depending on embodiments, the SID may be used to identify a plurality of IP streams, not based on the service.

Depending on embodiments, the SID may have a size of 1 byte. In this case, 256 packet streams may be identified using the SID. The size of the SID may be adjusted based on the structure of the system or the packet.

The SID to be received by the receiver may be transmitted through signaling of the system. The link layer of the receiver may filter only the link layer packet having the corresponding SID using this signaling information. The receiver may decode only packet streams desired by the receiver through the filtering. This signaling information may correspond to the LMT, which has been previously described. This LMT may include an SID of a specific packet stream, an IP address of the packet stream, and information that maps a UDP/TCP port number. When this LMT information is transmitted to the receiver, the receiver may perform link layer packet filtering at the link layer step before transmitting data to the upper layer. Of course, as previously described, the LMT may also include a specific PLP and information that maps packet streams transmitted through the PLP. In a case in which RoCH is applied depending on embodiments, the SID may be utilized as a RoCH channel, through which a context ID is transmitted.

Whether the SID is included may be identified using the SIF field or the L (Link ID Flag) field, which have been previously described. This field may have a size of 1 bit. In a case in which the SIF field has a value of 1, the SID may exist in the optional header of the corresponding link layer packet.

In addition, the HEF field or the OP (Optional Header Flag) field, which has been previously described, may indicate whether the optional header exists. This field may have a size of 1 bit. Depending on embodiments, the HEF field or the OP field may indicate whether the header extension (Header_Extension( )), which has been previously described, is included in the optional header of the corresponding link layer packet.

Figure 126:
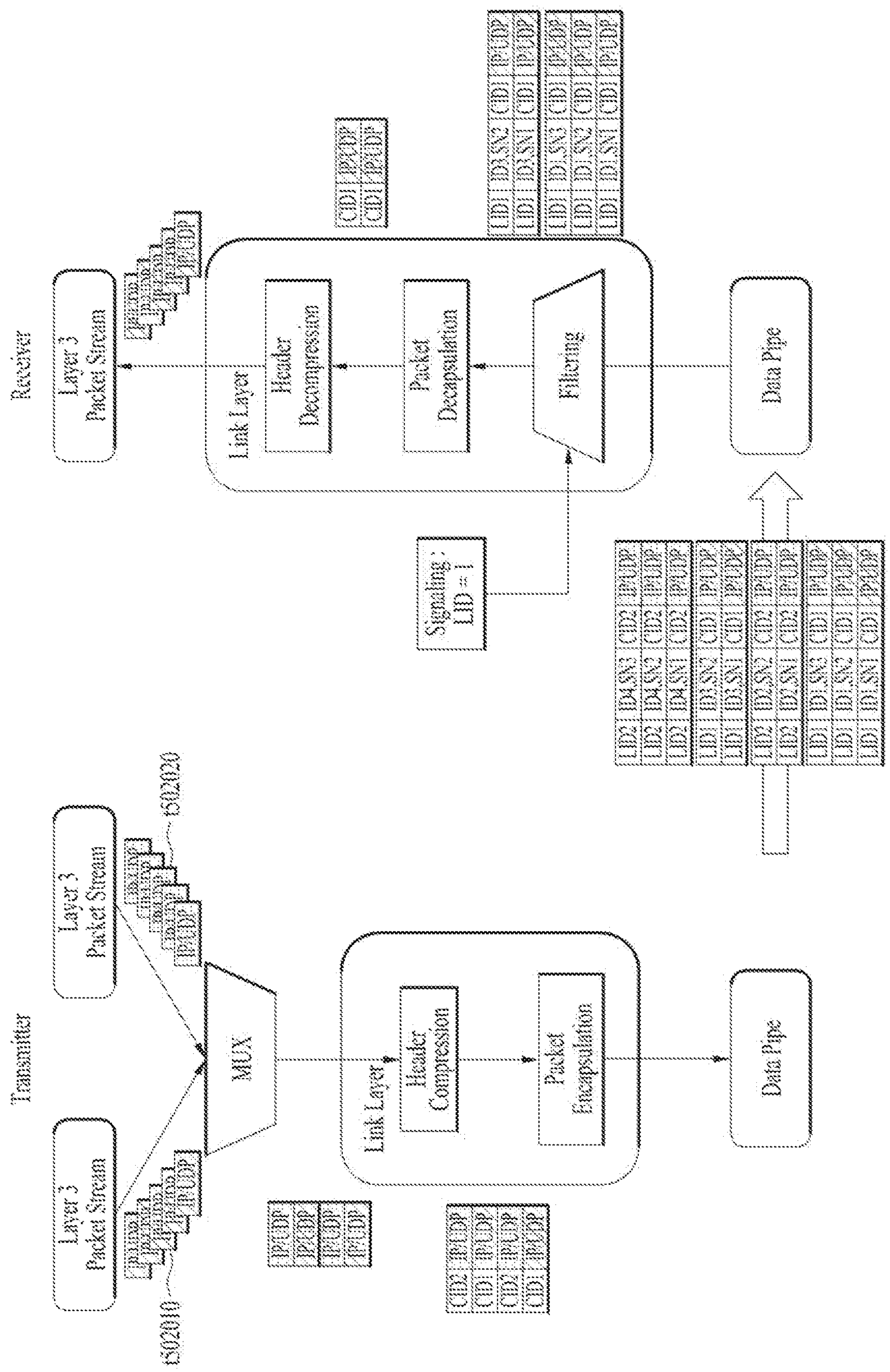

FIG. 126 is a view illustrating a method of filtering a packet stream using an SID according to an embodiment of the present invention.

In the method shown in this figure, it is assumed that a multiplexer MUX is located between an upper layer and a link layer. Here, the upper layer may mean layer 3, an IP layer, or an IP/UDP layer.

At a transmitter side, the upper layer may transmit at least one packet stream to the link layer. Here, the packet stream may be referred to as a transport stream, a data stream, a TS stream, an IP stream, a transport session, an IP session, or an upper layer session. Here, it is assumed that the packet stream is an IP/UDP packet stream. For example, a first packet stream denoted by t502010 and a second packet stream denoted by t502020 may be transmitted to the link layer.

Each packet stream may pass through the MUX before being transmitted to the link layer. IP/UDP packets which belong to the first and second packet streams may be mixed by the MUX. Subsequently, the multiplexed IP/UDP packets may be transmitted to the link layer.

As previously described, a header compression and/or packet encapsulation procedure may be performed in the link layer. Depending on embodiments, the header compression procedure may be omitted. Input packets may be encapsulated into link layer packets through the packet encapsulation procedure.

In the header compression procedure, context information about each IP stream may be extracted. A context ID (CID) may be assigned to each compressed IP stream. For example, CID1 may be assigned to the first packet stream, and CID2 may be assigned to the second packet stream.

In the packet encapsulation procedure, each input packet may be encapsulated into a link layer packet. For example, in a case in which segmentation is executed, a segment ID and/or a segment sequence number may be assigned to each link layer packet. The segment ID may correspond to the Segment_ID field, which has been previously described, and the segment sequence number may correspond to the Seg_SN field, which has been previously described. In a case in which IP packet #1 is divided into three segments, segment IDs and segment sequence numbers, e.g. (SID1, SN1), (SID1, SN2), and (SID1, SN3), may be assigned to link layer packets having the respective segments. As previously described, the segment ID may be omitted. In this figure, the SID may mean the segment ID.

In addition, the same SID may be assigned to link layer packets that transport data of packets belonging to the same upper layer packet stream. In this figure, the SID is shown as an LID. For example, link layer packets that transport packets belonging to the first packet stream may have LID1 as an SID value, and link layer packets that transport packets belonging to the second packet stream may have LID2 as an SID value.

Information about mapping between the SID (Sub-stream ID) and the upper layer packet stream may be transmitted to the receiver through signaling. The receiver may be aware of target packet streams to be decoded/parsed in the link layer in advance through configuration information (mapping information) about the SID.

The link layer packets may be generated as a broadcast signal through physical layer processing procedures, such as encoding and interleaving, which have been previously described. The physical layer processing may be executed in units of DP or PLP. This broadcast signal may be transmitted to the receiver. Depending on embodiments, link layer processing may be executed as part of the physical layer processing. In this case, a hardware module that executes the link layer processing may be part of a hardware module that manages the physical layer.

The receiver may decode the received broadcast signal through the physical layer processing. The link layer at the receiver side may process only desired packet streams through filtering. The SID (Sub-stream ID) may be used for this filtering. Information about this SID may be transmitted from the transmitter to the receiver through signaling. The receiver may identify a target packet stream from the link layer, and execute packet decapsulation and header decompression procedures for the identified target packet stream. Subsequently, the packet stream may be transmitted to the upper layer. For example, link layer packets having an SID of 1 may be filtered, decapsulated, and transmitted to the upper layer. The receiver may acquire the original first packet stream t502010. Since desired data are processed, the system load at the receiver side may be reduced.

Figure 127:
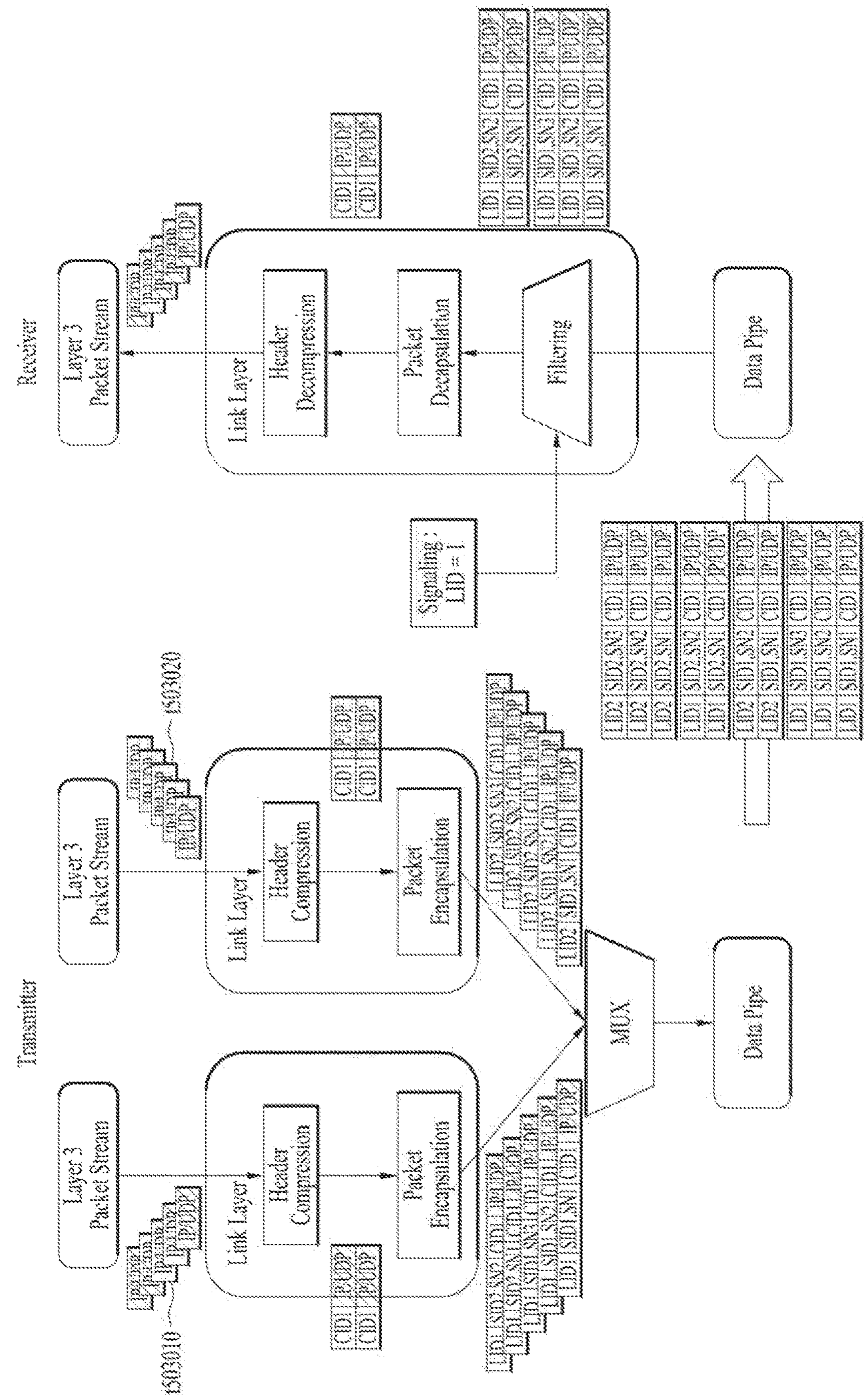

FIG. 127 is a view illustrating a method of filtering a packet stream using an SID according to another embodiment of the present invention.

In the method shown in this figure, it is assumed that a multiplexer MUX is located between a link layer and a physical layer. Here, an upper layer may mean layer 3, an IP layer, or an IP/UDP layer.

In the same manner, the upper layer may transmit a first packet stream t503010 and a second packet stream t503020 to the link layer. The link layer may execute header compression and/or packet encapsulation for each packet stream. As previously described, the header compression procedure may be omitted.

Each packet stream may be compressed through header compression, and the CID may be assigned to each compressed packet stream. In addition, each input packet may be encapsulated into a link layer packet through encapsulation, and a segment ID and/or a segment sequence number may be assigned to each input packet. In addition, an SID (Sub-stream ID) may be assigned to each of the link layer packets that transports the respective upper layer packet streams. As previously described, the SID may be included in an optional header of the corresponding link layer packet.

The link layer packets output from the link layer may be input to the MUX, in which the link layer packets may be multiplexed. Subsequently, the physical layer may execute physical layer processing to generate a broadcast signal, and the generated broadcast signal may be transmitted to the receiver.

In the same manner, the receiver may filter link layer packets that transport desired packet streams using mapping information related to the SID received through signaling. The filtered link layer packets may be decapsulated, header-decompressed, and transmitted to the upper layer. As a result, the receiver may acquire the original first packet stream t503010.

Figure 128:
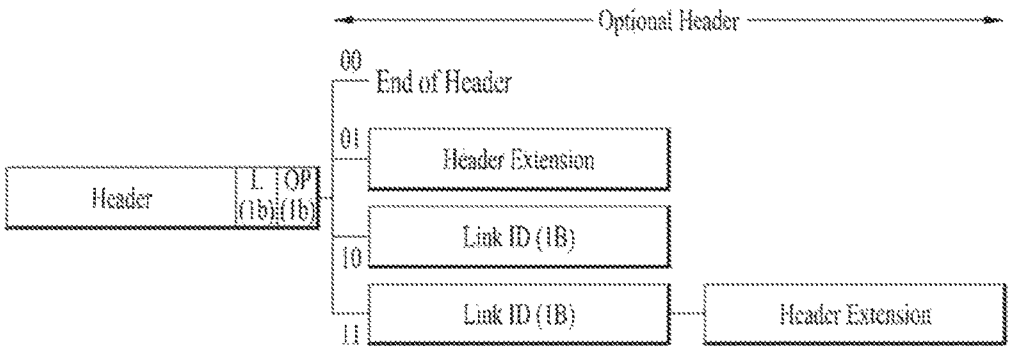

FIG. 128 is a view illustrating the configuration of an optional header according to an embodiment of the present invention and fields related thereto.

The optional header may be attached to the rear of the front part of the aforesaid header. The optional header may be added to the back of the additional header, which has been previously described. As previously described, the optional header may include an SID and/or header extension (Header_Extension( )). In a case in which the SID is included, the SID may be located in front of Header_Extension( ) in the optional header.

The SIF field and/or the HEF field, which has been previously described, may be included behind the additional header. Based on the type of the additional header, only the SIF field or the HEF field may be present. Here, the SIF field and the HEF field have been previously described. In this figure, the SIF field and the HEF field are shown as an L field and an OP field, respectively.

The SIF field may indicate whether an SID (link ID) is included in the optional header of the corresponding link layer packet. The HEF field may indicate whether the corresponding link layer packet includes the optional header. Depending on embodiments, the HEF field may indicate whether Header_Extension( ) is included in the optional header of the corresponding link layer packet.

In a case in which the values of the SIF field and the HEF field are 0 and 0, respectively, neither an optional header nor an SID may be present. In a case which the values of the SIF field and the HEF field are 0 and 1, respectively, an optional header may exist but no SID may be included in the optional header. In a case which the values of the SIF field and the HEF field are 1 and 0, respectively, no optional header may exist but an SID may be included behind an additional header. In this case, the SID may be added irrespective of the optional header. In a case which the values of the SIF field and the HEF field are 1 and 1, respectively, an optional header may exist and an SID may be included in the optional header.

In an embodiment in which the HEF field indicates whether Header_Extension( ) exists, in a case in which the values of the SIF field and the HEF field are 0 and 0, respectively, the HEF field may indicate that no Header_Extension( ) exists. In a case in which the values of the SIF field and the HEF field are 0 and 1, respectively, the HEF field may indicate that only Header_Extension( ) is included in the optional header. In a case in which the values of the SIF field and the HEF field are 1 and 0, respectively, the HEF field may indicate that only the SID is included in the optional header. In a case in which the values of the SIF field and the HEF field are 1 and 1, respectively, the HEF field may indicate that the SID and Header_Extension( ) are sequentially included in the optional header. This case may indicate that the optional header exists and only the SID is included in the optional header without header extension information.

Depending on embodiments, in an embodiment in which HEF field indicates whether Header_Extension( ) exists, the positions of the SID and Header_Extension( ) in the optional header may be determined based on the positions of the SIF field and the HEF field in the additional header.

Depending on embodiments, the optional header may be omitted. In a system in which no optional header is used, the HEF field may also be omitted. Header_Extension( ) which is information including extension fields defined for future use, may be omitted if not necessary.

Figure 129:
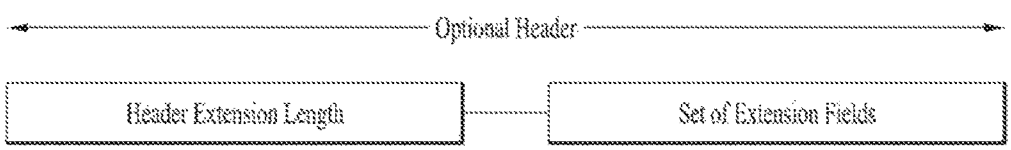

FIG. 129 is a view illustrating the structure of an optional header according to another embodiment of the present invention.

In this figure, the optional header includes only Header_Extension( ) with no SID. The Header_Extension( ) part may be referred to as header extension, a header extension part, or header extension information. As previously described, the Header_Extension( ) part may include an Extension_Type field, an Extension_Length field, and/or an Extension_Byte field.

In the illustrated embodiment, Header_Extension( ) may be divided into a header extension length part indicating the length of the header extension part and the remaining fields of the header extension part (a set of extension fields). The header extension length part may correspond to the Extension_Length field, which has been previously described. The fields of the header extension part may correspond to the Extension_Type field and/or the Extension_Byte field. The Extension_Byte field may mean real header extension information.

Figure 130:
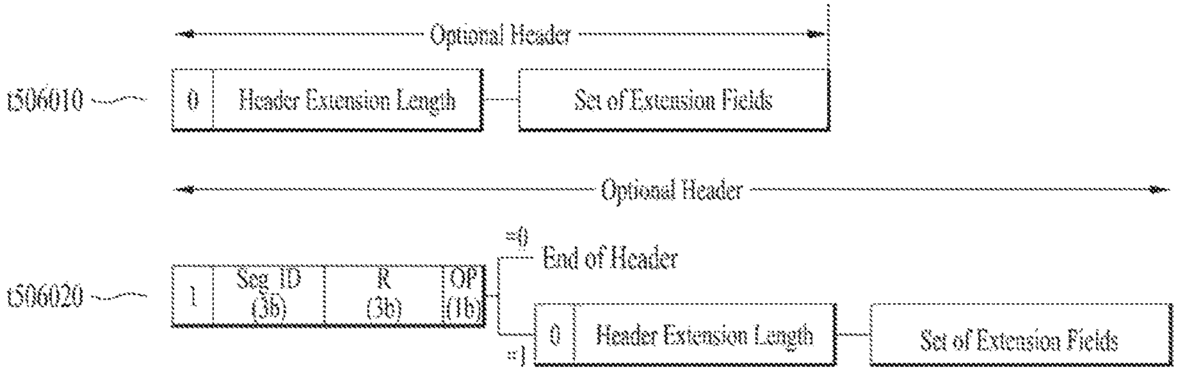

FIG. 130 is a view illustrating a scheme for configuring an optional header according to another embodiment of the present invention.

In a case of segmentation, an additional header for segmentation may be added to the base header, as previously described. In this case, the Seg_ID field may be omitted from the additional header, as previously described. In a case in which segments are sequentially transmitted, it is possible for the reception side to recombine packets using only the LSI field and the Seg_SN field without the Seg_ID field.

In a case in which the Seg_ID field is omitted, however, the optional header may include the Seg_ID field depending on embodiments. In this embodiment, an additional field may be included in order to indicate whether the optional header includes the Seg_ID field.

In a first embodiment t506010, the optional header includes Header_Extension( ) with no SID. As previously described, Header_Extension( ) may be divided into a part indicating the length of Header_Extension( ) and the remaining parts. The first bit of Header_Extension( ) may be assigned in order to indicate whether an Seg_ID field is included. In a case in which the first bit has a value of 0, segment ID information may not be included in the corresponding optional header or Header_Extension( ). In a case in which the field indicating the length of Header_Extension( ) has a length of 1 byte, the remaining 7 bits excluding the first bit may indicate the length of Header_Extension( ) Header_Extension( ) having the indicated length may follow.

In a second embodiment t506020, the optional header includes Header_Extension( ) with no SID, and the first bit of Header_Extension( ) may be assigned in order to indicate whether segment ID information exists. In a case in which the first bit has a value of 1, a Seg_ID field may follow. As previously described, the Seg_ID field may indicate the ID of a packet in which the corresponding segment is included. A reserved bit may or may not be included behind the field as needed.

An additional HEF field (or an OP field) may be included behind it. The HEF field may indicate whether an additional optional header part further exists behind an optional header including the Seg_ID field. An HEF field indicating whether the entire optional header exists (a general HEF field, which has been previously described) may be included in the additional header, irrespective of the HEF field.

In a case in which the additional HEF field has a value of 0, no further optional header part (for example, Header_Extension( )) may exist. In a case in which the additional HEF field has a value of 1, an additional optional header part having the same structure as the first embodiment t506010 may follow. In this case, the first bit of the additional optional header part may have a value of 0. This may be because it is not necessary to transmit segment ID information any more due to duplication. Depending on embodiments, the first bit may have a value of 1 in order to indicate that other information is transmitted through the optional header.

Depending on embodiments, the field indicating whether the aforementioned segment ID exists may be assigned to bits other than the first bit.

FIG. 131 is a view illustrating a scheme for configuring an optional header according to another embodiment of the present invention.

In the aforementioned embodiment of the additional header, the additional header includes an SIF field and/or an HEF field in most cases. Depending on embodiments, these two fields may additionally exist, but only a flag having a size of 1 bit may exist in the additional header. In this case, in the optional header, the configuration of the corresponding optional header may be indicated. To this end, the optional header may include a T1 field and/or a T2 field, which will be hereinafter described.

In the illustrated embodiment t507010, the front header of the optional header may include only an HEF field (or an OP field) having a size of 1 bit. In a case in which this HEF field has a value of 0, it may indicate that no optional header exists. In this case, no optional header may be included behind the additional header.

In a case in which this HEF field has a value of 1, it may indicate that an optional header additionally exists. In this case, the first bit of the added optional header may be assigned to the T1 field. The configuration of the optional header may be indicated based on the value of the T1 field. In a case in which the T1 field has a value of 0, the optional header may include SID information. The SID information may be located starting with the bit after the T1 field.

In a case in which the T1 field has a value of 1, the second bit may be assigned to the T2 field. The configuration of the following optional header may be indicated based on the value of the T2 field. In a case in which the T2 field has a value of 0, the optional header may include a Seg_ID field. The Seg_ID field may be assigned from the bit after the T2 field. In a case in which the T2 field has a value of 1, the optional header may include Header_Extension( ) Header_Extension( ) may be assigned from the bit after the T2 field. As previously described, Header_Extension( ) may be divided into a part indicating the length of Header_Extension( ) and the remaining fields of Header_Extension( ).

The method of configuring the optional header described in the illustrated embodiment t507010 may be arranged as in an embodiment t507020. In a case in which the T1 field has a value of 0, no T2 field may exist, and the SID information may be located from the second bit. In a case in which the T1 field has a value of 1, the T2 field may follow. The Seg_ID field or Header_Extension( ) may be located in this optional header based on the value of the T2 field.

Depending on embodiments, the aforesaid T1 and T2 fields may be assigned to bits other than the first bit and the second bit, respectively.

FIG. 132 is a view illustrating a scheme for configuring an optional header according to another embodiment of the present invention.

Depending on embodiments, the aforesaid base header or additional header may further include an OP_cnt (Optional header count) field. The OP_cnt field may be located in a reserved bit of the base header or the additional header, or may be located in place of the existing fields. For example, the OP_cnt field may be located in place of the HEF field and the SIF field.

The OP_cnt field may be a 2-bit field. In a case in which this field has a value of 00, it may indicate that no optional header exists. In a case in which this field has a value of 01, it may indicate that one optional header exists. In a case in which this field has a value of 10, it may indicate that two optional headers exist. In a case in which this field has a value of 11, it may indicate that three optional headers exist. The optional headers may be located behind the base header or the additional header (t508010).

Each optional header may have a structure of the optional header which has been described in the previous embodiment. Each optional header may have one selected from among embodiments of the structure of the optional header which have been previously described. Depending on embodiments, the respective optional headers may have different structures. For example, the added optional header may have the same structure as the illustrated embodiment t508020. This structure may use the aforesaid T1 and T2 fields. The details of this structure have been previously described.

FIG. 133 is a view illustrating a scheme for configuring an optional header in a case of concatenation according to another embodiment of the present invention.

In the case of concatenation, which has been previously described, the additional header may include a Len MSB field, a Count field, an HEF field, and/or Component_Length fields. The optional header may be located behind the additional header. In general, the optional header may be located behind the Component_Length fields. Depending on embodiments, however, the Component_Length fields may be located behind the optional header.

An HEF field t509010 of the additional header, which has been previously described, may indicate whether the optional header exists. In a case in which the value of the HEF field is 0, no optional header may exist. In this case, the Component_Length fields, which are the remaining parts of the additional header, may be located behind the HEF field, and no optional header may exist behind these fields.

In a case in which the value of the HEF field is 1, an optional header may exist. This optional header may be configured as will be described hereinafter.

The first bit of the optional header may be assigned to an SIF field. As previously described, the SIF field may indicate whether SID information is included in a corresponding link layer packet. In addition, the SIF field may indicate whether the SID information is included in an optional header of the corresponding link layer packet. Depending on embodiments, the SIF field may be assigned to a bit other than the first bit of the optional header.

A length field indicating the length of Header_Extension( ) may be located behind the SIF field. This length field may have a size of 7 bits. Depending on embodiments, this size may be changed. Depending on embodiments, the field indicating the length of Header_Extension( ) may indicate the total length of the optional header, may indicate the length of Header_Extension( ), may indicate the length of Header_Extension( ) excluding its own length, or may indicate the sum of the total length of the optional header and the length of the Component_Length fields.

In a case in which the SIF field has a value of 0, the corresponding optional header may include no SID information. In this case, the remaining fields of Header_Extension( ) may be located behind the length field of Header_Extension( ). In an embodiment in which the Component_Length fields are located behind the optional header, the Component_Length fields may be located behind the remaining fields of Header_Extension( ).

In a case in which the SIF field has a value of 1, the corresponding optional header may include SID information. In this case, the SID information may be located behind the length field of Header_Extension( ). Depending on embodiments, this SID information may have a size of 1 byte. In a case in which the SID information has a fixed size, it may be unnecessary for the length field of Header_Extension( ) to indicate the size of the corresponding SID information. The remaining fields of Header_Extension( ) may be located behind it. In an embodiment in which the Component_Length fields are located behind the optional header, the Component_Length fields may be located behind the remaining fields of Header_Extension( ).

FIG. 134 is a view illustrating a scheme for configuring an optional header in a case of concatenation according to another embodiment of the present invention.

This embodiment may be similar to the scheme for configuring the optional header in the case of concatenation which has been previously described. In the case of concatenation, the optional header may be added behind the additional header. In the same manner, the optional header may generally be located behind the Component_Length fields. Depending on embodiments, however, the Component_Length fields may be located behind the optional header.

An HEF field t510010 of the additional header may indicate whether the optional header exists. In a case in which the value of the HEF field is 0, no optional header may exist, and the Component_Length fields, which are the remaining parts of the additional header, may be located behind the HEF field.

In a case in which the value of the HEF field is 1, an SIF field may be located behind the HEF field. In a case in which the SIF field has a value of 0, a Header_Extension( ) part may follow without an SID field. The Component_Length fields may be located behind Header_Extension( ).

In a case in which the SIF field has a value of 1, SID may follow. An additional HEF field may be located behind the SID. In a case in which the value of the additional HEF field is 0, the Component_Length fields may be directly located with no Header_Extension( ) part. In a case in which the value of the additional HEF field is 1, the Header_Extension( ) part may be present. As previously described, the first bit of the Header_Extension( ) part may indicate whether an SID is present thereafter. Since the SID has already been transmitted, which amounts to duplication, the value of this field may be set to 0. The Header_Extension( ) part may be located behind the first bit, and the Component_Length fields may be located behind it.

Depending on embodiments, the Component_Length fields may be directly located behind the HEF field t510010 (an additional header), and optional headers may follow it according to the aforesaid structure.

FIG. 135 is a view illustrating a broadcast signal transmission method according to an embodiment of the present invention.

A broadcast signal transmission method according to an embodiment of the present invention may include a step of generating service data of a broadcast service, a step of encapsulating the service data into a plurality of transport packets of a transport stream, a step of link processing the transport packets to generate link layer packets, a step of generating a broadcast signal, and/or a step of transmitting the broadcast signal.

First, a first module at a transmission side may generate service data of a broadcast service. The first module at the transmission side, which is a service provider, may be a module that generates data necessary to reproduce a service. The service data may mean all kinds of information related to services, such as audio/video components, captioning, service signaling information, and SLT.

Subsequently, a second module at the transmission side may encapsulate the generated service data into a plurality of transport packets. Here, the second module, which is a hardware module that manages IP/UDP processing, may be a module that performs encapsulation of ROUTE/MMTP packets into IP/UDP packets in a UDP or IP layer on a protocol stack. Here, the transport packets may mean IP packets. Depending on embodiments, other transport packets, e.g. a TS, may be utilized in addition to the IP. The transport packets may be transmitted through a transport stream. Here, the transport stream may mean a packet stream, an IP stream, a transmission session, an upper layer session, or an upper layer packet stream, which have been previously described.

A third mode at the transmission side may link process the transport packets of the transport stream. Link layer packets may be output through link processing. Here, each link layer packet may include a base header, which has been previously described. According to circumstances, some link layer packets may include an additional header, and some link layer packets may include an optional header.

The generated link layer packets may be physical layer processed by the third module. A broadcast signal may be generated through physical layer processing, and this broadcast signal may be transmitted to a receiver. This may also be performed by the third module. The third module may be a hardware module that performs an operation corresponding to the link layer on the protocol and/or an operation corresponding to the physical layer. The third module may also include an antenna used for transmission. Depending on embodiments, the link layer processing may be executed as part of the physical layer processing. In this case, the hardware module that executes the link layer processing may be part of the hardware module (the third module) that manages the physical layer. Depending on embodiments, the modules that manage the respective layers may be provided separately. That is, the third module may be divided into two or more parts based on the role thereof.

In a broadcast signal transmission method according to another embodiment of the present invention, an optional header of at least one link layer packet may include a sub stream identifier, and the sub stream identifier may be used to filter a transport stream delivered by the corresponding link layer packet. Here, the sub stream identifier may correspond to the aforesaid SID (sub stream ID). As previously described, the SID may be used to identify data of which upper layer packet stream are data transmitted by a link layer packet that delivers the corresponding SID. Depending on embodiments, the SID may be utilized as a service ID.

In a broadcast signal transmission method according to another embodiment of the present invention, another link layer packet selected from among a plurality of link layer packets may include a link mapping table, and the link mapping table may include information about transport streams that are delivered through a single PLP. Here, another link layer packet may not mean a link layer packet that delivers IP packets (Packet Type=000) but may mean a link layer packet that delivers link layer signaling (Packet Type=100). The link mapping table may correspond to the aforesaid LMT. As previously described, the LMT may provide a specific PLP with a list of upper layer packet streams that are delivered through the PLP.

In a broadcast signal transmission method according to another embodiment of the present invention, a link mapping table may include an identifier of a single PLP, and information about each transport stream may include information about the IP address and the UDP port number of the corresponding transport stream. As previously described, the LMT may include PLP ID information of a PLP related to the corresponding LMT and IP/UDP information that is capable of identifying packet streams transmitted through the PLP (a Source IP address, a Destination IP address, a Source UDP port number, a Destination UDP port number, etc.).

In a broadcast signal transmission method according to another embodiment of the present invention, information about each transport stream may further include a sub stream identifier flag field, and the sub stream identifier flag field may indicate whether optional headers of link layer packets that deliver the corresponding transport stream each includes a sub stream identifier. Here, the sub stream identifier flag may correspond to the SID_Flag field in the LMT, which has been previously described. The SID_Flag field may indicate whether link layer packets that deliver a packet stream identified by the aforesaid IP/UDP information include an SID in their optional header. In addition, this field may indicate whether the SID field exists in the LMT.

In a broadcast signal transmission method according to another embodiment of the present invention, information about each transport stream may further include a sub stream identifier field, and the sub stream identifier field may have the same value as the sub stream identifier possessed by an optional header of link layer packets that deliver the corresponding transport stream. Here, the sub stream identifier field may correspond to the SID field in the LMT. The SID field in the LMT may have the same value as the SID possessed by link layer packets that deliver the packet stream identified by the aforesaid IP/UDP information. The LMT may map an upper layer packet stream to the SID through the SID field and the IP/UDP information.

In a broadcast signal transmission method according to another embodiment of the present invention, a base header may include information indicating the type of the transport packet included in a corresponding link layer packet and information indicating the configuration of a payload of the corresponding link layer packet. The pieces of information may correspond to the Packet_Type field and/or the PC field, which has been previously described.

The additional header may include additional information about the link layer packet indicated by the information about the base header based on the configuration of the corresponding link layer packet. As previously described, additional headers may have different configurations according to circumstances, and each additional header may have information about a corresponding link layer packet.

The optional header may further include information about an extended header of a corresponding link layer packet, and the information about the extended header may be located behind a sub stream identifier. The information about the extended header may correspond to Header_Extension( ), which has been previously described. In a case in which both the SID and Header_Extension( ) are included in the optional header, Header_Extension( ) may be located behind the SID in the optional header.

In addition, the additional header may be located behind the base header, and the optional header may be located behind the additional header.

Hereinafter, a broadcast signal reception method according to an embodiment of the present invention will be described. This method is not shown in the drawings.

A broadcast signal reception method according to an embodiment of the present invention may include a step of a first module at a reception side receiving a broadcast signal, a step of the first module parsing the broadcast signal to acquire a link layer packet, a step of the first module parsing the link layer packet to acquire a plurality of transport packets included in a transport stream, a step of a second module at the reception side processing the transport packets to acquire service data, and/or a step of a third module at the reception side providing a service using the transport packets. Depending on embodiments, the first module at the reception side may filter a link layer packet that delivers a desired transport stream using SID information received through signaling before decapsulating the link layer packet. Only these link layer packets may be decapsulated.

Broadcast signal reception methods according to embodiments of the present invention may correspond to the broadcast signal transmission methods according to the embodiments of the present invention that have been previously described. The broadcast signal reception methods may be performed by hardware modules corresponding to the modules (for example, the first, second, and third modules at the reception side) used in the broadcast signal transmission methods. The broadcast signal reception method may have embodiments corresponding to those of the broadcast signal transmission method that have been previously described.

Depending on embodiments, the aforesaid steps may be omitted or may be replaced by other steps at which the same or similar operations are performed.

FIG. 136 is a view illustrating a broadcast signal transmission apparatus according to an embodiment of the present invention.

A broadcast signal transmission apparatus according to an embodiment of the present invention may include a first module, a second module, and/or a third module at a transmission side, which have been previously described. Each block or module has been previously described.

A broadcast signal transmission apparatus according to an embodiment of the present invention and the modules/blocks therein may perform the embodiments of the broadcast signal transmission method, which have been previously described.

Hereinafter, a broadcast signal transmission apparatus according to an embodiment of the present invention will be described. This apparatus is not shown in the drawings.

A broadcast signal transmission apparatus according to an embodiment of the present invention may include a first module, a second module, and/or a third module at a reception side, which have been previously described. Each block or module has been previously described.

A broadcast signal transmission apparatus according to an embodiment of the present invention and the modules/blocks therein may perform the embodiments of the broadcast signal reception method, which have been previously described.

The blocks/modules in the apparatus may be processors that execute a series of procedures stored in a memory. Depending on embodiments, they may be hardware elements located inside/outside the apparatus.

Depending on embodiments, the aforesaid modules may be omitted or may be replaced by other modules that perform the same of similar operations.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method for transmitting a broadcast signal in a digital transmitter, the method comprising:

generating transport packets of transport streams including service data;

generating a link layer packet including the transport packets, the link layer packet including a base header including configuration information indicating a configuration of a payload of the link layer packet, the link layer packet further including an additional header including information representing that an optional header for a sub-stream identifier is present after the additional header, and the link layer packet further including an optional header having the sub-stream identifier;

generating signaling information including link mapping information between the sub-stream identifier and an internet protocol (IP) address and a user datagram protocol (UDP) port carrying a transport stream for the sub-stream identifier;

generating the broadcast signal including the link layer packet and the signaling information; and transmitting the broadcast signal, wherein the sub-stream identifier in the link layer packet and the signaling information are used to filter out a specific transport stream carried in the corresponding link layer packet in a link layer level.

2. The method according to claim 1, the method further comprising:

compressing at least one header of at least one IP packet, wherein the at least one IP packet includes at least one initialization and refresh (IR) packet, at least one IR-dynamic (IR-DYN) packet and at least one compressed packet; and extracting context information based on a processing mode.

3. A digital transmitter for transmitting a broadcast signal, the digital transmitter comprising:

a packet generator configured to generate transport packets of transport streams including service data, and generate a link layer packet including the transport packets, the link layer packet including a base header including configuration information indicating a configuration of a payload of the link layer packet, the link layer packet further including an additional header including information representing that an optional header for a sub-stream identifier is present after the additional header, the link layer packet further including an optional header having the sub-stream identifier;

a signaling information generator configured to generates signaling information including link mapping information between the sub-stream identifier and an internet protocol (IP) address and a user datagram protocol (UDP) port carrying a transport stream for the sub-stream identifier; and a frame builder configured to generate the broadcast signal including the link layer packet and the signaling information, and transmit the broadcast signal, wherein the sub-stream identifier in the link layer packet and the signaling information are used to filter out a specific transport stream carried in the corresponding link layer packet in a link layer level.

4. The digital transmitter according to claim 3, wherein the digital transmitter further performs:

compressing at least one header of at least one IP packet, wherein the at least one IP packet includes at least one initialization and refresh (IR) packet, at least one IR-dynamic (IR-DYN) packet and at least one compressed packet; and extracting context information based on a processing mode.

5. A method for receiving a broadcast signal in a digital receiver, the method comprising:

receiving the broadcast signal including transport packets of transport streams including service data and signaling information, the transport packets including a link layer packet; and parsing the link layer packet and the signaling information, the signaling information including link mapping information between a sub-stream identifier and an internet protocol (IP) address and a user datagram protocol (UDP) port carrying a transport stream for the sub-stream identifier, the link layer packet including a base header including configuration information indicating a configuration of a payload of the link layer packet, the link layer packet further including an additional header including information representing that an optional header for the sub-stream identifier is present after the additional header, and the link layer packet including an optional header having the sub-stream identifier, wherein the sub-stream identifier in the link layer packet and the signaling information are used to filter out a specific transport stream carried in the corresponding link layer packet in a link layer level.

6. The method according to claim 5, the method further comprising:

de-compressing at least one IP packet by recovering at least one header of the at least one IP packet based on context information from the broadcast signal, wherein the at least one IP packet includes at least one initialization and refresh (IR) packet, at least one IR-dynamic (IR-DYN) packet and at least one compressed packet.

7. An apparatus for receiving a broadcast signal, the apparatus comprising:

a receiver configured to receive the broadcast signal including transport packets of transport streams including service data and signaling information, the transport packets including a link layer packet; and at least one processor configured to parse the link layer packet and the signaling information, the signaling information including link mapping information between a sub-stream identifier and an internet protocol (IP) address and a user datagram protocol (UDP) port carrying a transport stream for the sub-stream identifier, the link layer packet including a base header including configuration information indicating a configuration of a payload of the link layer packet, the link layer packet further including an additional header including information representing that an optional header for the sub-stream identifier is present after the additional header, and the link layer packet including an optional header having the sub-stream identification identifier, wherein the sub-stream identifier in the link layer packet and the signaling information are used to filter out a specific transport stream carried in the corresponding link layer packet in a link layer level.

8. The apparatus according to claim 7, wherein the apparatus further performs:

de-compressing at least one IP packet by recovering at least one header of the at least one IP packet based on context information from the broadcast signal, wherein the at least one IP packet includes at least one initialization and refresh (IR) packet, at least one IR-dynamic (IR-DYN) packet and at least one compressed packet.

* * * * *